United States Patent [19]

Colley et al.

[11] 4,325,120
[45] Apr. 13, 1982

[54] DATA PROCESSING SYSTEM

[75] Inventors: Stephen R. Colley, Aloha; George W. Cox, Portland; Justin R. Rattner, Aloha; Roger C. Swanson, Portland, all of Oreg.

[73] Assignee: Intel Corporation, Santa Clara, Calif.

[21] Appl. No.: 971,661

[22] Filed: Dec. 21, 1978

[51] Int. Cl.³ .......................................... G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,648,253 | 3/1972 | Mullery et al. | 364/200 |
| 3,787,818 | 1/1974 | Arnold et al. | 364/200 |
| 3,905,023 | 9/1975 | Perpiglia | 364/200 |
| 4,044,334 | 8/1977 | Bachman et al. | 364/200 |
| 4,047,161 | 9/1977 | Davis | 364/200 |
| 4,060,849 | 11/1977 | Brenvenu et al. | 364/200 |
| 4,071,890 | 1/1978 | Pandeya | 364/200 |
| 4,084,224 | 4/1978 | Appell et al. | 364/200 |
| 4,104,718 | 8/1978 | Poublan et al. | 364/200 |

Primary Examiner—Harvey E. Springborn
Attorney, Agent, or Firm—Owen L. Lamb

[57] ABSTRACT

A data processor architecture wherein the processors recognize two basic types of objects, an object being a representation of related information maintained in a contiguously-addressed set of memory locations. The first type of object contains ordinary data, such as characters, integers, reals, etc. The second type of object contains a list of access descriptors. Each access descriptor provides information for locating and defining the extent of access to an object associated with that access descriptor. The processors recognize complex objects that are combinations of objects of the basic types. One such complex object (a context) defines an environment (for execution) of objects accessible to a given instance of a procedural operation. The dispatching of tasks to the processors is accomplished by hardware-controlled queuing mechanisms (dispatching-port objects) which allow multiple sets of processors to serve multiple, but independent sets of tasks. Communication between asynchronous tasks or processes is accomplished by related hardware-controlled queuing mechanisms (buffered-port objects) which allow messages to move between internal processes or input/output processes without the need for interrupts. A mechanism is provided which allows the processors to communicate with each other. This mechanism is used to reawaken an idle processor to alert the processor to the fact that a ready-to-run process at a dispatching port needs execution.

56 Claims, 20 Drawing Figures

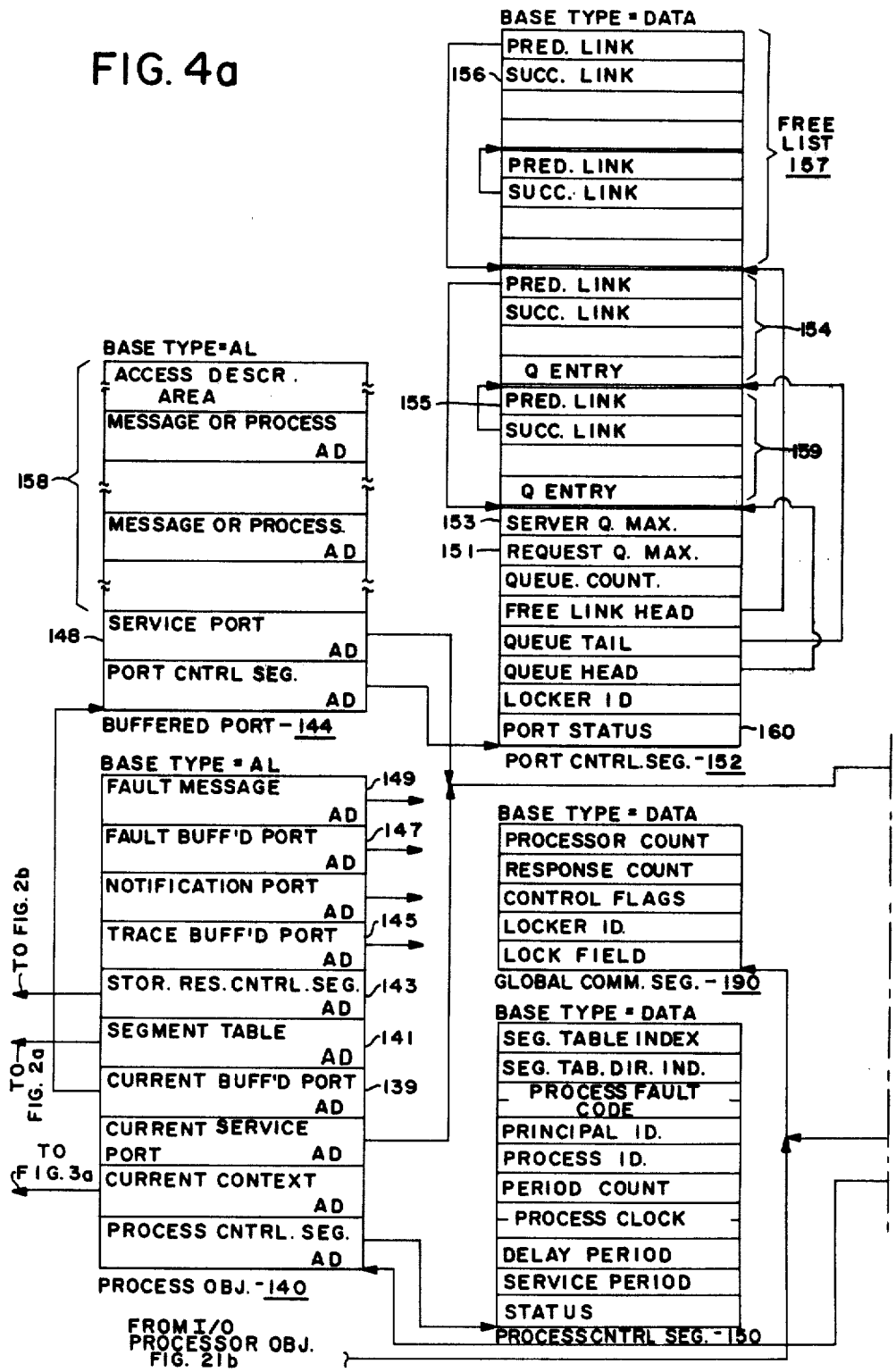

FIG. 7 INSTRUCTION UNIT

FIG. 8-EXECUTION UNIT

CLOCK TIMING

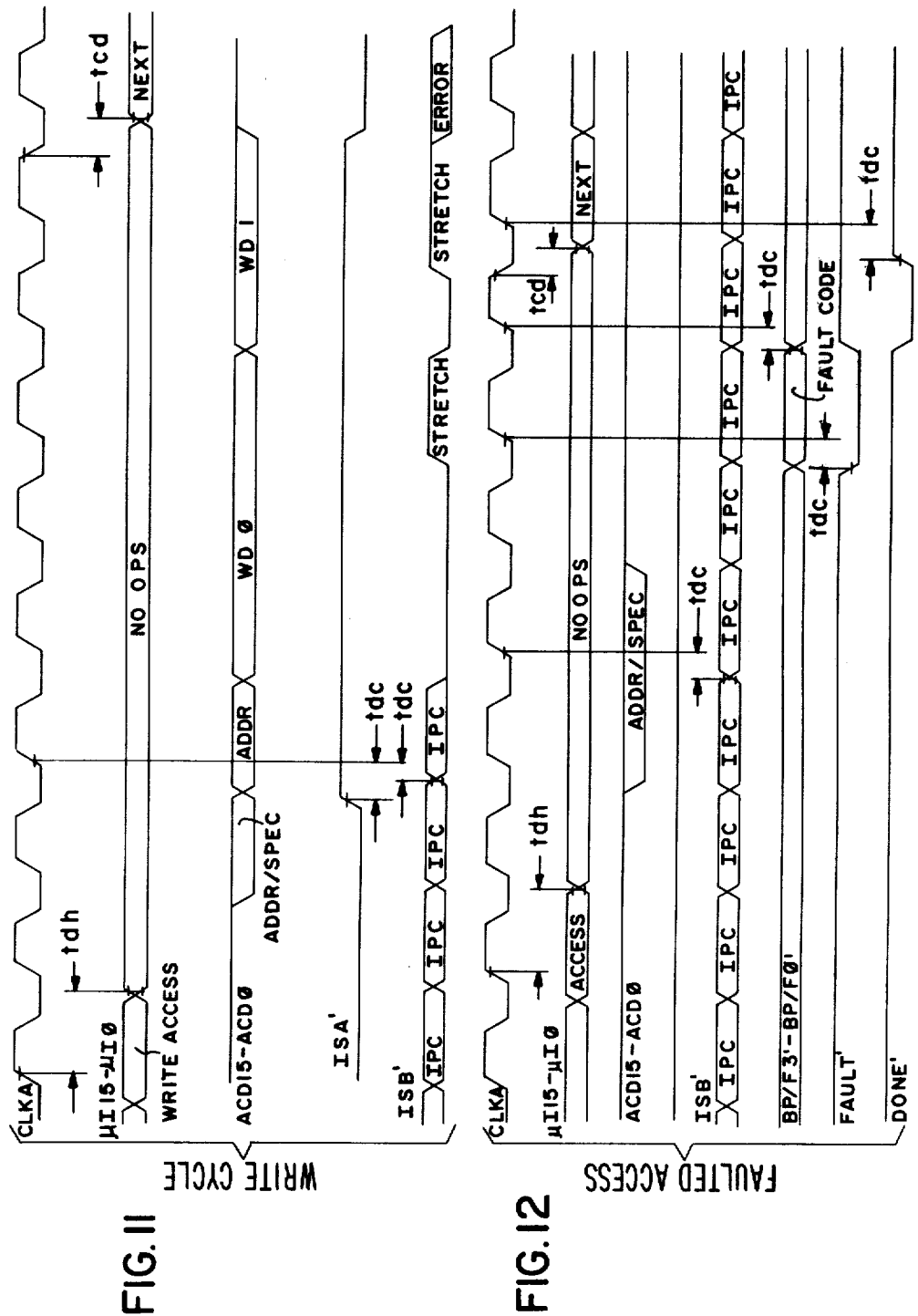
FIG. 11 WRITE CYCLE
FIG. 12 FAULTED ACCESS

MISCELLANEOUS TIMINGS

DATA PROCESSING SYSTEM

FIELD OF THE INVENTION

The invention relates to data processing systems, and more particularly to multiprocessing systems.

DESCRIPTION OF THE PRIOR ART

A multiprocessing system is able to execute simultaneously two or more computer programs or sequences of instructions. In a tightly-coupled multiprocessing system several processors may be connected to a single, shared memory. These systems multiplex numerous concurrent functions or tasks on one or more of the processors. Facilities must be provided for ensuring necessary isolation and communication between tasks, and for assigning available processors to tasks which are ready to be executed. Prior approaches have employed software, firmware, and hardware techniques.

Of the prior software techniques, there are the master-slave types of systems wherein one processor performs executive functions to allocate tasks to the other processors in the system (Mellen et al U.S. Pat. Nos. 3,530,438 and Barbour 3,984,817). There are also systems that utilize identical processors wherein none of them take on the role of the master. These systems utilize a central control wherein the software for task assignment is stored in memory (Driscoll U.S. Pat. Nos. 3,496,551 and Ochsner 3,348,210). Finally there are those systems wherein a special instruction is provided for implementing task assignment in each processor (Podvin U.S. Pat. Nos. 3,614,745 and Clark 3,725,864).

In Mellen et al U.S. Pat. No. 3,530,438 a multiprocessor is disclosed which has identical processors that can execute any task. An executive control program handles task scheduling by maintaining task priority lists of received requests. The requests are removed from the list and assigned to processors as they become available. When a processor finishes a task it interrogates the task table for a new assignment. The system relies on executive control programming to perform the task scheduling. The control program controls the generation of requests for tasks and the assignment of priorities to the requests, prioritizes the requests in tasks tables and controls the one-by-one removal of the requests from the task tables as processors become available to perform the tasks.

Barbour U.S. Pat. No. 3,984,817 provides for allocating resources in a data processor's memory to a plurality of programs based upon the activity level of each program. Each use of a program causes the activity queue of the used program to be given the highest activity state.

In Driscoll U.S. Pat. No. 3,496,551 task assignment is performed by a supervisory program which allocates tasks to different queues. A quota system established by the supervisory program allocates the various processors to the queues so that each queue is assured of a certain number of processors working on it. The quota system established for each queue causes a processor to step to the next queue in scanner sequence when a particular queue has its quota of processors working on it. In this manner the supervisory program attempts to maximize the efficiency of the system.

In Ochsner U.S. Pat. No. 3,348,210 a number of identical processors share a common store and execute tasks in parallel. When a processor completes one task, the last instruction in the task transfers control of the processor to a task assignment algorithm stored in a memory separate from the common store. This is an example of the type of multiprocessor wherein a processor relinquishes control to a central control unit which performs the task assignment function.

In Podvin U.S. Pat. No. 3,614,745 a special fork instruction is provided to initiate task switching. When a processor executes this instruction a fork status word is sent to a central control apparatus which handles resource management for the entire system. Status work queues are maintained for each type of fork instruction. The central control apparatus allocates available processors to cause them to take tasks from the queues and execute them. This patent represents an attempt to achieve optimum system efficiency by assigning resources dynamically as parallel tasks are executed. The technique necessitates that one of the processors take on the job of distributing tasks among other free processors.

In Clark U.S. Pat. No. 3,725,864 a plurality of input-/output processors select an I/O task from a queue of tasks whenever the I/O processor is available. The I/O processor performs the I/O program up to a point in the program where it can be temporarily suspended. The program is then stored in a device queue which frees the I/O processor and makes it available to select another task from the task queue and thereby execute the I/O program associated with a new task. When the partially-performed task which was stored in the device queue is ready to be resumed, the specified device signals the I/O processors. Any one of them which is available responds to the signal, fetches the partially-performed task from the device queue, and resumes the previously-suspended I/O program. Self-scheduling of channel programs is done by a special enqueue command which is part of the channel program.

Techniques utilizing firmware use special-purpose microprogrammed controllers to perform the scheduling and dispatching functions.

Nadir U.S. Pat. No. 4,011,545 is an example. This patent discloses a multiprocessor system which uses a loop architecture. A number of processors are connected to a communication loop and are accessed through ports which are identified by unique addresses. Data and commands are received by means of time slots on the loop. The information is shifted into shift registers at the receiving processor. If the processor's address is found in the shifted data then operations are commenced. If the processor's address is not found, data are allowed to pass back onto the loop unchanged.

Of the hardware techniques in the prior art there are those that have task queues and utilize either scanners (Valassis U.S. Pat. No. 3,959,775) or a central control (Tucker U.S. Pat. No. 3,449,722) for allocating tasks among a number of processors by manipulating the queues. Other hardware techniques allocate time slots to each of the processors to thereby synchronize the processors with programs by either utilizing a synchronous bus technology (Anceau et al U.S. Pat. No. 4,015,242) or by dividing up the memory cycles between the processors (Brown U.S. Pat. No. 3,896,418).

Valassis et al U.S. Pat. No. 3,959,775 discloses a synchronous type of multiprocessor in which common control equipment called a bus assigner allocates the processors on either a priority basis or on a sequential basis by scanning the processors.

In Tucker U.S. Pat. No. 3,449,722 a common queue services a number of independent processors. All operations are under control of a central control portion which has access to the common queue. The central control thus selects the appropriate processor by examining the queue when a processor becomes free in order to find a request earmarked for the free processor.

Anceau et al U.S. Pat. No. 4,015,242 discloses a multiprocessor system which has one hardware main processor and several special processors for executing a number of programs. Task switching is controlled by software lists and a priority scheme. A group of flip-flops in a register indicates which processors are activated. A management logic includes means for examining the state of these flip-flops to perform the dispatching function. This patent is an example of recent techniques wherein the dispatching and scheduling functions are performed by special automatic microprogrammed logic.

Brown U.S. Pat. No. 3,896,418 is an example of still another synchronous approach to the handling of multiprocessors which share a common memory so that the processors can simultaneously execute separate programs. In Brown the fetch and execute cycles of each processor are synchronized such that while one processor is in a fetch cycle the other is in an execute cycle.

None of the prior art data processing systems take full advantage of recent advances in the state-of-the-art of very large-scale, integrated-circuit technology. Accordingly, the performance of these prior systems is low and programming to support multiprocessing is very complex.

With respect to the prior art software techniques discussed above, while they are capable of performing complex multiprocessing operations, they suffer from the high costs of control programming to support these operations.

The firmware techniques, while reducing somewhat the programming costs of the software techniques, lack flexibility and lack general-purpose application.

The hardware techniques of the prior art also lack flexibility by being able to handle only synchronous types of operations. They also lack the necessary hardware mechanisms to effectively communicate between various asynchronous operations without resort to costly control program support for such operations, for example, interrupts at the processor level.

It is therefore a primary object of the present invention to provide a new data processing apparatus which is fast and economical, and which is designed to efficently utilize large-scale, integrated-circuit technology.

It is a further object of this invention to provide an architectural structure which supports several levels of system performance, while preserving compatibility among systems.

It is also an object of this invention to provide a data processing apparatus which may be utilized in a tightly-coupled multiprocessing system, wherein one or more processors share a single memory space.

It is an object of this invention to provide a data processing system in which processor-level interrupts or service requests are not needed.

It is a further object of this invention to provide a data processing system structure which has the capability of increasing processing power by accommodating the addition of general-purpose and input/output processors without logical restrictions.

It is an object of this invention to provide a hardware mechanism for the isolation of and communication between tasks multiplexed to run concurrently on one or more processors, and to provide facilities to automatically assign available processors to ready-to-run tasks.

A still further object of the invention is to provide means whereby new tasks may be created, processed, and deleted under dynamic software control, and wherein shared hardware and software resources may be dynamically allocated, interlocked, and reclaimed.

BRIEF SUMMARY OF THE INVENTION

Briefly, the above objects are accomplished in accordance with the invention by providing an object-based access mechanism which is employed by processors within the system. An object is a representation of related information maintained in a contiguously-addressed set of memory locations. Two basic types of objects are recognized and distinguished by a processor. The first basic type (a data segment) contains ordinary data such as characters, integers, reals, etc. The second basic type (an access list) contains access descriptors. Each access descriptor provides information for locating and defining the extent of access to an object associated with that access descriptor. Processors construct complex objects by combinations of objects of the basic types. Mechanisms within the processor identify the types of complex objects and control their use.

One such complex object, a context, defines an environment made up of objects accessible to a given instance of a procedural operation. Processors recognize context objects and utilize them in process execution.

In accordance with an aspect of the invention, two other types of hardware recognizable objects, buffered communication ports and dispatching ports, are defined.

A buffered port is responsive to a currently-running process and provides the means for communication between processes. Each buffered port includes a dual-purpose queue for queuing messages which have been sent and for queuing processes that are waiting to receive a message.

Dispatching ports and buffered ports are utilized in the dispatching of ready-to-run processes for execution by an available processor. Each dispatching port includes separate queuing means for queuing processes sent from a buffered port for execution, and for queuing processors that are available to receive a process for execution thereof.

In accordance with another aspect of the invention, means capable of being activated by a process are provided for selectively queuing a process to either a buffered port or a dispatching port. This enables a process to be selectively communicated for service by either a processor or another process, whereby additional process interpretation may be interposed prior to the execution of a process by a processor.

In accordance with a further aspect of the invention, a value called a "deadline" is used in a dispatching port. This value is generated by a processor when it enqueues a process at a dispatching port, the process with the nearest deadline being placed at the head of the request queue. The processes on the request queue are thus ordered in priority by increasing deadlines. Since processors always remove processes from the head of the request queue, the processes with the nearest deadline are served first. Means are also provided whereby a process may queue itself for execution at some future time. In the event no processes become enqueued with either deadlines, an idle processor queued at the dispatching port automatically reschedules itself to the delayed process at the future time.

The present invention has the advantage that the need for a supervisory control program is eliminated. This is accomplished by providing the hardware dispatching port mechanism (by which a processor is able to perform a self-queuing function and thus wait at a dispatching port until a process to be executed arrives) in conjunction with the hardware buffered port mechanism (by which a processor is able to perform the interprocess communication function and thus delay or relay processes to dispatching ports for execution).

The present invention has the further advantage that the central control techniques of the prior art are not necessary as task assignment and interprocess communication is performed by the processors themselves. The disadvantages of master-slave types of systems are eliminated.

The present invention utilizes a resource control segment which contains fields of information called the delay period and the service period. This has the advantage of allowing processors to automatically control distribution of processing resources in accordance with policies initially set through software.

The present invention has the advantage over prior synchronous types of multiprocessor systems of being able to handle simultaneous synchronous or asynchronous operations by means of the unique buffered ports and dispatching ports.

The invention has the further advantage that the number of processors may be increased to obtain higher performance without having to provide new software for each new configuration. This is possible because each processor automatically assigns itself to a ready process or will wait for a process to be made ready by the activity on some other processor.

Another advantage of the invention is that modern programming languages are supported by the unique way the static component of a context is divided into a public access list and a private access list. All operations on a given extended type are made available via the public access list. Data hiding or object hiding is accomplished by means of the private access list.

The invention also has the advantage that by providing a segment table for storing the base address and segment descriptors, the updating of parameters describing a segment is performed by updating a single copy of the parameters.

BRIEF DESCRIPTION OF THE DRAWINGS

The foregoing and other objects, features, and advantages of the invention will be apparent from the following detailed description of a prefered embodiment of the invention, as illustrated in the accompanying drawings wherein:

FIGS. 4A and 4B, taken together, are a block diagram of system objects supporting interprocess communication, scheduling and dispatching of processes, and interprocessor communication, shown in FIG. 1;

FIG. 11 is a timing diagram of a typical write cycle;

FIG. 12 is a timing diagram of a faulted access;

TABLE OF CONTENTS

Figure 1:
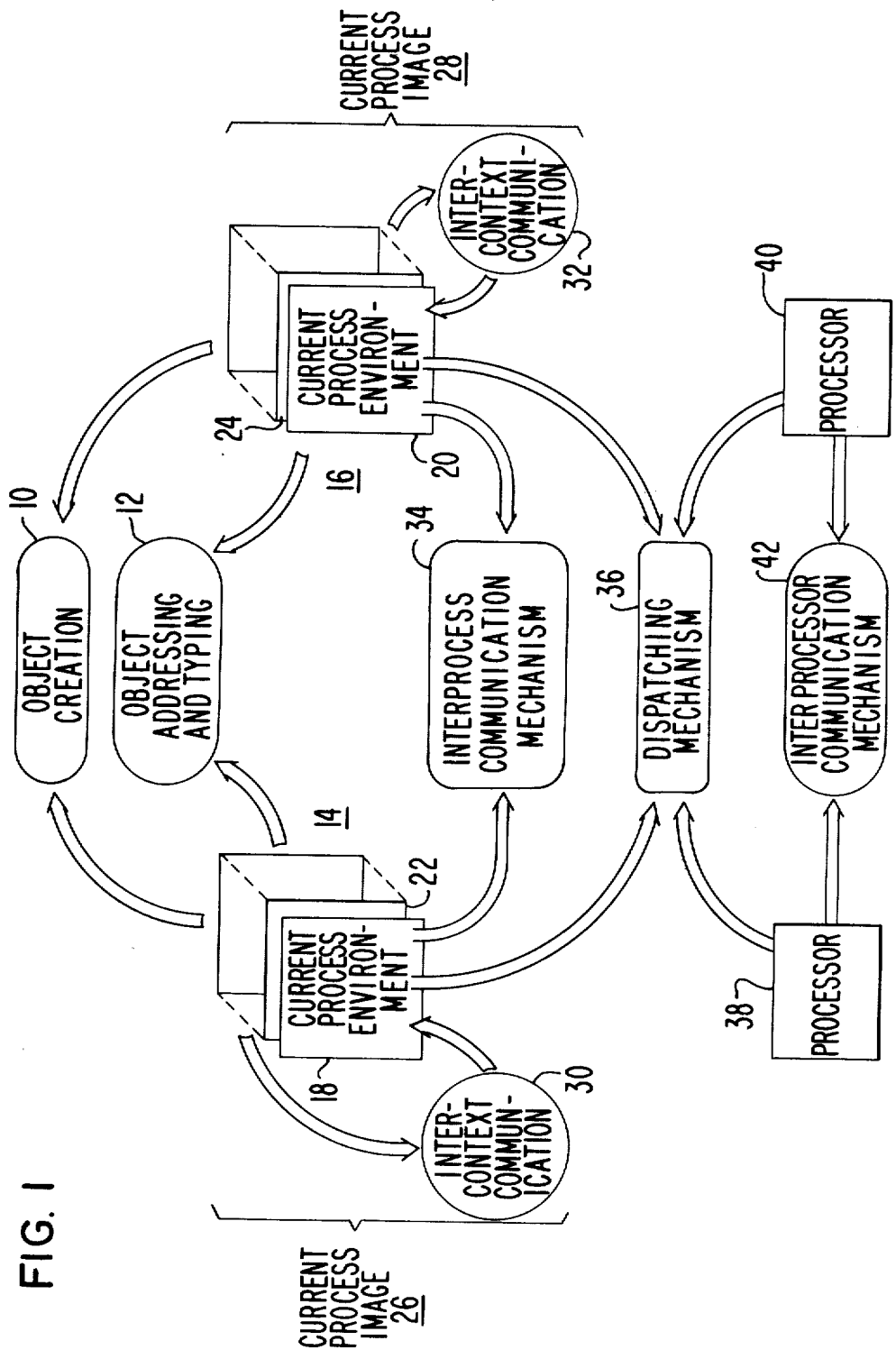
FIG. 1 is a functional block diagram illustrating the various components of the invention.

Description
  Field of the Invention
  Description of the Prior Art
  Brief Summary of the Invention
  Brief Description of the Drawings
  Table of Contents
  Introductory Description of the Invention
    Object Creation, Addressing and Typing
    Individual Process Environment
    Intercontext Communication
    Interprocess Communication
    Dispatching Mechanism
    Interprocessor Communication
    Processor Types

PART 1. GENERALIZED DATA PROCESSOR ARCHITECTURE 1.0 Overall System
  1.1 Segmented Addressing
  1.2 Segment Types
  1.3 Objects
  1.4 Functional Hierarchy
  1.5 Communication
  1.6 Data Types, Operators, and Instructions
2.0 Information Structure
  2.1 Memory
    2.1.1 Logical Addressing
    2.1.2 Physical Addressing
  2.2 Data Formats
  2.3 Data Representation
  2.4 Data Positioning
  2.5 Data Integrity
  2.6 Operand Stacks
  2.7 Instruction Segments
3.0 Generalized Data Processing
  3.1 Computational Data Types
    3.1.1 Character
    3.1.2 Short Ordinal
    3.1.3 Short Integer
    3.1.4 Ordinal
    3.1.5 Integer
    3.1.6 Short Real
    3.1.7 Real
    3.1.8 Temporary Real 3.2 Instruction Composition
  3.2.1 Types of References
  3.2.2 Operators
  3.2.3 Data References
    3.2.3.1 Explicit Data References
    3.2.3.2 Implicit Data References
3.3 Operand Stack Behavior
3.4 Sequential Instruction Execution
3.5 Branching
4.0 System Object Structures
  4.1 Segments
    4.1.1 Segment Tables and Segment Descriptors
    4.1.2 System Types and Their Encodings
    4.1.3 Segment Table Directories and Segment Tables
    4.1.4 Temporary Segment Table Directory
  4.2 Access Lists
    4.2.1 Access Descriptors and Access Paths
      4.2.1.1 Access Rights
      4.2.1.2 Descriptor Control
    4.2.2 Access List Access Rights
    4.2.3 Null Access Descriptor
  4.3 Data Segments
    4.3.1 Data Segment Access Rights
    4.3.2 Segment Table Segments
  4.4 Domains
    4.4.1 Public and Private Access Lists
  4.5 Operations and Contexts
    4.5.1 Context Objects
      4.5.1.1 Instruction Segments
      4.5.1.2 Context Control Segments
      4.5.1.3 Operand Stacks
      4.5.1.4 Entry Access List
  4.6 Coroutines
    4.6.1 Nonbuffered Communication Ports
  4.7 Processes
    4.7.1 Process Objects
      4.7.1.1 Process Control Segments
      4.7.1.2 Current Service and Buffered Ports
      4.7.1.3 Segment Tables and Storage Resources
      4.7.1.4 Trace, Notification, and Fault Buffered Ports
      4.7.1.5 Fault Access Descriptor
    4.7.2 Buffered Communication Ports
      4.7.2.1 Buffered Port Control Segment
      4.7.2.2 Service Ports
  4.8 Processors
    4.8.1 Processor Objects
      4.8.1.1 Processor Self-Queuing
      4.8.1.2 Processor Control Segments
      4.8.1.3 Global Communication Segments
      4.8.1.4 Current Process Objects
      4.8.1.5 Current Segment Table Directories
      4.8.1.6 Alarm Dispatching Ports
      4.8.1.7 Diagnostic Dispatching Ports
      4.8.1.8 Fault Access Descriptors and Fault Process Objects
    4.8.2 Dispatching Ports
      4.8.2.1 Dispatching Port Control Segment
      4.8.2.2 Request and Service Queues
      4.8.2.3 Deadlines
      4.8.2.4 Preemption Ports
  4.9 Storage
    4.9.1 Free Segment Descriptor Lists
    4.9.2 Storage Resource Control Segments
  4.10 Transformers
  4.11 Labels
    4.11.1 Path Level Descriptors
    4.11.2 Label Linkages
    4.11.3 Label Objects
  4.12 Processor Registers
5.0 Access Environment Manipulation and Communication
  5.1 Access Environment Manipulation Mechanisms
    5.1.1 General Access Descriptor Movement
    5.1.2 Complex Object Manipulation
    5.1.3 Type & Rights Application & Manipulation
    5.1.4 Access Path Labeling & Traversal
    5.1.5 Dynamic Segment & Path-Level Creation
      5.1.5.1 Segment Descriptor Allocation
      5.1.5.2 Storage Allocation
      5.1.5.3 Path Level Creation
    5.1.6 Access Path Inspection
    5.1.7 Object Interlocking
  5.2 Communication Mechanisms
    5.2.1 Instruction-to-Instruction Communication
    5.2.2 Context-to-Context Communication
      5.2.2.1 Intradomain Context Creation
      5.2.2.2 Interdomain Context Creation
      5.2.2.3 Parameter and Result Transmission
      5.2.2.4 Context Invocation
      5.2.2.5 Context Return
    5.2.3 Coroutine-to-Coroutine Communication
      5.2.3.1 Coroutine Parameter Transmission
      5.2.3.2 Coroutine Resumption/Suspension
    5.2.4 Process-to-Process Communication
      5.2.4.1 Process Parameter Transmission
      5.2.4.2 Process Resumption/Suspension
      5.2.4.3 Buffered Communication Ports and Dispatching Ports
    5.2.5 Processor-to-Processor Communication
      5.2.5.1 Interprocessor Communication Protocol
      5.2.5.2 Processor Control Functions
  5.3 Exception Handling
    5.3.1 Notification
    5.3.2 Fault Mechanism Data Structures
    5.3.3 Context-Level Faults
      5.3.3.1 Object Access Faults
      5.3.3.2 Displacement Faults
      5.3.3.3 Descriptor Control Faults
      5.3.3.4 Computational Faults
      5.3.3.5 Software Context Faults
    5.3.4 Process-Level Faults
      5.3.4.1 Reference Validity Faults
      5.3.4.2 Restartable Suspended Operation Faults
      5.3.4.3 Context Fault Failure Faults
      5.3.4.4 Nonrestartable Faults
    5.3.5 Processor-Level Faults
      5.3.5.1 Process-Level Fault Failure Faults
      5.3.5.2 Faults With a Process
      5.3.5.3 uncorrectable Hardware Failures
    5.3.6 Consistency Halts
  5.4 Debugging Support
  5.5 Initialization and Software-Controlled Reset
  5.6 Alarm Handling
6.0 Floating Point Computation
  6.1 Floating Point Model
  6.2 Rounding Modes
  6.3 Precision Control
  6.4 Floating Point Exceptions
    6.4.1 Invalid Operand
    6.4.2 Overflow
    6.4.3 Underflow
    6.6.4 Divide by Zero
    6.6.5 Domain Error
  6.5 Floating Point Remainder Calculation 7.0 Generalized Data Processor Instructions
  7.1 Class Field
  7.2 Format Field
  7.3 Reference Field
    7.3.1 Data References
      7.3.1.1 Segment Selector Component
      7.3.1.2 Displacement Component
      7.3.1.3 Scalar Data References
      7.3.1.4 Static Vector Element Data References
      7.3.1.5 Record Item Data References '7.3.1.6 Dynamic Vector Element Data References
    7.3.2 Branch Reference
  7.4 Op-Code Field
  7.5 Instruction Interpretation
    7.5.1 Physical Address Generation
      7.5.1.1 Segment Selector Search
      7.5.1.2 Access Descriptor Qualification
      7.5.1.3 Directory Index Search
      7.5.1.4 Segment Directory Register Reload
      7.5.1.5 Segment Table Descriptor Qualification
      7.5.1.6 Segment Descriptor Register Reload
      7.5.1.7 Segment Descriptor Qualifications
      7.5.1.8 Access right Qualification
      7.5.1.9 Displacement Qualification
      7.5.1.10 Altered Bit Update
    7.5.2 Stack Interaction
    7.5.3 Execution
8.0 Generalized Data Processor Operator Set
  8.1 Character Operators
    8.1.1 Character Move Operators
    8.1.2 Character Logical Operators
    8.1.3 Character Arithmetic Operators
    8.1.4 Character Relational Operators
    8.1.5 Character Conversion Operator
  8.2 Short-Ordinal Operators
    8.2.1 Short-Ordinal Move Operators
    8.2.2 Short-Ordinal Logical Operators
    8.2.3 Short-Ordinal Arithmetic Operators
    8.2.4 Short-Ordinal Relational Operators
    8.2.5 Short-Ordinal Conversion Operators
  8.3 Short-Integer Operators
    8.3.1 Short-Integer Move Operators
    8.3.2 Short-Integer Arithmetic Operators
    8.3.3 Short-Integer Relational Operators
    8.3.4 Short-Integer Conversion Operators
  8.4 Ordinal Operators
    8.4.1 Ordinal Move Operators
    8.4.2 Ordinal Logical Operators
    8.4.3 Ordinal Arithmetic Operators
    8.4.4 Ordinal Relational Operators
    8.4.5 Ordinal Conversion Operators
  8.5 Integer Operators
    8.5.1 Integer Move Operators
    8.5.2 Integer Arithmetic Operators
    8.5.3 Integer Relational Operators
    8.5.4 Integer Conversion Operators
  8.6 Short-Real Operators
    8.6.1 Short-Real Move Operators
    8.6.2 Short-Real Arithmetic Operators
    8.6.3 Short-Real Relational Operators
    8.6.4 Short-Real Conversion Operators
  8.7 Real Operators
    8.7.1 Real Move Operators
    8.7.2 Real Arithmetic Operators
    8.7.3 Real Relational Operators
    8.7.4 Real Conversion Operators
  8.8 Temporary-Real Operators
    8.8.1 Temporary-Real Move Operators
    8.8.2 Temporary-Real Arithmetic Operators
    8.8.3 Temporary-Real Relational Operators
    8.8.4 Temporary-Real Conversion Operators
  8.9 Access Environment Manipulation Operators
    8.9.1 Access Descriptor Movement Operators
    8.9.2 Type and Rights Manipulation Operators
    8.9.3 Label Manipulation Operators
    8.9.4 Segment Creation Operators
    8.9.5 Access Path Inspection Operators
    8.9.6 Object Interlocking
  8.10 Branch Operators
    8.10.1 Intrasegment Branch Operators
    8.10.2 Intersegment Branch Operators
  8.11 Communication Operators
    8.11.1 Context Communication Operators
    8.11.2 Coroutine Communication Operators
    8.11.3 Process Communication Operators
    8.11.4 Processor Communication Operators Part 2. GENERALIZED DATA PROCESSOR AND SYSTEM INTERCONNECTIONS 9.0 Instruction Unit
  9.1 General Operation
  9.2 The Interchip Bus
  9.3 The Microinstruction Bus
  9.4 BP/F Lines
  9.5 True and Done Lines
  9.6 Interprocessor Communication
  9.7 Instruction Unit Diagnostic Features
  9.8 Initialization and Error Conditions
10.0 Execution Unit
  10.1 General Operation
  10.2 Clock and Special Lines
  10.3 Address/Control/Data Lines
  10.4 Functional Description
    10.4.1 Data Manipulation Unit (DMU)
    10.4.2 Control Unit (CU)
    10.4.3 Reference Generation Unit (RGU)
    10.4.4 Minor Circuit Blocks
11.0 Instruction Unit/Execution Unit Microinstruction Set
  11.1 Memory and Operand Stack Access Microninstructions
  11.2 Address Development Microinstructions
  11.3 Data Manipulation Microinstructions
  11.4 Floating Point Microinstructions
  11.5 Communication Microinstructions
    11.5.1 IP Manipulation Microinstructions
    11.5.2 Segment Manipulation Microinstructions
    11.5.3 Timer Control Microinstructions
    11.5.4 Cache Management Microinstructions
  11.6 Control Microinstructions
    11.6.1 Instruction Unit Control Microinstructions
    11.6.2 Instruction Unit/Execution Unit Control Microinstructions
    11.6.3 Execution Unit Control Microinstructions
12.0 Summary of Instruction Unit/Execution Unit Operations
  12.1 Three-Stage Pipeline
  12.2 Stage One: Instruction Decoder (ID)
  12.3 Stage Two: Microinstruction Sequencer (MIS)
  12.4 Stage Three: Microinstruction Execution Unit (MEU)
  12.5 Typical Processor Operation Part 3. INPUT/OUTPUT ARCHITECTURE 13.0 Overall I/O System
  13.1 Basic Structures and Facilities 13.2 Software Viewpoint
13.3 Data Transfer
   13.3.1 Setup
   13.3.2 Transfer
      13.3.2.1 Synchronization
      13.3.2.2 Termination
   13.3.3. Cleanup
13.4 Beyond Data Transfer
13.5 Structural Overview
13.6 Supported Interfaces
14.0 Information Structure
   14.1 Memory
      14.1.1 Logical Addressing
      14.1.2 Physical Addressing
   14.2 Operand Formats
   14.3 Operand Representation
   14.4 Operand Positioning
   14.5 Operand Integrity
   14.6 Operand Stacks
   14.7 Instruction Segments
   14.8 Peripheral Interface Addressing
15.0 Input/Output Processing
   15.1 Computational Data Types
      15.1.1 Character
      15.1.2 Short Ordinal
      15.1.3 Short Integer
   15.2 Environment Manipulation
   15.3 Instruction Composition
      15.3.1 Types of References
      15.3.2 Operators
      15.3.3 Data References
         15.3.3.1 Explicit Data Reference
         15.3.3.2 Stack References
      15.3.4 Access Descriptor References
   15.4 Operand Stack Behavior
   15.5 Sequential Instruction Execution
   15.6 Branching
16.0 Input/Output Object Structures
   16.1 Segments
      16.1.1 Input/Output Segments and Segment Descriptors
      16.1.2 Peripheral Objects
         16.1.2.1 Peripheral Control Segments
   16.2 Operations and Contexts
   16.3 Coroutines
   16.4 Processes
      16.4.1 Current-Event Ports
      16.4.2 Event Ports
         16.4.2.1 Event-Port Control Segments
         16.4.2.2 Service Ports
   16.5 Processors
      16.5.1 Processor Objects
         16.5.1.1 Interprocessor Messages
         16.5.1.2 Request Interfaces
         16.5.1.3 Event Lists
         16.5.1.4 Event-Control Objects
         16.5.1.5 Transfer-Control Objects
         16.5.1.6 Bandwidth-Control Objects
   16.6 Storage Resources, Transformers, and Labels
   16.7 Processor Registers
17.0 Input/Output Facilities
   17.1 Address Space Manipulation
   17.2 Peripheral-to-Process Communication
      17.2.1 Request Acceptance by a Transfer Controller
      17.2.2 Request Acceptance by an Event Controller
   17.3 Data Transfer
      17.3.1 Block Transfer Operators
         17.3.1.1 Block Data Transfer
      17.3.2 Block Data Translation
      17.3.3 Access Descriptor Transfer
         17.3.3.1 Block Access Descriptor Transfer
      17.3.4 Transfer Algorithms
   17.4 Process-to-Process Communication
   17.5 Processor-to-Processor Communication
   17.6 Low-Level Initialization
18.0 Input/Output Processor Instructions
   18.1 Op-Code Field
   18.2 Reference Field
      18.2.1 Data References
         18.2.1.1 Explicit Data References
         18.2.1.2 Stack References
         18.2.1.3 Literals
         18.2.1.4 Immediates
      18.2.2 Access-Descriptor References
      18.2.3 Branch References
   18.3 Instruction Interpretation
   18.4 Physical Address Generation
      18.4.1 Execution
19.0 Input/Output Processor Operator Set
   19.1 Character Operators
      19.1.1 Character Movement Operators
      19.1.2 Character Logical Operators
      19.1.3 Character Arithmetic Operators
      19.1.4 Character Relational Operators
      B 19.1.5 Character Conversion Operators
   19.2 Short-Ordinal Operators
      19.2.1 Short-Ordinal Movement Operators
      19.2.2 Short-Ordinal Logical Operators
      19.2.3 Short-Ordinal Arithmetic Operators
      19.2.4 Short-Ordinal Relational Operators
      19.2.5 Short-Ordinal Conversion Operators
   19.3 Short-Integer Operators
      19.3.1 Short-Integer Movement Operators
      19.3.2 Short-Integer Arithmetic Operators
      19.3.3 Short-Integer Relational Operators
   19.4 Access Environment Manipulation Operators
      19.4.1 Access Descriptor Movement Operators
      19.4.2 Type and Rights Manipulation Operators
      19.4.3 Label Manipulation Operators
      19.4.4 Segment Creation Operators
      19.4.5 Access Path Inspection Operators
      19.4.6 Object Interlocking Operators
   19.5 Branch Operators
      19.5.1 Intrasegment Branch Operators
      19.5.2 Intersegment Branch Operators
   19.6 Communication Operators
      19.6.1 Context Communication Operators
      19.6.2 Coroutine Communication Operators
      19.6.3 Process Communication Operators
      19.6.4 Processor Communication Operators
   19.7 Block Transfer Operators

INTRODUCTORY DESCRIPTION OF THE INVENTION

Referring now to FIG. 1, the following introductory description broadly describes the various elements of the system in which the invention is embodied and provides an introduction to some of the terminology used throughout the following specification. FIG. 1 illustrates the various agents in the system and the mechanisms that they utilize. Arrows in the figure denote the following. The agent is located at the source of the arrow and the mechanism that the agent is using is located at the destination of the arrow. Two kinds of agents are shown, processes that are in a particular state, and the processors that the processes are executed on.

Object Creation, Addressing and Typing

All information within the system is represented by hardware-recognized, memory-resident, information structures called objects. There are two basic types of objects: data segments and access lists. Access lists control access to objects and data segments are used to contain data scalar values.

The system provides an object-creation mechanism (10) in hardware for supporting object creation dynamically. This mechanism is based upon a particular kind of object called a storage resource object, which describes the various areas of physical memory that are not currently allocated. By utilizing a specific set of hardware-supported algorithms, the mechanism performs, upon request, the allocation of data segments of either one of the two basic object types. Once a set of objects have been created, a given process running on a given processor may generate references to these objects. These references are mapped or developed into physical addresses for the main memory by means of a mechanism called the object-addressing, protection and typing mechanism (12). This mechanism provides the means by which any one reference to an object can be converted into a physical address for that object. This object-addressing mechanism makes use of what is called an access path to the object. For example, in a simple case, the access path is comprised of three levels. The first level employed in the development of the address is called an access descriptor which is contained within the type of object called an access list. Access descriptors describe the kind of access that the user of the access descriptor has to the object at the base of the access path. An access descriptor describes the kind of rights, for example, read rights or write rights, which define various kinds of access (depending upon the type of the object) that the holder of the access descriptor has for that object.

At the next level down the path to the object for which the reference was generated and the address is being developed, there are segment descriptors. The system employs a two-level segmented addressing space. That is, there are two levels of segment tables. The highest level segment table is called a segment table directory. In it are found segment descriptors for segment tables. An access descriptor contains two components that are used in selecting the segment descriptor to use in the address development. The first reference selects from the segment table directory the segment table in which the final segment descriptor should be found. The second reference selects out of that segment table the segment descriptor for the segment in question.

The segment descriptor for the object for which addresses are being developed contains information which locates that object in a physical memory, gives its length, gives various typing information about the object, and includes various memory management information (such as the count of the number of access paths to this object, information about whether the segment had been altered or referenced, etc.).

Individual Process Environment

Various process environments (14 and 16) are shown in FIG. 1. The current process access environment (18, 20) is shown at the front and the past history (22, 24) (process environments that are not currently invoked) is shown toward the back of the drawing. The instantaneous state of these process environments is illustrated and referred to as the current process image (26, 28). As described above, a process running on a processor generates references while the processor translates into a physical address using the object addressing, protection, and typing mechanism. A context object represents a process environment in which a particular instance of an operation can be executed. Over a period of time a process, which is the site for potential or parallel activity, may move between contexts in its execution.

A context object in the present system has four components. These four components are four access lists containing access descriptors. Given the sum total of the access descriptors in this environment one can tell exactly what kind of access that environment provides to the various objects for which there are access descriptors.

Intercontext Communication

Each one of the contexts as a minimum must contain access descriptors for all of those objects that the operation in that environment can access. One operation may need over a period of time to call another operation in order to support modular programming. Since the second operation may not be defined to work or operate in the same environment as the first operation, a mechanism is provided for transferring control from one environment (and the operation in it) to an operation in another environment. This mechanism is called the intercontext communication mechanism (30, 32 in FIG. 1). There are two kinds of intercontext communication. One kind supports downward call/upward return or call/return kinds of control transitions. The second kind is called nonhierarchical communication or coroutine communication. This kind of communication supports the hierarchical or asynchronous kinds of communication between contexts supported by the call/return mechanisms and supports synchronous control flow-patterns, such as encountered among coroutines. The program environments called contexts are retentive in nature. That is, they are not necessarily created immediately prior to or part of control flow entering them, and they are not immediately destroyed after or as part of control flow exiting from them. They have a longer lifetime than merely the control flow patterns that use them or traverse through them.

Contexts have a static component and a dynamic component. The static component of any context is made up of a two-component object called a domain. A domain refers to the domain of definition of the operation which is to execute within that context. The two components of a domain consist of a public access list and a private access list. This partitioning allows the domain to support the kinds of semantics called for by certain modern programming languages. In those terms, all the public operations of a given intended type are made available via the public access list while the hidden data or operations of the type are made available by means of the private access list.

The dynamic component of any context is called the context access list. The context access list provides an instance-specific, access descriptor working space. It is within this space that an instance of a particular operation defined within a given domain of definition does its dynamic access descriptor manipulation.

Another component which is dynamically selectable by a given context is what is called an entry access list. Any access list, for which a given context bears appropriate rights, can be selected and made a part of the current access environment by means of the entry access list.

Interprocess Communication

Two processes may need to communicate with each other but are scheduled, and thus run, in an asynchronous manner on one or more processors. A buffering mechanism, called the interprocess communication mechanism (34), is provided such that the timing differences between the two processes can be accommodated. Interprocess communication is supported by means of a hardware-recognizable object called a buffered communication port. The buffered communication port is a queueing mechanism wherein messages which one process wants to send to another process are queued and wherein processes which are waiting to receive a message are queued. These ports with their queueing ability thus provide the buffering needed to smooth out the asynchronous behavior of the two processes.

Dispatching Mechanism

Once a waiting process has received a message at a buffered port, the process is ready to run on one of a number of available processors (38, 40). The dispatching mechanism (36) provides a way for the process to be scheduled on a processor. The dispatching mechanism is a hardware mechanism which automatically does the scheduling and dispatching of ready-to-run processes in accordance with previously-set software parameters. In this way the dispatching mechanism enforces a previously-specified software scheduling policy or low-level scheduling policy on all of the processes within the system. If one were to simply assign a process to a processor with no control over how long that process should execute on the processor, then that process would run through completion on that processor. If the process were one that was never ending, the processor would be assigned to that process forever. The dispatching mechanism is provided so that software may specify how the processes are multiplexed over time with respect to the processors. The dispatching mechanism does not support preemptive forms of scheduling policies, but does support a family of what is referred to as relative-frequency scheduling policies. Two values are provided with every process when it is being queued at a dispatching port. The first is its maximum allowable delay and the second its maximum allowable service period. Using these two values, a range of relative-frequency based software scheduling policies are achieved from round robin to pure relative frequency.

Service period information is provided so that when a processor removes a process from a process queue or from a request queue in a dispatching port, the processor can tell how long software desires that this process be bound to the processor. This ensures that there are no runaway processes that tie up a processor forever. After a service period is over, the bond between a process and the processor is broken forces the dispatching mechanism to allow other processes to be assigned to a processor.

Interprocessor Communication

As previously described, the buffered port mechanism is utilized to bind a message to a process and the dispatching mechanism is utilized to schedule the process on an available processor. The processor with the message/process pair examines the appropriate dispatching port. If no processor is queued at that port, then the message/process pair is queued at the port to wait for an available processor. If there is a processor queued at the dispatching port awaiting the arrival of a service request (a message/process pair), then the processor that sent the message can bind the service request to the waiting processor. The interprocessor communication mechanism (42) is the means by which the requesting processor communicates to the waiting processor that it can begin executing the process which has been bound to it.

The interprocessor communication mechanism is also used to allow software running on one processor to ask another processor to perform certain diagnostic functions, such as performance of an initialization sequence, an alarm sequence, or a reset sequence. This allows the debugging of a processor within the system while the system is running.

Another use of the interprocessor communication mechanism is to communicate with a specific processor or broadcast to all processors within this system to thereby inform them that they should requalify certain information maintained on the processor about the address development mechanism.

The interprocessor communication mechanism is also used to support recovery from processors which have malfunctioned by causing these processors to stop functioning. The mechanism also supports reconfiguration so that processors can be inserted and removed from the system dynamically.

The interprocessor communication mechanism is structured as follows. Each processor has associated with it a local communication segment, stored in a common memory. The local communication segment is for processor-specific communication. Another segment, the global communication segment, is common to all processors, and is for system-wide communication.

Each communication segment has a field containing control flags. The flags are set by one processor and later inspected by another processor. The inspecting processor is instructed to perform a number of functions specified by the state of the control flags. A count field and a lock field are provided in all communication segments to interlock access to the communication mechanism.

Processor Types

Many types of processors are accommodated by the present system. Two types of processors are described in detail, Generalized Data Processors (GDP) and I/O Processors (IOP). A GDP functions within an address space and can only reference objects that are within that space. An IOP is able to reference objects in two different spaces and functions on the boundary between these two address spaces. The first address space is the same address space that the GDP uses. The other address space that any particular IOP uses is called an IO address space and is separate and does not intersect the GDP address space, i.e., the address spaces share no common addresses.

The main purpose of a GDP is to perform generalized computation over a wide spectrum of data types supported by this type of processor. The function of an IOP is more restricted with respect to the number of data types supported. The main purpose of an IOP is to transfer data between the two address spaces that it has access to and can reference. An example would be the transfering of data from an input device which exists in the I/O address space, into a data segment which exists in the GDP address space. Conversely data is transferred from a data segment in the GDP address space to an output device which exists in the I/O address space.

An IOP uses the same descriptor-controlled, segment-based address development mechanism as the GDP. The I/O operations also execute in a context-based environment similar to that provided for the GDP. An IOP uses the same interprocess communication mechanism and IOPs are selected for service via a dispatching mechanism which is similar to that described above. A similar interprocessor communication mechanism is utilized.

A different addressing mechanism must be employed for an IOP because there must be some way to tell that a segment being referenced is an I/O address space or is a GDP address space. There are also special considerations in referencing segments such as timing considerations dealing with a specific kind of device.

Special hardware is provided in an IOP to improve the performance of data transfer operations. This makes it possible to transfer blocks of data.

An IOP dispatches processes from a different dispatching port than a GDP. This avoids the necessity of having to examine processors queued at a particular dispatching port to find one of the correct type, i.e., a GDP or an IOP. To simplify the mechanism, GDPs in a system dispatch processes from one type of dispatching port. On the other hand, an IOP uses a different type of dispatching port, and not all of them have access to the same port. This is because not all of the IOPs have access to all I/O devices. Therefore, not all I/O processes, if they are to serve only their particular device, can be associated with any IOP. In general, out of a set of IOPs there will only be some small number which will have access to any particular I/O address space. For example, the number might be as small as one IOP to one peripheral device. On the other hand, it can also be the case that several IOPs will service several peripheral devices on one I/O bus which serves as one I/O address space. For this reason the mating of I/O processors to dispatching ports for I/O processes is as follows. All the IOPs that have access to one I/O address space (when in normal dispatching state) will dispatch I/O processes from one input/output process dispatching port.

PART 1. GENERALIZED DATA PROCESSOR ARCHITECTURE 1.0 OVERALL SYSTEM 1.1 SEGMENTED ADDRESSING

Figure 2A:
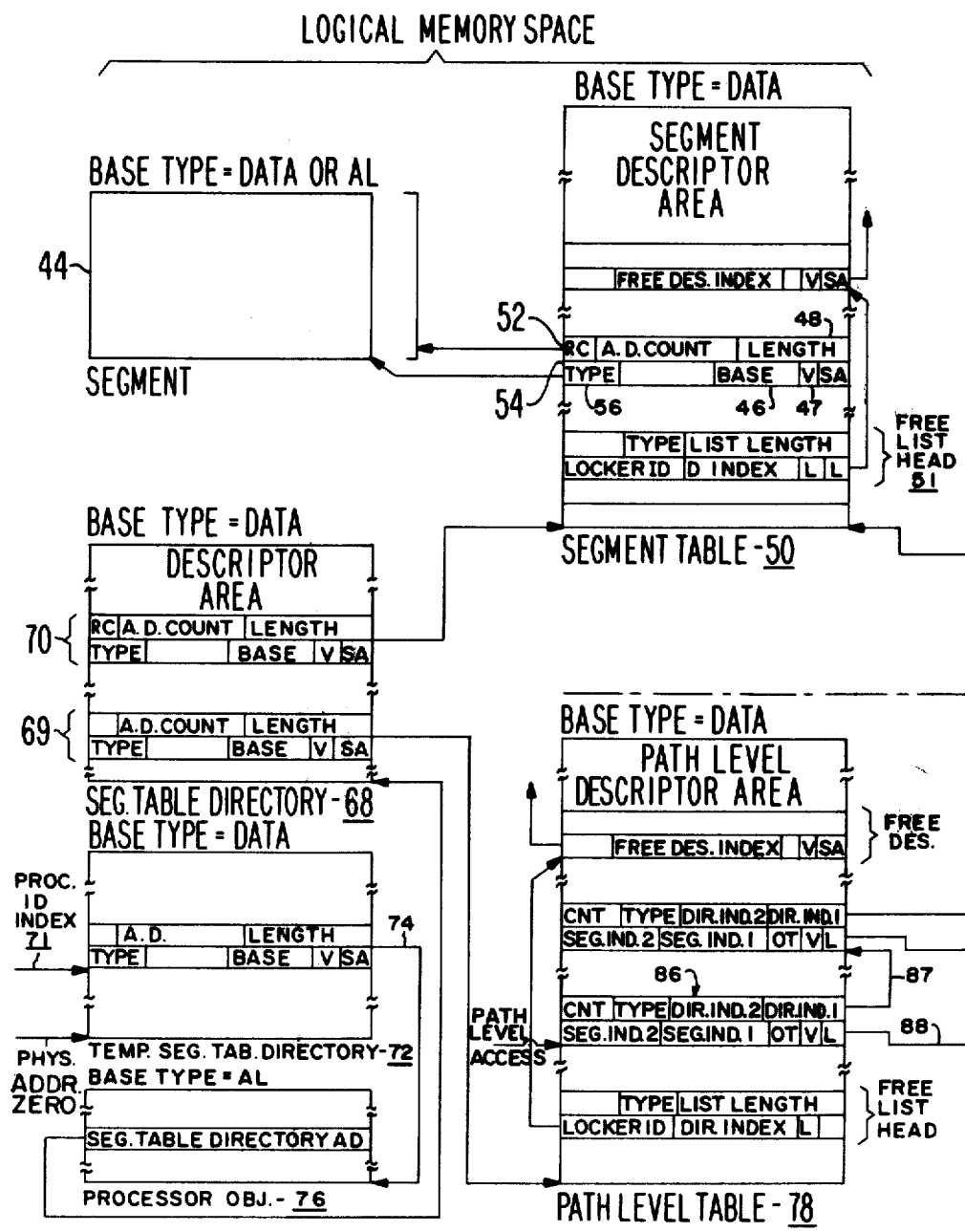
FIGS. 2A and 2B, taken together, are a block diagram of system objects for supporting object addressing and protection in the main memory shown in FIG. 1.
Figure 2B:
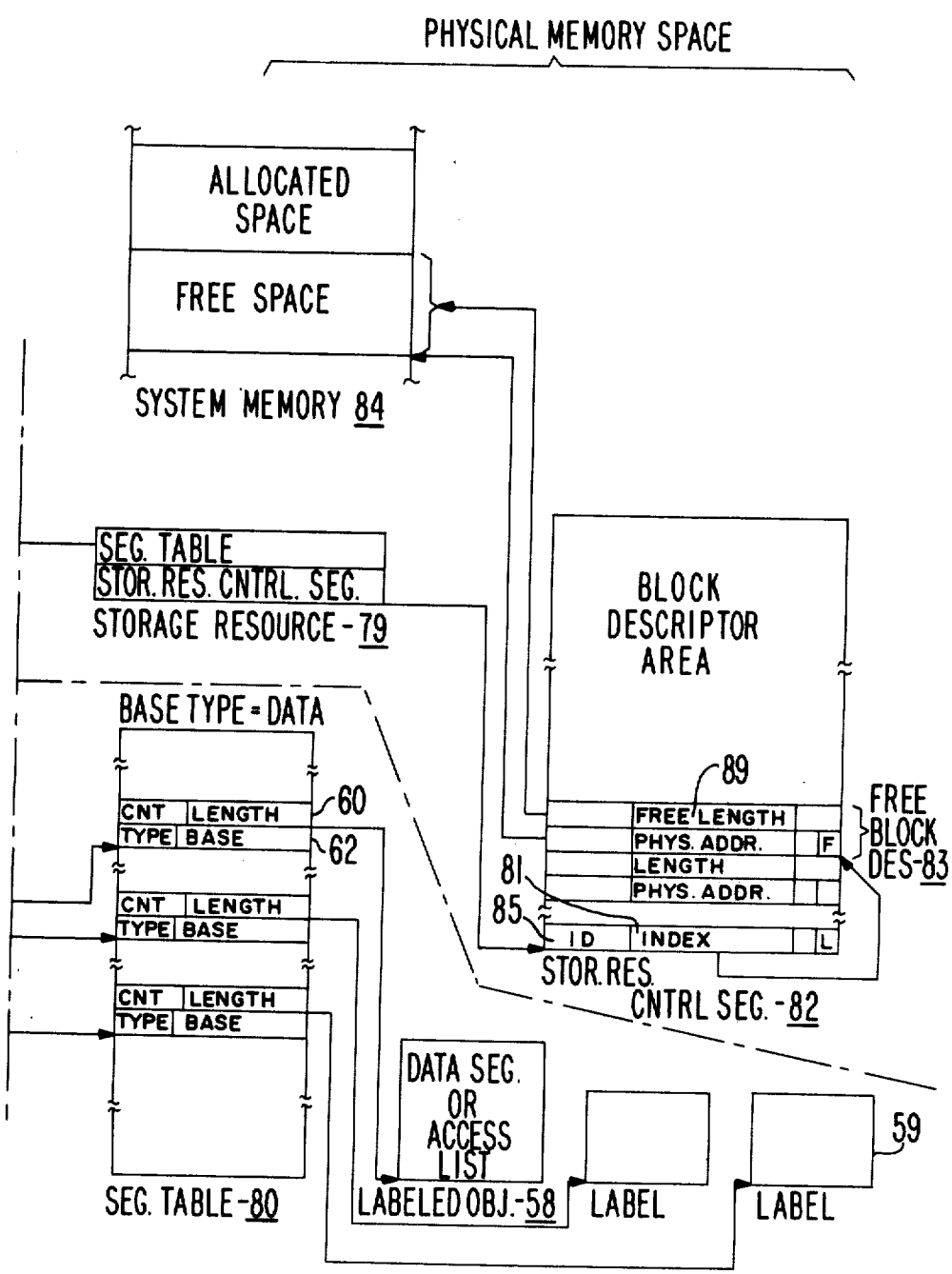

Refer now to FIGS. 2A and 2B. Segments (44) are the basis for all addressing and protection in the present system. Conceptually, a segment is simply a single, linear address space with a defined size or length. In practice, segments may exist in main memory and be associated with a starting or base address (46). To determine the actual physical address of an item of data within a segment, one simply adds the position of the item within the segment, called its displacement (48), to the segment's base address (46). To realize a simple, but important form of protection, one checks the displacement, before adding it to the base address to be sure that it does not exceed the defined length of the segment.

In conventional systems with segmented addressing, an effort is often made to keep the base addresses of segments apart from any displacements into them and to delay the formation of physical addresses until the last possible moment. When a physical address is needed, it is formed by adding the desired displacement to the base address as described above. The hope is that if these steps are taken, moving a segment will only require the updating of its base address. Unfortunately, in these systems nothing is ever done to prevent the base-address information from getting distributed throughout memory and in the processor's registers. This means that if a segment is moved, not simply one, but possibly hundreds of copies of its base address will have to be located and updated to reflect the change. Without extraordinary care on the part of the programmer, this process can be virtually impossible to carry out in a reasonable amount of time and in a reliable manner.

To avoid the problem of finding and updating a multitude of base addresses each time a segment is moved, the present system makes two fundamental improvements in segment-address management. First, it brings together all of the information about a segment (e.g., its current base address and length) and places that information in a segment table (50) along with the same information about all of the other segments in the system. Second, it requires that all references to a segment obtain the necessary base address and length information from this table. To change the base address of any segment, or to redefine its size, one simply changes its entry or segment descriptor (52, 54) in the segment table. Any reference to the segment will access the segment descriptor and obtain the correct and current base address (46) and length information (48).

Centralizing segment-address information is not, however, a complete solution to the problems associated with a segment-based addressing architecture. For example, it is often advantageous to be able to restrict the number of segments accessible to a given program to some artibrarily small set. With all of the segment information centralized, any program, whether it needs to or not, can find and address any segment in memory by simply indexing through the segment table. Centralizing the segment table can also lead to problems with the size of the index required to index through it. In the present system, the segment table can contain descriptors for over two million segments, implying a 21-bit segment table index for full access. If every operand address required that many bits to select the desired segment, in addition to a useful displacement size, instructions and programs would grow beyond all reason.

To eliminate the problems described above, the system provides a second level of address mapping above that provided by its segment table. Each independently-translated program unit or module is supplied at runtime with a list of segment numbers (i.e., indices for segment descriptors) for all the segments it may need to access during execution. The program selects a particular segment by specifying, as part of each operand's address in an instruction, an index into its list of accessible segments or its access list. Notice now that the index is known only to this particular program module because other modules have their own access lists and are thus able to use their own locally-known indices into them.

Since the only entries in a module's access list are for the segments it may need to access, the size of the index needed to select amongst them is, in general, much smaller than the total number of possible segments. This helps keep the local index small which in turn helps reduce the size of instructions and programs. At the same time, the access list limits the set of segments accessible to a program to exactly the set that it requires for its operation. This ability to restrict a program's accessibility, when combined with the ability to verify that displacements fall with the defined limits of segments, forms the foundation of the protection system of the present invention.

1.2 SEGMENT TYPES

Segments are used to hold all sorts of useful information in the system. For example, a segment is used to hold all of the information in the segment table (50). More precisely, a segment is used to represent the segment table's data structure in memory. In a similar way, a segment is also used to represent the access list of a program module. Segments, in fact, are used to hold data, instructions, and anything else that need a storage representation in the system.

With segments used to represent so many different things, it becomes apparent that being able to tell exactly what type of information a particular segment represents could be quite advantageous, especially from the point of view of protection. For example, if it was known that a particular segment were representing the segment table and a program inadvertently tried to execute its segment table data as instructions, the error could be detected and the program aborted before any damage might be done. Recognizing the usefulness of assigning types to segments, the system includes some additional information in each segment descriptor (52, 54). This information is used by a processor during execution to check the kind of access being made to the segment against what the segment's type definition (56) says it will allow. The type definition (56) includes both base-type and system-type information, described below. Any disagreement between the kind of access being made and the type definition causes an error.

There are two fundamental types of segments in the system. The first type is called the data segment and is used to represent almost every kind of data structure a programmer might choose to define, such as arrays, lists, and queues. It is also used to represent several important data structures that are hardware-recognized, such as the segment table. When a data segment is being used simply as that, a data segment, the base-type information (46) in its segment descriptor also indicates it's being used just as a data segment. If the segment is being used to represent some data structure that is recognized and used by the hardware, its base-type information again indicates that it is a data segment, but its system-type information (47) located next to the base type in its segment descriptor, indicates that the segment is being used for a special function. Examples of this two-level typing include data segments used to hold instructions (i.e., base type-data segment, system type-instruction segment) and data segments used as first-in, last-out stacks during arithmetic expression evaluation (i.e., base type-data segment, system type-operand stack).

The second fundamental type of segment in the system is the access list (AL). As mentioned above, an access list contains the indices for all of the segments accessible to a given program module. To guarantee that these indices are not manipulated, either accidentally or maliciously, by any program, access lists are absolutely inaccessible as data segments. The hardware simply will not operate on the information contained in an access list as data. The ability to preserve the absolute integrity of access lists is another fundamental concept in the protection system of the present invention.

Access lists, like data segments, can also be used to represent both programmer-defined and hardware-recognized information structures. Unlike data segments, however, access lists cannot represent structures of primitive data (e.g., integer arrays, character strings, etc.). Instead, the information structures they represent are collections or groupings of several entire segments. Since the segments referenced by an access list can be other access lists or data segments, they may be used to build arbitrarily complex, segment-based information structures. When an access list is used to represent a software interpreted, multisegment information structure, the base-type information in its segment descriptor indicates that it is an access list and that it has no other special function. When an access list is used to represent a multisegment structure with a hardware-recognized function, that function will be indicated by the system-type information in its segment descriptor. The following description, with reference to FIGS. 2A, 2B, 3A, 3B, 4A, and 4B, introduces a variety of these hardware-recognized, multisegment structures and describe their importance to the system architecture. Each system object shown in the figures is labeled as to its base type, i.e., base type=AL (access list) or base type=data (data segment). A more detailed description of system objects appears under the heading "System Object Structures."

1.3 OBJECTS

With the great variety of information structures that can be built from access lists and data segments, it soon becomes difficult to know each structure in detail. As a conceptual aid, it becomes easier to view each type of structure as a single amorphous entity or what is called an object. Once this view is taken, the apparent complexity of the many segment-based information structures used in the system is greatly diminished.

For every hardware-supported function in the system, from instruction execution to interprocess communication, there is a particular type of object, from a simple data segment to some arbitrarily complex network of access lists, data segments, and other objects, that is accessed and manipulated specifically by that function. In most cases, however, the programmer may completely ignore the internal organization of the object and yet remain confident that whenever an operator or function is applied to it, the object's type and structure will be verified by the hardware to be consistent with its definition and with the function specified.

Although the system makes many objects and their functions available to the programmer, it is often the case for the objects used by a given program that only a subset of the functions are actually required by the program. To allow for the specification of this subset, each entry in an access list is equipped with some additional information. When this information is combined with the type information available from the entry's associated segment descriptor, it defines the subjset of access rights available to the program for this object. This is why entries in an access list are called access descriptors. For not only do they describe which segment or object is accessible, but how it can be accessed as well.

Data segment access descriptors (i.e., access descriptors for data segments) are a good example of the kind of access control provided by access descriptors. If a data segment is being used just to hold data (i.e., no special hardware-recognized use is intended), the two essential access rights possible are read and write. An access descriptor for such a segment can indicate that its data can be read, can be written, can be read or written, or can be neither read nor written. If two different programs should happen to use the same segment in a cooperative manner, an access descriptor in an access list for one of the programs may allow only reading, while an access descriptor in an access list for the other program may allow the data in the segment to be both read and written.

Acces list access descriptors are also defined to have both read and write access rights, but the meaning of these rights differs considerably from that of the same rights applied to data segments. To be allowed to read an access list means to be able to copy or move any one of its access descriptors into another access list. Similarly, to be allowed to write an access list means to be able to replace one of the access descriptors in the list with another. Naturally, the integrity of the system protection system depends upon the absolute inability to do anything else to an access descriptor, such as altering the information inside of it.

As mentioned above, a variety of complex objects can be built from the two basic types of segments, data segments and access lists, and several of these object types are recognized by the system hardware. Most significantly for the hardware-recognized types, segment descriptors automatically identify a segment as to both its base type and its system type to the hardware. It becomes necessary, however, in more advanced software systems, to allow the programmer to define and distinguish new types of objects that are beyond the knowledge of the hardware. To support this requirement, the system provides a facility that lets the programmer extend the number of object types available to an almost infinite number. An object defined as a programmer extended type is identical to an object of a hardware-recognized type with one exception: access descriptors for the object are able to select both a segment access descriptor for the object and a programmer-defined type label. Since the hardware cannot do anything with an extended type object, other than recognize that it is such an object, it becomes necessary for the programmer to define the object's manipulations in software. Several basic mechanisms for simplifying this task are available. Among them are the ability to read an extended object's type label into a data segment and the ability to compare two such labels for equality. If the programmer insists that the hardware take greater precautions with an extended type object, the object can be hidden behind its label. Hiding an extended type in this manner will cause the hardware to insist on the presentation of the appropriate matching label before exposing the object. These facilities allow the programmer to provide, in software, many of the same kinds of checks provided by the hardware for recognized objects.

Many different labels can be applied to the same object, and the same label can be applied to many different objects. Since a labeled object behaves for the most part like any other kind of object, labeled objects themselves can be labeled. Logically speaking, each time a label is applied to an object, a new access path is created. The hardware guarantees that any access along this path will encounter the programmer-defined label. It the object is not hidden, the label can be bypassed, otherwise a matching label (i.e., a protected key) must be presented by the programmer in order to acces the object. Since paths are often formed hierarchically by applying a label to a previously-labeled object, paths are said to have levels of labeling. For this reason the hardware-recognized data structure used in segment tables to represent a level of labeling is known as a path level descriptor (see, for example, 60, 62 FIG. 2B).

As comprehensive as the system facilities are for the definition, identification, and manipulation of objects of all types, such facilities would not be complete without the availability of a flexible dynamic storage allocation mechanism. The allocation mechanism (77, FIG. 2B) provided by the system supports the instantaneous allocation of both storage and segment table space for new data segments and new access lists. The object typing and labeling facilities mentioned above permit the simple and direct construction of both hardware-recognized and programmer-defined object types.

1.4 FUNCTIONAL HIERARCHY

Figure 3A:
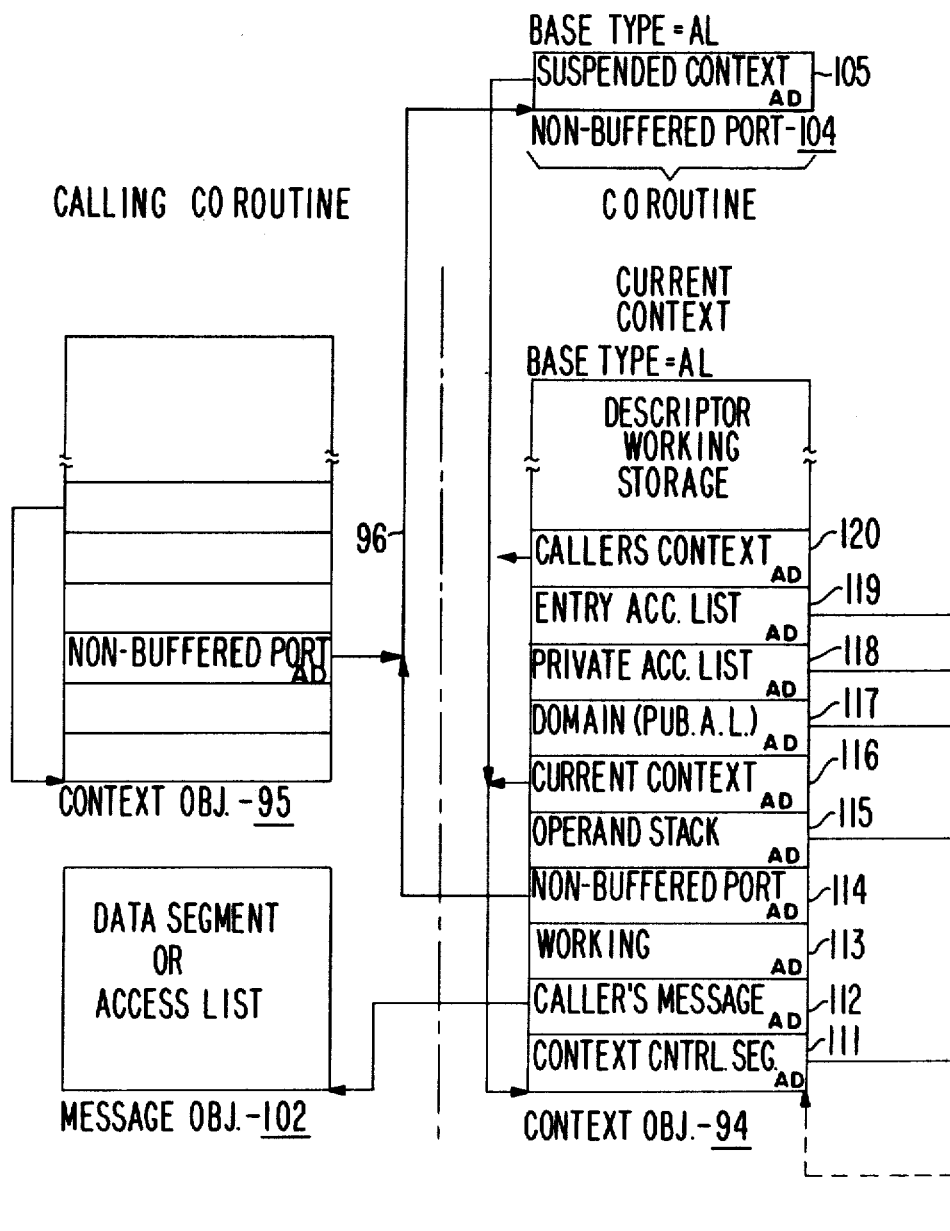
FIGS. 3A and 3B, taken together, are a block diagram of system objects making up an individual process environment, shown in FIG. 1.
Figure 3B:
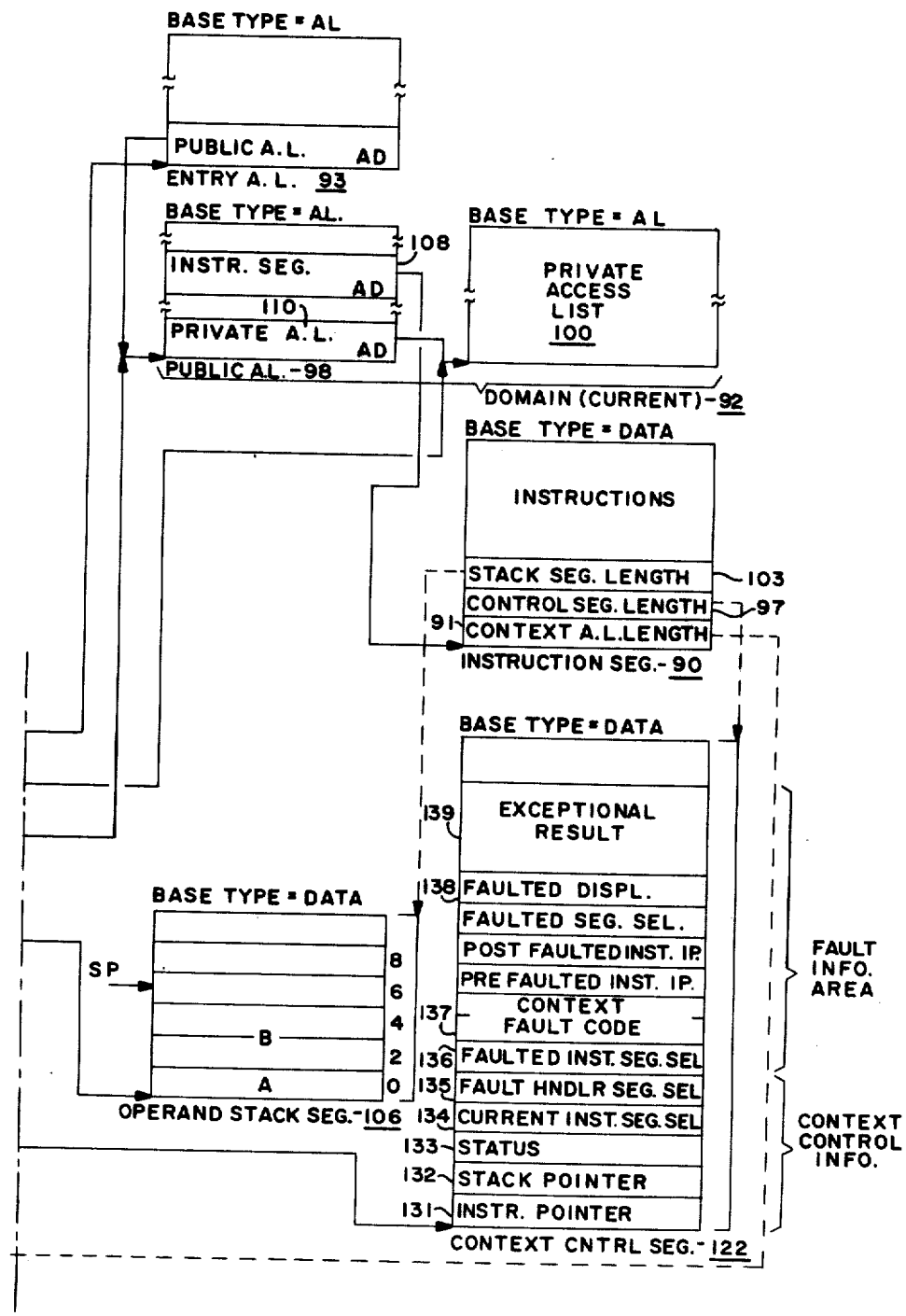

Refer now to FIGS. 3A and 3B. The system architecture is designed as a hierarchy of functional levels. At the lowest level of this hierarchy are the individual instruction fields consisting principally of operand references and operator codes. These fields may be combined to form a significant number of useful instructoons on a variety of primitive data types and structures. To define a complete procedural action or operation, as it is called in the present system, a sequence of instructions can be placed into a hardware-recognized object called an instruction segment (90). Only instructions obtained from such an object executable. Any attempt to execute instructions from some other type of object is considered a program error. Note that operations are not equivalent to instruction segments. This is because several instruction segments may be required to represent one operation, although no "operation object" type is defined to represent such a composite. The term operation is used in this specification to refer to an abstract operation object consisting logically of one or more instruction segments.

The next level in the system functional hierarchy defines a grouping or collection of operations. This grouping is usually based on the logical association of some set of operations for the manipulation of an object of some type. For example, a set of operations that would naturally be grouped together would be the set defined to manipulate an object of the type used to represent a dictionary. The set of operations might include procedural actions to look-up an entry in the dictionary, to insert a new entry, or to remove an old entry. Note that a group of operations defined in software to manipulate a particular type of object has an unmistakable resemblance to a set of operators defined in hardware to manipulate a primitive data type. The term operation is, in fact, intended to suggest the notion of a "software operator" which can be thought of as the software equivalent to a hardware operator.

The hardware object used to represent a logical grouping of operations is called a domain (92). While it is possible for a domain to represent nothing more than a collection of operations or, more precisely, access to a collection of operations, most of the time a domain will associate other objects with a set of operations as well. These objects usually contain the constants, variables, and access descriptors that are used in common by all of the domain's operations. For this reason, a domain is considered to be more than just a grouping, but rather an environment in which, along with various other objects, one of several possible operations can be accessed.

The environment provided by a domain is not, however, a sufficient one in which to execute an operation. Additional access must be provided. For example, many operations require parameters to be passed to them before they execute, and they need room for local variables and temporaries for use in expression evaluation. The environmental requirements of an executable operation simply go beyond the intended function of a domain object.

The key to building an environment in which an operation can execute is the creation of a hybrid access environment, combining the static properties of a domain with the dynamic aspects of an operation ready for execution. The hardware-recognized object that does just that is called a context (94). A context is an access environment (i.e., an access list) that is created prior to the execution of an operation and includes access to the domain in which the operation is defined. The context access list of a context includes working space for the access descriptors of local data segments, parameter objects, and the special object used for local expression evaluation, a first-in, last-out operand stack.

Once an operation is given a context in which to execute, it begins to exhibit more of the behavior usually ascribed to subroutines and procedures. For example, contexts (i.e., operations in contexts) are able to call and return to one another in subroutine fashion. The return link (96) for a calling context is conveniently stored in the context access list of the called context (94). Calling a context can, of course, produce significant changes in the access environment of a computation. Calling a context for an operation defined in the same domain as the caller only changes the environment's context specific components. The domain component remains the same. Calling a context for an operation defined in another domain changes all the components of a computation's access environment.

Being able to simply move from one context to another to experience such a complete change in access environments provides the system with another very useful form of protection. A domain can easily be defined with access to a particularly important block of information or data base. With that in place, the operations of the domain can be defined to manipulate the information in precisely the manner necessary to ensure its integrity. The only way then to access the information in the domain is to create a context for one of the operations in the domain and call it. The data base is completely protected against accidental or malicious modification. To even further enhance the information-hiding capability of a domain, the domain object (92) itself is designed to be partially hidden. If one domain has access to another domain, via an access descriptor for it, then from within a context for an operation defined within the former, only the objects found in the public access list (98) of the latter may be freely accessed. What remains hidden to the calling context is actually the other half of a two-part domain object called its private access list (100). The only way to access the objects found in a domain's private access list, is to transfer control to a context for one of its operations, in particular, to any context accessible via its public access list.

Should only access descriptors for instruction segments (108) be present in the domain's public access list (98), the calling context will find it necessary to first create a context for an operation to be called before calling it. Note that the hardware allows the dynamic construction of contexts for operation in domains different from the domain of the creating context without compromising the protective aspects of the created context or its domain. In other words, one context having access to another can only call it. The context access list of the called context and, therefore, its set of locally accessible objects, is not publicly accessible.

Normally, control (i.e., the locus of processing activity) moves from context to context in a hierarchical manner, as they call and return to one another much like subroutines. Occasionally, the need arises to transfer control between contexts in a more arbitrary manner including transferring from one context to another, and then to a third, and then back to the first again, in a cycle. (Note that this is not recursive control flow. That would involve creating a new context for each call of the same operation). Cyclic control flow means that that control actually resumes in the same context each time around the loop. Another more arbitrary control structure is the pipeline, where control enters and exits one context and then another, never to return again. To support these nonhierarchical control structures, contexts in the system are created prior to the time they receive control and are retained (i.e., not deallocated or reinitialized) after the time they relinquish control. That is why a context is not simply a procedure, in the ALGOL sense, which is defined to go into and out of existence at the same time it gains and gives up control. Contexts, of course, can be used to model procedural environments, as well as almost any other form of control and enviroment discipline, by explicitly creating and deleting contexts at the appropriate times. The term coroutine is used in this specification to refer to any context that operates in a nonhierarchical manner.

Figure 4B:
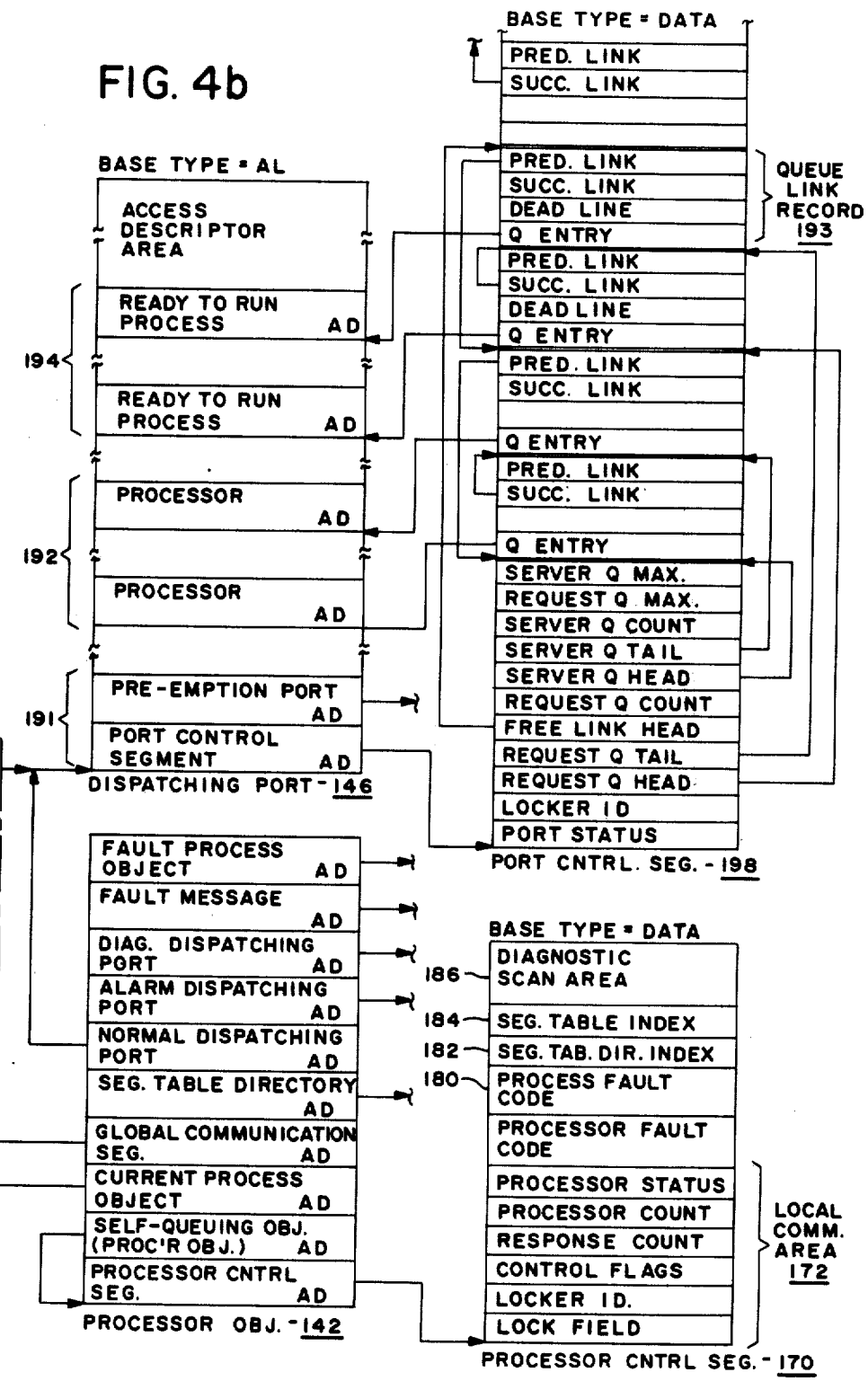

Refer now to FIGS. 4A and 4B. A sequential computational activity or process is characterized by a series of context and domain transitions resulting from transfers of control between contexts. Since more computational processes may exist than physical processors, the architecture provides a facility for automatically switching or multiplexing the available processors among ready-to-run processes. This is done by abstracting or virtualizing the notion of a processor. Physical processors may associate themselves, for a given period of time, with the virtual processor of a given computational process. When the physical processor disassociates itself from the virtual processor, the state of the computation is stored in memory as the state of the virtual processor. This allows for the convenient resumption of processing for that virtual processor whenever another physical processor of corresponding type is available. In the present system a different virtual processor is defined for each computational process, and so the terms virtual processor and process are used synonymously. In the remainder of this specification, however, the term process is used almost exclusively.

To maintain the state of the virtual processor associated with each independent process, the system makes use of another type of hardware-recognized object called a process object (140). In addition to the process state, this object contains information, previously stored there by software, that is used by the hardware of the system in an automatic allocation of processing resources and memory space. Another object, called a processor object (142), is assigned to each processor to maintain its state information and to determine the set of processes which it is to serve.

1.5 COMMUNICATION

Refer again to FIGS. 3A and 3B. A different communication mechanism is provided for the program objects at each level in the system architectural hierarchy. At the lowest level, communication between instructions takes place via commonly-accessible memory locations including last-in, first-out stacks for temporary scalar operands. The normal sequential flow-of-control from instruction to instruction can, of course, be altered by both unconditional and conditional branching. Because execution at this level is always sequential, no buffering or interlocking of instruction communication is required.

At the next level, communication between contexts, interacting conventionally as subroutines or procedures, is based on the transmission and reception of messages. Information to be transmitted is first assembled into a message object (102). If the information is simple scalar data, the message object is simply a single data segment. For the transmission of more complex information, the message object is instead an access list containing descriptors for other access lists, data segments, and objects. In all cases the message is treated as a single, but arbitrarily complex object. To transmit a message, the hardware simply moves the access descriptor (112) for the message object from the sending (caller's) context to the receiving one. Needless to say, this form of intercontext communication is fast, flexible, and extremely powerful.

When one context calls another hierarchically, in the manner of a subroutine or procedure, a return link (96) for the calling context is also passed to the called context as a separate argument message. The link, again in the form of an access descriptor, can be used by the called context (94) to return control along with a result message to the calling context (95) when desired. Significantly, the only difference between calling a context and returning to a context is that in the latter case no return link is supplied.

Messages also form the basis for communication between contexts that do not demand a strict call/return hierarchy. Unlike hierarchical context communication, however, nonhierarchical context or coroutine communication requires somewhat more selectivity over various potential callers. Whereas an ordinary context is subject to call by any one of its potential callers, a coroutine may dynamically choose to accept control and communication from only a subset of the coroutines which may call it. This selectivity is made possible by another type of hardware-recognized object called a nonbuffered communication port (104). In order to specify the particular port over which it desires to accept messages and obtain control, a coroutine suspends itself at that port whenever it transfers control and passes a message, via another nonbuffered port, to some other coroutine. From that point onward, the coroutine will only accept control and a message via the port at which it is suspended. Any other attempt to pass control and information to the coroutine, via any other nonbuffered port, is treated as an error. Despite the selectivity available, coroutine communication does not require any form of buffering or interlocking since coroutines, by definition, communicate with one another in a sequential manner.

Refer again to FIGS. 4A and 4B. At the topmost level in the functional hierarchy, the communication mechanism for potentially asynchronous sequential processes is fully buffered and interlocked. Both of these functions are provided by another type of hardware-recognized object called a buffer communication port (144). Since the relative speeds of independent processes are not predictable, the buffering provided by a port is rather extensive. Each buffered port provides two queues: one for messages that have been sent and one for processes that are waiting for messages to arrive. When one process sends a message to a port at which no other process is waiting, it simply places an access descriptor for the message in the port's message queue (150) and continues to execute. Sometime later, when another process attempts to receive a message at the same port, it immediately receives the message and continues to execute. If the receiving process does not find a message queued at the port, it places an access descriptor for its process object in the port's process queue. Sometime later, when a message arrives and the process is at the head of the port's process queue, the sending process removes the waiting process from the queue and makes it available for further execution.

In addition to providing the buffering and interlock required for asynchronous interprocess communication, buffered ports offer several other important capabilities. For example, by allowing more than one process to send messages through the same port and more than one process to receive messages through that same port, several identical processes, free to operate in parallel on several identical processors, may provide simultaneous service to a number of other client processes. This feature can be used effectively in advanced real-time systems to adjust and improve response time during peak-load periods. Since a process is free to receive at any port it can access, it may be arbitrarily selective in its processing of incoming-message traffic, much in the manner of a coroutine. A port may also be used in a simpler manner for supporting sophisticated forms of programmed mutual exclusion commonly found in resource management software. The ability of buffered ports to queue waiting processes, in addition to sent messages, completely eliminates the kind of busy waiting that would have a process endlessly testing or spinning on a lock bit to determine the arrival of a message. Certain hardware functions in the system do make use of spin locks, but special techniques are employed to avoid unnecessary memory contention during actual spin situations.

Logically, the assignment of processes to processors is supported by the same type of queued communication provided by buffered ports. That is, a process that is ready for further execution, is treated just like a message for one of possibly several receiving processors. To receive a process, a processor waits at a dispathing port (146) until a process arrives, just as a process might wait at a buffered port to receive a message. The logical equivalence of physical processors, virtual processors, and processes is clearly evident in this mechanism, for the system also permits one process to receive another process as a message. Although it is not able to directly execute the process, the receiving process may inspect, delay, or interpretively execute the received process before resending it as a message to a physical processor or perhaps some other process.

Normally, a process leaving the process queue of a buffered port is sent directly to a dispatching port for processor assignment. The particular dispatching port is specified by an access descriptor (148) in the buffered port itself. Should the buffered port not contain an access descriptor for another buffered port, the access descriptor for the process is sent there instead. This aspect of the system's communication facilities has significant practical consequences in operating system design. Through this mechanism software schedulers or other service processes can be interposed between hardware schedulers in a totally transparent manner.

The same type of interprocess communication described above is employed between the processes associated with general data processors and those associated with input/output processors. This is consistent with the asynchronous nature of input/output and eliminates the need for interrupts to the general data processors. All ordinary interrupts, direct memory access requests, etc. are handled by the input/output processors. After completing the necessary device service functions, the input/output processes communicate with associated general data processes by sending and receiving messages. The queuing of command and completion messages, in addition to the dispatching of input/output processes, is a natural byproduct of building the system's input/output system on top of its interprocess communication mechanism.

Although ordinary interrupts do not exist inside of the system, there is a mechanism which allows processors to communicate with each other. This mechanism is typically used to reactivate those processors that may have been idled by other processors for maintenance or those that may have idled themselves during a period of low computational activity or memory access interlock. This is known as processor-specific communication because the target of the interprocessor message is only the processor that needs to be reactivated. In other situations, the interprocessor communication mechanism is used to broadcast a system-wide processor directive. Ordinarily, this is a global request for all of the processors in a system to requalify the segment address information they all buffer internally. Perhaps what distinguishes interprocessor communication most from common interrupts is that the former never causes a receiving processor to alter the flow-of-control within the process it may be executing.

Communication in response to software and hardware exceptions takes several forms in the system. Most computational fauls cause a simple branch within the faulting context to a designated fault-handler instruction segment. More severe faults, such as protection faults, result in the suspension of execution for the faulting process and the transmission of an access descriptor for its process object to a fault-service process via a designated buffered port. A faulting processor is handled somewhat differently by reassigning it to a different dispatching port where it may attempt to execute a programmed diagnostic process.

External devices that independently monitor system alarm conditions, such as error-correction failures, bus-response failures, or primary-power failures, may force the suspension of all currently-executing processes and force the execution of critical alarm-handling processes.

1.6 DATA TYPES, OPERATORS, AND INSTRUCTIONS

A general-purpose set of data types and operators are provided by the general data processors. Included in the set are operators for individual bits, bit fields, characters, ordinals (i.e., unsigned integers) of two sizes, integers of two sizes, and reals (i.e., floating point data) of three sizes. Also provided, in lieu of any special operators, is a versatile operand reference mechanism for the efficient selection of the individual elements of aggregate data structures such as vectors and records.

Special consideration has been given to the floating-point architecture of the system to ensure extremely clean, real arithmetic. The set of operators provided permits the accurate determination of almost any mathematical function to true 64-bit precision. Other features of the floating-point architecture include complete control over result precision and rounding. This latter feature most notably contributes to the practical and efficient implementation of interval arithmetic in system software.

The instruction formats allow nearly any combination of explicit and implicit (i.e., from the top of the current operand stack) operand references to be specified with each operator. Redundant operand references, such as those that might occur when a source and destination address are identical, may be specified in a manner that eliminates the need for their common reference to appear more than once in the instruction. The near-total symmetry of the operator set and the instruction formats, with respect to data type and operand location, greatly simplifies the translation of programs described in higher level programming languages and significantly decreases the time and space required to execute them. The use of variable-length instruction formats, based on the frequency-of-occurrence encoding of operator codes and operand references, also provides significant reductions in the amount of memory needed to represent a program. Compression is often as high as fifty percent when compared to other computer systems of equivalent functionality and addressability.

Input/output processors support a restricted set of data types and operators specifically designed for handling the flow of information to and from peripheral devices and controllers. Included in the set are operators that transfer either single characters or short ordinals and operators that transfer strings of either characters of short ordinals. Also provided are several operators for scanning and translating both inbound and outbound data while it is being moved. These operators provide great flexibility in the selection of transfer synchronization and termination method. The architecture of the system Input/Output Processor is described in Part 3 of this specification.

2.0 INFORMATION STRUCTURE

2.1 MEMORY

The system implements a two-level memory structure. The software system exists in a segmented environment in which a logical address specifies the location of a data item. The processor automatically translates this logical address into a physical address for accessing the value in physical memory.

2.1.1 Logical Addressing

A software system is partitioned into many segments. A segment is a group of contiguously-addressed memory bytes, where a byte contains eight binary bits of information. A segment may be of any length from 1 to 65,536 bytes.

The instructions of an operation have access to the information contained within the segments that make up its current context. Instructions may contain one or more data references that specify the location of an operand in memory with a logical address. Each logical address has two components: a segment selector and an operand displacement. The segment selector specifies an index to an entry in one of the context's access lists. That entry indirectly specifies the memory segment that contains the operand. The operand displacement is the offset to the beginning byte of the desired operand from the base of the chosen segment. The maximum logical address space of a software system is limited to 2,097,152 segments of 65,536 bytes each for a total of 137,438,953,472 bytes.

2.1.2 Physical Addressing

Logical addresses are translated by the processor into physical addresses as explained under the heading "GENERALIZED DATA PROCESSOR INSTRUCTIONS." Physical addresses are transmitted to memory by a processor to select the beginning byte of a memory value to be referenced. A physical address is 24 binary bits in length. This results in a physical memory size limit of 16,777,216 bytes.

2.2 DATA FORMATS

When a processor executes the instructions of an operation within a context, it manipulates operands found in the segments of the context. An individual operand may occupy one, two, four, eight, or ten bytes of memory or a byte, double byte, word, double word, or extended word, respectively. All operands are referenced by a logical address as described above. The displacement in such an address is the displacement in bytes from the base address of the data segment to the first byte of the operand. For operands consisting of multiple bytes the address locates the low-order byte, and the higher-order bytes are found at the next higher consecutive addresses.

2.3 DATA REPRESENTATION

The following convention is used for representing data structures that are stored in memory. The bits in a field are numbered by increasing numeric significance, with the least-significant bit on the right. Increasing byte addresses are from right to left. Four basic lengths in the system are: 1 byte (bits 0–7); a double byte(bits 0–15); a word (4 bytes, bits 0–31); a double word (8 bytes, bits 0–63); and an extended word (10 bytes, bits 0–79).

2.4 DATA POSITIONING

The data structures discussed above may be aligned on an arbitrary byte boundary within a data segment. Note that more efficient system operation may be obtained when multibyte data structures are aligned on double-byte boundaries if the memory system is organized in units of double bytes.

2.5 DATA INTEGRITY

The multiprocessor architecture of the system places certain requirements on the operation of the memory system to ensure the integrity of data items that can potentially be accessed simultaneously. Indivisible read-modify-write (RMW) operations to both double-byte and word operands in memory are necessary for manipulating system objects. From the time a RMW-read is processed for a location in memory, any other RMW-reads to that location must be held off by the memory system until a RMW-write to that location is received (or until a RMW timeout occurs). Also for ordinary reads and writes of double-byte or longer operands, the memory system must ensure that the entire operand has been either read or written before beginning to process another access to the same location. Otherwise, for instance, as a result of two simultaneous writes to the same location (by two processors), the set of locations used to store the operand could contain some interleaved combination of the two written values.

2.6 OPERAND STACKS

The stack pointer (SP), managed by the hardware, contains the displacement in bytes from the base of the segment to the next free stack element. When an operand is pushed onto the stack, the value is stored in the location specified by the SP and the SP is then incremented by the length of the operand. Similarly, when an operand is popped from the stack, the SP is first decremented by the length of the operand and then the value is loaded from the location specified by the SP. If the stack contained a double-byte, A, and a word, B, the stack would appear as shown in FIG. 3B. (Byte displacement is shown by the numbers on the right-hand side of the operand stack segment, 106.)

An instruction referencing the top element in the stack need not specify either the segment selector or the displacement, since the processor is aware of which segment contains the current stack for the executing process, and the stack pointer specifies the current top-of-stack displacement. Temporary results generated by an executing operation are most efficiently stored on the operand stack, since very little information is required in an instruction to make the stack reference.

The exact manner in which operands are stored in an operand stack depends on the length of the operand. In the present system a byte operand stored in the stack is right-justified in a 16-bit stack element with an all-zero, high-order byte. A double-byte operand simply occupies one element in the stack. Word, double-word, and extended-word operands require two, four, and five stack elements, respectively, with higher-order elements stored at higher addresses.

2.7 INSTRUCTION SEGMENTS

Every software operation has its instructions contained in an instruction segment (90, FIG. 3B). Unlike data items, however, instructions are not constrained to fit within the fixed-length formats described above. Instead a processor views an instruction segment as a contiguous string of bits called an instruction stream. Individual processor instructions, which contain a variable number of bits, may begin at any bit within the string. The location of a generalized data processor instruction is specified by a logical address whose displacement is a bit displacement from the beginning of the instruction segment containing the instruction stream to the first bit of the instruction. Since this displacement is limited to 16 bits, an instruction segment is limited to 65,536 bits or 8,192 bytes. A processor reads the instruction segment from memory in units of 32 bits. For this reason an instruction segment must end on a word boundary. Otherwise a boundary error will occur when the processor attempts to read the bits of the last instruction of the instruction segment.

3.0 GENERALIZED DATA PROCESSING

3.1 COMPUTATIONAL DATA TYPES

A generalized data processor provides a comprehensive set of operators for manipulating several different hardware-recognized computational data types. Each type is characterized by the amount of storage required and the operators available for operands of that type. These types, each of which is discussed below, are the primitive types with which more complex data structures can be built in a system. The operators for each type are considered to be complete in the sense that all meaningful operators for data of that type are available. If the result of any operator violates the bounds of its data type, this condition is recognized by the hardware, and special action, as defined subsequently, is taken.

3.1.1 Character

Character operands require one byte of memory and can be used to represent boolean, character, or unsigned integer values. The latter are limited to the range 0 to 255. The operations provided for character operands include logical operations (e.g., AND, OR, XOR, XNOR, etc.), simple unsigned arithmetic operations (e.g., add, subtract, increment, decrement, etc.), and relational operations (e.g., equal, greater than, greater than or equal, etc.).

3.1.2 Short Ordinal

Short-ordinal operands are most commonly used as selectors that designate the position of an element in an ordered list. For example, such operands would be useful as indices for vectors or arrays. Since these operands occupy a double byte of memory, their values are limited to the range 0 to 65,535. Additionally, short-ordinal operands can be used to represent bit fields of 16 bits or less. The short-ordinal operations include logical operations, bit manipulations, and complete unsigned arithmetic and relational operations.

3.1.3 Short Integer

Short-integer operands also occupy a double byte of memory but represent signed integers in the range −32,768 to 32,767 in 2s complement form. A complete set of signed arithmetic and relational operators is provided to manipulate short-integer operands.

3.1.4 Ordinal

Ordinal operands occupy a word of storage and represent unsigned integer values in the inclusive range 0 to 4,294,967,295. Also, ordinal operands can be used for longer bit fields, up to 32 bits, than can be accommodated by short-ordinal operands. The set of operations associated with ordinal values includes logical operations, bit manipulations, and complete unsigned arithmetic and relational operations.

3.1.5 Integer

An integer operand requires one word of storage. This data type provides extended precision beyond that available with the short-integer data type. Values of these operands are in 2s complement form and lie in the range −2,147,483,648 to 2,147,483,647. A set of 32-bit signed arithmetic and relational operators are provided to manipulate integer operands.

3.1.6 Short Real

Data values of type short real provide a wider range of values than is provided by either integer or short-integer operands, although the precision throughout the range is not as great. Values of this type consist of two parts, a mantissa and a scale factor, which itself consists of a base and an exponent. An example using decimal numbers is $$(1.2345) * 10^{-3},$$

which represents the decimal value 0.0012345. Note that in this example, the mantissa is 1.2345, and the scale factor consists of the base 10 and the exponent −3. As described in detail below, only the mantissa and exponent are actually included in the representation of values of type short real. Short-real operands occupy a word of storage and have the following format.

```
31 30      23 22        0
 s  exponent  mantissa
```

Note that the most-significant bit (bit 31) specifies the sign (0 is positive and 1 is negative) of the short-real value. All bit patterns that represent short-real operands are not interpreted in the same manner by the hardware. There are four classes of operands: invalid operands, normalized operands, zero operands and unnormalized operands.

Invalid operands are those with an exponent field of all ones or those with a sign bit of one and the exponent and mantissa fields all zeros. The manner in which the hardware responds to invalid operands is described under the heading: "FLOATING-POINT COMPUTATION."

Normalized operands are those in which the exponent field is neither all zeros nor all ones. The binary mantissa is stored in a true magnitude, normalized form that assumes an implicit bit with value one to the left of the most-significant bit of the mantissa. The binary point is between this implied bit and the most-significant mantissa bit. The scale factor of the store-real operand uses a binary base and an exponent whose value if 127 less than the unsigned binary integer stored in the exponent field of the short-real operand. Values of the exponent field range from 0 through 255. Since an exponent field with all zeros or all ones (unsigned integer value 0 or 255) has special meaning, the exponent of the scale factor ranges from −126 through 127. The value of the short-real operand stored as

```
31 30    23 22    0
 s  e7...e0  f22...f0
``` is $$(-1)^{s} * (1.f_{22}...f_0) * (2^{(e7...e0)-127}).$$

Normalized short-real operands provide the equivalent of seven decimal digits of precision. The largest and smallest absolute values are approximately given by:

largest absolute value = $3.4 * 10^{38}$
smallest absolute value = $1.2 * 10^{38}$.

A zero short-real value has a unique representation. This representation has all zeros in the sign, exponent, and mantissa fields.

Unnormalized short-real operands are recognized and supported by the hardware in order to extend the range of values that can be represented near zero. On a system that does not recognize unnormalized operands, certain computations cannot complete correctly without the intervention of complex software. With the system, however, these same computations can be carried out completely by the hardware in a straightforward way. Unnormalized values are represented by an exponent field that is all zero and a mantissa field that is not all zero. The binary mantissa is stored in a true magnitude form without the implicit bit. The binary point is located to the left of the most-significant bit of the mantissa, and the exponent of the scale factor has the value −126. The value of the unnormalized short-real operand stored as

```
31 30   23 22    0
 s  0.....0  f22...f
```

$$(-1)^{s} * (0.f_{22}...f_0) * (2^{-126}).$$

Note that as the number of high-order zero bits in the mantissa increases, the precision of the corresponding short-real value decreases. Supporting unnormalized values results in the smallest absolute value of short-real operands being reduced to approximately:

smallest absolute value = approximately $1.4*10^{-45}$.

3.1.7 Real

Real operands, which occupy a double word of storage, provide a computational capability that is similar to that of short-real operands as described above. Real operands, however, provide both a wide-range of values and more precision. The format for real operands is

```
63 62      52 51      0
| s | exponent | mantissa |
```

The interpretation of this format is similar to the interpretation of the short-real format discussed above. Again there are four classes of operands. Invalid operands are those with an exponent field of all ones or those with a sign bit of one and the exponent and mantissa fields all zeros.

Normalized operands are those in which the exponent field is neither all zeros nor all ones. The binary mantissa is stored in a true magnitude, normalized form with an implicit 1-bit to the left of the most-significant bit of the mantissa. The binary point is between this implicit bit and the most-significant mantissa bit. The exponent of the scale factor is 1023 less than the unsigned binary integer stored in the exponent field of the real operand. Since an exponent field of all zeros of all ones (unsigned integer value 0 or 2047) has a special meaning, the exponent on the scale factor ranges from $-1022$ through 1023. The value of the normalized real operand stored as

```
63 62      52 51      0
| s | e_{10}...e_0 | f_{51}...f_0 |
``` is $$(-1)^{s*} (1.f_{51}...f_0)^* (2^{(e_{10}...e_0)-1023}).$$

Real operands provide the equivalent of 15 decimal digits of precision. The largest and smallest absolute values are approximately given by largest absolute value = approximately $1.8*10^{308}$
smallest absolute value = approximately $2.2*10^{-308}$ As with short-real operands, the unique real value of zero is represented by a real operand with sign, exponent, and mantissa fields all zero.

Unnormalized real values have an exponent field of all zeros and a nonzero mantissa field. The binary mantissa is stored in a true magnitude form without the implicit bit, and the exponent of the scale factor is $-1022$. The value of the unnormalized real operand stored as

```
63 62           0
| s | 0......0 f_{51}...f_0 |
```

$$(-1)^{s*} (1.f_{51}...f_0)^* (2^{-1022}).$$

3.1.8 Temporary Real

Values of type temporary real occupy an extended word of storage and provide an even wider range of values and even more precision than do values of type real. Temporary-real operands are intended for use as intermediate, or temporary, results during floating-point computations. Supporting such temporary results has two very important effects. First, the use of temporary-real operands for the intermediate values of a multistep calculation allows a result to be obtained with much less loss of precision than would occur if short-real or real operands were used to hold the intermediate values. Second, the extended exponent range greatly reduces the possibility that overflow or underflow might occur and halt the computation before it is complete. For example, the elementary trigonometric functions can be calculated exactly to the precision of short-real or real values by using temporary-real values for the intermediate results. The format for temporary-real operands is

```
79 78      64 63      0
| s | exponent | mantissa |
```

As with the short-real operands described above, there are four classes of temporary-real operands. The invalid operands are those with an exponent field of all ones or those with a sign bit of one and exponent and mantissa fields of all zeros.

Normalized operands are those with an exponent field that is not all ones and with a most-significant mantissa bit of one. The binary mantissa is stored in a true magnitude, normalized form with the binary point between the two most-significant bits of the mantissa. Note that an implicit 1-bit is not used with the temporary-real format. The exponent of the scale factor is 16,383 less than the unsigned binary integer stored in the exponent field of the temporary-real operand. Since an exponent field of all ones (unsigned integer value 32,767) is reserved for invalid operands, the exponent on the scale factor of normalized operands ranges from $-16,383$ through 16,383. The value of the normalized temporary-real operand stored as

```
79 78      64 63      0
| s | e_{14}......e_0 1f_{62}......f_0 |
```

$$(-1)^{s*} (1.f_{62}...f_0)^* (2^{(e_{14}...e_0)-16,383}).$$

Temporary-real operands provide the equivalent of 19 decimal digits of precision. The largest and smallest absolute values are approximately given by:

largest absolute value = approximately $1.2*10^{4932}$
smallest absolute value = approximately $1.7*10^{4932}$.

The unique temporary-real value of zero is represented by a temporary-real operand whose sign, exponent, and mantissa fields are all zeros.

Unnormalized temporary-real values are those whose exponent field is not all ones and whose most-significant mantissa bit is zero. The binary mantissa is again stored in a true magnitude form with the binary point between the two most-significant mantissa bits. As with normalized operands, the exponents of the scale factor is 16,383 less than the unsigned binary integer stored in the exponent field. This exponent therefore has the same range as in normalized temporary-real operands. The value of the unnormalized temporary-real operand stored as

```
79 78      64 63      0
| s | e_{14}......e_0 0f_{62}......f_0 |
```

$$(-1)^{s*} (o.f_{62}...f_0)^* (2^{(e_{14}...e_0)-16,383}).$$

Supporting unnormalized operands results in the smallest absolute value of temporary-real operands being reduced to approximately smallest absolute value = approximately $1.8*10^{-4951}$.

3.2 INSTRUCTION COMPOSITION

The actions of a generalized data processor are determined by the instructions obtained from the current instruction segment of the process being executed. Every instruction specifies an operator and several references. The operator specifies to the processor what hardware operation is to be performed, and the references select the operands to be used or manipulated. For each instruction this operator and reference information is encoded in several variable-length fields. The ordering of these fields within an instruction is shown in the diagram below.

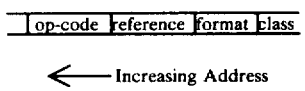

⟵——— Increasing Address

The general form and function of each field is described in the following sections.

3.2.1 Types of References

Two types of references may appear in the reference field of an instruction. A data reference is the encoded form of an operand's logical address in a data segment. A branch reference, used only with a branch operator, is simply the encoded form of an instruction's logical address in an instruction segment. For a given instruction, the type and number of required references is uniquely determined by the operator. For example, whenever the ADD INTEGER operator occurs in an instruction, three data references are required. Two of them specify the operands to be added together, and the third gives the logical address of where the result is to be stored. The unconditional branch operator, on the other hand, requires a single branch reference, which gives the logical address of the next instruction to be executed.

3.2.2 Operators

The operator specified in an instruction is encoded in two fields, the class field and the operator code or op-code field. The class field specifies the operator class to which the operator belongs, and the op-code field selects the hardware operation to be performed from within that class.

An operator's class is determined by the order of the operator (i.e., the number of required data references) and the length of the associated operands. The order-zero operators, such as the BRANCH operator, require no data references. The order-one operators require a single data reference, which may specify an operand whose length ranges from a byte to an extended word. The reference may specify either a source operand or a destination address. For example, the conditional branch operators require a single data reference, which specifies a byte operand that supplies a condition to be tested. Alternatively, the ZERO REAL operator requires a single data reference, which specifies the address of a double word that is set to zero by the action of the operator. The order-two operators require two data references, which may independently specify operands whose lengths range from a byte to an extended word. In most cases one reference specifies a source operand to be manipulated, and the other specifies a destination address for the result. For example, the EQUAL ZERO INTEGER operator compares a word source operand and zero for equality and produces a boolean result, which is a byte. Lastly, the order-three operators require three data references, which again may specify several combinations of operand lengths. In most cases the three references specify two source operands to be manipulated by the operator and a destination address for the result of the operation. The NOT EQUAL SHORT INTEGER operator compares two double-byte source operands for inequality and produces a boolean result, which is a byte.

3.2.3 Data References

The data references required by each operator may be supplied in various ways to provide an increase in flexibility and a more efficient use of memory. An encoded form of an operand's logical address may appear directly in the reference field of an instruction. Such an explicit data reference provides random access to the operands within any currently accessible data segment. If, however, an operand is to be read from or a result is to be written to the top of the current operand stack, an explicit data reference is not required. Instead, an implicit data reference is used. A format field is required with operators of order one, two, or three to specify whether each required data reference is given explicitly or implicity.

3.2.3.1 Explicit Data References

An encoded explicit data reference must contain sufficient information for a processor to determine both components of the full logical address of the desired operand. The segment selector component of a logical address can be specified directly in the data reference or indirectly in a data value in a data segment. The displacement component may also be specified in more than one way. In addition to being specified directly in the data reference, it may also be determined from a combination of information in the data reference and data values from data segments. This allows efficient accessing of complex data structures.

The format provides information that allows an operand referenced by a single explicit data reference to play more than one role during the execution of the instruction. As an example, consider an instruction to increment the value of an integer in memory. This instruction contains a class field, which specifies that the operator is of order two and that the two operands both occupy a word of storage, followed by a format field, whose value indicates that a single reference specifies a logical address to be used both for fetching the source operand and for storing the result, followed by an explicit data reference to the integer to be incremented, and finally followed by an op-code field for the order-two operator INCREMENT INTEGER.

3.2.3.2 Implicit Data References

It is possible for a format field to indicate that an instruction which considers the high-level language statement $$A = A + B*C.$$

The instruction stream fragment for this statement consists of two instructions and has the following form

| ADD INT | Ref A | Format | Class | MUL INT | Ref C | Ref B | Format | Class |

← Increasing Address

Assume that A, B, and C are integer operands. The first class field (the rightmost field in the picture above) specifies that the operator has order 3 and that all three references reference word operands. The first format field contains a code specifying that there are two explicit data references and that these two explicit references are to supply only the two source operands. The destination is referenced implicitly so that the result of the multiplication is to be pushed onto the operand stack. The second class field is the same as the first specifying that the operator has order three and that all three references reference word operands. The second format field specifies that there is one explicit data reference and that this reference is to be used for both the first source operand and the destination. The second source operand is referenced implicitly and is to be popped from the operand stack when the instruction is executed.

3.3 OPERAND STACK BEHAVIOR

The operand stack is handled in a uniform manner whenever implicit references are used in an instruction. Unless the operator is one of the save operators, using the operand stack to obtain a source operand causes the value to be popped from the stack when it is fetched. The save operators provide the ability to read the value at the top of the operand stack without popping it. Whenever the operand stack is specified as the destination, the result of the operation is pushed onto the stack. If the operand stack is used as the source for both operands of an order-three operator, the format field in the instruction specifies the order in which the two operands appear on the stack.

3.4 SEQUENTIAL INSTRUCTION EXECUTION

Normally, a processor is controlled by instructions that are taken in sequence from the current instruction segment of the process being executed. An instruction is fetched from the current instruction segment using a bit displacement obtained from the instruction pointer (IP) that is maintained within the processor. After that instruction has been executed, the instruction pointer is incremented by the number of bits in that instruction so that it points to the next sequential instruction.

3.5 BRANCHING

This sequential control flow can be changed by the use of branch operators. There are four types of branch operators: unconditional, conditional, indirect, and intersegment. These operators require information to locate the instruction that is the target of the branch. This is provided by a branch reference for the unconditional and conditional branch operators, by a data reference to a short-ordinal value for the indirect branch operator, and by two data references to short-ordinal values for the intersegment branch operator.

Executing an instruction containing the unconditional branch operator causes the next instruction to be the one specified by the branch reference. The conditional branch operators behave similarly except that the branch may or may not be taken depending on the value of a true/false condition (i.e., a boolean value) generated by a previously-executed instruction. All conditioned branch operators are of order one. The one required data reference specifies the location of the boolean to be tested. There are two conditional branch operators. One causes the branch to take place if the condition is true, while the other causes the branch if the condition is false.

Two types of branch references are used with conditional and unconditional branch operators. Since these operators only allow branches to be taken within the current instruction segment, these references need not specify the segment selector component of the logical address. The first type, the relative branch reference, is a 10-bit signed integer value that provides the bit displacement to the target instruction relative to the beginning of the instruction containing the branch operator. The second type, the absolute branch reference, is a 16-bit unsigned integer that provides the bit displacement to the target instruction relative to the base of the current instruction segment. This value is simply used as the new value for the instruction pointer in order to execute the branch.

The BRANCH INDIRECT operator provides a mechanism for placing an arbitrary 16-bit value from an arbitrary segment into the instruction pointer. The operator is of order one, and the one required data reference specifies the short-ordinal value to be used as the new instruction pointer. Viewed another way, the short-ordinal value gives the displacement in bits from the base of the current instruction segment to the target instruction.

The BRANCH INTERSEGMENT operator provides the ability to change the current instruction segment and to branch to a target instruction within that segment. The operator is of order two. The short-ordinal value referenced by the first data reference specifies the new instruction segment, and the short ordinal referenced by the second data reference provides the bit displacement from the beginning of that segment to the target instruction.

4.0 SYSTEM OBJECT STRUCTURES

The system makes extensive use of nonprimitive, hardware-recognized, data structures to represent the various computational objects defined in its functional hierarchy. For convenience, efficiency, and logical consistency, the data structures for these system objects are built from data of the primitive types described under the heading "GENERALIZED DATA PROCESSING." This allows them to be created and manipulated by any generalized data processor, without circumventing the safety and protection of the system access mechanisms.

The facilities that support the recognition and use of system objects also provide for the constant checking of both their type and structure prior to use. Should a deviation from either specification be detected by a processor, an exception is recognized. Such exceptions may either be events of which software must be made aware but which do not preclude continued execution of the current instruction stream or they may be events which require immmediate software attention. A number of such exceptions are described below. A detailed description of the exception-handling mechanisms appears under the heading "EXCEPTION HANDLING."

4.1 SEGMENTS

The use of the segment as the logical basis for every type of system object is fundamental, as segments form the foundation for all address development and access control. Segments also serve as the building blocks for all larger and more specialized computational objects and are the basis for realizing a multilevel or virtual memory capability. Normally, a single segment is sufficient to contain the data structure defined for a system object. In those cases, however, where a system object is a composite of primitive data and other system objects, a number of segments may be used.

4.1.1 Segment Tables and Segment Descriptors

Each segment has its physical base address, length, and other information specified in a type of system object called a segment table (e.g., segment table, 50, FIG. 2A). Each entry in a segment table entry is eight bytes long and describes one segment. A segment table entry is called a segment descriptor and has the following organization:

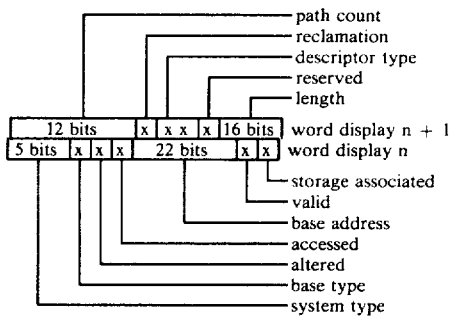

The 22-bit base address field of each segment descriptor specifies a full 24-bit, word-aligned (i.e., the two least significant bits are implied to be zero) physical base address of a segment.

The length of each segment is given by the short ordinal, called the length field, found in the third double-byte of its segment descriptor. The value of this field is one less than the length of the segment in bytes. The length field permits the definition of segments as short as one byte or as long as 65,536 bytes. Each time a segment is referenced by a logical address, the displacement component of the address is compared to the value of the length field. If the displacement exceeds this value, a segment displacement fault occurs. Since a segment table is represented by a segment, a maximum of 8,192 segment descriptors can be held in any one segment table.

The 1-bit base type field indicates the basic content of the segment, namely access list or data segment. Every hardware operator requires that its operands either be obtained from or be represented by an object of a specified base type. If the base type of any object accessed during the execution of an instruction does not agree with this specification, a base type mismatch fault is generated.

The 5-bit system-type field indicates which, if any, of the processor-recognized types constructed from the two base types is represented by the associated segment. Every hardware operator requires that its operands either be obtained from or be represented by an object of a specified system type. If the system type of any object accessed during the execution of an instruction does not agree with this specification, a system type mismatch fault is generated.

4.1.2 System Types and Their Encodings

The system types constructed from access lists and the associated encodings of the system-type field are:

00000—access list
00001—domain
00010—nonbuffered communication port
00011—GDP process
00100—buffered communication port
00101—dispatching port
00110—generalized data processor
00111—input/output processor
01000—private access list
01001—reserved
01010—reserved
01011—GDP context
01101—IOP context
01110—storage resource
01111—IOP process
10000 to 11111—reserved The system types constructed from data segments and the associated encodings of the system-type field are:

00000—data segment
00001—GDP instruction segment
00010—IOP instruction segment
00011—segment table
00100—segment table directory
00101—operand stack
00110—context control segment
00111—process control segment
01000—label
01001—path level table
01010—storage resource control segment
01011—transformer
01100—buffered port control segment
01101—dispatching post control segment
01110—processor control segment
01111—global communication segment
10000 to 11111—reserved The fourth double-byte of each segment descriptor contains a 12-bit field called the path count for the segment. This field is used to track the total number of access paths that are currently in existence for the segment. The path count is automatically and indivisibly incremented or decremented whenever an access path for the segment is duplicated or deleted, respectively. If the path count ever reaches zero, as a result of overflow or underflow, a path count notification occurs.

The 1-bit storage associated field indicates whether or not here is any storage associated with this segment descriptor. A value of zero indicates that no storage is associated with this segment descriptor. A value of one indicates that there is storage associated with this segment descriptor. This field is checked by a processor each time it accesses a segment descriptor. If the bit is zero, a no-storage associated fault occurs. Otherwise, execution continues in a normal manner.

The 1-bit valid field indicates whether or not a segment can be referenced via this segment descriptor. This field is checked by a processor each time it accesses a segment descriptor. If the bit is zero, a segment-descriptor validity fault occurs. Otherwise, execution continues in a normal manner. Through the fault-response mechanism, the valid field may be used by system software to implement a segmented, virtual memory capability, based on the controlled movement of segments between main memory and a lower speed, secondary memory system.

The 1-bit accessed field indicates whether or not the associated segment has been accessed by some executing process. This field is set to zero when a segment descriptor is allocated. This field is updated to a value of one by a processor any time it accesses a segment descriptor in which the bit is zero.

Similarly, the 1-bit altered field indicates whether or not the information contained in the associated segment has been modified (i.e., written) by some executing process. This field is set to zero when a segment descriptor is allocated. The field is updated to a value of one by a processor any time it writes into the segment associated with a segment descriptor in which the bit is zero.

The 2-bit descriptor type field indicates whether this descriptor is a segment descriptor, a path level descriptor, a free segment descriptor list head, or an unallocated segment descriptor. A value of zero indicates that the descriptor is a segment descriptor. A value of one indicates that the descriptor is a path level descriptor. A value of two indicates that the descriptor is the head of the list of free (i.e., unallocated) segment descriptors. A value of three indicates that the descriptor is unallocated. If an operator requires that its operands be or be supplied via a descriptor of a specified type and the descriptor accessed during the execution of instruction containing the operator is not of that type, a descriptor-type fault is generated.

The 1-bit reclamation field indicates whether or not any access descriptors for this segment descriptor have been moved or copied. A value of zero indicates that no movement or copying has occurred. A value of one indicates that movement or copying has occurred. This field is set to one when a segment descriptor is allocated. The field is updated to a value of one by a processor any time it moves or copies an access descriptor for a segment descriptor in which the bit is zero. While much of the reclamation of descriptors and segments can be accomplished via the path-count mechanism, reclamation of cyclic or self-referential structures cannot be accomplished without a software facility known as garbage collection. The hardware-maintained reclamation bit is designed to assist software in the implementation of such a facility.

4.1.3 Segment Table Directories and Segment Tables

To significantly increase the number of segments, and hence the number of objects, that can be addressed, the system allows a number of segment tables to be defined and in use. In order to address these multiple segment tables, a table of segment tables or a segment table directory object (68, FIG. 2A) is defined. Basically, such as directory is like any other segment table except that it only contains segment descriptors (e.g., 70) for other segment tables.

To select an individual segment descriptor, the segment index supplied by an access descriptor is redefined to have two components. The first component is an index into a processor's current segment descriptor (70) for the segment table 50 containing the desired segment descriptor. The second component is an index into the segment table 50 selected by the first index. The segment descriptor (52, 54) it indexes in that segment table is the desired segment descriptor. Given the format of access descriptors, as described below, a segment table directory index is limited to an 8-bit value. This limits the effective size of the segment table directory to 256 entries, although it could otherwise contain the 8,192 entries that are possible in an ordinary segment table object.

Although the architecture places no restriction on the total number of segment table directories that can be used, a single processor can use only one such table at a time. To change segment table directories, system software must order a processor to reset itself. Such a segment table directory switch is very rare, however, since a single software system using more than one segment table directory will not perform efficiently and will probably be unreliable. The multiple segment table directory capability is designed to permit several complete and independent software systems to coexist within a single physical system. For example, multiple segment table directories make it possible to develop and test a new software system under the supervision of a separate, but existing software system operating on the same hardware.

4.1.4 Temporary Segment Table Directory

Before any processor can begin normal operation, it must establish the location of its current segment table directory. Unfortunately, the location of this directory is specified by a logical address, which requires the use of a segment table to obtain the necessary physical address information. This apparent circularity is resolved by defining a temporary segment table directory (72, FIG. 2A) for use during processor initialization. The physical base address of the temporary segment table directory is defined to be physical memory address zero. Found there is a segment descriptor, as described above, which provides the rest of the information necessary to complete the description of the temporary segment table directory.

The use of the temporary segment table directory for processor initialization is described under the heading "ACCESS ENVIRONMENT MANIPULATION AND COMMUNICATION."

4.2 ACCESS LISTS

To protect access information from accidental or malicious damage, all access information, in the form of access descriptors, is kept in separate segments generically called access lists. An access list (AL) may not contain or be accessed as ordinary data in all but the most unusual circumstances, and only information found in access lists or in other system objects built from access lists may be used as access information. The objects in FIGS. 2A through 4B which are access lists are labeled as such, i.e., base type=AL.

4.2.1 Access Descriptors and Access Paths

Among their several important functions, access descriptors serve as the means for mapping the segment selector of a logical address into the pair of indices which locate the associated segment descriptor via the processor's current segment table directory and one of the several possible segment tables. The level of mapping provided by an access descriptor is very useful. It allows the operations of a domain to use their own set of logical addresses without regard for the logical addresses in use by other operations in other domains. As a result, domains can be independently assembled or compiled. To link or bind several domains together, a linking program or constructor simply places the appropriate access descriptors in predefined positions in each access list of each domain. This method of linking completely eliminates the need for object text editing, so common in conventional computer systems. It also simplifies the implementation of a dynamic program linking facility in software. The level of mapping provided by an access descriptor also helps reduce the size of the segment selector used by individual programs and thus helps minimize the size of programs.

The mapping given to a logical address by the combination of an access descriptor and its associated segment descriptor is referred to as an access path. The following diagram shows the mapping or linkage provided by one such access path.

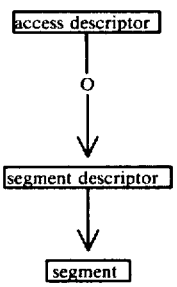

Many such paths as this can exist, of course, as each access descriptor provides a unique path to an object. This is exemplified by the ability of different access descriptors for the same segment to supply many different access rights for it. The number of paths to any single object is limited by the size of the path count field in a segment descriptor, namely, 4096 paths. Note that above the —0— in the linkage between the access descriptor and the segment descriptor indicates the level of mapping provided by the segment table directory.

All access descriptors have the same format:

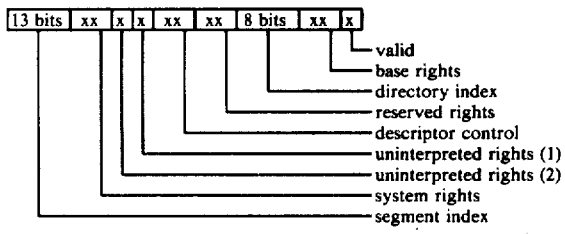

The 8-bit directory index field specifies an index into the processor's current segment table directory which is used to select and locate one of 256 possible segment tables.

The 13-bit segment index field specifies an index into the segment table, specified by the directory index, which is used to select and locate the desired segment descriptor.

The 1-bit valid field indicates whether or not a segment can be accessed via this access descriptor. A value of one indicates that this access descriptor is valid and usable. A value of zero indicates that this access descriptor is invalid or null. This field is checked by a processor each time it attempts a reference via an access descriptor. If the access descriptor is invalid, an access descriptor validity fault occurs.

The remaining fields of an access descriptor are described in the following two sections.

4.2.1.1 Access Rights

Access descriptors also provide a means for controlling extent of access to any segment. Since different access descriptors for the same segment may exist in several environments, the manner in which the segment may be accessed may be different in each of these environments. For example, in one environment a process may be permitted to either read or write data in a given segment, whereas in another environment, a process may only be permitted to read data from the segment. The ability to access a segment in a given manner (i.e., to read data) is called an access right. An access descriptor contains, in an encoded form, information that specifies precisely those access rights available to an process accessing the associated segment within a given environment. For example, when accessing a segment via a reference which only requires that the segment be of a given base type, the base rights field specifies those access rights which are available (i.e., read, write, or some combination).

Because the system recognizes a number of different, higher level types of objects for which simple base access rights, such as read and write, are either not meaningful or not always available, a second level of access control is provided by access descriptors. For example, when accessing a segment via a reference which requires not only that the segment be of a given base type but also of a given system type (i.e., base type access list and system type buffered communication port), the system rights field specifies those access rights which are available. Thus, associated with access descriptors for each system type are a set of access rights that relate only to the use of objects of that specific system type. For example, a buffered communication port access descriptor can bear either send rights, receive rights, or some combination. System software sets the appropriate type each time a new object is created and the rights each time it creates a new access path. Whenever an access descriptor is used to access a segment in a particular manner, a processor automatically verifies that the type and rights of the path authorize that manner of access. If they do not, the attempted access is denied and a type or rights fault occurs.

In all cases, rights encodings follow the rule that if the field contains a zero, the right is granted. Conversely, if it contains a one, the right is denied. The two other rights fields in an access descriptor have special meaning. The reserved rights field is defined to allow for further hardware definition and use. The uninterpreted rights bits are available for software definition and interpretation.

4.2.1.2 Descriptor Control.

Although access descriptors are protected from alteration or mutilation by not allowing them to appear within ordinary data segments, it is possible to move them, when certain rights permit, within the access lists of a given environment. Furthermore, it is possible to pass access descriptors as parameters, by sending either one or a group of them as a message to a context, a coroutine, or a process. Similarly, access descriptors may be returned as results. In all cases, the convenient movement of access descriptors is made possible by the fact that an access descriptor is a uniform reference to an object and its information, regardless of the access list or environment in which the descriptor appears.

A separate field within each access descriptor controls the degree to which the descriptor may be moved. In some sense this control is like an access right except that it only concerns the individual descriptor and not the associated object. The high order bit of the 2-bit descriptor control field, found in every type of access descriptor, indicates the right to delete the descriptor at any time. It the bit is set (i.e., has the value one) and an attempt is made to overwrite the descriptor, an access descriptor deletion fault occurs. The next lower order bit of the field indicates the right to duplicate the descriptor at any time. If the bit is set and an attempt is made to copy the descriptor, an access descriptor duplication fault occurs. Note that whenever an access descriptor is actually copied, the new copy of the access descriptor always bears delete rights. Without this guarantee, a proliferation or undeletable access descriptors could occur. Combinations of these two bits allow precise control over the movement of descriptors throughout a system. The use of the different bit combinations is described in more detail subsequently.

4.2.2 Access List Access Rights

The base-rights field of an access list access descriptor is interpreted as follows:

00—access descriptors may either be read from the list or written into the list
01—access descriptors may not be read from the list
10—access descriptors may not be written into the list
11—access descriptors may neither be read from or written into the list.

The system-rights field has no interpretation for the two generic system objectis, i.e., access lists and data segments.

Up to 16,384 access descriptors may be held in any one access list, but only 64 of them are directly selectable by a logical address. If the access descriptor for a desired segment does not lie in the first 64 entries of an access list, it must either be referenced indirectly or be moved into one of these directly selectable locations before the segment may be referenced by a logical address.

4.2.3 Null Access Descriptor

From time to time it is necessary to destroy an existing access descriptor or to reserve room in an access list for an access descriptor that is not yet available. Such a reserved or unusable entry is indicated by a type of access descriptor called a null access descriptor. A null or invalid access descriptor is any access descriptor with its access descriptor valid field set to zero. The normal case, however, is for null access descriptors to contain all zeros. Note that such an all-zero null access descriptor may be duplicated or deleted without restriction.

4.3 DATA SEGMENTS

The first generic type of system discussed above is the access list. The other generic type of system object is the data segment. Scalar operands of all the primitive types and aggregate data structures built from those types may be placed in and accessed from a data segment.

4.3.1 Data Segment Access Rights

The base-rights field of a data segment access descriptor is interpreted in the following way:

00—data may either be read from or written to the segment
01—data may not be read from the segment
10—data may not be written to the segment
11—data may neither be read from or written to the segment.

The system-rights field has no interpretation for the two generic system objects, i.e., access lists and data segments.

4.3.2 Segment Table Segments

A segment table (50, FIG. 2A) is basically a data segment that is accessed simultaneously and automatically by many processors. Normally, a data segment with such a high degree of parallel acess would be provided with extensive interlocks to guarantee the order of operations upon it at all times. A segment table, however, cannot afford to use these interlocks because of the overhead they introduce in the address development cycle. Fortunately, they are unnecessary in the normal case because the information in a given segment table, specifically the base addresses for all of its segments, is invariant over comparatively long periods of time.

A segment table interlock is only required when the content of a segment table is to be changed (i.e., rewritten). The process desiring to make an alteration must first mark the segment descriptor (52, 54) to be changed as invalid by setting the valid (V) field (47) to zero. It must then request that all of the processors in the system, including the processor on which it is running, requalify (i.e., reload and recompute) any segment address information that may be saving or buffering internally. It may then alter the segment descriptor as desired and mark it as valid by setting the valid field (47) to one.

The base-rights field for a segment table access descriptor is interpreted in the same manner as for all objects of base-type data segment. The low-order bit of the system-rights field for a segment table access descriptor is interpreted as follows:

0—this segment table may be used in segment descriptor allocation
1—this segment table may not be used in segment descriptor allocation.

The high-order bit of the system-rights field for a segment table access descriptor has no interpretation.

4.4 DOMAINS

A domain (e.g., 92, FIG. 3B) typically corresponds to the static access environment defined for the smallest independently-compiled or assembled program unit or module. It is small only in the sense that it provides the smallest possible access environment that is consistent with the definition of the program module it represents. A large program with many modules would associate a domain with each module in order to maximize their isolation and minimize the likelihood of their accidental or malicious interference with one another. During execution, a process would then switch to a different domain each time it exits one module and enters another. At any instant a process can only access these objects defined to be in the current module and hence in the current domain.

Physically, the primary structure of a domain is represented by a pair of access lists. These are the public (98) and private (100) access lists.

4.4.1 Public and Private Access Lists

The public access list contains access descriptors for all the objects that the domain chooses to make publicly available. This means that in any given domain having a domain access descriptor for a second domain, the access descriptors present in the public access list of the second domain are fully accessible to first domain. Typically, the only access descriptors that appear in the public access list of a domain are those for the instruction segments, e.g., 108, FIG. 3B of its associated operations. A public access list of a domain has one reserved entry (110) for the access descriptor of the domain's private access list. This is entry zero. The segment accessed via an access descriptor appearing in this entry will usually bear a system type of private access list. Normally, only by invoking an instance of one of the operations in the public access list of a domain does a process gain access to the private access list of the domain.

The private access list contains the access descriptors for those objects that are only accessible when a process is operating within the domain as a result of invoking an instance of one of its operations. Typically, the private access list contains the descriptors for local instruction segments and for local, but permanent, data segments. Quite often as well, it contains access descriptors for still other domains. The general structure of a domain is shown in FIG. 3B with the abbreviation. Typically private access list access descriptors bear neither duplicate nor delete rights. The base rights field for a domain access descriptor is interpreted in the same manner as for all objects of base type access list. The system rights field for a domain access descriptor is uninterpreted.

The base-rights field for a private access list access descriptor is interpreted in the same manner as for all objects of base type access list. The system rights field for a private access list access descriptor is uninterpreted.

4.5 OPERATIONS AND CONTEXTS

A process may change its access environment as a result of calling or returning from an instance of an operation. This change to the current access environment of a process, which normally occurs in a nested manner, is recorded in the form of a linked set of access lists called context objects. In this way, the current context object, 94 FIG. 3A, of a process provides the means for a process to reestablish the previous access environment as each invoked operation is exited.

4.5.1 Context Objects

Before an operation is invoked, a context object (e.g., 94, FIG. 3A), which represents a single sequentially executable instance of an operation, must be constructed. Each such object consists of at least ten access descriptors.

Moving up from the lowest position in the context object, the first descriptor, 111, is an access descriptor for the context control segment. The next three descriptor entries are initially occupied by null access descriptors. The first is replaced when the context is actually invoked. The second, 112, is an access descriptor for the message passed from that context, if any. The third, 113, and 114, entries are for use as descriptor working storage. The fifth access descriptor, 115, is for the context's operand stack. The sixth access descriptor, 116, is replaced when the context is invoked, with an access descriptor for the context itself. The next two descriptors, 117, 118, are the public and private access lists of the domain in which the context's operation was defined. The ninth access descriptor, 119, is replaced dynamically whenever the context selects a new entry access list. The tenth access descriptor, 110, is replaced dynamically when the context is invoked by an access descriptor linking this context to the context, 95, from which it was invoked. The rest of the context object, above those entries defined above, is intended for use as descriptor working storage for the context.

The base rights field for a context object access descriptor is interpreted in the same manner as for all objects of base type access list. The system rights field for a context object access descriptor is uninterpreted.

4.5.1.1 Instruction Segments

An instruction segment (90, FIG. 3B) is used to hold the instructions of a programmer-defined operation. For modular programming languages, one instruction segment is allocated to each separate operation. For essentially nonmodular languages, such as COBOL, several instruction segments may be used to contain the instructions of large, monolithic programs.

The base-rights field for an instruction segment access descriptor is interpreted in the same manner as for all objects of base-type data segment. The low order bit of the system rights field for an instruction segment access descriptor is interpreted as follows:

0—a context may be created for this instruction segment

1—a context may not be created for this instruction segment

The high-order system rights bit of a instruction segment is not interpreted.

Note that an instruction segment may not be more than 8192 bytes long. This limitation is a result of limited branch displacements to short ordinal values. When a new instruction segment is selected, a processor automatically verifies the length of the segment to be not more than 8192 bytes. If that length is exceeded, an instruction segment length fault occurs.

To assist the hardware in the creation of a new context, instruction segments contain context creation control information (91, 93, 95) at their base. This information, consisting of three short-ordinal values, specifies the required sizes of three of the segments required to create a context for a given instruction segment. The structure of an instruction segment is shown in FIG. 3B.

When creating a context, a processor creates a context access list (94) and a context control segment (122) each with a length equal to the size required by hardware for that segment plus the size specified for that segment in the instruction segment. An operand stack (106) is also created for the context. Since there is no minimum operant stack size, its size is simply the value specified in the instruction segment. No operant stack will be created if the stack size specified is zero.

4.5.1.2 Context Control Segments

Each time a new context object (94) is created, an associated context control segment (122) is also created and its new access descriptor is placed in the second entry of the new context object. The intended use of this data segment is as instance-specific control information, for recording fault information, and as randomly addressable scalar working storage. Diagrammatically, a context control segment appears as shown in FIG. 3B.

The first and second double bytes, 131, 132, of the context control segment contain the Instruction Pointer IP and Stack Pointer SP as of the moment execution of the context last ceased. At context creation the IP field is initialized to the value 48, pointing it to the starting bit of the first instruction in the instruction segment. At the same time, the SP is field initialized to the value zero, indicating an empty stack. The third double byte, 133, in the context control segment contains context status information. It specifies the state of certain internal processor flags at the moment execution of the context last ceased. It also contains the state of the context itself, such as whether it is invoked or suspended. The organization of the context status field, 133, is shown below.

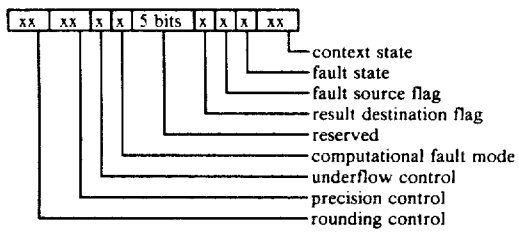

- context state
- fault state
- fault source flag
- result destination flag
- reserved
- computational fault mode
- underflow control
- precision control
- rounding control The interpretation of the context state subfield is as follows:
00—suspended for call
01—suspended for return
10—suspended for resume
11—invoked This field is initialized to zero at context creation.

The fault state flag specifies whether or not the context is in faulted state. A value of zero indicates that the context is not in faulted state. A value of one indicates that the context is in faulted state. The computational fault mode flag controls the behavior of a processor in terms of the residual state of a context after a computational fault. A value of zero indicates that the context is in post-faulting mode. Conversely, a value of one indicates that the context is in prefaulting mode. The use of this control field is described in detail under the heading: "ACCESS ENVIRONMENT MANIPULATION AND COMMUNICATION."

The underflow control flag specifies what action is to be taken by a processor when real underflow occurs. The precision control flags specify the precision to which temporary real results are to be rounded. The rounding control flags specify how a processor is to round all real results. The use of the last three control fields are described in detail under the heading: "FLOATING POINT COMPUTATION."

The fourth double byte, 134, contains a segment selector for the current instruction segment of the context. It is initialized at context creation and altered as a result of either intersegment branch operators or context-level faults.

Whenever a fault occurs within a context, particularly as the result of an exceptional data condition such as overflow, an implicit branch operator is executed causing control to flow from the current operation to an instruction segment called the fault handler. Any repair action possible may be programmed into this handler. For a given context, the associated fault handler is specified via the fifth entry in its context control segment. The entry contains an instruction segment selector for the desired fault handling instruction segment. This field may be initialized or altered by software, from within the context, at any time.

To assist in the diagnosis of a fault, fault information is recorded in the context control segment. At the occurrence of a fault, a processor automatically places information in this area that defines the type and circumstances surrounding the fault. The appropriate fault handler, defined within the context and thus having access to this fault information, may use it to undertake repairs. Only those fields needed to record data specific to the given fault are valid upon entry to the fault handler. Which fields are valid under which circumstances is discussed under the heading "ACCESS ENVIRONMENT MANIPULATION AND COMMUNICATION."

Referring to the context control segment shown in FIG. 3B, the sixth double byte, 136, is used to record a segment selector for the instruction segment in which a fault has occured. The fault code word is used to record the cause of a fault (i.e., a floating point overflow). The preinstruction IP is used to record the IP of the instruction that caused a fault. The postinstruction IP is used to record the IP of the instruction sequentially following the one that caused a fault.

The eleventh double byte, 138, is used to record a result segment selector for the segment into which the result of an instruction that faulted would have been written or segment selector for a segment that caused a fault. The result displacement is used to record the displacement (after any scaling or indexing) into the result segment where the result of an instruction that faulted would have been written or the displacement (after any scaling or indexing) that caused a fault or access descriptor segment selector that caused a fault. The exceptional result field (139) is used to record information about the computation that caused the fault.

The base rights field for a context control segment assess descriptor is interpreted in the same manner as for all objects of base type access list. The system rights field of a context control segment access descriptor is uninterpreted.

4.5.1.3 Operand Stacks

Each time a new context object is created, an associated operand stack segment (106, FIG. 3B) is also created. The intended use of this data segment is an instance-specific scalar working storage for expression evaluation. The new access descriptor is placed in the third entry (113) of the new context object.

The last double byte of an operand stack is not accessible to software unless the segment is referenced via a data segment access descriptor. Such an access descriptor is normally unavailable to the context. Due to the behavior of the stack pointer ($SP_t$, as described under the heading: "INFORMATION STRUCTURE,") it always points to the next available double byte of the stack. For example, if an operand has been pushed onto the next-to-the-last double byte of the stack, the resultant SP will point to the last double byte of the stack. Then if another operand is pushed onto the stack, the resultant SP will point to the first double byte past the end of the stack and result in an operand stack displacement fault. Underflow of the stack pointer also results in an operand stack displacement fault.

The base-rights field of an operand stack access descriptor is interpreted in the same manner as for all objects of base-type data segment. The system-rights field of an operand stack access descriptor is uninterpreted.

4.5.1.4 Entry-Access List

In order to gain direct access to any access list to which a context holds base-read rights, an operation may dynamically select a new entry-access list (93, FIG. 3B) for its context. Thus, at any instant, the current entry-access list is either null or some accessible and readable-access list. The selection of the current entry-access list is provided for by one of the access environment manipulation operators. The action of this operator is described under the heading "ACCESS INVIRONMENT MANIPULATION AND COMMUNICATION."

4.6 COROUTINES

A process may change its access environment either by changing its current entry-access list, as the result of executing certain operators or as a result of calling or returning from a context.

Whenever a desired access environment or control flow transition cannot be supported in a nested or hierarchical manner, the nonhierarchical program structure known as a coroutine may be used.

4.6.1 Nonbuffered Communication Ports

Contexts, when behaving as coroutines, communicate with one another by sending and receiving messages, in the form of access descriptors, via system linkage objects called nonbuffered communication ports (104, FIG. 3A). Conceptually, a nonbuffered port contains a single entry. They are represented by a single-entry access list, 105, as shown in FIG. 3.

When a context suspends itself at a nonbuffered port, an access descriptor for the current context is deposited in the specified port. The presence of a context access descriptor in a nonbuffered port and the state information, 133 (i.e., suspended for resume), in the associated context control segment, 122, indicates to any resuming coroutine that a resumable coroutine is available. When control is transferred to a context via a nonbuffered port, that port is overwritten with a null access descriptor to indicate the current unavailability of the newly invoked coroutine.

The base-rights field for a nonbuffered port access descriptor is interpreted in the same manner for all objects of base-type access list. The system rights field for a nonbuffered port access descriptor is interpreted as follows:

00—a context may suspend itself at this port or resume another context via this port
01—a context may resume another context via this port
10—a context may suspend itself at this port
11—a context may neither suspend itself at this port nor resume another context via this port.

4.7 PROCESSES

Logically, a process is simply an environment in which execution by a processor can occur. If several of these environments exist within a system, then execution can occur independently within each one. If several processors exist within the system, then execution can occur simultaneously within a corresponding number of environments. The simultaneous execution of several processes can be used to enhance system performance in a variety of applications.

When the execution of a process does occur, it does so at a particular site or point within the associated environment. In the present system, that point is defined at any instant, by a specific instruction, within a specific operation, within a specific context, within a specific domain. The execution point moves, of course, as each instruction is executed because a new instruction is automatically specified. Occasionally, as the result of instruction execution, a new context or a new context and a new domain is specified. Unless the process should indicate its termination, the execution point continues to move in this manner forever.

Given there is some means for recording the coordinates of any particular execution point, a processor may suspend the execution of a process at any time, without its knowledge or consent, prior to termination. A process suspended in this manner may resume execution on any compatible processor, including the suyspending one, at some later time without difficulty. The type of objects described below, when used in conjunction with the objects previously described, allow processors to perform process suspension and resumption quickly and automatically.

4.7.1 Process Objects

When the execution of a process is suspended, its context objects already record most of the information needed to resume its execution. The only piece of information they do not record is the identity of the context object currently in use by the process. That information is recorded in another hardware-recognized data structure, called a process object (140, FIG. 4A). Each time a process suspends one context and invokes another, the second entry of its process object, which contains the access descriptor for its current context object, is changed. It is replaced by the context access descriptor for the context object of the invoked context. In the event the process is suspended, only four pieces of information need by saved: the current context mode, the current instruction segment selector, the current instruction pointer value, and the operand stack pointer value in the current context control segment. The other essential execution site information is already recorded in the structure of both its current context and process objects.

In addition to the current context object information, a process object contains descriptors for several other objects related to a process. Generally, these objects are not accessible to the process, but are instead used by hardware and system software for process maintenance and control. The complete structure of a process object (140) is shown in FIG. 4A.

The base-rights field for a process object access descriptor is interpreted in the same manner as for all objects of base-type access list. The system rights field for a process object access descriptor is uninterpreted.

The objects referenced by a process object are functionally described in the following subsections. In those cases where the referenced object is uniquely associated with process objects (i.e., actually part of their basic structure), the structure of the object as well as its function is described.

4.7.1.1 Process Control Segments

The process control segment, accessible via the first entry in a process object, contains several fields of information that assists in both the automatic and program-controlled distribution of system resources. If also contains fields for recording both process state and fault information. The structure of a process control segment, 150, is shown in FIG. 4A.

The first double byte in the process control segment, 150, contains process status information that is other wise not found in any of the segments associated with a process. In particular, it specifies the state of certain internal processor flags at the moment execution of the process last ceased. Finally, it contains the state of the process itself, such as whether it is running or waiting for a processor. The organization of the process status field is shown below.

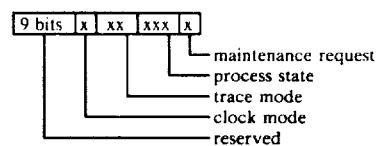

In order to force a process to wait for maintenance, a maintenance request flag is available in the process status field. When in the normal course of inspecting or loading process status information, a processor finds this flag to be set, the associated process is placed in the waiting for maintenance state and sent immediately to the preemption port of the current service port for software maintenance. No further attempt to execute the process is made. The specific situations that will lead to the detection of a maintenance request are described under the heading: "ACCESS ENVIRONMENT MANIPULATION AND COMMUNICATION."

The interpretation of the process state subfield is as follows:
000—running
001—010 reserved
001—waiting for trace
100—waiting for message
101—waiting for processor
110—waiting for service
111—waiting for maintenance The interpretation of the trace mode subfield is as follows:
00—normal mode
01—fault trace mode
10—flow trace mode
11—full trace mode The clock-mode bit indicates whether or not process clock maintenance is to be done. A value of zero indicates that process clock maintenance is to be done. A value of one indicates that process clock maintenance is not to be done. The clock-mode bit can be used to allow performance improvements in systems where clock maintenance is not desired or necessary.

The two short ordinal values, called the delay period and the service period, allow processors to automatically enforce software-defined processor resource allocation policies. When set by the appropriate processor scheduling software, they specify to a processor when and for how long a given process should be executed. The short ordinal value called the period count is used by processors to tell how many service periods a given process should receive prior to being rescheduled by software. The exact method used by processors to make this determination is described under the heading "ACCESS ENVIRONMENT MANIPULATION AND COMMUNICATION." Processors also assist scheduling software in the accu- rate measurement of the total processing time given to a process, by maintaining a process clock field in the process control segment. After each period of service a process receives, the executing processor adds the duration of the service period to the ordinal value in the process clock field. The field is initialized to zero by software at the time the process is created. The process clock may be read at any time by a process.

Also contained in the process control segment are two identification numbers. The first of these, called the process ID may be read by a process at any time in order to establish its own identity within a module of a system's resource management software. Similarly, the principal ID may be read by a process at any time to establish the identity of the agent or agency responsible for its creation. Normally, this will be an agent authorized to share the system's resources.

When a process-level fault occurs, fault information is recorded in the process control segment. The directory index is used to record the index into the current segment table directory of the segment table with which a fault is associated. The segment index is used to record the index into that table of the segment descriptor for the segment that caused a fault.

The base-rights field of a process control segment access descriptor is interpreted in the same manner as for all objects of base-type data segment. The system rights field is uninterpreted 4.7.1.2 Current Service and Buffered Ports In certain situations, it is essential for hardware to record for later use by both hardware and software, the identity of the last port used for process service. This information is found in the third entry of its process object, 140, and is updated each time an access descriptor for the process is sent to a service port. In most cases, the current service port is simply the dispatching port, 146, last used to pair the process with a processor. Occasionally, it is a buffered port for a software service process such as a medium-term processor scheduler or other resource manager.

For similar reasons, the hardware also records the identity of the last buffered port, 144, used to pair the process with a message. This information is found in the fourth entry of its process object, 140, and is updated each time the process receives a message via a buffered port or an access descriptor for the process object is enqueued at a buffered port.

4.7.1.3 Segment Tables and Storage Resources

During execution of a process, there are times when an implied requirement for access to unallocated storage and segment descriptors exists (e.g., when a context object must be created dynamically). The segment table access descriptor, 141, and storage resource access descriptor, 143, in a process object satisfy that requirement by providing access to such resources.

4.7.1.4 Trace, Notification, and Fault-Buffered Ports

Whenever a process is in tracing mode and a tracing event occurs, the process is suspended and sent as a message to a service process for inspection and/or possible alteration. The port at which the service process waits is called the trace-buffered port (access descriptor 145).

Whenever a path underflow occurs during the execution of a process, the last access descriptor for the path is sent to the notification port of the process for software disposition (access descriptor 147).

Whenever a process commits a fault that cannot be handled within the current context, the process is suspended, fault information is recorded in its process control segment, and the process is sent as a message to a maintenance process for repair or destruction. The port at which such a maintenance process waits to receive broken processes is called a fault-buffered pot (access descriptor).

4.7.1.5 Fault Access Descriptor

Whenever a process-level, nonrestartable, communication instruction fault occurs, the access descriptor, 149, for the message that could not be delivered is recorded in the current process object.

4.7.2 Buffered Communication Ports

Processes communicate with one another by sending and receiving messages, in the form of access descriptors, at system objects called buffered communication ports (144, FIG. 4A). Conceptually, a buffered port contains two queues. The first queue is called the request queue and holds the access descriptors for messages that have been sent but not yet received. The second queue is called the server queue and holds the process object access descriptors for processes that have been suspended pending the arrival of a message.

Since it is impossible for descriptors of both types to be enqueued at the same time, a buffered port physically contains only one queue. Status information found in the port indicates whether the physical queue is currently a server queue, a request queue; or simply empty.

Buffered ports are accessed via buffered port access descriptors (e.g., 139, in process object 140).

The base-rights field for a buffered port access descriptor is interpreted in the same manner as for all objects of base-type access list.

The system rights field for a buffered port access descriptor is interpreted as follows:
00—messages may be sent or received via this port
01—messages may be sent via this port
10—messages may be received via this port
11—messages may neither be sent nor received via this port The following subsections describe the other components of a port in detail.

4.7.2.1 Buffered Port Control Segment

The two logical queues of a buffered port are defined by the hardware-recognized data structures of its port control segment (152, FIG. 4A). The first eight double bytes of the segment contain queue status and control information while the remainder of the segment contains a dynamically allocated area for queue link records.

The first double byte (160) of the port control segment (152) contains the port status field.

The information in this field, as shown below, indicates the presence or absence of queued descriptors of either type.

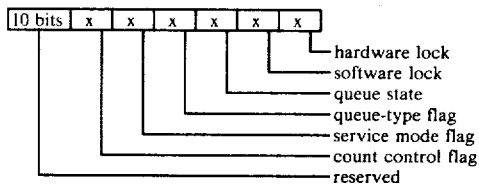

The port locks are used to give one processor or one process exclusive access to the port during insertion or removal operations. When the port is locked by a processor, the second double byte contains the locking processor's identification value. When the port is locked by a process, the second double byte (Locker ID) contains the locking processor's identification (ID) value. The use of the service mode flag is described below.

The third and fourth double bytes of the port control segment contain short ordinals whose values are byte displacements to the lowest addressed bytes of the first and last queue link records of the current queue, respectively. The sixth double byte contains the count of queue elements when either of the queues is occupied.

To assist software in the management of the port, two maximum count values (151, 153) can be maintained by the hardware during insertion operations. The count control flag indicates whether or not queue length monitoring is to be done. A value of zero indicates that queue length monitoring is to be done. A value of one indicates that queue length monitoring is not to be done. The count control flag can be used to allow performance improvements in systems where queue length monitoring is not desired or necessary. Depending on the queue, if the count control flag is not set, the appropriate maximum count field is checked and updated if necessary.

A list of free queue link records, 157, is created when the queue is initialized by software. The head of this list is a short ordinal value found in the fifth double byte of the port control segment. It contains a byte displacement to the lowest addressed byte of the first queue link record in the free list.

The location of a descriptor in the access descriptor area, 158, and its arrival order in the corresponding queue is given by a queue link record. The structure of such a record, 154, is shown in FIG. 4A.

The successor and predecessor links are short ordinals containing the byte displacement to the lowest addressed byte of a queue link record for a previously or subsequently enqueued descriptor, respectively. A zero displacement signifies that no record is linked. This only occurs in the predecessor link, 155, or the first queue link record and the successor link, 156, of the last queue link record of a queue. The queue entry field is a short ordinal specifying the access list entry number of the associated access descriptor in the access descriptor area. The second double byte of the queue link is reserved for further use by the port queuing mechanisms.

The strategy for queue element insertion and deletion at a buffered port is first-in, first out. Each time an access descriptor is inserted on a queue at the port, a new queue link record is removed from the free list, 157. The access descriptor is stored at the entry specified by the head queue link record, 159, and the record is linked on at the tail of the queue. Each time an element is removed from a queue, the head queue link record specifies the location of the associated access descriptor. The head queue link is then removed from the queue and returned to the free list.

The base rights field of a buffered port control segment access descriptor is interpreted in the same manner as for all segments of base-type data segment. The system rights field in uninterrupted.

4.7.2.2 Service Ports

When a waiting process is paired with an arriving message, the process access descriptor for that process is removed from the server queue and sent, as a message, to the port specified by the second entry, 148, in the port object. This port may be another buffered port or a dispatching port, 146. In the latter case the process will soon be accepted for execution.

Should a process not have to wait to receive a message at a buffered port (i.e., a message was already queued there), it continued to execute unless its current service port access descriptor is different from the service port access descriptor in the port. If it is different, the process is suspended and its process object access descriptor is sent to the service port as described above.

In certain buffered port applications, it is often desirable to send a process to its current service port, as specified in its process object, instead of sending it to the port-specified service port. This mode of operation is obtained when the service mode flag in the port status field, 160, is set to one.

4.8 PROCESSORS

In the present system, processors recognize a variety of system objects in order to enhance performance and reduce programming complexity. While most of these objects are of considerable use and advantage in general programming situations, a few have been defined to assist principally in the management and control of the processors themselves. The key facility these special objects provide is one of processor selectivity. Through their coordinated use, processors can be assigned to serve processes on as narrow or as broad a basis as is necessary.

4.8.1 Processor Objects

Refer now to FIGS. 2a and 2b. Before a processor can begin normal operation, it must establish physical addressability to several different system objects. Foremost among these is the segment table directory, 68, that will enable the processor to translate the logical addresses it normally encounters in instructions into their corresponding physical addresses. Initial access to a segment table directory is achieved, by a processor simply assuming the existence of a temporary segment table directory, 72, at physical address zero.

Having established itself in a logical address space, via the temporary segment table directory, a processor is ready to locate a ready-to-run process. Such processes, however, are found at dispatching ports, and the processor has yet to be assigned to a specific one. Although another default mechanism could be used (i.e., a temporary dispatching port), the system employs a system object for each processor wherein they locate their normal dispatching ports via logical, rather than physical, addresses. At initialization or reset, each processor loads its own unique, hardwired (i.e., physically connected) processor unit number into an internal register. That number is then used as a segment descriptor index (71) into the temporary segment table directory. At the physical address specified by the selected segment descriptor, each processor finds its own processor object. This is the system object used to establish the processor's accessibility to its normal dispatching port and to a number of other system objects it will need for proper operation. The port descriptor for the normal dispatching port of a processor is found, as shown in FIG. 4B, in the sixth entry of its processor object.

The other objects referenced by a processor object are functionally described in the following subsections. If an object is uniquely associated with processor objects, its form as well as its function is described.

4.8.1.1. Processor Self-Queuing

Whenever a processor is unable to find a ready-to-run process at a dispatching port, the event is recorded by placing an access descriptor for its processor object on the server queue of that port. To simplify the generation of the descriptor, the second entry of each processor object contains an access descriptor for the processor object itself. Whenever circumstances cause the processor to enqueue itself and go idle, it simply copies this descriptor into the appropriate queue position at the port.

The base rights field for a processor object access descriptor is interpreted in the same manner as for all objects of base type access list. The system rights field for a processor object access descriptor is interpretated as follows:

00—an interprocessor message may be broadcast via the global communication segment of this processor object, or it may be sent to this processor via the processor control segment of this processor object 01—an interprocessor message may be broadcast via the global communication segment of this processor object 10—an interprocessor message may be sent to this processor via the processor control segment of this processor object 11—no interprocessor messages may be sent to this processor object These two types of interprocessor communications are described in the following two subsections.

4.8.1.2 Processor Control Segments

A processor is able to receive information directed to it from other processors by inspecting, when requested, the contents of an area called the local cummunication area in its processor control segment. This segment, which is unique to each processor, is accessed via the second access descriptor in its processor object. In addition to interprocessor communication, the segment is also used to record fault and diagnostic scan information. The information in the processor control segment is organized as shown in FIG. 4B.

In order to interlock the transmission of multiple, simultaneous interprocessor messages, each processor control segment contains a set of lock bits in its first double byte. The format of this lock field is shown below.

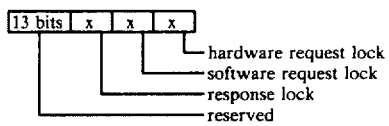

The request locks and the response lock must be clear before transmission begins. At the onset of communication, one of the request locks and the response lock are set. Following the communication, the request lock is cleared, with the response lock left set until the processor carries out the functions requested by the message.

When the port is locked by a processor, the second double byte contains the locking processor's identification value. When the port is locked by a process, the second double byte contains the locking process' identification value.

4.8.1.2.1 Interprocessor Messages

The interprocessor message takes the form of a double byte bit field containing a set of processor control flags. The message is stored in the third double byte of the segment by the sending processor. Its organization is shown below.

The processor count and response count fields also participate in the message interlock function. At the time a message is sent, the sending processor initializes the response count to the processor count value. When the processor completes the requested function, it decrements the response count and tests the new value for zero. If the decremented value is zero, the processor clears the response lock. Normally, the processor count value in a processor control segment will be initialized to one.

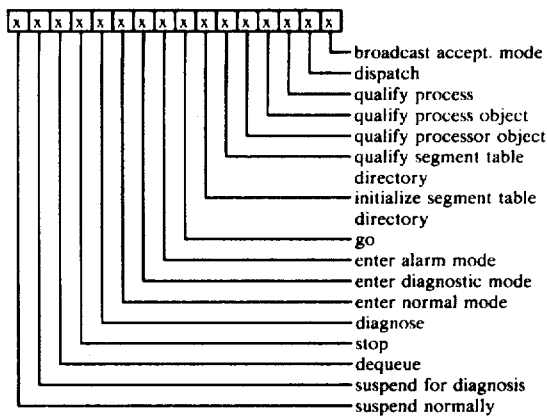

Another double byte bit field is present in each processor control segment. This field contains status information about the associated processor. Included in the processor status field, as shown below, are subfields describing the processor state, dispatching state, and type.

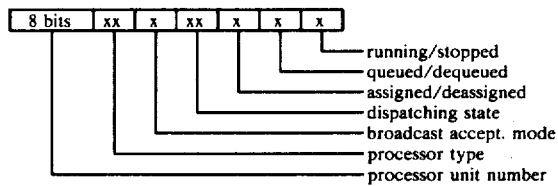

The processor unit number is the value loaded into the processor at initialization or reset.

The running/stopped bit is interpreted as follows:
0—running
1—stopped

The queued/dequeeued bit is interpreted as follows:
0—not queued at a disptaching port
1—queued at a dispatching port The assigned/deassigned bit is interpreted as follows:
0—assigned to a process
1—not assigned to a process The dispatching state subfield is interpreted as follows:
00—using normal dispatching port
01—using alarm dispatching port
10—using diagnostic dispatching port
11—reserved The meaning of these states is explained in later sections.

The broadcast acceptance mode bit is interpreted as follows:
0—broadcast interprocessor messages are being accepted and acknowledged
2—broadcast interprocessor messages are not being accepted or acknowledged The processor type subfield is interpreted in the following manner:
00—generalized data processor
01—input/output processor
10—reserved
11—reserved.

All of the subfields in the processor status field are initialized and maintained by the processors themselves.

4.8.1.2.2 Processor Fault Information

When a processor-level fault occurs, fault information is recorded in the processor control segment. The processor fault code word is used to record the cause of the processor-level fault. The process fault code word, the segment table directory index, and the segment table index are used to record the same information that would have been recorded in the process object when that is not possible.

The diagnostic scan area is used to record information requested via the diagnostic function of interprocessor communications.

The base-rights field of a processor control segment access descriptor is interpreted in the same manner as for all segments of base-type data segment. The system rights field of a processor control segment access descriptor is uninterpreted.

4.8.1.3 Global Communication Segments

It is often inconvenient to communicate with all of the processors in a system of an individual basis when a message of common interest must be transmitted. For this reason, each processor is given access to a common communication area called the global communication segment via the fourth entry in its processor object. The structure of this segment is identical to that of the local communication area of a processor control segment, with one exception: a global communication segment does not contain a processor status, fault information, or diagnostic scan fields.

The processor count, a short ordinal value, is set by system software to be equal to the total number of processors having access to the segment. As in the case of the processor control segment, the response lock is not cleared until the response count reaches zero. This insures that all the processors have responded before another message is accepted. The response count is initialized to the processor count value by the sending processor.

The base-rights field of a global communication segment access descriptor are interpreted in same manner as for all segments of base-type data segment. The system rights are uninterpreted.

4.8.1.4 Current Process Objects

While a processor is executing a process, the third entry of its processor object provides the identity of that process via a process object access descriptor. The presence of this descriptor simplifies several software and hardware functions. For example, it permits system software to determine, without disturbance, which process, if any, a processor is currently executing. On the hardware side, should the processor be forced, at some time, to requalify addressing information that it may be buffering internally while executing the process, the descriptor provides a convenient means for the processor to reestablish addressability after requalification.

The current process object entry is also used to allow other processors to assign a ready-to-run process to a previously idled processor. Once another processor places the desired process object access descriptor in the current process object entry, it is a simple matter to awaken the idling processor and have it resume execution of the process. Should the processor be forced to suspend the process, the current process object access descriptor is easily copied into the appropriate queue at the specified port.

4.8.1.5 Current Segment Table Directories

Quite often a processor will only use the temporary segment table directory during system initialization.

After initialization, system software will direct the processor to change to a new, more permanent, directory constructed during initialization. The fifth entry of a processor object contains the segment table directory access descriptor for this new, current segment table directory.

4.8.1.6 Alarm Dispatching Ports

Upon the detection of a hardwired alarm signal, a processor will suspend any process that it may currently be executing and enter the alarm dispatching state. At that point it will begin executing any process it finds queued at the alarm dispatching port specified by the port access descriptor in the seventh entry of its processor object. Processes present at this port are intended to be of extreme priority, such as those that might run in the event of an imminent power failure.

Interprocessor messages can be used to request a processor to either enter or exit the alarm dispatching state.

4.8.1.7 Diagnostic Dispatching Ports

Should a processor suspect an internal malfunction, it will suspend any process it may currently be executing and enter the diagnostic dispatching state. At that point it will begin executing any processes it finds waiting at the diagnostic dispatching port specified by the eighth entry of its processor object. The processes present at this port are intended to be of the type that will either verify the proper operation of a processor or request that it stop.

Interprocessor messages can be used to request a processor to either enter or exit the diagnostic dispatching state.

4.8.1.8 Fault Access Descriptors and Fault Process Objects

The fault access descriptor is used to record the access descriptor that would normally be recorded in the like-named entry in the process object for the process that faulted when it is impossible to record it there. The fault process object is used to record an access descriptor for the process, if any, that was running on the given processor when a processor-level fault occurs.

4.8.2 Dispatching Ports

Processors serve processes that are ready for execution by receiving them at dispatching ports in much the same manner as processes serve messages that have been sent to them at buffered communication ports. The differences in dispatching port functions are significant enough, however, to require a different hardware-recognized data structure.

Since, with dispatching ports, it is possible for descriptors of both types to be enqueued at the same time, a dispatching port physically contains two queues. Status information found in the port indicates the states of the associated request and server queues.

A dispatching port is represented by an access list whose organization is shown in FIG. 4B.

The rest of the port access list, called the access descriptor area, serves as a temporary repository or buffer for access descriptors queued at the port.

Dispatching ports are accessed via dispatching port-access descriptors. The base-rights field for a dispatching port-access descriptor is interpreted in the same manner as for all objects of base-type access list.

The system rights field for a dispatching port access descriptor is interpreted as follows:

00—process objects may be sent to and received from this dispatching port
01—process objects may be sent to this dispatching port
10—process objects may be received from this dispatching port
11—process objects may neither be sent to nor received from this dispatching port.

The following subsections describe the other components of a port in detail.

4.8.2.1 Dispatching Port Control Segment

The two queues of a dispatching port are defined by the hardware-recognized data structures of its port control segment. The first eleven double bytes of the segment contain queue status and control information while the remainder of the segment contains a dynamically allocated area for queue link records. The overall structure of this segment is shown in FIG. 4B.

The first double byte of the port control segment contains the port status field.

The information in this field, as shown below, indicates the presence or absence of queued descriptors of either type.

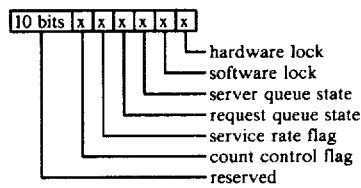

The port locks are used by the process or processors to give one process exclusive access to the port during insertion or removal operations.

The queue state flags indicate whether the associated queues are empty or occupied.

The service rate flag indicates the state of the port with respect to its deadlines. A value of zero indicates that, when the processor last dispatched a process, the deadline of that process had not passed. A value of one indicates that, when the processor last dispatched a process, the deadline of that process had passed. Software may examaine this flag to determine whether the processors dispatching processes from this port are ahead of or behind schedule.

The base-rights field of a dispatching port control segment access descriptor are interpreted in the same manner as for all segments of base-type data segment. The system rights field of a dispatching port control segment access descriptor are uninterpreted.

4.8.2.2 Request and Service Queues

The second two double bytes of the port control segment are used to locate the request queue head and tail. The seventh and eighth double bytes of the port control segment are used to locate the server queue head and tail. The sixth double byte of the port control segment contains the count of queue elements in the request queue. The ninth double byte of the port control segment contains the count of queue elements in the server queue.

To assist software in the management of the port, two maximum count values can be maintained by the hardware during insertion operations. The count control flag indicates whether or not queue length monitoring is to be done. A value of zero indicates that queue length monitoring is to be done. A value of one indicates that queue length monitoring is not to be done. The count control flag can be used to allow performance improvements in systems where queue length monitoring is not desired or necessary. Depending on the queue, if the count control flag is not set, the appropriate maximum count field is checked and updated if necessary.

A list of free queue link records is created when the queue is initialized by software. The head of this list is a short ordinal value found in the seventh double byte of the port control segment. It contains a byte displacement to the lowest addressed byte of the first queue link record in the free list.

The location of a descriptor in the access descriptor area and its arrival order in the corresponding queue is given by a queue link record. The structure of such a record is shown in FIG. 4B.

The successor and predecessor links are short ordinals containing the byte displacement to the lowest addressed byte of a queue link record for a previously or subsequently enqueued descriptor, respectively. A zero displacement signifies that no record is linked. This only occurs in the predecessor link of the first queue link record and the successor link of the last queue link record of a queue. The queue entry field is a short ordinal specifying the access list entry number of the associated access descriptor in the access descriptor area.

4.8.2.3 Deadlines

The fourth double byte of a queue link record is used in a dispatching port to hold a short ordinal value called a deadline. The manner in which the deadline value is determined is described in Chapter 5. The value is the basis of the nearest-deadline-first algorithm used to insert processes on the request queue at a dispatching port. Basically, the process with the nearest deadline (i.e., nearest in time) is placed at the head of the request queue. The processes on the request queue are thus ordered by increasing deadlines. The dispatching mode bit indicates whether an enqueued process may be dispatched before or only after its deadline arrives. If the bit is zero, the process may be dispatched early. Otherwise, the process may not be dispatched until its deadline arrives or is past. Processors select processes by starting at the head of the request queue, so that processes with the nearest deadlines are normally served first. When a processor encounters a queued link record in which the dispatching mode bit is set and whose deadline has not arrived, it skips that record and attempts to find a dispatchable process further down the queue. When a processor enqueues itself at a dispatching port, the value of the deadline field is zero.

Each time an access descriptor is inserted on a queue at the port, a new queue link record is removed from the free list. The access descriptor is stored at the entry specified by the queue link record, and the record is inserted in the queue in increasing deadline order. Each time an element is removed from a queue, the head queue link record specifies the location of the associated access descriptor. The head queue link is then removed from the queue and returned to the free list.

4.8.2.4 Preemption Ports

The port access descriptor in the second entry of a dispatching port references a preemption port to which processes that have been suspended for external reasons (e.g., period count expiration or maintenance request) are sent in the form of process object access descriptor messages, for proper rescheduling or destruction. With normal preemption for service period expiration, a preempted process will merely reenter its current dispatching port's request queue for further execution at some later time. Preemption ports are normally buffered ports where the processes are treated like any other message.

4.9 STORAGE

Many of the facilities described above encourage the dynamic creation of objects of all types and, in particular, the dynamic creation of new contexts. To maintain system performance in such a dynamic situation, the system provides a hardware mechanism for the rapid allocation of segment descriptors and memory space.

The type of object that controls segment creation is called a storage resource and its provides access to a pair of related objects. The first object is called a storage resource control segment, and it defines the physical blocks of storage that may be allocated by a particular instance of a storage resource object. The second object is a segment table that, although it may be in widespread use for address development, supplies to the storage resource a list of unallocated segment descriptors. Diagrammatically, a storage resource appears as shown in FIG. 2B.

The base rights of an access descriptor for a storage resource are interpreted in the same manner as for all segments of base-type access list.

The low order bit of the system rights field for a storage resource object access descriptor is interpreted as follows:

0—base-type segments of either type may be allocated from this storage resource

1—no segments may be allocated from this storage resource

The high order bit of the system rights field of a storage resource object is uninterpreted.

4.9.1 Free Segment Descriptor Lists

In each segment table, all unallocated segment descriptors are linked together to form a list of free segment descriptors. The head of this list is a specially formatted segment descriptor located at the second segment descriptor entry in the segment table. The organization of the free segment descriptor list head is shown below.

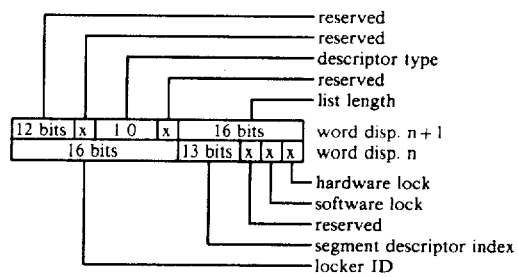

The descriptor locks are used to guarantee exclusive access to the storage resource control segment during an allocation cycle. The identity of the locking agent (processor/process) is placed in the locker ID field.

The segment descriptor index contains the index of the first free segment descriptor on the free list. If zero, the free list is empty.

The list length field maintains the count of segment descriptors remaining on the free list. It was the value zero when the segment index field has the value zero.

Each time storage is allocated, the free segment descriptor selected by the free list head is removed from the free list. The organization of an unallocated segment descriptor is shown below.

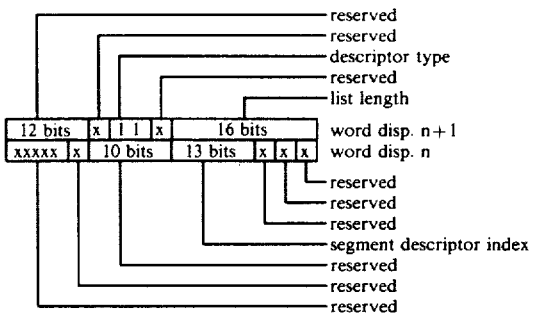

Only two fields are defined in free segment descriptors. The descriptor type field indicates that the descriptor is unallocated and the segment descriptor index selects the next free segment descriptor on the list. If the index is zero, the descriptor is the last one on the free list. As a free segment descriptor is allocated from the head of the free list, its segment descriptor index is used to update the value in the segment index field of the free segment descriptor list head. In this way the free list head always selects the next free descriptor on the segment descriptor free list.

4.9.2 Storage Resource Control Segments

A storage resource control segment defines the blocks of physical memory available for allocation from a particular storage resource. Many blocks of storage can be associated with a storage resource and each block is defined within the storage resource control segment, whose overall structure is shown in FIG. 2B.

The storage block index is the word index of the storage block descriptor that should be used first, when an attempt is made to allocate storage from this storage resource.

Hardware and software locks are used to guarantee exclusive access to the object during operations upon it, and the locker ID records the identity of the locking agent.

Each block of physical memory is defined by a storage block descriptor with the following format:

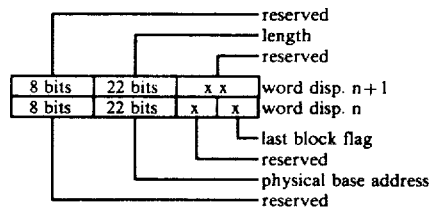

The last block flag indicates whether this is the last storage block in this resource. It is zero if there is a valid storage block descriptor following this block, and it is one if this is the last storage block descriptor in this resource.

The physical base address is the word aligned base of a free block of physical memory from which allocations can be made. It has two low order zero bits implied.

The length is the byte length of the storage block. It has two low order zero bits implied and is, therefore, always a word multiple.

The strategy for storage allocation is known as rotating first fit. Starting with the storage block indexed by the value of the storage block index, attempts are made to allocate space in the first block that is large enough to satisfy the request. The storage block index is advanced by one descriptor position if the currently indexed block contains insufficient space. If a descriptor with its last block flag set cannot satisfy the request, the index is reset to the first entry. If during a single allocation attempt, the index is advanced in this manner to again equal its value at the start of the attempt, a storage allocation fault occurs. If a large enough storage block is found, the segment storage is allocated from the tail of the block and the length of the block is reduced by the size of the allocation.

The low order bit of the system rights field for a storage resource object control segment access descriptor has the following interpretation:

0—storage may be allocated from this storage resource
1—storage may not be allocated from this storage resource The high order bit of the system rights field for storage resource access descriptors is uninterpreted.

4.10 Transformers

There are many situations in which software must either type a segment descriptor for an object or modify the access rights available to an object in a given access descriptor. Both of these functions are provided by a type of object called a transformer.

When a newly created segment is to be used to represent a hardware-recognized system object, the type of that object must be entered into the system type labeling. A transformer used for type labeling supplies the type code to be placed in the segment descriptor. Since a transformer used for type labeling is protected, only operations having access to the necessary transformer, with the appropriate access rights may create system objects of that type.

In certain situations, an operation may find it necessary to increase or amplify the rights it has available to an object over a given access path. Access to a protected transformer contain a type value that matches the type of the access path to be amplified, and with appropriate rights to that transformer, will allow the operation to modify an existing access descriptor or to create a new access descriptor with increased rights. The increase in rights will be a function of both the rights field in the transformer and the rights already present in the rights field of the access descriptor.

Whenever it is necessary to create a new access path with less rights than those held for an existing path, an appropriately formatted and unprotected transformer may be used. In a similar manner to that described for access right alteration, both protected and unprotected transformers may be used to alter the descriptor control fields of existing access descriptors or to create new access descriptors with altered descriptor control fields.

Transformers have the following organization:

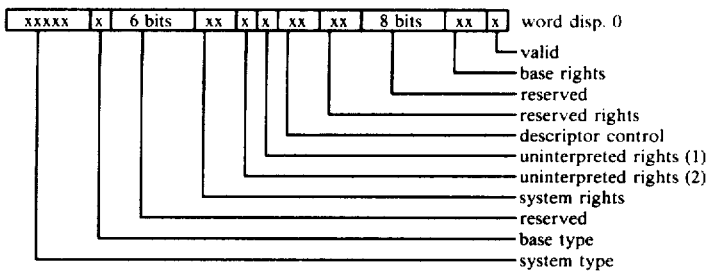

The base-type field is used for checking purposes by the operators that require transformers and is encoded the same way as the corresponding field in segment descriptors.

The system-type field is used for insertion in the case of type labeling and for checking purposes by the amplification and restriction operators. It is encoded the same way as the corresponding field in segment descriptors.

The access rights fields are used for insertion in the case of type labeling and amplification and are logically ORed with the corresponding fields of the target access descriptor in the case of restriction. They are encoded the same way as the corresponding fields in access descriptors.

The descriptor control field is used for insertion in the case of type labeling and amplification and is logically ORed with the corresponding field of the target access descriptor in the case of restriction. It is encoded the same way as the corresponding field in access descriptors.

Transformers, when encoded as protected objects, are accessed via transformer access descriptors. The base rights field for a transformer access descriptor is interpreted in the same manner as for all objects of base-type data segment. The system rights field for a transformer access descriptor is interpreted as follows:

00—a base-type object may be labeled or an access descriptor may have its rights amplified with this transformer 01—an access descriptor may have its rights amplified with this transformer 10—a base-type object may be labeled with a system type with this transformer 11—neither system-type labeling nor access descriptor rights amplification may be performed with this transformer.

Unprotected transformers are accessible as ordinary ordinal values and may be located at any arbitrary position in a data segment.

4.11 Labels

To support software-defined typing of objects, beyond that provided for processor-recognized types, a set of labeling facilities are provided. Labels are 64-bit, software-encoded values used to provide an extremely large type number space. Labels may be applied to both software-typed and system-typed objects. By introducing a label into an access path, it is insured that the typing and access control information they contain is applied to any use of that access path. This is called extending type labeling. In order to access the underlying object at the base of the access path, an operation must obtain an access descriptor for the underlying object by traversing all the labels in that access path. This is call path level traversal.

4.11.1 Path Level Descriptors

Path level descriptors are used to represent a labelled level in an access path. A path level descriptor logically contains a pair of access descriptors. The first of these logical access descriptors selects a segment descriptor for a data segment with software-type label. The second of these logical access descriptors selects either another path level descriptor or the segment descriptor for the underlying object. Path level descriptors appear in path level tables that are managed much like segment tables. As with segment descriptors for segment tables, segment descriptors for path level tables appear in the segment table directory. Thus, the segment table directory is shared between segment tables and path level tables.

A path level descriptor has the following organization:

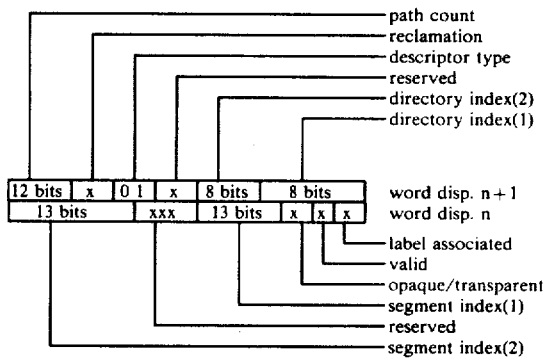

The directory index fields serve the same purpose and are treated the same way as the corresponding fields in access descriptors. Directory index(1) is used in referencing the next lower level in the access path. Directory index(2) is used in referencing the associated label. The segment index fields serve the same purposes and are treated the same way as the corresponding fields in access descriptors. Segment index(1) is used in referencing the next lower level in the access path. Segment index(2) is used in referencing the associated label. The label-associated field serves the same purpose and is treated the same way as the storage-associated field in segment descriptors. The opaque/transparent field indicates whether or not this path level descriptor requires that label checking be performed when traversal is desired. The other fields serve the same purpose and are treated in the same way as the corresponding fields in a segment descriptor.

4.11.2 Label Linkages

The linkages in effect when a path level descriptor has been used to create a software labeled access path are shown below. Note that a —0— in a linkage indicates the level of mapping provided by the segment table directory.

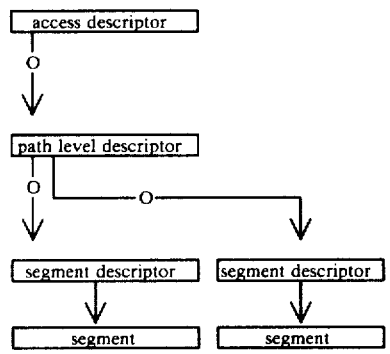

4.11.3 Label Objects

The ability to label and traverse labeled access paths is provided by a label object. Such objects are accessed via label access descriptors.

The base-rights field for a label access descriptor is interpreted in the same manner as for all objects of base-type data segment. The system rights field for a label access descriptor is interpreted as follows:

00—objects may be a labeled and a path level may be traversed with this label
01—a path level may be traversed with this label
10—an object may be labeled with this label
11—neither object labeling nor path level traversal may be performed with this object.

4.12 PROCESSOR REGISTERS

To efficiently access the system objects previously described, each processor posses an extensive set of internal, segment descriptor registers. These registers are used to buffer segment address and length information obtained from segment descriptors.

The first set of registers, which are referenced directly by the microcode, is shown below.

```
15    0 23 16 2
|length | base | 0 segment table directory
|length | base | 1 process object
|length | base | 2 dispatching port
|length | base | 3 process control segment

|length | base | 4 process object
|length | base | 5 context control segment
|length | base | 6 context object
|length | base | 7 public access list
|length | base | 8 private access list

|length | base | 9 entry access list
|length | base | 10 operand stack directory
|length | base | 11 instruction segment
|length | base | 12 segment work register - A
|length | base | 13 segment work register - B
```

The second set of registers, which are referenced associatively by the microcode based upon segment selector, is shown below.

```
15    0 23 16 2
|length | base | 0 data segment - A (assoc.)
|length | base | 1 data segment - B (assoc.)
|length | base | 2 data segment - C (assoc.)
|length | base | 3 data segment - D (assoc.)
|length | base | 4 data segment - E (assoc.)
|length | base | 5 data segment - F (assoc.)
|length | base | 6 data segment - G (assoc.)
|length | base | 7 data segment - H (assoc.)
```

The third set of registers, which are referenced associatively by the microcode based upon segment table directory index, is shown below.

```
|length | base | 0 segment table - A (assoc.)
|length | base | 1 segment table - B (assoc.)
|length | base | 2 segment table - C (assoc.)
|length | base | 3 segment table - D (assoc.)
```

Since the segment descriptor registers can only contain segment information that is identical to that found in memory, it is never necessary to save or store their contents. Furthermore, they are only reloaded when conditions demand it for proper and efficient operation. These conditions are described in the following table:

| REGISTER | LOAD TIME |
|---|---|
| 0 - segment table dir. | initialization; reset |
| 1 - processor object | initialization; reset |
| 2 - dispatching port | initialization; reset |
| 3 - process control seg. | process switch |
| 4 - process object | process switch |
| 5 - context control seg. | context switch |
| 6 - context object | context call/switch |
| 7 - public access list | domain switch |
| 8 - private access list | domain switch |
| 9 - entry access list | access list entry/domain switch |
| 10 - operand stack | context call/switch/switch |
| 11 - instruction segment | context call/switch; seg-seg branch |
| 12 - segment work reg. - A | when needed |
| 13 - segment work reg. - B | when needed |
| 0 - data segment A | first reference to data segment |
| 1 - data segment B | first reference to data segment |
| 2 - data segment C | first reference to data segment |
| 3 - data segment D | first reference to data segment |
| 4 - data segment E | first reference to data segment |
| 5 - data segment F | first reference to data segment |
| 6 - data segment G | first reference to data segment |
| 7 - data segment H | first reference to data segment |
| 0 - segment table A | first reference to segment table |
| 1 - segment table B | first reference to segment table |
| 2 - segment table C | first reference to segment table |
| 3 - segment table D | first reference to segment table |

The data segment, segment descriptor registers are loaded automatically whenever a new data segment is first referenced. Once loaded, they are selected through an associative search on their segment selector fields (not shown). If more than eight segments are being referenced simultaneously, the registers are reloaded on a least-recently-used basis.

The segment table, segment descriptor registers are loaded automatically whenever a new segment table is first referenced. Once loaded, they are selected through an associative search on their segment table directory index fields (not shown). If more than four segment tables are being referenced simultaneously, the registers are reloaded on a least-recently-used basis.

Generalized data processors also possess an additional set of registers for buffering frequently used pointers. The instruction segment selector (ISS), the instruction pointer (IP), and the operand stack pointer (SP) are kept in this manner. The processors also possess a set of registers for maintaining the status of the currently executing process and context, as well as the status of the processor itself.

| 15 | 0 | |
|---|---|---|
| ISS | | 0 instruction segment selector |
| IP | | 1 instruction pointer |
| SP | | 2 operand stack pointer |
| context status | | 3 context status register |
| process status | | 4 process status register |
| processor status | | 5 processor status register |

5.0 ACCESS ENVIRONMENT MANIPULATION AND COMMUNICATION

Communication in the system is organized as a hierarchy of five major levels:
1. instructions
2. contexts
3. coroutines
4. processes
5. processors Defined for each level is a set of communication mechanisms that provide for a transition from the currently controlling object to another object at the same level, for the transmission of information between these two objects, and for the modification of the current access environment in proper response to either of the previous two actions. A transition at a given level necessarily implies a transition at each lower level but does not necessarily imply a transition at any higher level. For example, a transition from one coroutine to another results in a transition to a different context and a different instruction as well, but the transition can be made without making a transition to another process. At each level the mechanisms have been designed to provide the necessary functions at their particular level and to serve as building blocks for the communications mechanisms at the next higher level. At all times the mechanisms maintain the same high level of protection and isolation found throughout the architecture.

At any time the access environment of a process consists of the set of segments that can be directly or indirectly accessed through the current set of four local access lists which is the current context. Also part of this access environment is the manner in which those accessible segments may be accessed. Complementing the communication mechanisms are a set of access environment manipulation mechanisms that allow this environment to be modified. These mechanisms, made available as hardware operators, are also the means by which system software generates and distributes access descriptors throughout a system. As such, they are designed to be consistent with the overall protection structure of the system.

The following sections describe the access environment manipulation mechanisms and the communication mechanisms for each level, as they relate to the use of the system objects whose structures are described under the heading "SYSTEM OBJECT STRUCTURES".

5.1 ACCESS ENVIRONMENT MANIPULATION MECHANISMS

At any instant in time, the access environment of a process can be quite complex. A variety of facilities are provided that allow an operation to make required modifications to the access environment provided by a context. These facilities include access descriptor movement between access lists, complex object manipulation, type application and type manipulation, access path labeling and traversal, dynamic segment creation, access path inspection, and object interlocking.

5.1.1 General Access Descriptor Movement

Only the first 64 access descriptors in any of the four local access lists of the current context can be specified directly by a data reference in an instruction. In order for an operation to access all of its objects it must either access them indirectly through a short ordinal containing a full 16-bit segment selector, or move an access descriptor from an arbitrary position in a local access list to one of the first 64 positions in the same or another access list. This ability is provided by the MOVE ACCESS DESCRIPTOR and COPY ACCESS DESCRIPTOR operators.

Two mechanisms are available for controlling the movement of access descriptors. The first mechanism controls at a low level how an access descriptor may be moved. It makes use of the descriptor control bits that are present in each access list access descriptor. These bits specify whether an access descriptor may be duplicated and/or deleted. The possible values of the descriptor control bits along with their corresponding interpretations are given below.

00—Delete, duplicate=→this access descriptor may be duplicated any number of times or may be deleted at any time.
01—Delete, no delete=→this access descriptor may not be duplicated but may be deleted at any time.
10—No delete, duplicate=→this access descriptor may be duplicated with any of the duplicates being deletable, but the original may not be deleted.
11—No delete, no duplicate=→this access descriptor may neither be duplicated nor deleted and so may never be removed from the access list in which it resides.

Note that any time an access descriptor is copied, the copy always bears delete rights.

The second mechanism provides high level control over the destination access list when an excess descriptor is moved. The base rights bits in each access list descriptor are used to specify whether that access list can be written into or read from. Any attempt to modify an access list via an access descriptor with only read access rights will cause a fault.

5.1.2 Complex Object Manipulation

Access lists can be used to represent arbitrarily complex multisegment structures. The access lists may contain various types of access descriptors including access list access descriptors for other access lists that are part of the structure. These complex structures include the system objects such as processors, processes, ports, contexts, and domains as well as similar software-created objects. A special set of operators is provided to support the manipulation of such structures.

A complex object is manipulated by moving and copying the various access descriptors in its several access lists. The current context object access list can be used as a work area for this kind of manipulation. Several operators are provided to support these kinds of structures. They are:
MORE ACCESS DESCRIPTOR TO ENVIRONMENT,
COPY ACCESS DESCRIPTOR TO ENVIRONMENT,
MOVE ACCESS DESCRIPTOR FROM ENVIRONMENT, COPY ACCESS DESCRIPTOR FROM ENVIRONMENT,
MOVE ACCESS DESCRIPTOR INDIRECT, and
COPY ACCESS DESCRIPTOR INDIRECT.

The "to environment" operators provide the ability to move or copy an access descriptor from a specified entry in any secondary access list (ie., one accessible via a local access list) to a specified entry in any local access list. The "from environment" operators provide the ability to move or copy an access descriptor from a specified entry in any local access list to a specified entry in any secondary access list access descriptor. The "indirect" operators provide the ability to move or copy an access descriptor from a specified entry in any secondary access list to a specified entry in any secondary access list. The "indirect" operators provide the ability to move or copy an access descriptor from a specified entry in any secondary access list to a specified entry in any secondary access list. Both descriptor control bits and access list access rights, described in the previous section for controlling the movement of access descriptors are, of course, used to control these two operators as well.

5.1.3 Type and Rights Application And Manipulation

Type application allows the application of processor-recognized, system-type information to a base-typed (i.e., data segment or access list) object and is provided by the APPLY TYPE operator. Rights transformations allow the modification of the rights provided via a given access path to an object. Such transformations are effected by the AMPLIFY RIGHTS and RESTRICT RIGHTS operators. Restriction allows an operation to reduce the rights available to an object that is being passed. Transformation of access descriptors for objects of the various system types provides for building of domains that manage objects of those system types in a protected way. For example, managers of system objects can create access descriptors for those objects with restricted rights and use amplification to regain rights previously held when necessary for object management purposes.

5.1.4 Access Path Labeling and Traversal

Labeling of access paths for generated or extended types (as opposed to hardware-recognized system types) is provided so that it is possible to build domains which manage generated types in a protected way. Labels are 64-bit, software-encoded values used to provide an extremely large type number space. Labels are applied as levels, one label to a level, in access paths between access descriptor and their associated segment descriptors, via the APPLY PATH LEVEL operator, generating multilevel access paths. By applying labels to access paths, it is ensured that the typing and access control information they contain is applied to any use of the access path.

In order to access the underlying, unlabeled object at the base of the access path, an operation must obtain an access descriptor for that object by traversing all levels in that access path. These facilities are provided by the TRAVERSE TRANSPARENT PATH LEVEL and TRAVERSE OPAQUE PATH LEVEL operators. The difference between the two operators centers on whether the given path level is transparent or opaque. In the transparent case, no checking is required and merely requesting an access descriptor for the next lower level is sufficient. In the opaque case, however, a label object must be supplied for use in comparison to the label at the given path level. If the label in the path and the label in the object are equal, an access descriptor for the next lower path level is returned.

5.1.5 Dynamic Segment And Path Level Creation

Dynamic segment creation is provided to support efficient, locally controlled memory allocation in a dynamic environment. The dynamic creation of data segments is supported via the CREATE DATA SEGMENT operator. Similarly, the dynamic creation of access lists is supported via the CREATE ACCESS LIST operator. Segment creation involves the allocation and formatting of a segment descriptor and the allocation of physical memory for the segment. These operations are supported by storage resource objects. The initialization of storage resource objects, the deallocation of segments, and the return of the associated descriptors and storage to the appropriate storage resource objects is the responsibility of software. Software is aided in deallocation by the path count and reclamation indicators maintained in path level tables and segment tables by hardware.

5.1.5.1 Segment Descriptor Allocation

Whenever the execution of a process requires that a segment descriptor be allocated, a segment descriptor allocation cycle is performed. Before such a cycle commences the processor must establish the target segment table from which the allocation will take place.

The segment descriptor allocation cycle proceeds by locking the segment table for allocation and saving the associated segment descriptor header information in the processor. If the segment table cannot be locked, even after several attempts, a segment table lock fault occurs.

The segment descriptor index of the segment descriptor header is then used to select a free segment descriptor to be allocated. If the free descriptor count of the segment descriptor header contains a zero, the segment table has no free entries, and thus, the segment table is unlocked and a segment descriptor allocation fault occurs.

If no faults have occured to this point, it is known that the allocation can be made via the segment descriptor index. The segment descriptor index is moved from the first segment descriptor on the segment descriptor list to the segment descriptor index field of the segment descriptor header and the free descriptor count field of the segment descriptor header is decremented. The allocated segment descriptor has its reclamation bit set. Finally, the segment table is unlocked, completing the segment descriptor allocation cycle.

When multiple segment descriptor allocations must be performed as part of a single instruction, the segment table object is locked once at the start of the requests and is not unlocked until all have been completed. Note also that in such cases, a fault may occur after some, but not all, of the grouped allocations have been made.

5.1.5.2 Storage Allocation

Refer to FIGS. 2A and 2B. Whenever the execution of a process requires that storage in system memory (84) be allocated for a segment, a storage allocation cycle is performed. Before such a cycle commences, the processor must establish the target storage resource object (79) from which the allocation will take place, the target segment descriptor for which the storage is to be allocated, and the length of the storage area to be allocated.

The storage allocation cycle proceeds by locking the storage resource object (79) and saving the associated storage block pointer (81) in the processor. If the storage resource object cannot be locked, even after several attempts, a storage resource lock fault occurs.

The storage block pointer (81) is then used to select a storage block descriptor (83) to be used in the allocation. The length field of this storage block descriptor is compared to the desired length minus one. If the desired length minus one is less than or equal to the length field, then the allocation can be made from this storage block and the storage allocation cycle continues as in the following paragraph. If not, the last block flag (f) of the selected storage block descriptor (83) is examined. If it is set, then the storage blockpointer of the storage resource object is set to entry one. Otherwise, it is incremented to the next entry. In either case, the new value is compared to the saved value of the storage block pointer. If they are not equal, allocation is reattempted as described above at the top of this paragraph. Otherwise, no storage block associated with the storage resource object contains enough storage to satisfy the request, and, therefore, the storage resource object is unlocked and a storage allocation fault occurs.

If any faults have occured to this point, it is known that the allocation can be made from free block (in system memory, 84) described in the selected storage block descriptor. The length field (89) of the selected storage block descriptor (83) is decremented by the desired length and truncated to an even-word multiple. The length field of the segment descriptor is set to desired length minus one. The base address field of the segment descriptor is set to the sum of the starting address field and the length field of the selected storage block descriptor. Finally, the storage resource object (79) is unlocked, completing the storage allocation cycle.

When multiple storage allocations must be performed as part of a single instruction, the storage resource object is locked once at the start of the requests and is not unlocked until all have been completed. Note also that in such cases, a fault may occur after some, but not all, of the grouped allocations have been made.

5.1.5.3 Path Level Creation

The dynamic creation of new path levels is supported in hardware by the CREATE PATH LEVEL operator. Basically, a path level descriptor is allocated from a path level table (78) much in the same way as segment descriptors are allocated from segment tables. Then a previously created label is linked to that path level descriptor by basically copying the access information for the label into the path level descriptor. Such a created path level may then be applied to a path as described above.

5.1.6 Access Path Inspection

Access path inspection falls into three classes—access descriptor inspection, label inspection, and segment descriptor inspection. Access descriptor inspection gives an operation the ability to check access descriptor received as parameters for conformance with its interface specifications for descriptor control and access rights. It also allows an operation to verify that an access descriptor it intends to use in a specific manner is not going to cause a fault. Access descriptor inspection can be performed via the READ ACCESS DESCRIPTOR operator. This operator reads an access descriptor from an access list and deposits a copy of it in a data segment for further inspection.

Label inspection gives an operation the ability to determine the value of the label at a given level within an access path. This information may be quite useful if the operation intends to attempt to traverse a path level. Label inspection can be performed via the READ LABEL operator. This operator deposits the label information from the label at the given level into a data segment for further inspection.

Segment descriptor inspection gives an operation the ability to determine the type, state, physical base address, and size of any segment to which it has access. This information may be quite useful if the operation intends to move a segment. Segment descriptor inspection also gives a operation the ability to determine how many access descriptors are in existence for the segment. This is helpful when performing memory management (e.g., garbage collection). Segment descriptor inspection also gives an operation the ability to determine the transparency state of a level in an access path if the descriptor referenced is a path level descriptor as opposed to a segment descriptor. This is helpful when a operation must dynamically decide how to traverse a multilevel access path. Segment descriptor inspection can be performed via the READ SEGMENT DESCRIPTOR operator. This operator deposits the segment or path level descriptor information from the referenced descriptor into a data segment for further inspection.

5.1.7 Object Interlocking

Most of the time lockable system objects are manipulated solely by processors. Any required exclusion between processors is handled via object locks. Occasionally maintenance software must gain sole access to such objects for relatively long periods of time (i.e., the time required to execute several instructions). Object interlocking is made possible by the LOCK OBJECT and UNLOCK OBJECT operators and provides for the required mutual exclusion of software and hardware with respect to lockable system objects. These facilities are not mainly for process/process exclusion as buffered ports are the intended structure for such purposes.

For the simpler cases where software/hardware exclusion is required, but the associated object manipulation can be completed within a single instruction, INDIVISIBLY ADD SHORT-ORDINAL, INDIVISIBLY SUBTRACT SHORT-ORDINAL, and INDIVISIBLY INSERT ORDINAL are provided. These instructions are particularly useful for path level and segment descriptor maintenance.

5.2 Communication Mechanisms

An appropriate communication mechanism is provided for the program objects at each level in the functional hierarchy. By providing separate mechanisms at each level, those mechanisms can be optimized to provide the desired services in a minimum amount of space and time. The following sections give a brief description of the mechanisms available at each level with the detailed communication algorithms given in the operator descriptions under the heading "GENERALIZED DATA PROCESSOR OPERATOR SET."

5.2.1 Instruction-to-Instruction Communication

At the lowest level in the functional hiearchy is instruction-to-instruction communication. Transitions from one instruction to another take place through normal sequential flow-of-control as well as through both intrasegment and intersegment branching. Transmission of information between instructions is provided by shared segments and objects, including the top locations in the current operand stack. Execution at this level is sequential so no buffering or interlocking of instruction communication is required.

5.2.2 Context-to-Context Communication

At the next level in the hierarchy is context-to-context communication. Because operations are executed sequentially within a process, no buffering or interlocking is required here either. When a transition is made between operations (i.e., when an operation in one context calls an operation in another context), the operation in the calling context is suspended at the point of the call, and execution of the operation in the called context is continued at the point where it was last suspended.

The hierarchial or downward flow-of-control that occurs as one context calls another is recorded in the return links of called contexts. This allows the flow-of-control to return back up the chain of invoked contexts in a simple and direct manner.

There are two ways of transmitting information between the two operations. The first, available whether or not the operations share the same domain, is via a message object, described below. The second, usually available only when the two operations are defined in the same domain, is via shared segments and objects. Operations that are in the same domain are somewhat unprotected from each other's actions, either mistaken or malicious. For operation where the domain of definition differs, when control flows from one operation to the other, a domain change occurs. In such cases, shared segments and objects are not generally available. This provides the ability to support protected operations and subsystems with controlled interfaces.

5.2.2.1 Intradomain Context Creation

Before an operation can be executed, an access environment must be created in which it an execute. The CREATE CONTEXT operator is used to establish just such an access environment. The reason that this function is not merely part of calling a context is to allow for efficient creation of retained and possibly reusable instances of environments in which their associated operations can be executed. For example, with static languages, such as FORTRAN, contexts can be created and linked to those contexts with which they communicate before execution begins. For more dynamic languages, such as ALGOL, contexts can be created and linked to those contexts with which they communicate at point of invocation.

Information about the environment required for an operation is found at the base of its primary (i.e., starting) instruction segment (90, FIG. 3B). This information, placed there by a translator, is used by the CREATE CONTEXT operator to create an environment for an executable instance of the given operation. In particular, it specifies the sizes of the several instances specific data segments and an access list formed at context creation.

When performing intradomain context creation, an access descriptor (108) for the specified intruction segment must appear in either the public or private access lists of the current context. The environment or context object (94) resulting from context creation is represented by a context access list containing access to a set of other objects. The two that are specific to the given context are a context control segment (122) and an operand stack segment (106). Not unique to the context, but accessible to it are the public and private access lists (98, 100, respectively) of the domain of definition of the current operation.

5.2.2.2 Interdomain Context Creation

In order to create a context for an operation defined in another, but accessible domain, a context must first gain access to the public access list of the accessible domain.

The ENTER ACCESS LIST operator can be used to select a new entry access list for the current context and thus make available for inspection and use any access list, including the public access list of a domain, to which the current context has base-read rights. If data is accessible via the entry access list, it can be accessed directly. If other access lists are accessible via the entry-access list, it can be accessed directly. If other access lists are accessible via the entry-access list (93) FIG. 3B, they too can be entered. This allows traversal of arbitrarily complex access list structures. If contexts are accessible via the entry access list, they can be invoked just like contexts in the current domain (92).

The major difference between having entered a domain and any other type of access list is that if operations are accessible via the public access list of a domain, which is the current entry access list of the current context, contexts can be created for them as described above. Those contexts can then be invoked. Note that only those objects, including operations, that the definer of the entered domain has chosen to make public are made accessible by the ENTER ACCESS LIST operator.

5.2.2.3 Parameter And Result Transmission

A message is represented either by a scalar data segment or by an access list. Access to either kind of message is, as with all objects, gained via an access descriptor for that object. Messages are passed via the message entry (112) FIG. 3A, in context objects. After the transition to the called operation, the message passed is accessible via the message entry of the new context. If it is a data segment, it may be accessed directly. If it is an access list, it must be selected as the entry access list of the new context before its components are local. As described above, the ENTER ACCESS LIST operator is available to allow an operation to gain local access to the components of any access list (i.e., such as messages) for which it has base-read rights. The context may then make use of the objects accessible via the entered access list as described above.

As described below, one access descriptor for a message can be returned via a RETURN operator.

5.2.2.4 Context Invocation

The CALL CONTEXT operator is used to transfer control to a new context as part of an invocation. This is done with CALL CONTEXT WITH MESSAGE operator. The transition involves several steps. First the context object for the called context becomes the new context access list. Second, the public access list for the domain of the called context becomes the new public access list. Third, the private access list accessed via the new public access list becomes the new private access list. Fourth, the new entry access list becomes the entry access list of the called context as it was when that context was last suspended.

5.2.2.5 Context Return

All context-level return operators (e.g., RETURN, RETURN MESSAGE) are used to return control to the operation in the context in which it resided before the most recent CALL CONTEXT. The linkage information in the context being returned from is updated appropriately. Some of the RETURN operators also provide the ability to return information to the calling context, either via a message or by causing a fault in the calling context.

5.2.3 Coroutine-to-Coroutine Communication

The system recognized and supports the nonhierarchial control structure known as a coroutine. Because of the differences in the control flow patterns of coroutine-to-coroutine communication, they make use of different communication facilities. In general, coroutines are not constrained to communicate in hierarchial pattern. In fact, they may communicate in a cyclical pattern. Due to this difference, coroutines cannot be supported by the single return link of a context object. Nonbuffered communication ports (104, FIG. 3A) are provided to support the special communication needs or coroutines. By using different nonbuffered ports for each logically different coroutine interface, a coroutine can operate with quite arbitrary control structures. Coroutine communication as with communication at all lower levels, is sequential and hence is unbuffered and noninterlocked.

5.2.3.1 Coroutine Parameter Transmission

The parameter passing scheme for coroutines is the same as that at lower levels. Thus, whenever parameters are passed between coroutines, a message as described above is context-to-context communication is used.

5.2.3.2 Coroutine Resumption/Suspension

Execution of the RESUME COROUTINE operator causes the actual transition from the current coroutine to the coroutine being invoked. As discussed above, the calling coroutine is suspended at the point of call and the invoked coroutine is resumed at the point where it was last suspended.

Nonbuffered ports provide the facilities to allow coroutines to choose from among a set of suspension points. By being able to choose a suspension point, a coroutine can select which other coroutines it will allow to resume next.

5.2.4 Process-to-Process Communication

Processes are by definition capable of running and normally do run asynchronously with respect to each other. Therefore, communication between processes tend to occur asynchronously. The mechanism required to support this type of communication can be viewed as communication between potentially parallel coroutines with a queuing mechanism interposed to resolve the possible speed differential. Buffered communication ports (144, FIG. 4A) provide this queuing mechanism. Details of their use are described below.

5.2.4.1 Process Parameter Transmission

Parameter passing between processes is done using the same message-based mechanism as above. That is, an access descriptor (112, FIG. 3A) for the message is placed in the message entry of the current context object (94) of the receiving process. Process creation is performed in software by simply creating the initial context for the process as discussed above, attaching that context to a new process object, and finally attaching that process object to a buffered communication port (144, FIG. 4A) to wait for a message or to a dispatching port (146, FIG. 4B) to wait for a processor.

5.2.4.2 Process Resumption/Suspension

There are several operators available for interprocess communication. They are:
SEND,
CONDITIONAL SEND,
WAIT TO RECEIVE,
CONDITIONAL RECEIVE,
WAIT n TIME QUANTA, and
WAIT TO RECEIVE OR n TIME QUANTA.

When the SEND OR CONDITIONAL SEND operators are used, the process sending the message proceeds without waiting, potentially in parallel with the process receiving the message. When the CONDITIONAL RECEIVE OPERATOR is used, the process proceeds whether a message was received or not. When the WAIT TO RECEIVE operator is used, and no message is available, the waiting process is suspended at that point and queued awaiting a message. When WAIT n TIME QUANTA is used, the process is sent to a dispatching port and guaranteed that a dispatching delay of n time quanta will pass prior to it be redispatched. When WAIT TO RECEIVE OR n TIME QUANTA is used, the process is sent to a dispatching port and guaranteed that, if it has not received a message via a specified buffered port before a dispatching delay of n time quanta passes, it will become dispatchable again.

When synchronous communication is required, a SEND operator immediately followed by a WAIT operator can be used to simulate a synchronous, interprocess call facility.

5.2.4.3 Buffered Communication Ports and Dispatching Ports

These kinds of ports are system objects described previously with respect to FIGS. 4A, 4B, under the heading: "SYSTEM OBJECT STRUCTURES," used mainly for resolving the speed differences of processes and processors through queuing. The differences between buffered communication ports and dispatching ports can be characterized by the types of objects that are queued, as well as the insertion selection, and service mechanisms employed.

5.2.4.3.1 Buffered Communication Ports

Buffered communication ports (144, FIG. 4A) provide the essential queuing facilities for processes waiting for messages and for messages waiting for processes. If a buffered communication port object access descriptor is referenced in a interprocess communication, message insertion is at the end of the message queue. Process insertion is always done at the end of the process queue. Messages and processes are always selected from the end of the associated queue in the access descriptor area (158). Depending upon the setting of the service mode flag in the port status field (160), after a message has been received by a process, the process is sent either to the service destination port specified by the buffered communication port at which the process received the message or to the current service port of the process. This allows a process to be sent either to a communication port as a message for service by a software server or to a dispatching port for service by a hardware server (i.e., processor).

Besides providing the queuing facilities described above, another result of the use of buffered ports in interprocess communication is that the same kind of selectivity over inputs that is available to coroutines via nonbuffered ports is available to processes. An additional facility, made available by the process queuing provided by buffered ports, is the ability to support nondistinguished server processes (i.e., a homogeneous set of server processes, all of which perform the same service) at service ports.

Another intended use of buffered ports is for process-to-process exclusion over shared objects. Such exclusion can be achieved via the processes in question waiting for access, to the object over which exclusion is desired, at a buffered port behind which the object is queued as a message when it is not in the possession of any process.

The hardware optionally maintains information to help the software monitor service load and queue space. This option is controlled by the setting of the count control flag in the port. One example of this monitoring is the maintenance of maximum counts of queue depth for both messages and processes. Software, which analyzes this data and responds to faults if queue space runs out, can control the queue space available in the near future based upon the recent past. Methods of supporting medium-term service load balancing can be based upon adding nondistinguished server processes at ports where a buildup of service requests is noticed by monitoring software.

5.2.4.3.2 Dispatching Ports

Dispatching ports (146, FIG. 4B) provide the essential queuing facilities for processors waiting for processes and processes waiting for processors. Processes are always inserted on the request queue (194) in accordance with scheduling control data in the process object. Processor insertion is always done at the end of the processor queue (192). Process and processor selection is always done from the front of the associated queue. The preemption destination port to which a process is sent if it is preempted for external reasons (i.e., service period count expiration or external maintenance request) is specified by the dispatching port from which the process was last dispatched. This allows a preempted process to be sent either to a communication port as a message for service by a software server or to a dispatching port for service by a processor.

The short-term scheduling behavior of the system depends upon scheduling control data that is inserted by software into appropriate fields in port and process objects. This data tells a processor where to insert processes in queues, how long to let them run once dispatched before preemption, how many times they should cycle through the request queue before they should be sent to a software server for scheduling service, and where they should be sent next for service.

The scheduling control data (see process control segment 150, FIG. 4A) used by a processor in deciding where to insert a process on a process queue at a dispatching port consists of two components. The first component is the service period of the system process. This is the maximum period over which a processor will serve this process before preemption. The process may voluntarily give up the processor sooner (e.g., by executing a WAIT TO RECEIVE operator). The second segment is the relative scheduling delay period of the process. This is the maximum delay that the process can absorb and still be able to complete its service period before it falls behind the schedule set for it by software. This delay is relative since it begins when the process is enqueued at a dispatching port. This relative delay, when added to the current processor timing value, forms the deadline for the process. This deadline is then used when enqueuing the process. The process is enqueued before any process with a greater deadline. When any process arrives at a dispatching port for scheduling, its service period count is examined. If this count is zero, the process is sent to the preemption port specified in the dispatching port. Otherwise, it is inserted at the dispatching port in deadline order.

The current processor timing value is maintained internally as a 16-bit counter. The processor timers of all processors in a configuration are synchronized so that a single, system-wide time standard is available. The processor timers provide 100 microsecond resolution, and up to 6.55 seconds of total time before turnover. The maximum relative scheduling delay is limited by processors to half of the timer turnover period (i.e., 3.27 seconds). The minimum process service period is 100 microseconds (i.e., the resolution of the system-wide time standard). The maximum process service period is limited by processors to 3.27 seconds (i.e., a 15-bit number).

When selecting a process at a dispatching port, a process must, prior to dispatching the process associated with a given queue link record, inspect the dispatching mode field of the given queue link record. If the dispatching mode field is not set, the associated process may be dispatched either before or after its deadline has passed. However, if the dispatching mode field is set, the associated process may not be dispatched until after its deadline has passed. In such a case, if the deadline has not passed, the processor must search further down the request queue for a queue link associated with a process which is dispatchable.

When a process is selected via dispatching, the current processor timing value is added to the process service period to form an absolute process preemption time. This time is held internally by the processor. Each time the timer is incremented, it is tested against the absolute process preemption time (presuming the processor is currently serving a process) to see if service period preemption should occur. When service period preemption occurs or the process is enqueued at a buffered port due to a voluntary wait, the process service period count is decremented by one. When service period preemption occurs, the process is reinserted, as described above, in the request queue of the dispatching port from which it was dispatched.

Processed timing data is optionally maintained in the process clock field in each process object. This option is controlled by the setting of the clock mode in the process object. When a process is suspended, its process clock is updated to reflect the amount of service it received during its last service period. If the process was preempted due to expiration of its service period, the length of the service period is added to the process clock. If the process was suspended voluntarily (e.g., by executing a WAIT TO RECEIVE operator) or involuntarily (i.e., via a processor-level fault), the elapsed part of the process' service period is added to the process clock. The process clock is maintained as an ordinal value. It can thus account for 429,496.72 seconds (greater than 118 hours) of processor time based upon the 100-microsecond resolution of the system-wide time standard. If the process clock overflows, a process-level fault occurs after the process clock has been automatically reinitialized to the amount of overflow from the addition causing the fault.

Dynamic alterations to scheduling behavior are caused by software by changing the scheduling control data described above. Given the exclusion mechanisms provided for port objects and processor objects via the LOCK OBJECT and UNLOCK OBJECT operators and the process maintenance request mechanism, scheduling software can gain sole access to the appropriate objects and, as described below, alter the scheduling control data contained there to change the static scheduling behavior of the system. By maintaining data structures containing process-related information for every process in the system, software can dynamically compute the current service load. Given this information, service period, relative delay, and period count scheduling information in the process objects can be manipulated to implement most desirable scheduling policies. For example, a "round-robin" policy can be implemented by setting the delay and service periods for all processes the same. If the service period exceeds each process' processor requirement, the policy reduces to "first-come/first-served." Other policies can be implemented in similar ways. Not only can those policies be implemented easily, but they can be altered dynamically to reflect loading.

The same sorts of adaptive service load and queue space balancing that were discussed above under communication ports is made possible at dispatching ports by optional hardware maintenance of the same kind of measurement data. This option is controlled by the setting of the count control flag in the port.

Processor-To-Processor Communication

If processors queue themselves at dispatching ports, as described above, some means must be provided for signaling a queued and idle processor to reattempt the dispatching cycle when a process has become available for service. This is one of the main functions of the interprocessor communication mechanism. The following set of mechanisms are provided.

5.2.5.1 Interprocessor Communication Protocol

Each processor has access to two communication segments: one for system-wide communication called the global communication segment (190, FIG. 4A), and one for the processor specific communication, called the local communication area (172) of the processor-control segment (170). Contained in each communication segment is a field containing a number of processor-control flags. When set by some processor and later inspected by the associated processor, these control flags cause the inspecting processor to perform a variety of important functions. For example, the inspecting processor can be made to perform the dispatching function.

Every interprocessor communication has two phases: a request phase and an associated response phase. The request phase proceeds as follows. The communication segment to be used has its hardware-request lock set. The required service count is set from the processor count found in the communication segment. The interprocessor message is stored in the control-flag field, and the response lock is set. The request lock for the communication segment is unlocked. The target processor or processors are notified to inspect the appropriate communication segment via the hardware interprocessor signaling mechanism.

The response phase proceeds as follows. A processor sets the hardware request lock for the given communication segment. Each of the processor-control flags is responded to in priority order in accordance with the state of the responding processor. Upon completion of each requested function, the processor changes the state information in its processor object appropriately. This is because the current processor state determines in some cases what effects the processor-control flags have. Next, the required service count is decremented. When the required service count reaches zero, the control-flag field and the response lock are cleared.

If a processor finds a communication segment locked, when attempting to access that object on its own behalf, it generates an object interlock fault.

A pair of instructions called SEND TO PROCESSOR and BROADCAST TO PROCESSORS are available to allow software access to the interprocessor communication facilities.

5.2.5.2 Process-Control Functions

There are sixteen distinct process-control functions that will be specified in an interprocessor communication segment. Processor response to these control flags is in the following order.

SUSPEND NORMALLY

The reaction to the SUSPEND NORMALLY flag by a processor currently serving a process is to queue that process at its current service port and enter the unassigned state. SUSPEND NORMALLY implies STOP after suspension is complete if there are no other processor-control flags set. For a processor which is not currently serving a process, no response is required. With processors already in the unassigned state, no response is required.

SUSPEND FOR DIAGNOSIS

The reaction to the SUSPEND FOR DIAGNOSIS flag by a processor currently serving a process is to store an access descriptor for that process in the fault-process entry in its processor object and enter the unassigned state. SUSPEND FOR DIAGNOSIS implies STOP after suspension is complete if there are no other processor-control flags set. For a processor that is not currently serving a process, no response is required. With processors already in the unassigned state, no response is required.

DEQUEUE

The reaction to the DEQUEUE flag by a processor currently queued and idle at a dispatching port is to dequeue itself from that port. DEQUEUE implies STOP after dequeuing is complete if there are no other processor-control flags set. For a processor which is not currently queued and idle at a port, no response is required. With processors already in the dequeued state, no response is required.

STOP

The reaction to the STOP flag by a processor is to simply stop and wait for another signal. It is not necessary that a processor be in the unassigned state to enter the stopped state. A broadcasted STOP does not cause the broadcasting processor to enter the stopped state.

DIAGNOSE

The reaction to the DIAGNOSE flag by a processor is to write the contents of certain of its internal registers into its diagnostic scan area accessed via its processor object. This flag is ignored unless the processor is in the stopped state.

ENTER NORMAL STATE

The reaction to the ENTER NORMAL STATE flag by a processor is to switch dispatching states. This flag is ignored unless the processor is in the unassigned and dequeued state. If a processor is in normal dispatching state, no response is required. If a processor is not in normal dispatching state, the processor will switch to the normal dispatching state. Depending upon which dispatching state a processor is in, it will use a different dispatching port when it must dispatch.

ENTER DIAGNOSTIC STATE

The reaction to the ENTER DIAGNOSTIC STATE flag by a processor is to switch dispatching states. This flag is ignored unless the processor is in the unassigned and dequeued state. If a processor is in diagnostic dispatching state, no response is required. If a processor is not in diagnostic dispatching state, the processor will switch to the diagnostic dispatching state. Depending upon which dispatching state a processor is in, it will use a different dispatching port when it must dispatch.

ENTER ALARM STATE

The reaction to the ENTER ALARM STATE flag by a processor is to switch dispatching states. This flag is ignored unless the processor is in the unassigned and dequeued state. If a processor is in alarm-dispatching state, no response is required. If a processor is not in alarm-dispatching state, the processor will switch to the alarmdispatching state. Depending upon which dispatching state a processor is in, it will use a different dispatching port when it must dispatch.

GO

The reaction to the GO flag by a processor is to qualify some of its internal state information (e.g., MASTER/CHECKER mode) from external sources and resume operation from the point at which it stopped. If the processor is in the unassigned state, DISPATCH is implied. If the processor was not in the stopped state, GO has no effect.

INITIALIZE SEGMENT-TABLE DIRECTORY

The reaction to the INITIALIZE SEGMENT-TABLE DIRECTORY is to assume that its current segment-table directory is at location zero and set its internal segment-table directory.

QUALIFY SEGMENT-TABLE DIRECTORY

The reaction to the QUALIFY SEGMENT-TABLE DIRECTORY is to qualify its internal segment-table directory current processor object and the current segment-table directory.

QUALIFY PROCESSOR OBJECT

The reaction to the QUALIFY PROCESSOR OBJECT flag by a processor is to qualify its internal processor-object access information via the wired-in, configuration-dependent-processor index and the current segment-table directory.

QUALIFY PROCESS

The reaction to the QUALIFY PROCESS flag by a processor is to qualify its internal process-related access information from up-to-date memory resident tables. The reaction differs depending upon whether the processor is currently serving a process or not. For a processor that is currently serving a process, the basic process-related access information is qualified and all the associatively referenced access information is invalidated. For a processor which is not currently serving a process, no response is required.

DISPATCH

The reaction to the DISPATCH flag by a processor in the unassigned state is to dispatch the first available process at the dispatching port indicated by its current condition. With processors not in the unassigned state, no response is required. This function requires qualification of current state-dispatching-port information via the current processor object and the current segment-table directory.

SWITCH BROADCAST ACCEPTANCE STATE

The reaction to the SWITCH BROADCAST ACCEPTANCE STATE flag by a processor is to switch from the current state to the opposite state. If the processor is in accept-broadcast state, it enters ignore-broadcast state. If the processor is in do-not-accept-broadcast state and the current interprocessor message is processor specific, it enters accept-broadcast state.

Given the above functions, it is possible via software to cause a processor to perform several of what are normally considered purely hardware-requested, control-function sequences. This facility may be very useful during system development and testing. For example, the system initialization sequence can be requested by a combination of STOP, ENTER NORMAL STATE, GO, INITIALIZE SEGMENT-TABLE DIRECTORY, QUALIFY PROCESSOR OBJECT, and DISPATCH. The system reset sequence can be requested by a combination of SUSPEND NORMALLY, DEQUEUE, STOP, ENTER NORMAL STATE, GO, QUALIFY SEGMENT-TABLE DIRECTORY, QUALIFY PROCESSOR OBJECT, and DISPATCH. The system-reset sequence can be requested by a combination of SUSPEND NORMALLY, DEQUEUE, STOP, ENTER NORMAL STATE, GO, QUALIFY SEGMENT TABLE DIRECTORY, QUALIFY PROCESSOR OBJECT, and DISPATCH. The system-alarm sequence can be requested by a combination of SUSPEND, DEQUEUE, ENTER ALARM STATE, and DISPATCH.

5.3 EXCEPTION HANDLING

Various conditions may arise during normal execution which require exceptional software treatment. Considered broadly, these may either be events of which software must be made aware but which do not preclude continued execution of the current instruction stream or they may be events which require immediate software attention. The former class of events are handled via the notification mechanism; the latter via one of the fault mechanisms.

The fault mechanisms can be further subdivided into three levels. When a condition arises which prohibits the normal execution of instructions to continue, either a context-level, process-level, or processor-level fault occurs. The level of the fault indicates the execution object which can no longer proceed normally. A context-level fault indicates that normal execution of the current context must be suspended. A processor-level fault indicates that the normal execution of processes by the processor must be stopped and a special process executed. Each class of faults is dealt with at a level appropriate to its severity. If none of these fault levels can properly deal with the problem, then the processor will perform a consistency halt.

5.3.1 Notification

A notification is treated as an implicit SEND of an access descriptor to a process-designated port. Whenever the access-descriptor count associated with an object would go to zero as the result of some normal processor activity, a notification occurs. Rather than destroying the descriptor and reducing the count, it is sent to the port designated as the notification port in the process object. If this SEND cannot complete successfully, a process-level fault occurs as described below under "Communication Instruction Faults."

5.3.2 Fault Mechanism Data Structure

There are fault-recording areas associated with each level at which faults may occur. For each context, the context control segment contains a 24-byte long data area for context-level fault information. For each process, the process-control segment contains an 8-byte long data area for process-level fault information. It also has a reversed access descriptor entry for recording a fault-access descriptor if necessary. For each processor, the processor-control segment contains a 12-byte long data area for processor-level fault information. It also has two reserved access descriptor entires.

Each of the fault-information areas has a fixed format which defines fields for any information which may never be stored by a fault at that level. Which fields actually contain valid information after a fault is defined in the discussions of the various faults.

5.3.3 Context-Level Faults

Context-level faults require interruption of the normal execution of instructions within the running context. When such a fault occurs, information identifying its cause is recorded in the context-control segment and an intersegment branch is effectively executed to offset zero of the currently designated context-fault handler. This instruction segment is designated by a segment selector located in the fault-handler segment selector of the context-control segment. The state of the context is also set to faulted which causes special treatment of further context-level faults (see below). This state may be restored to normal at any time programatically via the SET CONTEXT MODE operator.

As described under the heading "SYSTEM OBJECT STRUCTURE," the fields defined in the context-fault information area are: (1) the faulted instruction segment selector, (2) the fault source flag, (3) the context fault code, (4) the preinstruction IP, (5) the postinstruction IP, (6) the result destination flag, (7) the fault segment selector, (8) the fault displacement, and (9) the exceptional result. For any context-level fault the first three of these fields are always valid.

5.3.3.1 Object-Access Faults

All uses of access descriptors to actually make use of an object require some checking of the type of the object; in addition, it may be necessary to check the rights associated with the descriptor. If these checks do not result in a decision to permit the instruction to proceed, then an object-type fault or object-rights fault is generated. For either of these classes of faults, the SP is restored to its value at the start of the instruction. Additional valid fields are: (1) the preinstruction IP and (2) the fault-segment selector.

5.3.3.2 Displacement Faults

References to a segment must be within the extent of that segment as defined by the segment length. If a reference specifies an offset greater than the length, a displacement fault occurs. If the computation of an offset due to indexing or scaling overflows, a displacement-overflow fault occurs. The SP is restored to its value at the start of the instruction. Additional valid fields are: (1) the preinstruction IP, (2) the fault-segment selector, and (3) the fault displacement.

5.3.3.3 Descriptor Control Faults

Operations upon access descriptors directly (as opposed to operations upon the objects they reference) may require the checking of the associated descriptor-control flags. If this check does not result in a decision to permit the instruction to proceed, then either a descriptor-control fault or an indirect-descriptor-control fault is generated. The SP is restored to its value at the start of the instruction. Additional valid fields are: (1) the preinstruction IP and (2) the fault-segment selector. If the access descriptor causing the fault was referenced indirectly, then the fault displacement field, used as an indirect-segment selector, is also valid.

5.3.3.4 Computational Faults

Computational faults are all those which arise due to the data computations involved in executing an instruction (e.g., overflow, invalid operands, etc.). At any time, a context is executing in either prefaulting or postfaulting mode determined by the setting of the context's computational fault-mode flag.

In prefaulting mode, a fault results in the restoring of the SP to its value at the start of the instruction. Additional valid fields are: (1) the preinstruction IP, (2) the postinstruction IP, and (3) the exceptional result. The value left in the exceptional result field is defined with each of the instructions which may cause a computational fault.

In postfaulting mode, a fault results in execution of the instruction up until but not including the storing of a result. That is, the SP is not restored to its previous value. Additional valid fields are: (1) the preinstruction IP, (2) the postinstruction IP, (3) the result destination flag, and (4) the exceptional result. Again, the exceptional result depends upon the instruction definition. If the result-destination flag indicates that the result was bound for memory rather than the stack, then also valid are the: (5) fault-segment selector, and (6) the fault displacement. These last two fields designate the ultimate-result address for the faulted instruction (after any indexing, indirection, or scaling).

5.3.3.5 Software Context Faults

A context that expects service from some agent should be notified if that agent is unable to normally complete the service. This may occur when a context is returned to. The service agent needs to be able to cause a context-level fault in the context needing the service. This is accomplished via the RETURN MESSAGE AND FAULT operator. The fault code is supplied as an operand of the instruction. The only additional valid field is the postinstruction IP which references the instruction following the original CALL instruction. A context may simulate a context-level fault in its own context by storing the appropriate fault information and explicitly executing a branch to the context-fault handler.

5.3.4 Process-Level Faults

Process-level faults require the suspension of the concerned process and repair by a fault handling process. When such a fault occurs, the processor is preempted from the currently running process and information about the fault is recorded in the process-object fault areas. The preempted process object is sent as a message to the fault service port identified in its process object. The processor then attempts dispatching at its current dispatching port. The limited number of process-level faults that can occur are described below.

As described under the heading "SYSTEM OBJECT STRUCTURES," the fields defined in the process fault areas are: (1) the process fault code, (2) the directory index, (3) the segment index, and (4) the fault access descriptor. For any process-level fault, the first of these fields is always valid.

5.3.4.1 Reference Validity Faults

When an attempt is made to reference the contents of any segment, the valid flags of its segment descriptor and of the segment descriptor for the segment table containing its segment descriptor are inspected. If the latter of these is invalid, a segment table directory fault occurs; if the former is invalid, a segment table fault occurs with one exception noted below. For either of these faults, the IP and SP of the context running in the process are reset to their values immediately preceding the start of the execution of the current instruction. Additional valid fields are: (1) the directory index and (2) the segment index.

5.3.4.2 Restartable Suspended Operation Faults

When an attempt is made to perform an operation that requires exclusive access to a system object, the process must lock the object. If this cannot be accomplished, a fault will be generated. In such cases, the IP and SP of the process are restored to their value at the start of the instruction so that the operation can be retried by merely redispatching the process. Additional valid fields are: (1) the directory index and (2) the segment index. These fields designate the object that caused the fault.

5.3.4.3 Context Fault Failure Faults

While a context fault is being handled (i.e., the context fault state is faulted), the occurrence of an additional context-level fault is considered to be an error. If one occurs, the IP and SP are reset to their values at the start of the instruction and a process-level context fault handler failure fault is generated.

5.3.4.4 Nonrestartable Faults

There are two major cases in which process-level faults yield situations in which the instruction that was executing at the time of the fault cannot simply be restarted after some repair action. These cases are due to the fact that system objects have been irrecoverably altered before the fault is detected.

5.3.4.4.1 Communication Instruction Faults

During a logical SEND operation, failures that occur cannot in general be guaranteed not to already have altered memory structures. As a result all faults that occur after the initiation of an actual SEND function (as opposed to during any initial instruction set-up) are treated as nonrestartable faults. A SEND may fail to complete due to an overflow of a queue at a target port, invalidity of part of a port object, or data structure errors at a port. The fault code distinguishes these cases. When this occurs, the message and message target are recorded so that software can continue the operation to completion. The message access descriptor is stored in the fault access descriptor. As this always represents a move of the descriptor, no count alteration is necessary (reclamation marking is required). The store is done without regard to the previous contents of the fault access descriptor entry. It is up to the software to insure that this entry contains a null entry at any time such a fault may occur. The segment indices of the target port are also stored. Thus all the additional fields are valid.

Note that a SEND fault can occur when no process is associated with the processor. Specifically, process suspension involves SENDS(s) of the current running process, during which time no other process is associated with the processor. These faults are handled exactly as above except that they cause processor-level faults as described below under "Faults Without A Process."

5.3.4.4.2 Segment Descriptor Allocation Faults

When one of the segment creation operators is being executed and the segment descriptor list of the specified segment table contains no free segment descriptors, a segment descriptor allocation fault occurs. If this occurs during either the execution of either a CREATE DATA SEGMENT or CREATE ACCESS LIST operator, it is treated as a restartable fault. If this occurs during the execution of a CREATE CONTEXT operator, it is treated as a nonrestartable fault.

5.3.4.4.3 Storage Allocation Faults

When one of the segment creation operators is being executed and none of the storage block descriptors in the specified storage resource contains enough storage to satisfy the request, a storage allocation fault occurs. This is treated as a nonrestartable fault. In such cases, an access descriptor for the previously allocated segment descriptor is stored in the specified destination. The segment descriptor is marked as valid but with no storage associated and has its length field set to the requested length minus one.

5.3.5 Processor-Level Faults

The most severe disruption of processing is a processor-level fault. These require the suspension of the running process and the normal dispatching mechanism for the processor, and the dispatching of a special process to evaluate and possibly repair the system state. As described under the heading "SYSTEM OBJECT STRUCTURES," the fields defined in the processor fault areas are: (1) the processor fault code, (2) the fault access descriptor, (3) the process fault code, (4) the process directory index, (5) the process segment index, and (6) the fault process object access descriptor. For any processor-level fault, the first two of these fields are always valid.

When such a fault occurs, the processor is preempted from the currently running process, and the access descriptor for that process is moved within the processor object to the fault access descriptor. Since the access descriptor is moved, it requires no alteration to its access descriptor count (reclamation marking is required). The previous contents of the fault access descriptor entry are overwritten without count updating or concern for its descriptor control settings. It is up to the software to guarantee that this entry is null whenever such a fault may occur, if corruption of the access descriptor count is to be avoided. This approach is taken because the potential faults associated with descriptor movement cannot be tolerated at this level in the fault hierarchy. Information about the fault is recorded in the processor fault information area. The processor dispatching state is switched from normal to diagnostic and the processor then attempts dispatching at the diagnostic dispatching port.

This operation may logically be viewed as the processor sending an interprocessor message to itself of: SUSPEND FOR DIAGNOSIS, ENTER DIAGNOSTIC STATE, and DISPATCH.

If such a fault occurs while the processor is already in the diagnostic dispatching state, the processor performs a consistency halt (see below.

5.3.5.1 Process-Level Fault Failure Faults

The correct handling of a process-level fault requires that space be available at the fault communication port to enqueue the faulted process. It also requires that proper descriptors for a fault information reporting area and a fault communication port be available. If any of these conditions are not met, then a process-level fault mechanism failure occurs.

In the first case, where the fault information can be properly recorded but there is no available queueing space at the port, the process-level fault information is recorded normally. A processor-level fault is then generated with a fault code that indicates that the fault port overflowed.

In the second case, where fault information cannot be properly recorded, the information is stored in the "process" fields of the processor fault area instead. The processor-level fault code indicates a process-level fault information recording fault. The process fault code is valid in this case. Also valid are any of the "process"

fields corresponding to fields in the process-level fault areas that would have been valid for the fault.

5.3.3.2 Faults With A Process

It is possible for a fault to occur while no process is assigned to the processor. These can only occur due to functions that can be requested via the interprocessor communication mechanism (although the interprocessor communication mechanism need not have been used to cause the instance of the function which faulted). For such faults, a null access descriptor is stored in the fault access descriptor field.

If the fault corresponds exactly to a process-level fault (eg. SEND port overflow fault), it is handled in a manner analagous to a process-level fault information recording fault. That is, all the normal information is recorded in the "process" fields of the process-level fault areas and the fault code indicates that a processless process-level fault occurred.

If the fault does not correspond to a process-level fault, the fault code indicates what function was being attempted.

5.3.5.3 Uncorrectable Hardware Failures

Mechanisms for handling this class of faults are still in development.

5.3.6 Consistency Halts

If the processor-level fault mechanism cannot successfully complete its function due to improper descriptors, data structures, or unrecoverable hardware, failure prevents the processor from accessing the memory, the processor enters a consistency halt. It stops and asserts an external error condition.

5.4 DEBUGGING SUPPORT

The hardware support for software debugging and analysis is based upon the process-level fault mechanism. When a trace event occurs, the processor is preempted from the currently running process, and that process has its state marked as waiting for trace. The IP and SP of the suspended process' current context are left set to their values at the beginning of the instruction that caused the trace event. A fault code is recorded in the process-level fault area and the process is sent as a message to the trace communication port. Redispatching of a process in other than no-trace mode always guarantees that at least one instruction will execute before the next trace event is recognized.

A process may be in one of four trace modes as determined by the setting of the trace-mode field in its control segment: (1) no-trace mode (not tracing), (2) fault-trace mode, (3) flow-trace mode, or (4) full-trace mode.

In no-trace mode, process execution is as described throughout the rest of this document. In fault-trace mode, a trace event occurs prior to the execution of the first instruction of a context-level fault handler. In flow-trace mode, a trace event occurs prior to the execution on any instruction related to the flow of control through the process or change of access environment of the process. These include: (1) all branch instructions, (2) all synchronous communication instructions, (3) all asynchronous communication instructions, and (4) all access environment change instructions. In full-trace mode, every instruction causes a trace event.

When a trace mode other than no trace is specified by a process, trace events are generated as described whenever the process is executing in a context that is open for debugging. A context is open if it is accessed via an access descriptor that has base-read rights. If a context is not open to the process, then no trace events are ever generated from within it. When a context is created via the create-context instruction, its base-read rights are set to equal the base-read rights from the access descriptor for the private-access list of the domain from which it was created.

When a process that is in full-trace mode transfers from a closed context to an open one, the first trace event generated is prior to execution of the first instruction in the open context. When such a process transfers from an open context to a closed one, the last trace event is generated immediately prior to the instruction that causes the transfer. When a process is in flow-trace or fault-trace modes, the first trace event generated after transfer from a closed to an open context occurs at the next flow instruction or fault. When such a process transfers from an open context to a closed one, the last trace event is generated either prior to the transfer instruction (in flow-trace mode) or at the last fault (in fault-trace mode) in the open context.

5.5 INITIALIZATION AND SOFTWARE CONTROLLED RESET

At initialization time, each processor must locate its segment table directory and processor object. In order to make finding these objects convenient, an initial or temporary segment table directory (72, FIG. 2A) is assumed to exist in memory starting at location zero. The first N entries, where N is the number of processors in the configuration, are dedicated to segment descriptor for processor objects. Using a hard-wired, configuration dependent processor unit number (ID) a processor can easily find its initial processor object (76). The initialization sequence is normally requested via an external hard-wired signal. As noted above, however, for testing and development purposes, the initialization sequence may be requested by software via the interprocessor communication mechanism.

The initialization sequence proceeds as follows. When a processor enters the initialization sequence, it sets its segment table directory base register to zero and reads its externally defined processor unit number. It uses that number as a segment descriptor index into the temporary segment table directory (72) and loads the segment descriptor (74) found there. The segment addressible via that segment descriptor becomes the new processor object. From there it proceeds to qualify access to its dispatching port via one of its dispatching port access descriptors and the associated segment descriptor in the temporary segment table directory. Having established a complete operational environment, the processor attempts to dispatch a process from its dispatching port. For software initialization to occur, one of the generalized data processors attempting dispatching must find a process to run when it attempts to dispatch.

If address space partitioning is desired, this initialization process makes sure that the segment table directory access descriptors in all the processor objects and their associated segment descriptor in the temporary segment table directory are set appropriately. It then issues a BROADCAST TO PROCESSORS instruction requesting the reset sequence. The initial process will be sent to its current service port that will usually be the same port as the one from which it was dispatch. This leaves the initial process waiting to be dispatched by any processor that is dynamically added to the configuration.

The reset sequence allows a processor to disassociate itself from any currently associated process or port and qualify its segment table directory, processor object, and dispatching port access information. The reset sequence may be requested by software via the interprocessor communication mechanism. This facility allows a configuration, either statically via preset memory or dynamically under software control via the SEND TO PROCESSOR or BROADCAST TO PROCESSORS operators, to be partitioned into arbitrary sets of processors with either partially shared or totally isolated logical address spaces.

The reset sequence proceeds as follows. If the processor is currently associated with a process, that process is set waiting and sent to its current service port. If the processor is currently idle at a dispatching port, it dequeues its processor object from that port. Then it proceeds to qualify access to its new segment table directory via the current segment table directory access descriptor in the current processor object and the associated segment descriptor in the temporary segment table directory. At that point, the processor reads its externally defined processor unit number. It uses that number as a segment descriptor index into the new segment table directory and loads the segment descriptor found there. The segment addressible via that segment descriptor becomes the new processor object. From there it proceeds to qualify access to its dispatching port via one of its dispatching port access descriptors and the associated segment descriptor in the new segment table directory. Having reestablished a complete operational environment, the processor attempts to dispatch a process from its dispatching port.

5.6 ALARM HANDLING

When an alarm condition occurs, external devices that independently monitor system alarm conditions, such as error correction failures, bus response failures, or primary power failures, may force the suspension of all currently executing processes and cause the activation of critical alarm handling processes. The alarm sequence is normally requested via an external hardwired signal. Also, as noted above, for testing and development purposes, the alarm sequence may be requested by software via the interprocessor communication mechanism.

The alarm sequence proceeds as follows: If the processor is currently associated with a process, that process is set waiting and sent to its preemption port. If the processor is currently idle at a dispatching port, the processor object is dequeued from that port. From there it proceeds to qualify access to its alarm dispatching port via the alarm dispatching port access descriptor and the associated segment descriptor. Having reestablished a complete operational environment, the processor attempts to dispatch a process from its alarm dispatching port.

6.0 FLOATING-POINT COMPUTATION

Floating-point computations involve the manipulation of short-real, real, and temporary-real operands by the set of operators associated with these data types. The floating-point architecture of a generalized data processor provides clean, accurate arithmetic for floating-point computations and eases the writing of reliable mathematical software.

In the discussion that follows, the term floating point is used generically to describe operands and operators of type short-real, real, and temporary-real.

6.1 FLOATING-POINT MODEL

Calculations using floating-point operands within the system are essentially approximations to theoretical calculations carried out on values from the set of real numbers. From a methematical point of view, the the set of real numbers can be viewed as a number line stretching from minus infinity to plus infinity as illustrated below.

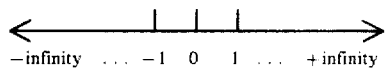

Each point from the infinite set of points on this line represents a unique real number. The real numbers that can be represented exactly by short-real, real, and temporary-real operands form a finite set of discrete points along this number line. Note that the values represented by character, short-ordinal, ordinal, short-integer, or integer operands also form a finite set of discrete points along this number line. All of the values that can be represented exactly by these data types can be represented exactly by real or temporary-real operands, and most can be represented exactly by short-real operands. Only a few ordinal and integer values can be approximated by short-real operands.

The design of the floating-point architecture is based on a particular model of floating point computation. This model assumes that any computation begins with a set of source values that are represented by either short-real or real operands. The programmer selects the representation for these values, depending on the precision or exponent range required. The values produced by the computation are also represented by short-real or real operands. Again the programmer makes the choice, depending on the precision or exponent range required in the results. The model further assumes that any intermediate result that is generated during the computation is represented by a temporary-real operand. The additional precision provided by the temporary-real values allows for much more precision in the final results than if short-real or real values were used as intermediates. At the same time, the extended exponent range allows computations to continue that might otherwise have been halted because the exponent range of a short-real or real operand was not sufficient to hold the exponent of an intermediate result.

The set of operators associated with the floating-point data types is structured to support the computational model described above. All of the order-three arithmetic operators produce results that are temporary-real values. Also, each of these arithmetic operators has three forms, which allows mixing the precisions of the source operands. For example, there are three operators for addition of short-real operands. One adds two short-real operands, another adds a short-real operand to a temporary-real operand, and the third adds a temporary-real operand to a short-real operand. All three produce temporary-real results. The advantage of this type of structure can be seen in the following program fragment that might be used as part of a statistical calculation that requires the sum of the elements of a vector and the sum of the squares of the elements.

```
SUM : = SUM + A(I);
SUMOFSQ : = SUMOFSQ + A(I) * A(I);
```

Assume that the variable A represents a vector of short-real values. The variable SUM accumulates the vector sum, and the variable SUMOFSQ accumulates the sum of the squares. These two results are temporary-real values in order to maintain as much precision as possible during the calculation. The two statements are part of a loop that increments the vector index I each time the loop is executed. The single operator ADD TEMPORARY REAL—SHORT REAL is all that is required for the first statement. Note that the name of the operator specifies the types of the two source operands. The second statement needs only two operators: MULTIPLY SHORT REAL—SHORT REAL and ADD TEMPORARY REAL—TEMPORARY REAL.

6.2 ROUNDING MODES

As described above, floating-point operands within the system represent discrete points along the real number line. When certain floating-point operators are executed, the exact result may be a real number that cannot be represented by a floating-point operand of the type produced by the operator. In this case the result must be rounded to one of the two representable floating-point values on either side of the true result. The floating-point architecture provides explicit control over the manner in that this rounding is done.

Four different rounding modes are supported. The type of rounding normally used is the unbiased form of rounding called round even. In this case the true result is rounded to the nearest representable floatingpoint value. If the true result lies along the number line exactly halfway between the two representable values on either side of it, the true result is rounded to the representable value whose least significant mantissa bit is zero.

The three other types of rounding are supported to provide the programmer with more control over floating-point computations. For example, this capability makes it possible to program interval arithmetic in software in a relatively straightforward way. In very simple terms, the interval arithmetic requires that each step of a floating-point computation produces an interval (i.e., an upper and lower bound) that is certain to contain the true result. The two types of rounding required by interval arithmetic are, therefore, round toward positive infinity (round up) and round toward negative infinity (round down). Whenever the true result of a floating-point operator lies between two representable floating-point values, rounding up will produce the algebraically smaller value. If the true result falls exactly on a representable value, both rounding up and rounding down will produce that same true result after rounding.

The final type of rounding that is supported is round toward zero or truncate. Whenever the true result lies between two representable floating-point values, truncating will produce the representable value that is algebraically closer to zero. If the true result falls exactly on a representable value, then truncating will produce that same true result after rounding.

The programmer can control the type of rounding that the processor uses by executing an instruction containing the SET CONTEXT MODE operator, which is described in detail under the heading "GENERALIZED DATA PROCESSOR OPERATOR SET." The result of executing this instruction is to cause a change in the setting of context status field of the current context control segment (see Section 4.6.2.1). The control bits that are changed and the manner in which they are changed are specified by the operand in the instruction. To control the type of rounding, the programmer must provide the proper operand so that the rounding control bit becomes set to the desired value. The interpretation of the rounding control bits is as follows:

00—round even
01—round up
10—round down
11—truncate

Note that the context control segment of the current context is normally accessible from within the context, making it possible to read or write the context status field in that segment with standard data manipulation operators. If the rounding control bits were to be written in such a manner, they would indeed be changed in the context control segment, but the change would not be reflected in the rounding control bits within the processor and therefore would not change the manner in which rounding was being done. In addition, the programmer's change to the status field could subsequently be overwritten by the processor in a manner that is totally outside of the programmer's control. Whenever control exists from the current context, the settings of control bits within the processor are written to the status field. When control reenters the context, the control bits in the processor are reset from these saved values. Since this change of control is often initiated by activities outside the context, the programmer has no way of knowing when changes he might have made have been overwritten. Only by using the SET CONTEXT MODE operator to set control bits within the context status field can the programmer be guaranteed deterministic behavior. As long as the programmer never changes the context status field by using any other operator, the setting of the control bits within the processor is always the same as the setting of the bits in the status field. As a result, if it is necessary to read the control bits, they can be read directly from the status field, and a special operator to read the control bits within the processor is not required.

The specific operators that are affected by the setting of the rounding control bits in the processor are indicated in the complete description of the operator set under the heading "GENERALIZED DATA PROCESSOR OPERATOR SET."

6.3 PRECISION CONTROL

In addition to controlling the type of rounding used during the execution of floating-point operators, the programmer can control the precision to which temporary-real results are rounded. The precision control bits in the processor, which are similar to the rounding control bits described above, affect the execution of any operator that produces a temporary-real result. These bits indicate whether the mantissa of the result is to be rounded to temporary-real precision (64 bits), real precision (53 bits), or short-real precision (24 bits). The type of rounding used is dictated by the setting of the rounding control bits. After the rounding has taken place, the low-order 40 mantissa bits in the case of the short-real precision and the low-order 11 mantissa bits in the case of real precision are zero.

The precision control bits are controlled by the user in a manner similar to that described above for the rounding control bits. The SET CONTEXT MODE operator is used to set the precision control bits to the desired values. The bits are set both in the processor and in the context status field of the context control segment. The interpretation of the precision control bits is as follows:

00—temporary-real precision
01—real precision
10—short-real precision
11—reserved The specific operators that are affected by the setting of these control bits are indicated in the operator descriptions under the heading "GENERALIZED DATA PROCESSOR OPERATOR SET."

6.4 FLOATING POINT EXECPTIONS

During the execution of the floating-point operators, a number of exceptions may arise. The processor detects these exceptions and acts on them in an appropriate manner. In most instances part of the action is to cause a fault to occur and therby invoke the fault handling mechanism, which is described in Section 5.3. All of the faults that are of concern here are computational faults in the class of context-level faults.

The five exceptions detected and handled are: invalid operand, overflow, underflow, divide by zero, and domain error. Each of these exceptions is described in turn in the following sections. Sections 4.6.2.1 and 5.3.3.4 define the information that is stored by the processor whenever a computational fault occurs. This information is stored in the context control segment where it is available to a software fault handler. Where appropriate, the discussion of an exception includes specifying particular values that are stored as part of this information. The exceptions that may arise during the execution of each floating-point operator are detailed in the complete operator descriptions under the heading "GENERALIZED DATA PROCESSOR OPERATOR SET."

6.4.1 Invalid Operand

The invalid operands for each of the three floating-point data types are described under the heading "GENERALIZED DATA PROCESSING." If any operand of a floating-point arithmetic or conversion operator is invalid, the execution of the operator is suppressed, and an invalid operand fault occurs. The value stored as the exceptional result in the context control segment is undefined.

Additional information is stored in the context control segment that provides information about the two source operands in the case of order-3 operators and about the single source operand in the case of order-2 operators. This information is encoded as part of the fault code. Note that future revisions of this description will specify the particular encoding of operand source information within the fault code. Information is provided about an operand whether it was actually found to be invalid or not. A small set of invalid operands are recognized by the processor as being of special interest, and if one of these special invalid operands is detected, it is so noted in the encoded fault code information. The eight valid and invalid conditions that are recognized and recorded for each source operand, whether short-real, real, or temporary-real, are:

(1) valid zero value
(2) valid positive value
(3) valid negative value
(4) invalid-sign bit = 0
   exponent = all 1's
   mantissa = all 1's
(5) invalid-sign bit = 1
   exponent = all 1's
   mantissa = all 1's
(6) invalid-sign bit = 1
   exponent = all 0's
   mantissa = all 0's
(7) all other positive invalid formats
(8) all other negative invalid formats In order to make use of this source operand information, the software fault handler could assign a unique meaning to each of the special invalid operands. For example, plus and minus infinity might be assigned to the fourth and fifth representations in the list above. If division by zero should occur, the fault handler could store a result of infinity with proper sign. Should that result be used subsequently as a source operand for some other floating-point operator, an invalid operand fault would occur. At that time, the software fault handler would have sufficient information available about the source operands to generate some meaningful result. For example, a meaningful result for dividing a valid positive operand by positive operand infinity would be a value of zero. It is important to be able to continue with computations in this manner, and the capability of the processor to recognize invalid operands and to provide the fault data described here makes writing the required software a much simpler task.

6.4.2 Overflow

Floating-point overflow occurs whenever a floating-point operator produces a result whose exponent is algebraically too large to be represented within the exponent field of the result operand. In particular, temporary-real overflow occurs only as a consequence of executing a floating-point arithmetic operator that produces a temporary-real result and then only if the exponent of that result is greater than 16,383. Real overflow and short-real overflow occur only as a consequence of executing conversion operators that convert from floating-point source operands having longer exponent fields than the result. Real overflow occurs if the exponent of the source is greater than 1023, and short-real overflow occurs if the exponent of the source is greater than 127.

Whenever floating-point overflow is detected, a fault occurs. An exceptional result is written into the context control segment as part of the fault data that is normally stored after the occurence of a context-level fault. In the case of a temporary-real overflow fault, the exceptional result is a temporary-real value whose mantissa is the correct, properly rounded mantissa of the overflowed result. The exponent of the stored result is 32,767 less than the correct exponent.

A similar kind of exceptional result could be stored in the case of short-real or real overflow faults. A wrapped-around exponent as described above, however, is not meaningful in the case of overflow caused by conversion operators, as it is in the case of overflow caused by arithmetic operators. Therefore, the exceptional result that is stored in the context control segment is the value of the source operand referenced by the instruction causing the fault.

6.4.3 Underflow

Floating-point underflow is very similar to floating-point overflow as described above. It occurs whenever a floating-point operator produces a result whose exponent is algebraically too small to be represented within the exponent field of the result operand. As with overflow, temporary-real underflow occurs only as a consequence of executing a floating-point arithmetic operator that produces a temporary-real result and then only if the exponent of the result is less than −16,383. Real underflow and short-real underflow can occur only as a consequence of executing conversion operators that convert from floating-point source operands having longer exponent fields than the result. Real underflow occurs if the exponent of the source is less than −1022, and short-real underflow occurs if the exponent of the source is less than −126.

Whenever floating-point underflow is detected, one of two possible actions is taken. The particular action is determined by the setting of the processor's underflow control bit. As with the two other control bits described earlier in this chapter, the setting of this bit is controlled by the SET CONTEXT MODE operator, which sets the bit both in the processor and in the context status field of the context control segment. The possible actions are that a fault occurs or that gradual underflow is performed. The corresponding settings of the underflow control bit are:

0—fault on underflow
1—perform gradual underflow

With gradual underflow, the result produced by the operator is allowed to become unnormalized. In most cases, these unnormalized results would participate in the remainder of the calculation in much the same manner as would normalized operands. Note that the technique of gradual underflow is still in development. Future revisions of this document will provide a complete description.

When the underflow control bit indicates that a fault should occur on underflow, the procedure is much the same as described above for overflow. In the case of temporary-real underflow, an exceptional result is stored in the context control segment. This is a temporary-real value whose mantissa is the correct, properly rounded mantissa of the true result. The exponent is in wrapped-around form. The exponent of the stored result is 32,767 greater that the correct exponent. With shortreal or real underflow, the exceptional result that is stored is the value of the source operand referenced by the instruction that caused the fault.

6.4.4 Divide by Zero

If any floating-point division operator encounters a zero divisor, the execution of the operator is suppressed, and a divide-by-zero fault occurs. The value stored as the exceptional result in the context control segment is undefined. The source operand information, as described above with invalid operand exceptions, is stored as part of the fault code in the context control segment.

6.4.5 Domain Error

Domain errors occur when an attempt is made to execute an operator with an operand for which the operator has no defined result. The following is a list of the possible domain error exceptions.

1. Attempting to divide by an unnormalized value.
2. Attempting to take the square root of a negative value.
3. Attempting to take the square root of an unnormalized value.
4. Attempting to convert an unnormalized temporary-real operand to a short-real or real result when the value of the temporary-real exponent is greater than −126 in the case of converting to short real and greater than −1022 in the case of converting to real. (Note that converting unnormalized temporary-real operands to short-real or real results always produces an exception. If the conditions described for a domain error exception are not satisfied, then an underflow exception occurs.)
5. Attempting to convert an unnormalized temporary-real operand to any data type other than short-real or real when the temporary-real operand would not naturally convert to zero.

When a domain error is detected, the execution of the operator is suppressed, and a domain error fault occurs. The value stored as the exceptional result in the context control segment is the value of the operand that caused the fault (i.e., the value of the divisor in the first case above and the value of the single source operand in the other four cases). Also, the source operand information is described above with invalid operand exceptions is stored as part of the fault code in the context control segment.

6.5 FLOATING-POINT REMAINDER CALCULATION

There is one particular floating-point calculation supported by the system floating-point architecture that requires special discussion. This is the calculation of the floating-point remainder after dividing two floating-point operands. This function is particularly useful, for example, in reducing the argument of a periodic function (e.g., sine, cosine, etc.) to a prescribed interval before calculating the function value.

The behavior of this calculation is best described in terms of an example. Consider the case of dividing 2101.5 by 51 using decimal arithmetic. The calculation, using long division, is:

$$\begin{array}{r} 41. \phantom{000} \\ 51\overline{\smash{)}2102.5} \\ \underline{204\phantom{00}} \\ \text{first partial remainder} \phantom{00} 62.5 \\ \underline{51\phantom{0}} \\ \text{second partial remainder} \phantom{00} 11.5 \end{array}$$

Each step of the division algorithm generates one digit in the quotient and a partial remainder. The remainder of interest is the partial remainder that results when the last digit of the integer part of the quotient has been generated (the second partial remainder in the example). Note that this partial remainder is the first one that is less than the divisor. Note also, that as the value of the divident increases, and the value of the divisor decreases, the number of digits that must be generated in the integer part of the quotient increases.

As described above the calculation of the remainder requires performing steps of the division algorithm until the last digit of the integer part of the quotient has been generated. In the case of temporary-real operands, the number of required steps could be quite large. For example, consider the case in which the exponent of the dividend is 16,383 (the largest possible exponent). Assume that the mantissa of each has the value of 1. The quotient in this case has an exponent of 32,766 or, in other words, an integer part that is effectively 32,766 bits long. If we assume that 64 division steps are required in a normal floating-point division operation, calculating the remainder in this case is equivalent to approximately 500 division operations. Because the time required to calculate a remainder is potentially very large, a single operator that produces the floating-point remainder from two floating-point source operands is not feasible. External events, such as interprocessor communications or alarm indications, are accepted by a processor only after the completion of the currently executing instruction. Not being able to respond to such events for an arbitrarily long period of time is not acceptable.

The TEMPORARY-REAL REMAINDER operator has been designed with the above problems in mind. It provides a very basic capability that allows the remainder function to be programmed in software. In addition, the time associated with executing the operator is approximately the same as that for a normal temporary-real division.

Each time the remainder operator is executed, one step of the division algorithm is iterated until a fixed number of quotient bits have been obtained or until the desired remainder has been generated. The later condition is recongized by the processor when a generated pertial remainder is less than the divisor. The result that the operator produces is the last partial remainder that it generated before it reaches the iteration limit or before it generated a partial remainder that was less than the divisor. Note that the partial remainder in the first case is precisely the dividend required to continue the calculation by executing the remainder operator again.

It should now be clear how this remainder operator could be used in a programmed loop to calculate the floating-point remainder from an arbitrary dividend and divisor. The following program fragment illustrates the loop in a pseudo-assembly language assuming all positive operands.

| L1: | "remainder" | X, Y, X |
| | "greater than" | Y, X, stack |
| | "branch FALSE" | stack, L1 |

The variables X and Y are temporary-real operands that correspond to the dividend and divisor, respectively. The first instruction uses the TEMPORARY REAL REMAINDER operator to calculate a partial remainder and store it back into X. The next instruction compares Y and X, and if Y is greater than X, a boolean TRUE is pushed onto the operand stack. Otherwise, FALSE is pushed onto the stack. The final instruction tests the top of the stack and branches back to L1 if the boolean was FALSE. The loop continues until the boolean becomes TRUE, indicating that the partial remainder X is less than the divisor Y, at which time X is the desired result.

7.0 GENERALIZED DATA PROCESSOR INSTRUCTIONS

The instructions of a generalized data processor are encoded into a common format that allows the interpretation of each instruction to proceed in a single, logical sequence. An instruction consists of a series of fields that are organized to present information to the processor as it is needed. Decoding of these fields proceeds as follows: decode the number of operands and the length of each; decode the operand addresses and fetch the source operands; finally, decode the operation, perform it, and store any result.

The general instruction format contains four fields: the class, format, reference, and op-code fields. These fields are stored in memory in the following format.

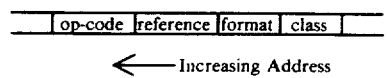

← Increasing Address

The following four sections explain the encoding of each of these fields. The fifth and final section provides a detailed description of the actions of a processor as it interprets instructions from its current instruction segment.

7.1 CLASS FIELD

The operator set is separated into classes based on the order of the operator and the length of each operand. The first field of every instruction specified the class of the operation to be performed.

Table I displays the classes of operators defined in an 8800 generalized data processor. For each operator order, the available operand lengths and the corresponding class encoding is shown. The abbreviations d, db, w, dw, and ew represent byte, double-byte, word, double-word, and extended-word operands, respectively. A branch entry in the operand length column indicates that operators in that class require a branch reference. The number of operators in each class and the class's format field field type are also shown. If a processor decodes the reserved class field in an instruction stream, an instruction class fault will occur. In the next section, the format field types are explained.

7.2 FORMAT FIELD

The location of each data operand required by an operator may be specified either by an implicit data reference or by an explicit data reference. An implicit data reference implies the top of the current operand stack as the logical address of the operant. An explicit data reference supplies a logical address in the instruction reference field to directly select the operand. The format field encodes the way in which data operands are mapped to either top-of-stack references or explicit data references.

Table II displays the possible reference formats and their corresponding format field encodings. For each reference format, the table shows how each data operand is to be referenced, with source operands given first. The abbreviations ref1, ref2, and ref3 indicate that the data operand is referenced through the first, second, or third explicit reference, respectively, defined in the instruction reference field. The abbreviation stk indicates that the data operand is to be either pushed or popped from the top of the operand stack.

TABLE I

| | Instruction class field encoding | | | |
|---|---|---|---|---|
| ORDER | OPERAND LENGTHS | CLASS ENCODING | OPERATORS IN CLASS | FORMAT TYPE |
| 0 | none | 001110 | 1 | none |
| | branch | 101110 | 1 | none |
| 1 | b, branch | 0000 | 2 | A |
| | b | 011110 | 3 | A |
| | db | 111110 | 14 | A |
| | w | 000001 | 4 | A |
| | dw | 100001 | 2 | A |
| | ew | 010001 | 2 | A |
| 2 | b, b | 110001 | 6 | B |
| | b, db | 001001 | 1 | C |
| | db, b | 101001 | 8 | C |
| | db, db | 1000 | 21 | B |
| | db, w | 011001 | 4 | C |
| | db, dw | 111001 | 2 | C |
| | db, ew | 000101 | 2 | C |
| | w, b | 100101 | 6 | C |
| | w, db | 010101 | 3 | C |
| | w, w | 0100 | 13 | B |
| | w, ew | 110101 | 3 | C |
| | dw, b | 001101 | 4 | C |
| | dw, dw | 101101 | 3 | B |
| | dw, ew | 011101 | 1 | C |
| | ew, b | 111101 | 4 | C |
| | ew, w | 000011 | 3 | C |
| | ew, dw | 100011 | 1 | C |

TABLE I-continued

Instruction class field encoding

| ORDER | OPERAND LENGTHS | CLASS ENCODING | OPERATORS IN CLASS | FORMAT TYPE |
|---|---|---|---|---|
| | ew, ew | 010011 | 4 | B |
| 3 | b, b, b | 110011 | 10 | D |
| | db, db, b | 1100 | 10 | E |
| | db, db, db | 0010 | 27 | D |
| | w, db, w | 001011 | 3 | D |
| | w, w, b | 1010 | 8 | E |
| | w, w, w | 0110 | 14 | D |
| | w, w, ew | 101011 | 4 | E |
| | w, ew, ew | 011011 | 4 | D |
| | dw, dw, b | 111011 | 4 | E |
| | dw, dw, ew | 000111 | 4 | E |
| | dw, ew, ew | 100111 | 4 | D |
| | ew, w, ew | 010111 | 4 | D |
| | ew, dw, ew | 110111 | 4 | D |
| | ew, ew, b | 001111 | 4 | E |
| | ew, ew, ew | 101111 | 5 | D |
| | reserved | 011111 | | |
| | reserved | 111111 | | |

TABLE II

Format field encodings

| ORDER | FORMAT TYPE | OPERAND 1 | OPERAND 2 | OPERAND 3 | EXPLICIT REFERENCES | ENCODING |
|---|---|---|---|---|---|---|
| 0 | none | ref1 | — | — | | |
| 1 | A | ref1 | — | — | 1 | 0 |
| | | stk | — | — | 0 | 1 |
| 2 | B | ref1 | ref2 | — | 2 | 00 |
| | | ref1 | ref1 | — | 1 | 10 |
| | | ref1 | stk | — | 1 | 01 |
| | | stk | ref1 | — | 1 | 011 |
| | | stk | stk | — | 0 | 111 |
| | C | ref1 | ref2 | — | 2 | 00 |
| | | ref1 | stk | — | 1 | 10 |
| | | stk | ref1 | — | 1 | 01 |
| | | stk | stk | — | 0 | 11 |
| 3 | D | ref1 | ref2 | ref3 | 3 | 000 |
| | | ref1 | ref2 | ref2 | 2 | 0010 |
| | | ref1 | ref2 | ref1 | 2 | 1010 |
| | | ref1 | ref2 | stk | 2 | 100 |
| | | ref1 | stk | ref2 | 2 | 0110 |
| | | stk | ref1 | ref2 | 2 | 1110 |
| | | ref1 | stk | ref1 | 1 | 0001 |
| | | stk | ref1 | ref1 | 1 | 1001 |
| | | ref1 | stk | stk | 1 | 0101 |
| | | stk | ref1 | stk | 1 | 1101 |
| | | stk1 | stk2 | ref1 | 1 | 0011 |
| | | stk2 | stk1 | ref1 | 1 | 1011 |
| | | stk1 | stk2 | stk | 0 | 0111 |
| | | stk2 | stk1 | stk | 0 | 1111 |
| | E | ref1 | ref2 | ref3 | 3 | 000 |
| | | ref1 | ref2 | stk | 2 | 100 |
| | | ref1 | stk | ref2 | 2 | 010 |
| | | stk | ref1 | ref2 | 2 | 110 |
| | | ref1 | stk | stk | 1 | 001 |
| | | stk | ref1 | stk | 1 | 101 |
| | | stk1 | stk2 | ref1 | 1 | 0011 |
| | | stk2 | stk1 | ref1 | 1 | 1011 |
| | | stk1 | stk2 | stk | 0 | 0111 |
| | | stk2 | stk1 | stk | 0 | 1111 |

For the order-three formats, the abbreviations stk1 and stk2 in the source operand columns indicate that the data operand is loaded from either the top or next-to-top element on the stack, respectively. The column labeled EXPLICIT REFERENCES in the table specified how many explicit references are required in the instruction reference field by that format.

The order-zero instructions do not require any data references and, as a result, do not have a format field. The order-three formats are encoded to allow either source operand to come from either stack element when both sources come from the stack. In this way, the ordering of operands on the stack does not restrict the use of the noncommutative order-three operators.

7.3 REFERENCE FIELD

The reference field of an instruction provides the explicit data references indicated by the format field and, for branch operators, the branch reference for the target instruction. A branch reference in the reference field follows any data references that might also be in the same field.

7.3.1 Data References

Since a data reference is simply an encoding of a logical address, it must provide both the segment selector component and the operand-displacement component of the logical address. Each of these components may be specified in different ways, and this provides a powerful addressing mechanism that allows flexible and efficient access to a variety of data structures. The two components of the logical address are discussed in the following two sections. Then the next four sections describe how these components are combined to build each of the four types of data references.

7.3.1.1 Segment Selector Component

Within any data reference the segment selector may be specified in two different ways, as a direct segment selector or as an indirect segment selector. A director segment selector appears directly within the data reference as a 4-bit or 8-bit field. The low-order two bits select one of a domain's four access descriptor lists. These two bits are interpreted in the following manner:

00—context access list
01—public access list
10—private access list
11—entry access list The remaining high-order bits in the segment selector field provide an index into the selected list for the access descriptor to be used in forming the physical address.

If the segment selector component is specified indirectly, then the data reference contains information to locate a short ordinal within a currently accessible data segment. The value of this short ordinal is used as the segment selector. In the same manner as described above for direct segment selectors, the low-order two bits of this short-ordinal value select one of a domain's four access lists, and the remaining high order 14 bits select from that access list the access descriptor to be used in forming the physical address.

Each of the four types of data references contains a segment selector field along with a two-bit segment selector control field, which indicates the structure of the segment selector field. The following shows the structure of these fields for direct segment selectors. In this and all subsequent representations of the data reference formats, the least significant bit of a field is shown on the right. When a single-bit field is used to select the length of another field, a 0 bit selects the shorter length, and a 1 bit selects the longer length.

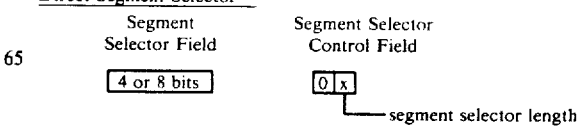

Direct Segment Selector

Segment Selector Field — Segment Selector Control Field

| 4 or 8 bits |    | 0 | x | segment selector length

The 0 in the high-order bit of the segment selector control field indicates that the segment selector field contains a direct segment selector, and the low-order bit of the control field specifies the length of the segment selector.

An indirect segment selector must provide sufficient information to locate the short-ordinal that contains the segment selector value. The short ordinal may be located on top of the operant stack. The segment selector control field indicates when this is the case, and the segment selector field itself does not exist. Alternatively, the short ordinal may be located in some other accessible data segment. In this case the segment selector field contains a direct segment selector, which specified the segment containing the short ordinal, and a displacement field, which gives the byte displacement from the beginning of the segment to the short-ordinal value. The two types of indirect segment selectors are illustrated below.

Operand Stack Indirect Segment Selector

| Segment Selector Field | Segment Selector Control Field |
|---|---|
| None | [1][0] |

General Indirect Segment Selector

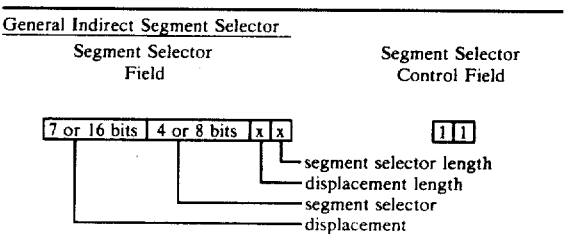

7.3.1.2 Displacement Component

As with the segment selector component, the operand displacement component of a logical address may be specified in more than one way. Its encoding in a data reference consists of two parts, a base part and an index part. This partitioning of the operand displacement leads to viewing a logical address as conceptually having three components. The segment selector component selects a segment, the base part provides a byte displacement to the base of an area of memory within the selected segment, and the index part specifies a particular operand within that area. Accessing flexibility is provided by allowing each part of the operand displacement to be given either directly or indirectly. A direct base or direct index has its value given directly in the data reference. When indirection is used, the value of the base or index is given by a short-ordinal value located within a currently accessible segment. There are four possible combinations of direct and indirect base and index parts, and each combination results in a different type of data reference. Each of these types has been named to give an indication of the kind of data structures for which the reference would typically be used. After the following description of the formats for indirect base and indirect index references, each type of data reference is described in detail.

When indirection is used to specify the base or index parts of the operand displacement component of a logical address, the data value that supplies the actual base or index may be located in any one of three different ways. The base or index value may be on top of the operand stack. In such a case no additional information is needed to locate the value. The base or index may be located anywhere within the same segment specified by the direct or indirect segment selector given at the beginning of the full-data reference. In this case only the byte displacement from the base of that segment to the base or index value needs to be given in the indirect reference. Finally, the base or index may be located anywhere within any accessible segment in the domain's current access environment. Both a direct segment selector and a byte displacement from the base of that segment to the base or index value must be given in the indirect reference. The three different types of indirect references are illustrated below.

Operand Stack Indirect Reference

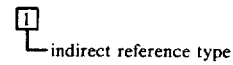

Intrasegment Indirect Reference

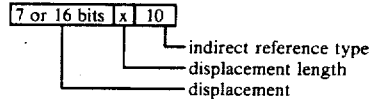

General Indirect Reference

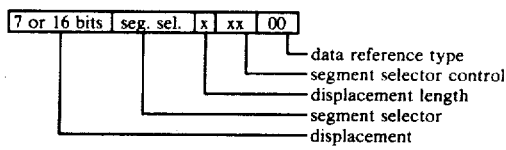

7.3.1.3 Scalar Data References

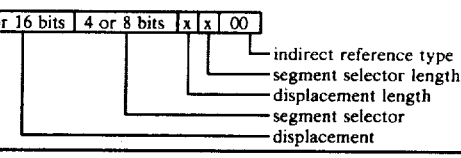

Converting a scalar reference to a logical address proceeds by simply using the directly or indirectly specified segment selector and the value in the displacement field as the segment selector and operand displacement components of the logical address.

7.3.1.4 Static Vector Element Data Reference

Three pieces of information are typically required in order to access an element of a statically allocated vector: the segment in which the vector is located, the byte displacement from the base of the segment to the base of the vector, and the index of the particular vector element. These three pieces of information are provided in a static vector element reference, whose format is shown below.

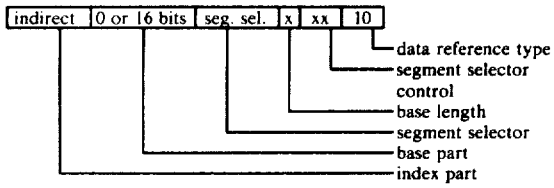

The segment in which the vector is located is given by the direct or indirect segment selector, and the byte displacement to the base of the vector is given by the 0-bit or 16-bit base part. A 0-bit base means that the base part is not present in the data reference and the value to be used for the base is zero. The index of the vector element is specified indirectly so that it can be computed during execution. If an index part has the value i, it specifies the ith element from the base of the vector, where an element can be any of the supported data types.

The conversion of a data reference to a logical address requires that this index value be converted to a byte displacement from the base of the vector. A processor automatically scales an index value by multiplying the index value by 1, 2, 4, 8, or 16, depending on whether the operand type occupies a byte, double-byte, word, double-word, or extended word, respectively. Note that because of the manner in which scaling is done, when vectors of temporary-real values are accessed with data references that automatically scale the index, each element is treated as if it were 16 bytes long, but only the first 10 bytes are actually read or written.

Converting the data reference to a logical address proceeds by using the value of the directly or indirectly specified segment selector as the segment selector component of the logical address. The operand displacement component is simply the sum of the value of the base part and the scaled value of the indirect index part. If the 16-bit scaling operation or the 16-bit addition operation produces an overflow, a data segment displacement fault occurs.

7.3.1.5 Record Item Data References

Accessing a data item within an instances of a record requires three pieces of information: the segment in which the record instance is located, the byte displacement from the base of the segment to the base of the particular record instance, and the byte displacement within the record to the data item. The record item data reference, whose format is shown below, was designed for this kind of access.

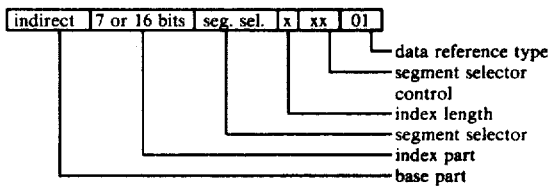

The segment in which the record instance is located is given by the direct or indirect segment selector. The byte displacement to the base of the record instance is given indirectly so that the particular record instance to be accessed can be computed during execution. The index part provides the fixed-byte displacement from the beginning of the record to the data item of interest.

Converting a record item reference to a logical address proceeds by using the value of the directly or indirectly specified segment selector as the segment-selector component of the logical address. The operand-displacement component is simply the sum of the values of the indirect base part and the index part. If the 16-bit addition operation produces an overflow, a data segment displacement fault occurs.

7.3.1.6 Dynamic Vector Element Data References

Accessing an element of a dynamically allocated vector is the same as accessing an element of a statically allocated vector except that the byte displacement to the base of the vector may be computed during execution. A data reference with both the base part and the index part specified indirectly is provided for this type of access. Its format is as follows:

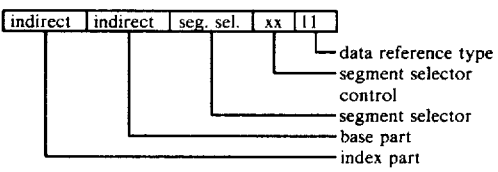

The segment-selector component of the logical address is simply the value of the directly or indirectly specified segment selector. The operand displacement component is the sum of the value of the indirect base part and the scaled value of the indirect index part. If the 16-bit scaling operation or the 16-bit addition operation produces an overflow, a data segment displacement fault occurs.

7.3.2 Branch References

A branch reference provides the logical address of an instruction that is the target of a branch operator. Two types of branch references are provided: relative-branch references and absolute-branch references. The relative-branch reference provides a 10-bit signed integer value that is used as the bit displacement to the target instruction relative to the beginning of the instruction containing the branch operator. The absolute branch reference provides a 16-bit unsigned integer value that is the bit displacement from the base of the current instruction segment to the target instruction. The format for a branch reference is shown below. The length bit specifies by implication whether the reference is relative or absolute.

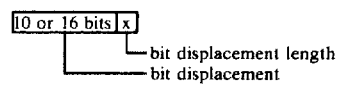

7.4 OP-CODE FIELD

The last field of the instruction is the op-code field. This field selects which of the operators in the class specified by the class field is to be performed.

7.5 INSTRUCTION INTERPRETATION

Before the individual instructions of an operation can be interpreted by a processor, appropriate process, domain, and operation information must be loaded into the processor's registers. This forms an access environment in which logical addresses from the instruction stream can be translated to the physical addresses that reference memory. Whenever a new instruction segment descriptor is loaded, the length of the segment is checked to ensure that it does not exceed the maximum length of 8192 bytes allowed for instruction segments. If the new instruction-segment length exceeds this limit, an instruction-segment-length fault occurs.

Once a proper access environment has been established, the processor begins to interpret the instruction referenced by the current value of the instruction pointer. If any attempt is made to access instruction information lying outside of the boundaries of the current instruction segment, an instruction-segment-displacement fault occurs. As an instruction is fetched from memory, each of its several fields is decoded, the logical addresses for the required operands are converted to physical addresses, the required source operands are read from memory, the hardware operation specified by the operator is executed, and any result that is generated is written back into memory in the destination address specified by the instruction.

7.5.1 Physical Address Generation

As the reference field of an instruction is decoded by a processor, each data reference is converted to a logical address as described above. Since the conversion process for some types of data references requires data values from memory, this conversion may generate additional logical addresses. Each of these logical addresses must in turn be converted to physical addresses.

The following subsections describe the sequence of steps that must be carried out in order to generate a physical address.

7.5.1.1 Segment Selector Search

Physical address generation begins by associatively searching the segment-selector field of the processor's segment-descriptor registers for a segment-selector component of the logical address. If it is not found, a segment-descriptor register must be loaded with access information for the segment. The procedure for loading a segment-descriptor register is described subsequently. If the selector is found and the reference involves a write operation and the altered bit of the selected segment-descriptor register is zero, the access descriptor for the segment must be reread in order to locate the associated segment descriptor and update its altered bit. If either of the two conditions does not hold, the formation of the physical address continues as described in section 7.1.5.9.

7.5.1.2 Access Descriptor Qualification

Given that a segment-descriptor register must be loaded with access information for the segment and an unused register is not available, the least-recently-used register is cleared and its segment-selector field is loaded with the new selector. The segment selector is used as an index line into one of the four current access lists. If the index lies outside of the selected access list, an access-list-displacement fault occurs. Otherwise, the directory-index field, the segment-index field, the valid bit, and the access-rights field are read from the selected access descriptor and saved internally by the processor. If the valid bit just read is zero, an access-descriptor-validity fault is generated.

7.5.1.3 Directory Index Search

Given a valid access descriptor, the conversion continues by associatively searching the directory-index field of the processor'segment-table registers for the directory index read from the access descriptor. If the index is found, the formation of the physical address continues as described subsequently. Otherwise, a segment-table register is loaded with access information for the selected segment table.

7.5.1.4 Segment-Directory Register Reload

If an unused register is not available, the least-recently-used register is cleared to provide register space for the new segment-table-access information. The directory index is used as an index into the processor's current segment-table directory. If this index lies outside of the directory, a directory-displacement fault is generated. Otherwise, the valid bit, the storage-associated bit, the base-address field, the length field, the accessed bit, and the type fields are read and saved internally by the processor.

7.5.1.5 Segment-Table Descriptor Qualification

If the storage-associated bit is zero, the address development is aborted and a no-storage-associated fault is generated. The valid bit is checked and if it is zero, a segment-descriptor-validity fault is generated. Given a valid segment descriptor, the type information for the selected segment is checked next. If the selected segment is not a segment-table segment, a segment-table-type fault occurs. Otherwise, the accessed bit for the selected segment is checked. If the accessed bit is zero, it is rewritten to indicate that the associated segment has been accessed and the base address, the length, and the directory index are loaded into the selected segment-table register.

7.5.1.6 Segment-Descriptor Register Reload

If the associative search for the segment-table register is successful, or after the desired segment-table-access information has been loaded into a segment-table register, the segment-descriptor register can be loaded with access information for the segment. The segment index obtained from the access descriptor is used as an index into the selected segment table. If this index lies outside of the table, a segment table displacement fault is generated. Otherwise, the valid bit, the storage-associated bit, the base-address field, the length field, the referenced bit, the altered bit, and the type fields are read and held internally by the processor.

7.5.1.7 Segment Descriptor Qualification

If the storage-associated bit just read is zero, a no-storage-associated fault is generated. Given a segment with storage associated, if the valid bit is zero, a segment descriptor validity fault is generated. Given a valid segment descriptor, the type information for the selected segment is checked. If the selected segment is not a data segment, a data-segment-type fault occurs. Given an object of the proper type, the accessed bit for the selected segment is checked. If the accessed bit is zero, it is rewritten in the segment descriptor to indicate that the associated segment has been accessed. Next, the base address, the length, the segment selector, the altered bit, an the previously read access rights are loaded into the selected segment descriptor register.

7.5.1.8 Access Right Qualification

If the associative search of the segment-descriptor registers is successful, or after the desired segment-access information has been loaded into a segment-descriptor register, the access rights for the selected segment is checked. If the selected data segment is one from which an operand is to be read, the associated access descriptor must provide read-access rights. Otherwise, a data-segment-rights fault is generated. If the selected data segment is one in which a result is to be stored, the associated access descriptor must provide write-access rights. Otherwise, a data-segment-rights fault is generated.

7.5.1.9 Displacement Qualification

The final step in forming the physical address is to check whether the operand displacement component of the logical address plus the operand length lies within the specified limits of the selected segment. This is done by comparing the sum of the displacement and the operand length to the length-field value. If the combined value is greatr than the length-field value, a data-segment-displacement fault is generated. Otherwise, the physical address formed by adding the operand displacement to the base address is used to physically reference memory. If an overflow occurs from this additional operation a data-segment-displacement fault is generated.

7.5.1.10.1 Altered Bit Update

Whenever the referenced segment is altered and the altered bit in the associated segment-descriptor register is zero, that bit and the corresponding bit in the associated segment descriptor are set to one.

7.5.2 Stack Interaction

During the interpretation of a given instruction, the operand stack may be the source for several data values. Some of these values may be used in forming logical addresses, while others may be used as actual source operands. Because of this multiple use of the stack, the order in which operand addresses are formed and operand values are fetched must be carefully specified.

There can be no operand order ambiguity with order-zero operators. This is also true with most order-one operators, with the exception of the save operators. These order-one operators read a value from the operand stack, without popping the stack, and store that value in the destination address specified by the single-data reference. As with all instructions containing order-one operators, the single-data reference is converted to a physical address before the save operation is actually executed. As a result, if the data reference has an indirect segment selector, an indirect base part, or an indirect index part that is located in the operand stack, that addressing information must be on top of the stack with the value to be saved immediately below. When the save operation is actually performed, the addressing information will have already been used and popped from the stack leaving the value to be saved as the top stack element.

In the case of order-two operators, the address of operand one is formed first. Since it is always a source operand, the associated value is fetched next, and then the address of operand two, normally a destination address, is formed. An example that illustrates the importance of understanding this ordering is given by an instruction that moves a value from the current operand stack to a location specified by a static vector data reference whose index part is also on the operand stack. Since the value of the first operand is fetched before the address of the second operand is formed, the operand stack must be configured with the value to be moved in the top stack element and the index for the destination is the next-to-top stack element.

For order-three operators, the address of operand one is formed first, and the associated value is fetched. Then the address of operand two is formed, and the associated value is fetched. Finally, the address of operand three, normally a destination, is formed.

If a single-data reference has more than one indirect part located on the operand stack, the following ordering conventions are used. If there are three indirect parts on the operand stack, the base part is nearest the top, the index part is immediately below the base part, and the segment selector is immediately below the index part. If only two indirectors are on the operand stack, this same ordering applies with the missing part deleted.

7.5.3 Execution

If all operand addresses are formed and all values fetched wihout any faults occurring, the hardware operation specified by the operator in the instruction is executed. Faults that are closely related to the actual manipulation of data may occur during this stage of instruction execution. Descriptions of these faults are contained with the detailed operator descriptions under the heading, "GENERALIZED DATA PROCESSOR OPERATOR SET."

8.0 GENERALIZED DATA PROCESSOR OPERATOR SET

The operator set contains operators to manipulate operands of each data type (character operators, short-ordinal operators, short-integer operators, ordinal operators, integer operators, short-real operators, real operators, and temporary-real operators), operators to manipulate the access environment (access environment manipulation operators), operators to alter the sequential flow of control within the instruction stream (branch operators), and operators to allow interaction between contexts, coroutines, processes, and processors (communication operators). The operators in each of these classes are described below. Each description incluees the number and type of required references, a commentary on the operation performed, and a list of the type-related faults that can occur when an instruction containing the operator is executed.

Several operator classes contain relational operators that are used to compare operands of a given type to determine if a particular relation (e.g., equal) holds between the operands. When an instruction containing such a relational operator is executed, a true/false, or boolean, result is generated. This is a value of type character that has the binary value XXXXXXX1 if the relation holds (i.e., the relation is true) and the binary value XXXXXXX0 otherwise (i.e., the relation is false). Here X is used for a bit whose value can be either 0 or 1.

Although a complete set of relational operators for each type is not explicitly provided, a full set for each type is available. This completeness is achieved through the proper use of the format field, as described previously under the heading "GENERALIZED DATA PROCESSOR INSTRUCTIONS," and through the ordering of explicit operand references within the instruction reference field.

8.1 CHARACTER OPERATORS

The character operators perform logical, arithmetic, and relational operations on character operands. These 8-bit operands are used to represent booleans, characters, or unsigned integer values in the range 0 to 255. If an arithmetic operation produces a result that cannot be represented in 8 bits, then the operation is terminated without storing a result, and a character overflow fault occurs.

8.1.1 Character Move Operators

MOVE CHARACTER     2 data references

The character at the source address is moved to the destination address. Using the operand stack as the source address results in the classical stack operation POP, and using the operand stack as the destination address results in the classical stack operation PUSH. Using the operand stack as both addresses results in no change.

ZERO CHARACTER     1 data reference

A character value of zero is moved to the destination address.

ONE CHARACTER     1 data reference

A character value of 1 is moved to the destination address.

SAVE CHARACTER     1 data reference

The character on top of the operand stack is read, without adjusting the stack, and moved to the destination address specified by the data reference. Using an implicit reference results in an operand stack configuration in which the top two locations contain the same character value.

8.1.2 Character Logical Operators

AND CHARACTER     3 data references

The logical AND of the two character source operands is placed in the destination address.

OR CHARACTER     3 data references

The logical OR of the two character source operands is placed in the destination address.

XOR CHARACTER     3 data references

The logical XOR (EXCLUSIVE OR) of the two character source operands is placed in the destination address. Note that applying this operator to two boolean operands produces a boolean result whose value is equivalent to the result of comparing the two boolean operands for inequality.

XNOR CHARACTER     3 data references

The logical XNOR (EXCLUSIVE NOR) of the two character source operands is placed in the destination address. Note that applying this operator to two boolean operands roduces a boolean result whose value is equivalent to the result of comparing the two boolean operands for equality.

COMPLEMENT CHARACTER     2 data references

The logical complement (1s complement) of the character source operand is placed in the destination address.

8.1.3 Character Arithmetic Operators

ADD CHARACTER     3 data references

Unsigned 8-bit addition is performed on the two character source operands, and the result is paced in the destination address. A character overflow fault can occur.

SUBTRACT CHARACTER     3 data references

Unsigned 8-bit subtraction is used to subtract the first character source operand from the second, and the result is placed in the destination address. A character overflow fault can occur.

INCREMENT CHARACTER     2 data references

The character source operand is incremented using unsigned 8-bit addition, and the result is placed in the destination address. A character overflow fault can occur.

DECREMENT CHARACTER     2 data references

The character source operand is decremented using unsigned 8-bit subtraction, and the result is placed in the destination address. A character overflow fault can occur.

8.1.4 Character Relational Operators

EQUAL CHARACTER     3 data references

The two character source operands are compared for equality, and the boolean result is placed in the destination address.

NOT EQUAL CHARACTER     3 data references

The two character source operands are compared for inequality, and the boolean result is placed in the destination address.

EQUAL ZERO CHARACTER     2 data references

The character source operand is compared to zero for equality, and the boolean result is placed in the destination address.

NOT EQUAL ZERO CHARACTER     2 data references

The character source operand is compared to zero for inequality, and the boolean result is placed in the destination address.

GREATER THAN CHARACTER     3 data references

An unsigned 8-bit comparison is made between the two character source operands. If the second is greater than the first, the boolean result is true. Otherwise, the result is false. The boolean result is placed in the destination address.

GREATER THAN OR EQUAL CHARACTERS     3 data references

An unsigned 8-bit comparison is made between the two character source operands. If the second is greater than or equal to the first, the boolean result is true. Otherwise, the result is false. The boolean result is placed in the destination address.

8.1.5 Character Conversion Operator

CONVERT CHARACTER TO SHORT-ORDINAL     2 data references

The character source operand is converted to a short-ordinal value by moving the source operand to the low-order byte of the short-ordinal result and setting the high-order byte to zero. The result is placed in the destination address.

8.2 SHORT-ORDINAL OPERATORS

The short-ordinal operators are used to perform logical, arithmetic, and relational operations on short-ordinal operands. These 16-bit operands are used to represent unsigned integer values in the range 0 to 65,535 and bit strings of 16 bits or less. if any arithmetic operation, except divide, produces a result that cannot be represented in 16 bits, the operation is terminated without storing a result, and a short-ordinal overflow fault occurs. If any division operation, including division by zero, would produce a result that cannot be represented in 16 bits, the operation is suppressed, and a short-ordinal divide fault occurs.

The set of short-ordinal operators contain two operators, EXTRACT and INSERT, that manipulate fields of bits. These operators require a descriptor to specify the field being manipulated. This descriptor consists of two adjacent character operands that form a double byte. The first specifies the beginning bit of the field. The bits of a short-ordinal operand are numbered with bit 0, the least-significant bit, and bit 15, the most significant bit. The beginning bit of a field is the smallest numbered bit in the field. The second character operand, which is located at the next higher address, specifies one less than the number of bits in the field. Only the low-order four bits of these character operands are interpreted by the hardware during execution. A field of any length up to 16 bits can be specified by a descriptor regardless of the beginning bit position. If a field is specified that extends beyond bit 15, bit 0 is considered to follow bit 15 in a circular fashion. Note that the sum modulo 16 of the two character operands gives the bit number of the highest numbered bit in the field. For example, a descriptor whose first character operand has the value 14 and whose second character operand has the value 3 describes a bit field consisting of 4 bits starting with bit number 14. Thus, the field consists of bit 14, bit 15, bit 0, and bit 1, with bit 14 the least-significant bit of the extracted field and bit 1 the most significant bit.

Also in the set of short-ordinal operators is an operator that aids in the manipulation of individual bits. The SIGNIFICANT BIT operator produces a result that specifies a bit position. Again bit 0 is the least-significant bit and bit 15 the most significant bit of a short-ordinal operand.

8.2.1 Short-Ordinal Move Operators

MOVE SHORT-ORDINAL    2 data references

The short-ordinal at the source address is moved to the destination address. Using the operand stack as the source address results in the classical stack operation POP, and using the operand stack as the destination address results in the classical stack operation PUSH. Using the operand stack as both addresses results in no change. Note that this operator is identical to the MOVE SHORT-INTEGER operator and is specified by the same oprator code.

ZERO SHORT-ORDINAL    1 data reference

A short-ordinal value of zero is moved to the destination address. Note that this operator is identical to the ZERO SHORT-INTEGER operator and is specified by the same oprator code.

ONE SHORT-ORDINAL    1 data reference

A short-ordinal value of 1 is moved to the destination address. Note that this operator is identical to the ONE SHORT-INTEGER operator and is specified by the same operator code.

SAVE SHORT-ORDINAL    1 data reference

The short-ordinal on top of the operand stack is read, without adjusting the stack, and moved to the destination address specified by the data reference. Using an implicit reference results in an operand stack configuration in which the top two locations contain the same short-ordinal value. Note that this operator is identical to the SAVE SHORT-INTEGER operator and is specified by the same operator code.

8.2.2 Short-Ordinal Logical Operators

AND SHORT-ORDINAL    3 data references

The logical AND of the short-ordinal source operands is placed in the destination address.

OR SHORT-ORDINAL    3 data references

The logical OR of the short-ordinal source operands is placed in the destination address.

XOR SHORT-ORDINAL    3 data references

The logical XOR of the short-ordinal source operands is placed in the destination address.

COMPLEMENT SHORT-ORDINAL    2 data references

The logical complement (1s complement) of the short-ordinal source operand is placed in the destination address.

EXTRACT SHORT-ORDINAL    3 data references

The second source operand is a short-ordinal from which a bit field is to be extractaed. The first source operand is a short-ordinal that is the descriptor used to identify the field to be extracted. The extracted bit field is right justified with high order zeros in the short-ordinal operand specified by the destination address.

INSERT SHORT-ORDINAL    3 data references

The second source operand is a short-ordinal that contains a right justified bit field to be inserted into another short-ordinal. The first source operand is a short-ordinal that is the descriptor used to specify the field in the target operand to be replaced by the inserted field. The destination address specified the short-ordinal into which the bit field is to be inserted.

SIGNIFICANT BIT SHORT-ORDINAL    2 data references

The position of the most significant set bit in the short-ordinal source operand is determined. The result is placed in the double byte referenced by the destination address. If the source operand has the value zero, the result of the operation is 16.

8.2.3 Short-Ordinal Arithmetic Operators

ADD SHORT-ORDINAL    3 data references

Unsigned 16-bit addition is performed on the short-ordinal source operands, and the result is placed in the destination address. A short-ordinal overflow fault can occur.

SUBTRACT SHORT-ORDINAL    3 data references

Unsigned 16-bit subtraction is used to subtract the first short-ordinal source operand from the second, and the result is placed in the destination address. A short-ordinal overflow fault can occur.

INCREMENT SHORT-ORDINAL    2 data references

The short-ordinal source operand is incremented using unsigned 16-bit addition, and the result is placed in the destination address. A short-ordinal overflow fault can occur.

DECREMENT SHORT-ORDINAL    2 data references

The short-ordinal source operand is decremented using unsigned 16-bit subtraction, and the result is placed in the destination address. A short-ordinal overflow fault can occur.

MULTIPLY SHORT-ORDINAL    3 data references

Unsigned 16-bit multiplication is performed on the short-ordinal source operands, and the least 16 bits of the result are placed in the destination address. A short-ordinal overflow fault can occur.

DIVIDE SHORT-ORDINAL    3 data references

Unsigned 16-bit division is used to divide the second short-ordinal source operand by the first, and the 16-bit quotient is placed in the destination address. Note that when the dividend is not an exact ordinal multiple of the divisor, the quotient is truncated toward zero (i.e., 5 divided by 2 is 2). A short-ordinal divide fault can occur.

REMAINDER SHORT-ORDINAL    3 data references

Unsigned 16-bit division is used to divide the second short-ordinal source operand by the first, and the 16-bit remainder is placed in the destination address. A short-ordinal divide fault can occur.

8.2.4 Short-Ordinal Relational Operators

EQUAL SHORT-ORDINAL    3 data references

The short-ordinal source operands are compared for equality, and the boolean result is placed in the destination address.

Note that this operator is identical to the EQUAL SHORT-INTEGER operator and is specified by the same operator code.

NOT EQUAL SHORT-ORDINAL    3 data references

The short-ordinal source operands are compared for inequality, and the boolean result is placed in the destination address. Note that this operator is identical to the NOT EQUAL SHORT-INTEGER operator and is specified by the same operator code.

EQUAL ZERO SHORT-ORDINAL    2 data references

The short-ordinal source operand is compared to zero for equality, and the boolean result is placed in the destination address. Note that this operator is identical to the EQUAL ZERO SHORT-INTEGER operator and is specified by the same operator code.

NOT EQUAL ZERO SHORT-ORDINAL    2 data references

The short-ordinal source operand is compared to zero for inequality, and the boolean result is placed in the destination address. Note that this operator is identical to the NOT EQUAL ZERO SHORT-INTEGER operator and is specified by the same operator code.

GREATER THAN SHORT ORDINAL    3 data references

An unsigned 16-bit comparison is made between the short-ordinal source operands. If the second is greater than the first the boolean result is true. Otherwise the result is false. The boolean result is placed in the destination address.

GREATER THAN OR EQUAL SHORT-ORDINAL    3 data references

An unsigned 16-bit comparison is made between the short-ordinal source operands. If the second is greater than or equal to the first, the boolean result is true. Otherwise, the result is false. The boolean result is placed in the destination address.

8.2.5 Short-Ordinal Conversion Operators

CONVERT SHORT-ORDINAL TO CHARACTER    2 data references

The short-ordinal source operand is converted to a character value by moving the low-order eight bits of the source operand to the destination address. If any of the high-order bits of the short-ordinal source operand has the value 1 the operation is suppressed and a character overflow fault occurs.

CONVERT SHORT-ORDINAL TO ORDINAL    2 data references

The short-ordinal source operand is converted to an ordinal value by moving the source operand to the low-order double byte of the ordinal result and setting the high-order double byte to zero. The result is placed in the destination address.

CONVERT SHORT-ORDINAL TO TEMPORARY-REAL    2 data references

The short-ordinal source operand is converted exactly to a temporary-real result, which is placed in the destination address. Note that the setting of the precision control bits is not used to determine the precision of the result.

8.3 SHORT-INTEGER OPERATORS

The short-integer operators perform arithmetic and relational operations on short-integer operands. These 16-bit operands represent signed integer values in the range −32,768 to 32,767 in 2s complement form. If any arithmetic operation, except division, produces a result that cannot be represented as a 16-bit 2's complement value, the operation is terminated without storing a result, and a short-integer overflow fault occurs. If any division operation, including division by zero, would produce a result that cannot be represented as a 16-bit 2s complement value, the operation is suppressed, and a short-integer divide fault occurs.

8.3.1 Short-Integer Move Operators

MOVE SHORT-INTEGER    2 data references

The short-integer at the source address is moved to the destination address. Using the operand stack as the source address results in the classical stack operation POP, and using the operand stack as the destination address results in the classical stack operation PUSH. Using the operand stack as both addresses results in no change. Note that this operator is identical to the MOVE SHORT-ORDINAL operator and is specified by the same operator code.

ZERO SHORT-INTEGER    1 data reference

A short-integer value of zero is moved to the destination address. Note that this operator is identical to the ZERO SHORT-ORDINAL operator and is specified by the same operator code.

ONE SHORT-INTEGER    1 data reference

A short-integer value of 1 is moved to the destination address. Note that this operator is identical to the ONE SHORT-ORDINAL operator and is specified by the same operator code.

SAVE SHORT-INTEGER    1 data reference

The short integer on top of the operand stack is read, without adjusting the stack, and moved to the destination address specified by the data reference. Using an implicit reference results in an operand stack configuration in which the top two locations contain the same short-integer value. Note that this operator is identical to the SAVE SHORT-ORDINAL operator and is specified by the same operator code.

8.3.2 Short-Integer Arithmetic Operators

ADD SHORT-INTEGER    3 data references

Signed 16-bit addition is performed on the short-integer source operands, and the result is placed in the destination address. A short-integer overflow fault can occur.

SUBTRACT SHORT-INTEGER    3 data references

Signed 16-bit subtraction is used to subtract the first short-integer source operand from the second, and the result is placed in the destination address. A short-integer overflow fault can occur.

INCREMENT SHORT-INTEGER    2 data references

The short-integer source operand is incremented using signed 16-bit addition, and the result is placed in the destination address. A short-integer overflow fault can occur.

DECREMENT SHORT-INTEGER    2 data references

The short-integer source operand is decremented using signed 16-bit subtraction, and the result is placed in the destination address. A short-integer overflow fault can occur.

NEGATE SHORT-INTEGER    2 data references

The short-integer source operand is negated, and the result is placed in the destination address. A short-integer overflow fault can occur.

MULTIPLY SHORT-INTEGER    3 data references

Signed 16-bit multiplication is performed on the short-integer source operands, and the least significant 16 bits of the result are placed in the destination address. A short-integer overflow fault can occur.

DIVIDE SHORT-INTEGER    3 data references

Signed 16-bit division is used to divide the second short-integer source operand by the first, and the signed 16-bit quotient is placed in the destination address. Note that when the dividend is not an exact integer multiple of the divisor, the quotient is truncated toward zero (i.e., 5 divided by 2 is 2, and −5 divided by 2 is −2). A short-integer divide fault can occur.

REMAINDER SHORT-INTEGER    3 data references

Signed 16-bit division is used to divide the second short-integer source operand by the first, and the signed 16-bit remainder is placed in the destination address. The sign of the remainder is the same as the sign of the dividend. A short-integer divide fault can occur.

8.3.3 Short-Integer Relational Operators

EQUAL SHORT-INTEGER    3 data references

The short-integer source operands are compared for equality, and the boolean result is placed in the destination address. Note that this operator is identical to the EQUAL SHORT-ORDINAL operator and is specified by the same operator code.

NOT EQUAL SHORT-INTEGER    3 data references

The short-integer source operands are compared for inequality, and the boolean result is placed in the destination address. Note that this operator is identical to the NOT EQUAL SHORT-ORDINAL operator and is specified by the same operator code.

EQUAL ZERO SHORT-INTEGER    2 data references

The short-integer source operand is compared to zero for equality, and the boolean result is placed in the destination address. Note that this operator is identical to the EQUAL ZERO SHORT ORDINAL operator and is specified by the same operator code.

NOT EQUAL ZERO SHORT-INTEGER    2 data references

The short-integer source operand is compared to zero for inequality, and the boolean result is placed in the destination address. Note that this operator is identical to the NOT EQUAL ZERO SHORT-ORDINAL operator and is specified by the same operator code.

GREATER THAN SHORT-INTEGER    3 data references

A signed 16-bit comparison is made between the short-integer source operands. If the second is greater than the first the boolean result is true. Otherwise the result is false. The boolean result is placed in the destination address.

GREATER THAN OR EQUAL SHORT-INTEGER    3 data references

A signed 16-bit comparison is made between the short-integer source operands. If the second is greater than or equal to the first the boolean result is true. Otherwise the result is false. The boolean result is placed in the destination address.

POSITIVE SHORT-INTEGER    2 data references

If the short-integer source operand is positive (greater than zero) the boolean result is true. Otherwise the result is false. The boolean result is placed in the destination address.

NEGATIVE SHORT INTEGER    2 data references

If the short-integer source operand is negative (less than zero) the boolean result is true. Otherwise the result is false. The boolean result is placed in the destination address.

8.3.4 Short-Integer Conversion Operators

CONVERT SHORT-INTEGER TO INTEGER    2 data references

The short-integer source operand is converted to an integer. The short-integer source operand is copied into the low order 16 bits of the result, and each of the high order 16 bits of the result is set to the sign bit of the short-integer source operand. The integer result is placed in the destination address.

CONVERT SHORT-INTEGER TO TEMPORARY-REAL    2 data references

The short-integer source operand is converted exactly to a temporary-real result, which is placed in the destination address. Note that the setting of the precision control bits is not used to determine the precision of the result.

8.4 ORDINAL OPERATORS

The ordinal operators are used to perform logical, arithmetic, and relational operations on ordinal operands. These 32-bit operands are used to represent unsigned integer values in the range 0 to 4,294,967,295 and bit strings of 32 bits or less. If any arithmetic operation, except divide, produces a result that cannot be represented in 32 bits, the operation is terminated without storing a result, and an ordinal overflow fault occurs. If any division operation, including division by zero, would produce a result that cannot be represented in 32 bits, the operation is suppressed, and an ordinal divide fault occurs.

The set of ordinal operations contains two operators, EXTRACT and INSERT, that manipulate fields of bits. These operators require a descriptor to specify the field being manipulated. This descriptor consists of two adjacent character operands that form a double byte. The first specifies the beginning bit of the field. The bits of an ordinal operand are numbered within bit 0 the least significant bit and bit 31 the most significant bit. The beginning bit of a field is the smallest numbered bit in the field. The second character operand, which is located at the next higher address, specifies one less than the number of bits in the field. Only the low-order five bits of these character operands are interpreted by the hardware during execution. A field of any length up to 32 bits can be specified by a descriptor regardless of the beginning bit position. If a field is specified that extends beyond bit 31, bit 0 is considered to follow bit 31 in a circular fashion. Note that the sum module 32 of the two character operands gives the bit number of the highest numbered bit in the field. For example, a descriptor whose first character operand has the value 30 and whose second character operand has the value 3 describes a bit field consisting of 4 bits starting with bit number 30. Thus, the field consists of bit 30, bit 31, bit 0, and bit 1, with bit 30 the least significant bit of the extracted field and bit 1 the most significant bit.

Also in the set of ordinal operators is an operator that aids in the manipulation of the individual bits. The SIGNIFICANT BIT operator produces a result that specifies a bit position. Again bit 0 is the least significant bit and bit 31 the most-significant bit of an ordinal operand.

8.4.1 Ordinal Move Operators

MOVE ORDINAL    2 data references

The ordinal at the source address is moved to the destination address. Using the operand stack as the source address results in the classical stack operation POP, and using the operand stack as the destination address results in the classical stack operation PUSH. Using the operand stack as both addresses results in no change. Note that this operator is identical to the MOVE INTEGER operator and is specified by the same operator code.

ZERO ORDINAL    1 data reference

An ordinal value of zero is moved to the destination address. Note that this operator is identical to the ZERO INTEGER operator and is specified by the same operator code.

ONE ORDINAL    1 data reference

An ordinal value of 1 is moved to the destination address. Note that this operator is identical to the ONE INTEGER operator and is specified by the same operator code.

SAVE ORDINAL    1 data reference

The ordinal on top of the operand stack is read, without adjusting the stack, and moved to the destination address specified by the data refereance. Using an implicit reference results in an operand stack configuration in which the top two words contain the same ordinal value. Note that this operator is identical to the SAVE INTEGER operator and is specified by the same operator code.

8.4.2 Ordinal Logical Operators

AND ORDINAL    3 data references

The logical AND of the ordinal source operands is placed in the destination address.

OR ORDINAL    3 data references

The logical OR of the ordinal source operands is placed in the destination address.

XOR ORDINAL    3 data references

The logical XOR of the ordinal source operands is placed in the destination address.

COMPLEMENT ORDINAL    2 data references

The logical complement (1s complement) of the ordinal source operand is placed in the destination address.

EXTRACT ORDINAL    3 data references

The second source operand is an ordinal from which a bit field is to be extracted. The first source operand is a short ordinal that is the descriptor used to identify the field to be extracted. The extracted bit field is right justified with high order zeros in the ordinal operand specified by the destination address.

INSERT ORDINAL    3 data references

The second source operand is an ordinal that contains a right justified bit field to be inserted into another ordinal. The first source operand is a short ordinal that is the descriptor used to specify the field in the target operand to be replaced by the inserted field. The destination address specified the ordinal into which the bit field is to be inserted.

SIGNIFICANT BIT ORDINAL    2 data references

The position of the most significant set bit in the ordinal source operand is determined. The result is placed in the double byte referenced by the destination address. If the source operand has the value zero, the result of the operation is 32.

8.4.3 Ordinal Arithmetic Operators

ADD ORDINAL    3 data references

Unsigned 16-bit addition is performed on the ordinal source operands, and the result is placed in the destination address. An ordinal overflow fault can occur.

SUBTRACT ORDINAL    3 data references

Unsigned 16-bit subtraction is used to subtract the first ordinal source operand from the second, and the result is placed in the destination address. An ordinal overflow fault can occur.

INCREMENT ORDINAL    2 data references

The ordinal source operand is incremented using unsigned 16-bit addition, and the result is placed in the destination address. An ordinal overflow fault can occur.

DECREMENT ORDINAL    2 data references

The ordinal source operand is decremented using unsigned 16-bit subtraction, and the result is placed in the destination address. An ordinal overflow fault can occur.

MULTIPLY ORDINAL    3 data references

Unsigned 16-bit multiplication is performed on the ordinal source operands, and the least 16 bits of the result are placed in the destination address. An ordinal overflow fault can occur.

DIVIDE ORDINAL    3 data references

Unsigned 16-bit division is used to divide the second ordinal source operand by the first, and the 16-bit quotient is placed in the destination address. Note that when the divided is not an exact ordinal multiple of the divisor, the quotient is truncated toward zero (i.e., 5 divided by 2 is 2). An ordinal divide fault can occur.

REMAINDER ORDINAL    3 data references

Unsigned 16-bit division is used to divide the second ordinal source operand by the first, and the 16-bit remainder is placed in the destination address. An ordinal divide fault can occur.

8.4.4 Ordinal Relational Operators

EQUAL ORDINAL    3 data references

The ordinal source operands are compared for equality, and the boolean result is placed in the destination address. Note that this operator is identical to the EQUAL INTEGER operator and is specified by the same operator code.

NOT EQUAL ORDINAL    3 data references

The ordinal source operands are compared for inequality, and the boolean result is placed in the destination address. Note that this operator is identical to the NOT EQUAL INTEGER operator and is specified by the same operator code.

EQUAL ZERO ORDINAL    2 data references

The ordinal source operand is compared to zero for equality, and the boolean result is placed in the destination address. Note that this operator is identical to the EQUAL ZERO INTEGER operator and is specified by the same operator code.

NOT EQUAL ZERO ORDINAL    2 data references

The ordinal source operand is compared to zero for inequality and the boolean result is placed in the destination address. Note that this operator is identical to the NOT EQUAL ZERO INTEGER operator and is specified by the same operator code.

GREATER THAN ORDINAL    3 data references

An unsigned 16-bit comparison is made between the ordinal source operands. If the second is greater than the first the boolean result is true. Otherwise the result is false. The boolean result is placed in the destination address.

GREATER THAN OR EQUAL ORDINAL    3 data references

An unsigned 16-bit comparison is made between the oridinal source operands. If the second is greater than or equal to the first the boolean result is true. Otherwise the result is false. The boolean result is placed in the destination address.

8.4.5 Ordinal Conversion Operators

CONVERT ORDINAL TO SHORT ORDINAL    2 data references

The ordinal source operand is converted to a short-ordinal value by moving the low-order 16 bits of the source operand to the destination address. If any of the high-order bits of the ordinal source operand has the value 1, the operation is suppressed, and a short-ordinal overflow fault occurs.

CONVERT ORDINAL TO INTEGER   2 data references

The ordinal source operand is converted to an integer value, and the result is placed in the destination address. If the most significant bit of the ordinal source operand has the value 1, the operation is suppressed, and an integer overflow fault occurs.

CONVERT ORDINAL TO TEMPORARY-REAL   2 data references

The ordinal source operand is converted exactly to a temporary-real result, which is placed in the destination address. Note that the setting of the precision control bits is not used to determine the precision of the result.

8.5 INTEGER OPERATORS

The integer operators perform arithmetic and relational operations on integer operands. These 32-bit operands represent signed integer values in 2s complement form and lie in the range −2,147,483,648 to 2,147,483,647. If any arithmetic operation, except division, produces a result that cannot be represented as a 32-bit 2's complement value, the operation is terminated without storing a result, and an integer overflow fault occurs. If any division operation, including division by zero, would produce a result that cannot be represented as a 32-bit 2s complement value, the operation is suppressed, and an integer divide fault occurs.

8.5.1 Integer Move Operators

MOVE INTEGER   2 data references

The integer at the source address is moved to the destination address. Using the operand stack as the source address results in the classical stack operation POP, and using the operand stack as the destination address results in the classical stack operation PUSH. Using the operand stack as both addresses results in no chagnge. Note that this operator is identical to the MOVE SHORT-REAL operator and is specified by the same operator code.

ZERO INTEGER   1 data reference

An integer value of zero is moved to the destination address. Note that this operator is identical to the ZERO SHORT-REAL operator and is specified by the same operator code.

ONE INTEGER   1 data reference

An integer value of 1 is moved to the destination address.

SAVE INTEGER   1 data reference

The integer on top of the operand stack is read, without adjusting the stack, and moved to the destination address specified by the data reference. Using an implicit reference results in an operand stack configuration in which the top two words contain the same integer value. Note that this operator is identical to the SAVE SHORT-REAL operator and is specified by the same operator code.

8.5.2 Integer Arithmetic Operators

ADD INTEGER   3 data references

Signed 32-bit addition is performed on the integer source operands, and the result is placed in the destination address. An integer overflow fault can occur.

SUBTRACT INTEGER   3 data references

Signed 32-bit subtraction is used to subtract the first integer source operand from the second, and the result is placed in the destination address. An integer overflow fault can occur.

INCREMENT INTEGER   2 data references

The integer source operand is incremented using signed 32-bit addition, and the result is placed in the destination address. An integer overflow fault can occur.

DECREMENT INTEGER   2 data references

The integer source operand is decremented using signed 32-bit subtraction, and the result is placed in the destination address. An integer overflow fault can occur.

NEGATE INTEGER   2 data references

The integer source operand is negated, and the result is placed in the destination address. An integer overflow fault can occur.

MULTIPLY INTEGER   3 data references

Signed 32-bit multiplication is performed on the integer source operands, and the least significant 32 bits of the result are placed in the destination address. An integer overflow fault can occur.

DIVIDE INTEGER   3 data references

Signed 32-bit division is used to divide the second integer source operand by the first, and the signed 32-bit quotient is placed in the destination address. Note that when the dividend is not an exact integer multiple of the divisor, the quotient is truncated toward zero (i.e., 5 divided by 2 is 2, and −5 divided by 2 is −2). An integer divide fault can occur.

REMAINDER INTEGER   3 data references

Signed 32-bit division is used to divide the second integer source operand by the first, and the signed 32-bit remainder is placed in the destination address. The sign of the remainder is the same as the sign of the dividend. An integer divide fault can occur.

8.5.3 Integer Relational Operators

EQUAL INTEGER   3 data references

The integer source operands are compared for equality, and the boolean result is placed in the destination address. Note that this operator is identical to the EQUAL SHORT-REAL operator and is specified by the same operator code.

NOT EQUAL INTEGER   3 data references

The integer source operands are compared for inequality, and the boolean result is placed in the destination address. Note that this operator is identical to the NOT EQUAL SHORT-REAL operator and is specified by the same operator code.

EQUAL ZERO INTEGER   2 data references

The integer source operand is compared to zero for equality, and the boolean result is placed in the destination address. Note that this operator is identical to the EQUAL SHORT-REAL operator and is specified by the same operator code.

NOT EQUAL ZERO INTEGER   2 data references

The integer source operand is compared to zero for inequality and the boolean result is placed in the destination address. Note that this operator is identical to the NOT EQUAL ZERO SHORT-REAL operator and is specified by the same operator code.

GREATER THAN INTEGER   3 data references

A signed 32-bit comparison is made between the integer source operands. If the second is greater than the first the boolean result is true. Otherwise the result is false. The boolean result is placed in the destination address.

GREATER THAN OR EQUAL INTEGER   3 data references

A signed 32-bit comparison is made between the integer source operands. If the second is greater than or equal to the first the boolean result is true. Otherwise the result is false. The boolean result is placed in the destination address.

POSITIVE INTEGER    2 data references

If the integer source operand is positive (greater than zero) the boolean result is true. Otherwise the result is false. The boolean result is placed in the destination address.

NEGATIVE INTEGER    2 data references

If the integer source operand is negative (less than zero) the boolean result is true. Otherwise the result is false. The boolean result is placed in the destination address.

8.5.4 Integer Conversion Operators

CONVERT INTEGER TO SHORT-INTEGER    2 data references

The integer source operand is converted to a short-integer. The short-integer result is placed in the destination address. A short-integer overflow fault can occur.

CONVERT INTEGER TO ORDINAL    2 data references

The integer source operand is converted to an ordinal, and the result is placed in the destination address. If the integer source operand is negative, the operation is suppressed, and an ordinal overflow fault occurs.

CONVERT INTEGER TO TEMPORARY-REAL    2 data references

The integer source operand is converted exactly to a temporary-real result, which is placed in the destination address. Note that the setting of the precision control bits is not used to determine the precision of the result.

8.6 SHORT-REAL OPERATORS

The short-real operators perform arithmetic and relational operations on short-real operands. These 32-bit operands provide less precision but a wider range of values than do integer operands. During the execution of these operators if rounding is required to produce the final result, the type of rounding used is determined by the setting of the rounding control bits. Where noted in the operator descriptions the precision maintained in temporary-real results is determined by the setting of the precision control bits.

As discussed in Section 6, as many as five exceptions are recognized during the execution of these operators: overflow, underflow, divide by zero, domain error, and invalid operand. Each operator description indicates the specific exceptions that can occur during its execution.

8.6.1 Short-Real Move Operators

MOVE SHORT-REAL    2 data references

The short-real operand at the source addresses is moved to the destination address. Using the operand stack as the source address results in the classical stack operation POP, and using the operand stack as the destination address results in the classical stack operation PUSH. Using the operand stack as both addresses results in no change. Note that this operator is identical to the MOVE INTEGER operator and is specified by the same operator code.

ZERO SHORT-REAL    1 data reference

A short-real value of zero is moved to the destination address. Note that this operator is identical to the zero integer operator and is specified by the same operator code.

SAVE SHORT-REAL    1 data reference

The short-real operand on top of the operand stack is read, without adjusting the stack, and moved to the destination address specified by the data reference. Using an implicit reference results in an operand stack configuration in which the top words contain the same short-real value. Note that this operator is identical to the SAVE INTEGER operator and is specified by the same operator code.

8.6.2 Short-Real Arithmetic Operators

ADD SHORT-REAL/SHORT-REAL    3 data references

The first source operand, a short-real operand, is added to the second source operand, a short-real operand, to produce a temporary-real result which is stored at the destination address. The settings of the rounding control bits and the precision control bits specify the type of rounding that is used and the precision to which the result is rounded. A short-real invalid operand exception can occur.

ADD SHORT-REAL/TEMPORARY-REAL    3 data references

The first source operand, a temporary-real operand, is added to the second source operand, a short-real operand, to produce a temporary-real result, which is stored at the destination address. The settings of the rounding control bits and the precision control bits specify the type of rounding that is used and the precision to which the result is rounded. Temporary-real overflow, temporary-real underflow, short-real invalid operand, and temporary-real invalid operand exceptions can occur.

ADD TEMPORARY-REAL/SHORT-REAL    3 data references

The first source operand, a short-real operand, is added to the second source operand, a temporary-real operand, to produce a temporary-real result, which is stored at the destination address. The settings of the rounding control bits and the precision control bits specify the type of rounding that is used and the precision to which the result is rounded. Temporary-real overflow, temporary-real underflow, short-real invalid operand, and temporary-real invalid operand exceptions can occur.

SUBTRACT SHORT-REAL/SHORT-REAL    3 data references

The first source operand, a short-real operand, is subtracted from the second source operand, a short-real operand, to produce a temporary-real result, which is stored at the destination address. The settings of the rounding control bits and the precision control bits specify the type of rounding that is used and the precision to which the result is rounded.

A short-real invalid operand exception can occur.

SUBTRACT SHORT-REAL/TEMPORARY-REAL    3 data references

The first source operand, a temporary-real operand, is subtracted from the second source operand, a short-real operand, to produce a temporary-real result, which is stored at the destination address. The settings of the rounding control bits and the precision control bits specify the type of rounding that is used and the precision to which the result is rounded. Temporary-real overflow, temporary-real underflow, short-real invalid operand, and temporary-real invalid operand exceptions can occur.

SUBTRACT TEMPORARY-REAL/SHORT-REAL    3 data references

The first source operand, a short-real operand, is subtracted from the second source operand, a temporary-real operand, to produce a temporary-real result, which is stored at the destination address. The settings of the rounding control bits and the precision control bits specify the type of rounding that is used and the precision to which the result is rounded. Temporary-real overflow, temporary-real underflow, short-real invalid operand, and temporary-real invalid operand exceptions can occur.

MULTIPLY SHORT-REAL/SHORT-REAL 3 data references

The first source operand, a short-real operand, is multiplied by the second source operand, a short-real operand, to produce a temporary-real result which is stored at the destination address. The settings of the rounding control bits and the precision control bits specify the type of rounding that is used and the precision to which the result is rounded. A short-real invalid operand exception can occur.

MULTIPLY SHORT-REAL/TEMPORARY-REAL 3 data references

The first source operand, a temporary-real operand, is multiplied by the second source operand, a short-real operand, to produce a temporary-real result, which is stored at the destination address. The settings of the rounding control bits and the precision control bits specify the type of rounding that is used and the precision to which the result is rounded. Temporary-real overflow, temporary-real underflow, short-real invalid operand, and temporary-real invalid operand exceptions can occur.

MULTIPLY TEMPORARY-REAL/SHORT-REAL 3 data references

The first source operand, a short-real operand, is multiplied by the second source operand, a temporary-real operand, to produce a temporary-real result, which is stored at the destination address. The settings of the rounding control bits and the precision control bits specify the type of rounding that is used and the precision to which the result is rounded. Temporary-real overflow, temporary-real underflow, short-real invalid operand, and temporary-real invalid operand exceptions can occur.

DIVIDE SHORT-REAL/SHORT-REAL 3 data references

The first source operand, a short-real operand, is divided into the second source operand, a short-real operand, to produce a temporary-real result which is stored at the destination address. The settings of the rounding control bits and the precision control bits specify the type of rounding that is used and the precision to which the result is rounded. Divide by zero, domain error, and short-real invalid operand exceptions can occur.

DIVIDE SHORT-REAL/TEMPORARY-REAL 3 data references

The first source operand, a temporary-real operand, is divided into the second source operand, a short-real operand, to produce a temporary-real result, which is stored at the destination address. The settings of the rounding control bits and the precision control bits specify the type of rounding that is used and the precision to which the result is rounded. Temporary-real overflow, temporary-real underflow, divide by zero, domain error, short-real invalid operand, and temporary-real invalid operand exceptions can occur.

DIVIDE TEMPORARY-REAL/SHORT-REAL 3 data references

The first source operand, a short-real operand, is divided into the second source operand, a temporary-real operand, to produce a temporary-real result, which is stored at the destination address. The settings of the rounding control bits and the precision control bits specify the type of rounding that is used and the precision to which the result is rounded. Temporary-real overflow, temporary-real underflow, divide by zero, domain error, short-real invalid operand, and temporary-real invalid operand exceptions can occur.

NEGATE SHORT REAL 2 data references

The short-real source operand is negated and the short-real result is placed in the destination address. A short-real invalid operand exception can occur.

ABSOLUTE VALUE SHORT-REAL 2 dat references

The absolute value of the short-real source operand is generated and the short-real result is placed in the destination address. A short-real valid operand exception can occur.

8.6.3 Short-Real Relational Operators

EQUAL SHORT-REAL 3 data references

The short-real source operands are compared for equality and the boolean result is placed in the destination address. Note that this operator is identical to the EQUAL INTEGER operator and is specified by the same operator code.

NOT EQUAL SHORT-REAL 3 data references

The short-real source operands are compared for inequality and the boolean result is placed in the destination address. Note that this operator is identical to the NOT EQUAL INTEGER operator and is specified by the same operator code.

EQUAL ZERO SHORT-REAL 2 data references

The short-real source operand is compared to zero for equality and the boolean result is placed in the destination address. Note that this operator is identical to the EQUAL ZERO INTEGER operator and is specified by the same operator code.

NOT EQUAL ZERO SHORT-REAL 2 data references

The short-real source operand is compared to zero for inequality and the boolean result is placed in the destination address. Note that this operator is identical to the NOT EQUAL ZERO INTEGER operator and is specified by the same operator code.

GREATER THAN SHORT-REAL 3 data references

A short-real comparison is done between the source operands. If the second is greater than the first, the boolean result is true; otherwise the result is false. The boolean result is placed in the destination address. A short-real invalid operand exception can occur.

GREATER THAN OR EQUAL SHORT-REAL 3 data references

A short-real comparison is done between the source operands. If the second is greater than or equal to the first, the boolean result is true; otherwise the result is false. The boolean result is placed in the destination address. A short-real invalid operand exception can occur.

POSITIVE SHORT-REAL 2 data references

If the short-real source operand is positive (greater than zero), the boolean result is true; otherwise, the result is false. The boolean result is placed in the destination address. A short-real invalid operand exception can occur.

NEGATIVE SHORT-REAL 2 data references

If the short-real source operand is negative (less than zero), the boolean result is true; otherwise the result is false. The boolean result is placed in the destination address. A short-real invalid operand exception can occur.

8.6.4 Short-Real Conversion Operators

CONVERT SHORT-REAL TO TEMPORARY-REAL    2 data references

The short-real source operand is converted without loss of precision to a temporary-real value, which is placed at the destination address. Note that the settings of the rounding control bits and of the precision control bits have no effect on the value of the result. A short-real invalid operand exception can occur.

8.7 REAL OPERATORS

The real operators perform arithmetic and relational operations on real operands. These 64-bit operands provide more precision and a greater exponent range than do the short-real operands. During execution of these operators if rounding is required to produce the final result, the type of rounding used is determined by the setting of the rounding control bits. Where noted in the operator descriptions the precision maintained in temporary-real results is determined by the setting of the precision control bits. As discussed in Section 6, as many as 5 exceptions are recognized during the execution of these operators: overflow, underflow, divide by zero, domain error, and invalid operand. Each operator description indicates the specific exceptions that can occur during its execution.

8.7.1 Real Move Operators

MOVE REAL    2 data references

The real operand at the source address is moved to the destination address. Using the operand stack as the source address results in the classical stack operation POP, and using the operand stack as the destination address results in the classical stack operation PUSH. Using the operand stack as both addresses results in no change. Note that this operator is identical to the MOVE LABEL operator and is specified by the same operator code.

ZERO REAL    1 data reference

A real value of zero is moved to the destination address.

SAVE REAL    1 data reference

The real operand on top of the operand stack is read without adjusting the stack and moved to the destination address specified by the data reference. Using an implicit reference results in an operand stack configuration in which the top two double words contain the same real value. Note that this operator is identical to the SAVE LABEL operator and is specified by the same operator code.

8.7.2 Real Arithmetic Operators

ADD REAL/REAL    3 data references

The first source operand, a real operand, is added to the second source operand, a real operand, to produce a temporary-real result, which is stored at the destination address. The settings of the rounding control bits and the precision control bits specify the type of rounding that is used and the precision to which the result is rounded. A real invalid operand exception can occur.

ADD REAL/TEMPORARY-REAL    3 data references

The first source operand, a temporary-real operand, is added to the second source operand, a real operand, to produce a temporary-real result, which is stored at the destination address. The settings of the rounding control bits and the precision control bits specify the type of rounding that is used and the precision to which the result is rounded. Temporary-real overflow, temporary-real underflow, real-invalid operand, and temporary-real invalid operand exceptions can occur.

ADD TEMPORARY-REAL/REAL    3 data references

The first source operand, a real operand, is added to the second source operand, a temporary-real operand, to produce a temporary-real result which is stored at the destination address. The settings of the rounding control bits and the precision control bits specify the type of rounding that is used and the precision to which the result is rounded. Temporary-real overflow, temporary-real underflow, real invalid operand, and temporary-real invalid operand exceptions can occur.

SUBTRACT REAL/REAL    3 data references

The first source operand, a real operand, is subtracted from the second source operand, a real operand, to produce a temporary-real result which is stored at the destination address. The settings of the rounding control bits and the precision control bits specify the type of rounding that is used and the precision to which the result is rounded. A real invalid operand exception can occur.

SUBTRACT REAL/TEMPORARY-REAL    3 data references

The first source operand, a temporary-real operand, is subtracted from the second source operand, a real operand, to produce a temporary-real result, which is stored at the destination address. The settings of the rounding control bits and the precision control bits specify the type of rounding that is used and the precision to which the result is rounded. Temporary-real overflow, temporary-real underflow, real invalid operand, and temporary-real invalid operand exceptions can occur.

SUBTRACT TEMPORARY-REAL/REAL    3 data references

The first source operand, a real operand, is subtracted from the second source operand, a temporary-real result, which is stored at the destination address. The settings of the rounding control bits and the precision control bits specify the type of rounding that is used and the precision to which the result is rounded. Temporary-real overflow, temporary-real underflow, real invalid operand, and temporary-real invalid operand exceptions can occur.

MULTIPLY REAL/REAL    3 data references

The first source operand, a real operand, is multiplied by the second source operand, a real operand, to produce a temporary-real result, which is stored at the destination address. The settings of the rounding control bits and the precision control bits specify the type of rounding that is used and the precision to which the result is rounded. A real invalid operand exception can occur.

MULTIPLY REAL/TEMPORARY-REAL    3 data references

The first source operand, a temporary-real operand, is multiplied by the second source operand, a real operand, to produce a temporary-real result which is stored at the destination address. The settings of the rounding control bits and the precision control bits specify the type of rounding that is used and the precision to which the result is rounded. Temporary-real overflow, temporary-real underflow, real invalid operand, and temporary-real invalid operand exceptions can occur.

MULTIPLY TEMPORARY-REAL/REAL    3 data references

The first source operand, a real operand, is multiplied by the second source operand, a temporary-real operand, to produce a temporary-real result, which is stored at the destination address. The settings of the rounding control bits and the precision control bits specify the type of rounding that is used and the precision to which the result is rounded. Temporary-real overflow, temporary-real underflow, real invalid operand, and temporary-real invalid operand exceptions can occur.

DIVIDE REAL/REAL     3 data references

The first source operand, a real operand, is divided into the second source operand, a real operand, to produce a temporary-real result, which is stored at the destination address. The settings of the rounding control bits and the precision control bits specify the type of rounding that is used and the precision to which the result is rounded. Divide by zero, domain error, and real invalid operand exceptions can occur.

DIVIDE REAL/TEMPORARY-REAL     3 data references

The first source operand, a temporary-real operand, is divided into the second source operand, a real operand, to produce a temporary-real result which is stored at the destination address. The settings of the rounding control bits and the precision control bits specify the type of rounding that is used and the precision to which the result is rounded. Temporary-real overflow, temporary-real underflow, divide by zero, domain error, real invalid operand, and temporary-real invalid operand exceptions can occur.

NEGATE REAL     2 data references

The real source operand is negated and the real result is placed in the destination address. A real invalid operand exception can occur.

ABSOLUTE VALUE REAL     2 data references

The absolute value of the real source operand is generated and the real result is placed in the destination address. A real invalid operand exception can occur.

8.7.3 Real Relational Operators

EQUAL REAL     3 data references

The real source operands are compared for equality and the boolean result is placed in the destination address. Note that this operator is identical to the EQUAL LABEL operator and is specified by the same operator code.

NOTE EQUAL REAL     3 data references

The real source operands are compared for inequality and the boolean result is placed in the destination address. Note that this operator is identical to the NOT EQUAL LABEL operator and is specified by the same operator code.

EQUAL ZERO REAL     2 data references

The real source operand is compared to zero for equality and the boolean result is placed in the destination address.

NOT EQUAL ZERO REAL     2 data references

The real source operand is compared to zero for inequality and the boolean result is placed in the destination address.

GREATER THAN REAL     3 data references

A real comparison is done between the source operands. If the second is greater than the first, the boolean result is true; otherwise the result is false. The boolean result is placed in the destination address. A real invalid operand exception can occur.

GREATER THAN OR EQUAL REAL     3 data references

A real comparison is done between the source operands. If the second is greater than or equal to the first, the boolean result is true; otherwise the result is false. The boolean result is placed in the destination address. A real invalid operand exception can occur.

POSITIVE REAL     2 data references

If the real source operand is positive (greater than zero), the boolean result is true; otherwise the result is false. The boolean result is placed in the destination address. A real invalid operand exception can occur.

NEGATIVE REAL     2 data references

If the real source operand is negative (less than zero), the boolean result is true; otherwise the result is false. The boolean result is placed in the destination address. A real invalid operand exception can occur.

8.7.4 Real Conversion Operators

CONVERT REAL TO TEMPORARY-REAL     2 data references

The real-source operand is converted without loss of precision to a temporary-real value which is placed in the destination address. Note that settings of the rounding control bits and of the precision control bits have no effect on the result. A real invalid operand exception can occur.

8.8 TEMPORARY-REAL OPERATORS

The temporary-real operators perform arithmetic and relational operations on temporary-real operands. These 80-bit operands provide substantially more precision and a much greater exponent range than do either short-real or real operands. During the execution of these operators if rounding is required to produce the final result, the type of rounding used is determined by the setting of the rounding control bits. Where noted in the operator descriptions the precision maintained in temporary-real results is determined by the setting of the precision control bits.

As discussed in Section 6, as many as five exceptions are recognized during the execution of these operators: overflow, underflow, divide by zero, domain error, and invalid operand. Each operator description indicates the specific exceptions that can occur during its execution.

8.8.1 Temporary-Real Move Operators

MOVE TEMPORARY-REAL     2 data references

The temporary-real operand at the source address is moved to the destination address. Using the operand stack as the source address results in the classical stack operation POP, and using the operand stack as the destination address results in the classical stack operation PUSH. Using the operand stack as both addresses results in no change.

ZERO TEMPORARY-REAL     1 data reference

A temporary-real value of zero is moved to the destination address.

SAVE TEMPORARY-REAL     1 data reference

The temporary-real operand on top of the operand stack is read with-without adjusting the stack and moved to the destination address specified by the data reference. Using an implicit reference results in an operand stack configuration in which the top two extended words contain the same temporary-real value.

8.8.2 Temporary-Real Arithmetic Operators

ADD TEMPORARY-REAL     3 data references

The first temporary-real source operand is added to the second temporary-real source operand to produce a temporary-real result which is stored at the destination address. The settings of the rounding control bits and the precision control bits specify the type of rounding that is used and the precision to which the result is rounded. Temporary-real overflow, temporary-real underflow, and temporary-real invalid operand exceptions can occur.

SUBTRACT TEMPORARY-REAL    3 data references

The first temporary-real source operand is subtracted from the second temporary-real source operand to produce a temporary-real result which is stored at the destination address. The settings of the rounding control bits and the precision control bits specify the type of rounding that is used and the precision to which the result is rounded. Temporary-real overflow, temporary-real underflow, and temporary-real invalid operand exceptions can occur.

MULTIPLY TEMPORARY-REAL    3 data references

The first temporary-real source operand is multiplied by the second temporary-real source operand to produce a temporary-real result which is stored at the destination address. The settings of the rounding control bits and the precision control bits specify the type of rounding that is used and the precision to which the result is rounded. Temporary-real overflow, temporary-real underflow, and temporary-real invalid operand exceptions can occur.

DIVIDE TEMPORARY-REAL    3 data references

The first temporary-real source operand is divided into the second temporary-real source operand to produce a temporary-real result which is stored at the destination address. The settings of the rounding control bits and the precision control bits specify the type of rounding that is used and the precision to which the result is rounded. Temporary-real overflow, temporary-real underflow, divide by zero, domain error, and temporary-real invalid operand exceptions can occur.

REMAINDER TEMPORARY-REAL    3 data references

Division is performed using the first temporary-real source operand as the divisor and the second temporary-real source operand as the dividend to produce a temporary-real partial remainder. Execution of this operator causes one step of the division algorithm to be iterated until a fixed number of division steps have been performed or until a partial remainder is generated whose absolute value is less than the absolute value of the divisor. In the latter case, that partial remainder is the true remainder of the division operation. If the true remainder has been generated, it is rounded as specified by the rounding control bits to the precision specified by the precision control bits. If the result is not the true remainder, no rounding is done. In either case the partial remainder generated by the last division step is stored at the destination address with the same sign as that of the dividend. Note that a detailed description of the use of this operator is given in Section 6.5. Divide by zero, domain error, and temporary-real invalid operand exceptions can occur.

NEGATE TEMPORARY-REAL    2 data references

The temporary-real source operand is negated, and the temporary-real result is placed in the destination address. A temporary-real invalid operand exception can occur.

SQUARE ROOT TEMPORARY-REAL    2 data references

The square root of the temporary-real source operand is extracted to produce a temporary-real result. The settings of the rounding control bits and the precision control bits specify the type of rounding that is used and the precision to which the result is rounded. Domain error and temporary-real invalid operand exceptions can occur.

ABSOLUTE VALUE TEMPORARY-REAL    2 data references

The absolute value of the temporary-real source operand is generated and the temporary-real result is placed in the destination address. A temporary-real invalid operand exception can occur.

8.8.3 Temporary-Real Relational Operators

EQUAL TEMPORARY-REAL    3 data references

The temporary-real source operands are compared for equality and the boolean result is placed in the destination address.

NOT EQUAL TEMPORARY-REAL    3 data references

The temporary-real source operands are compared for inequality and the boolean result is placed in the destination address.

EQUAL ZERO TEMPORARY-REAL    2 data references

The temporary-real source operand is compared to zero for equality and the boolean result is placed in the destination address.

NOT EQUAL ZERO TEMPORARY-REAL    2 data references

The temporary-real source operand is compared to zero for inequality and the boolean result is placed in the destination address.

GREATER THAN TEMPORARY-REAL    3 data references

A temporary-real comparison is done between the source operands. If the second is greater than the first, the boolean result is true; otherwise, the result is false. The boolean result is placed in the destination address. A temporary-real invalid operand exception can occur.

GREATER THAN OR EQUAL TEMPORARY-REAL    3 data references

A temporary-real comparison is done between the source operands. If the second is greater than or equal to the first, the boolean result is true; otherwise the result is false. The boolean result is placed in the destination address. A temporary-real invalid operand exception can occur.

POSITIVE TEMPORARY-REAL    2 data references

If the temporary-real source operand is positive (greater than zero), the boolean result is true; otherwise the result is false. The boolean result is placed in the destination address. A temporary-real invalid operand exception can occur.

NEGATIVE TEMPORARY-REAL    2 data references

If the temporary-real source operand is negative (less than zero), the boolean result is true; otherwise the result is false. The boolean result is placed in the destination address. A temporary-real invalid operand exception can occur.

8.8.4 Temporary-Real Conversion Operators

CONVERT TEMPORARY-REAL TO ORDINAL    2 data references

The temporary-real source operand is converted to an ordinal result which is placed in the destination address. The setting of the rounding control bits determines the type of rounding that is used. If the temporary-real value is negative, or if it is too large to be represented as an ordinal, ordinal overflow occurs. Domain error and temporary-real invalid operand exceptions can also occur.

CONVERT TEMPORARY REAL TO INTEGER  2 data references

The temporary-real source operand is converted to an integer result which is placed in the destination address. The setting of the rounding control bits determines the type of rounding that is used. If the temporary-real value is too large to be represented as an integer, an integer overflow exception occurs. Domain error and temporary-real invalid operand exceptions can also occur.

CONVERT TEMPORARY REAL TO SHORT REAL  2 data references

The temporary-real source operand is converted to a short-real value which is placed in the destination address. The setting of the rounding control bits determines the type of rounding that is used. Short-real overflow, short-real underflow, domain error, and temporary-real invalid operand exceptions can occur.

CONVERT TEMPORARY-REAL TO REAL  2 data references

The temporary-real source operand is converted to a real value which is placed in the destination address. The setting of the rounding control bits determines the type of rounding that is used. Real overflow, real underflow, domain error, and temporary-real invalid operand exceptions can occur.

8.9 ACCESS ENVIRONMENT MANIPULATION OPERATORS

The operators used for access environment manipulation are decribed below.

In order not to complicate the descriptions of those operators that make use of common, but somewhat involved suboperations, the descriptions simply refer to these suboperations by name. Similarly, for those operators that implicitly invoke other defined operators, the latter are also referred to by name. In both cases, the name of the suboperation or operator will be preceded by the word perform to indicate its use or invocation.

8.9.1 Access Descriptor Movement Operators

MOVE ACCESS DESCRIPTOR  2 data references

MOVE ACCESS DESCRIPTOR allows an operation to move an access descriptor from a specified entry in any directly accessible access list to a specified entry in any directly accessible access list. The first data reference specifies a short ordinal operand containing the segment selector for the access descriptor to be moved. The second data reference specifies a short-ordinal operand containing the segment selector for the destination access list entry. Operator execution proceeds as follows. Fetch the source segment selector. If the access descriptor for the source access list does not bear write rights, an access list rights fault occurs. Fetch the access descriptor to be moved. If the access descriptor does not bear delete rights, an access descriptor deletion fault occurs. Fetch the destination segment selector. If the access descriptor for the destination-access list does not bear write rights, an access-list-rights fault occurs. Fetch the associated access descriptor. Check that the destination-access-list entry bears delete rights, and if not, an access-descriptor-deletion fault occurs. Check that the destination-access-list entry contains a null-access descriptor, and if so, continue; otherwise perform path-count decrementation on the associated segment descriptor. Replace the source-access descriptor with a null-access descriptor and perform reclamation marking on the associated segment descriptor. Store the access descriptor at the destination-access-descriptor entry. Perform a selective-cache flush using both the source and destination segment selectors.

MOVE ACCESS DESCRIPTOR TO ENVIRONMENT  3 data references

MOVE ACCESS DESCRIPTOR TO ENVIRONMENT allows an operation to move an access descriptor from a specified entry in any indirectly accessible access list to a specified entry in any directly accessible-access list. The first data reference specifies a short-ordinal operand containing the segment selector for the access list access descriptor of the source list. The second data reference specifies a short-ordinal operand containing an index for the desired access descriptor within the source-access list. The third data reference specifies a short-ordinal operand containing the segment selector for the destination-access-list entry. Operator execution proceeds as follows. Fetch the segment selector for the source-access-list access descrip. Fetch the associated access descriptor. If the access descriptor fetched is not an access list access descriptor, an access-list-type fault occurs. If the access descriptor fetched does not bear read and write rights an access-list-rights fault occurs. Fetch the access-descriptor index. Fetch the access descriptor to be moved. If the access descriptor does not bear delete rights an access-descriptor-deletion fault occurs. Fetch the destination-segment selector. If the access descriptor for the destination-access list does not bear write rights an access-list-rights fault occurs. Fetch the associated access descriptor. Check that the destination-access-list entry bears delete rights, and if not, an access-descriptor-deletion fault occurs. Check that the destination-access-list entry contains a null-access descriptor, and if so, continue; otherwise, perform path-count decrementation on the associated segment descriptor. Replace the source-access descriptor with a null-access descriptor and perform reclamation marking on the associated segment descriptor. Store the access descriptor at the destination-access descriptor entry. Perform a selective-cache flush using the destination-segment selector.

MOVE ACCESS DESCRIPTOR FROM ENVIRONMENT  3 data references

MOVE ACCESS DESCRIPTOR FROM ENVIRONMENT allows an operation to move an access descriptor from a specified entry in any directly accessible access list to a specified entry in any indirectly accessible access list. The first data reference specifies a short-ordinal operand containing the segment selector for the access descriptor to be moved. The second data reference specifies a short-ordinal operand containing the segment selector for the destination-access-list access descriptor. The third data reference specifies a short-ordinal operand containing an index for the desired access descriptor within the destination-access list. Operator execution proceeds as follows. Fetch the source-segment selector. If the access descriptor for the source-access list does not bear write rights, an access-list-rights fault occurs. Fetch the access descriptor to be moved. If the access descriptor does not bear delete rights, an access-descriptor-deletion fault occurs. Fetch the segment selector for the destination-access-list access descriptor. Fetch the associated access descriptor. If the access descriptor fetched is not an access list access descriptor, an access-list-type fault occurs. If the access descriptor fetched does not bear read and write rights an access-list-rights fault occurs. Fetch the access-list index. Fetch the associated access descriptor. Check that the destination-access-list entry bears delete rights, and if not, an access-descriptor-deletion fault occurs. Check that the destination-access-list entry contains a null-access descriptor, and if so, continue; otherwise, perform path-count decrementation on the associated segment descriptor. Replace the source-access descriptor with a null-access descriptor and perform reclamation marking on the associated segment descriptor. Store the access descriptor at the destination-access-descriptor entry. Perform a selective-cache flush using the source-segment selector.

MOVE ACCESS DESCRIPTOR INDIRECT    2 data references

MOVE ACCESS DESCRIPTOR INDIRECT allows an operation to move an access descriptor from a specified entry in any indirectly accessible access list to a specified entry in any indirectly accessible access list. The first data reference specifies a word operand containing two short-ordinal values. The lower-double byte of the word contains a short-ordinal operand used as the segment selector for the access list access descriptor of the source list. The upper-double byte of the word contains a short-ordinal operand used as an index for the desired access descriptor within the source-access list. The second data reference specifies a word operand containing two short-ordinal values. The lower-double byte of the word contains a short-ordinal operand used as the segment selector for the destination access list access descriptor. The upper-double byte of the word contains a short-ordinal operand used as an index for the desired access descriptor within the destination-access list. Operator execution proceeds as follows. Fetch the segment selector for the source access list access descriptor. Fetch the associated access descriptor. If the access descriptor fetched is not an access list access descriptor, an access-list-type fault occurs. If the access descriptor fetched does not bear read and write rights, an access-list-rights fault occurs. Fetch the access-descriptor index. Fetch the access descriptor to be moved. If the access descriptor does not bear delete rights an access-descriptor-deletion fault occurs. Fetch the segment selector for the destination access list access descriptor. Fetch the associated access descriptor. If the access descriptor fetched is not an access list access descriptor, an access-list-type fault occurs. If the access descriptor fetched does not bear read and write rights an access-list-rights fault occurs. Fetch the access-descriptor index. Fetch the associated access descriptor. Check that the destination-access-list entry bears delete rights, and if not, an access-descriptor-deletion fault occurs. Check that the destination-access-list entry contains a null-access descriptor, and if so, continue; otherwise perform path-count decrementation on the associated segment descriptor. Replace the source-access descriptor with a null-access descriptor and perform reclamation marking on the associated segment descriptor. Store the access descriptor at the destination-access-descriptor entry.

COPY ACCESS DESCRIPTOR    2 data references

COPY ACCESS DESCRIPTOR allows an operation to copy an access descriptor from a specified entry in any directly accessible access list to a specified entry in any directly accessible access list. The first data reference specifies a short-ordinal operand containing the segment selector for the access descriptor to be copied. The second data reference specifies a short-ordinal operand containing the segment selector for the destination-access-list entry. Operator execution proceeds as follows. Fetch the source-segment selector. Fetch the access descriptor to be copied. If the access descriptor does not bear duplicate rights, an access-descriptor-duplication fault occurs. Fetch the destination-segment selector. If the access descriptor for the destination-access list does not bear write rights an access-list-rights fault occurs. Fetch the associated access descriptor. Check that the destination-access-list entry bears delete rights and if not, an access-descriptor-deletion fault occurs. Check that the destination-access-list entry contains a null-access descriptor and if so, continue; otherwise perform path-count decrementation on the associated-segment descriptor. Mark the access descriptor to be stored with delete rights. Store the access descriptor at the destination-access-descriptor entry and perform path-count incrementation and reclamation marking on the associated-segment descriptor. Perform a selective-cache flush using the destination-segment selector.

COPY ACCESS DESCRIPTOR TO ENVIRONMENT    3 data references

COPY ACCESS DESCRIPTOR TO ENVIRONMENT allows an operation to copy an access descriptor from a specified entry in any indirectly accessible access list to a specified entry in any directly accessible access list. The first data reference specifies a short-ordinal operand containing the segment selector for the access list access descriptor to the source list. The second data reference specifies a short-ordinal operand containing an index for the desired access descriptor within the source-access list. The third data reference specifies a short-ordinal operand containing the segment selector for the destination-access-list entry. Operator execution proceeds as follows. Fetch the segment selector for the source-access-list access descriptor. Fetch the associated access descriptor. If the access descriptor fetched is not an access list access descriptor, an access-list-type fault occurs. If the access descriptor fetched does not bear read rights, an access-list-rights fault occurs. Fetch the access-descriptor index. Fetch the access descriptor to be copied. If the access descriptor does not bear duplicate rights, an access-descriptor-duplication fault occurs. Fetch the destination-segment selector. If the access descriptor for the destination access list does not bear write rights an access-list-rights fault occurs. Fetch the associated access descriptor. Check that the destination-access-list entry bears delete rights and if not, an access-descriptor-deletion fault occurs. Check that the destination-access-list entry contains a null-access descriptor, and if so, continue; otherwise perform path-count decrementation on the associated-segment descriptor. Mark the access descriptor to be stored with delete rights. Store the access descriptor at the destination-access-descriptor entry and perform path-count incrementation and reclamation marking on the associated segment descriptor. Perform a selective-cache flush using the destination-segment selector.

COPY ACCESS DESCRIPTOR FROM ENVIRONMENT    3 data references

COPY ACCESS DESCRIPTOR FROM ENVIRONMENT allows an operation to copy an access descriptor from a specified entry in any directly accessible access list to a specified entry in any indirectly accessible access list. The first data reference specifies a short-ordinal operand containing the segment selector for the access descriptor to be copied. The second data reference specifies a short-ordinal operand containing the segment selector for the destination access list access descriptor. The third data reference specifies a short-ordinal operand containing an index for the desired access descriptor within the destination-access list. Operator execution proceeds as follows. Fetch the source-segment selector. Fetch the access descriptor to be copied. If the access descriptor does not bear duplicate rights, an access-descriptor-duplication fault occurs. Fetch the segment selector for the destination-access list access descriptor. Fetch the associated access descriptor. If the access descriptor fetched is not an access list access descriptor, an access-list-type fault occurs. If the access descriptor fetched does not bear write rights, an access-list-rights fault occurs. Fetch the access-list index. Fetch the associated access descriptor. Check that the destination-access-list entry bears delete rights and if not, an access-descriptor-deletion fault occurs. Check that the destination-access-list entry contains a null-access descriptor, and if so, continue; otherwise perform path-count decrementation on the associated segment descriptor. Mark the access descriptor to be stored with delete rights. Store the access descriptor at the destination-access-descriptor entry and perform path-count incrementation and reclamation marking on the associated segment descriptor.

COPY ACCESS DESCRIPTOR INDIRECT    2 data references

COPY ACCESS DESCRIPTOR INDIRECT allows an operation to copy an access descriptor from a specified entry in any indirectly accessible access list to a specified entry in any indirectly accessible access list. The first data reference specifies a word operand containing two short-ordinal values. The lower-double byte of the word contains a short-ordinal operand used as the segment selector for the access-list access descriptor of the source list. The upper-double byte of the word contains a short-ordinal operand used as an index for the desired access descriptor within the source-access list. The second data reference specifies a word operand containing two short-ordinal values. The lower-double byte of the word contains a short-ordinal operand used as the segment selector for the destination-access-list access descriptor. The upper-double byte of the word contains a short-ordinal operand used as an index for the desired access descriptor within the destination-access list. Operator execution proceeds as follows. Fetch the segment selector for the source-access-list access descriptor. Fetch the associated access descriptor. If the access descriptor fetched is not an access-list access descriptor, an access-list-type fault occurs. If the access descriptor fetched does not bear read rights, an access-list-rights fault occurs. Fetch the access-descriptor index. Fetch the access descriptor to be copied. If the access descriptor does not bear duplicate rights, an access-descriptor-duplication fault occurs. Fetch the segment selector for the destination-access-list access descriptor. Fetch the associated access descriptor. If the access descriptor fetched is not an access-list access descriptor, an access-list-type fault occurs. If the access descriptor fetched does not bear write rights, an access-list-rights fault occurs. Fetch the access-descriptor index. Fetch the associated access descriptor. Check that the destination-access list entry bears delete rights, and if not, an access descriptor deletion fault occurs. Check that the destination-access-list entry contains a null-access descriptor, and if so, continue; otherwise perform path-count decrementation on the associated segment descriptor. Mark the access descriptor to be stored with delete rights. Store the access descriptor at the destination-access-descriptor entry and perform path-count incrementation and reclamation marking on the associated segment descriptor.

NULL-ACCESS DESCRIPTOR    1 data reference

NULL-ACCESS DESCRIPTOR allows an operation to overwrite and thus logically clear a given access-descriptor entry. At the same time access to any object previously available via that access-descriptor entry is given up. The data reference specifies a short-ordinal operand containing the segment selector for the destination-access-list entry. Operator execution proceeds as follows. Fetch the destination-segment selector. If the access descriptor for the destination-access list does not bear write rights, an access-list-rights fault occurs. Fetch the associated access descriptor. Check that the destination-access-list entry bears delete rights, and if not, an access-descriptor-deletion fault occurs. Check that the destination-access-list entry contains a null-access descriptor, and if so, continue; otherwise perform path-count decrementation on the associated segment descriptor. Store a null-access descriptor at the destination-access-descriptor entry. Perform a selective-cache flush using and destination-segment selector.

8.9.2 Type-and Rights-Manipulation Operators

APPLY TYPE    2 data references

APPLY TYPE allows an operation to apply a system type to an object and a set of rights and control information to an access path. The first data reference specifies a short-ordinal operand containing a segment selector for an access descriptor for the given object. The resultant new access descriptor overwrites the original access descriptor for the given object. The second data reference specifies a short-ordinal operand containing a segment selector for a transformer-access descriptor. Operator execution proceeds as follows. Fetch the given-object-segment selector. If the access descriptor for the result-access list does not bear write rights, an access-list-rights fault occurs. Fetch the associated access descriptor. Check that the result-access-list entry bears delete rights, and if not, an access-descriptor-deletion fault occurs. Fetch the transformer-segment selector. Fetch the associated access descriptor. If the descriptor just fetched is not a transformer-access descriptor, a transformer-type fault occurs. If the access descriptor fetched does not bear apply rights, a transformer-rights fault occurs. Check that the base-type field for the given object matches the corresponding field of the transformer, and if not, a base-type-mismatch fault occurs. If the system-type field for the given object is not generic, a retyping fault occurs. Store the system-type field from the transformer in the corresponding field of the given object. Store an access descriptor with the result rights and descriptor control of the transformer at the result-access-descriptor entry. Perform a selective-cache flush using the destination-segment selector.

RESTRICT RIGHTS    2 data references

RESTRICT RIGHTS allows an operation to restrict its access to an object by altering, under control of an unprotected transformer, the access descriptor for that object to have either restricted rights or restricted rights and restricted descriptor control. The first data reference specifies a short-ordinal operand containing a segment selector for an access descriptor for the given object. The second data reference specifies a short-ordinal operand containing a segment selector for a data-segment access descriptor. This segment will be used as a transformer object. The destination-access-list entry is the same as the source-access-list entry. Operator execution proceeds as follows. Fetch the given object segment selector. If the access descriptor for the destination-access list does not bear write rights, an access-list-rights fault occurs. Fetch the associated access descriptor. Check that the destination-access-list entry bears delete rights, and if not, an access-descriptor-deletion fault occurs. Fetch the data segment segment selector. Fetch the associated access descriptor. If the descriptor just fetched is not a data-segment access descriptor, a data-segment-type fault occurs. If this descriptor does not bear read rights, a data-segment-rights fault occurs. Check that the base-and-system-type fields of the given object match the corresponding fields of the transformer, and if not, a type-mismatch fault occurs. Generate the result rights and descriptor-control fields by logically ORing the source rights and descriptor-control fields with the corresponding fields from the transformer. Store an access descriptor with the result rights and descriptor control at the destination-access-descriptor entry. Perform a selective-cache flush using the destination-segment selector.

AMPLIFY RIGHTS    2 data references

AMPLIFY RIGHTS allow an operation to amplify its access to an object by altering, under control of a protected transformer, the access descriptor for that object to have either amplified rights or amplified rights and amplified descriptor control. The first data reference specifies a short-ordinal operand containing a segment selector for an access descriptor for the given object. The second data reference specifies a short-ordinal operand containing a segment selector for a transformer-access descriptor. The destination-access-list entry is the same as the source-access-list entry. Operator execution proceeds as follows. Fetch the given object segment selector. If the access descriptor for the destination-access-list does not bear write rights, an access-list-rights fault occurs. Fetch the associated access descriptor. Fetch the transformer-segment selector. Fetch the associated access descriptor. If the descriptor just fetched is not a transformer-access descriptor, a transformer-type fault occurs. If the access descriptor fetched does not bear amplify rights, a transformer-system-rights fault occurs. Check that the base-and-system-type fields of the given object match the corresponding fields of the transformer, and if not, a type-mismatch fault occurs. If the destination-access-list entry does not bear delete rights and the result-descriptor-control fields of the transformer does not include delete rights, an access-descriptor-deletion fault occurs. Store an access descriptor with the result rights and descriptor control of the transformer at the destination-access-descriptor entry. Perform a selective-cache flush using the destination-segment selector.

8.9.3 Label Manipulation Operators

MOVE LABEL    2 data references

The label at the source address is moved to the destination address. Using the operand stack as the source address results in the classical stack operation POP, and using the operand stack as the destination address results in the classical stack operation PUSH. Using the operand stack as both addresses results in no change. Note that this operator is identical to the MOVE REAL operator and is specified by the same operator code.

SAVE LABEL    1 data reference

The label on top of the operand stack is read without adjusting the stack and moved to the destination address specified by the data reference. Using an implicit reference results in an operand stack configuration in which the top two double words contain the same label value. Note that this operator is identical to SAVE REAL operator and is specified by the same operator code.

EQUAL LABEL    3 data references

The label-source operands are compared for equality and the boolean result is placed in the destination address. Note that this operator is identical to the EQUAL REAL operator and is specified by the same operator code.

NOT EQUAL LABEL    3 data references

The label-source operands are compared for inequality and the boolean result is placed in the destination address. Note that this operator is identical to the NOT EQUAL REAL operator and is specified by the same operator code.

APPLY PATH LEVEL    3 data references

APPLY PATH LEVEL allows an operation to apply a path level to an access path at a specified level. The first data reference specifies a short-ordinal operand containing a segment selector for an access descriptor for the path-level descriptor to be applied. The second data reference specifies a short-ordinal operand containing a segment selector for an access descriptor for the level in the access path at which the path level is to be applied. The destination-access-list entry is the same as that specifying the accesss path. The third data reference specifies a boolean operand which determines whether the path becomes opaque or transparent. Operator execution proceeds as follows. Fetch the path-level-segment selector. Fetch the associated access descriptor. If the access descriptor fetched is not a path-level access descriptor, a path-level-type fault occurs. If the next level information in the path-level descriptor is not zero, a path-level-descriptor-state fault occurs. Fetch the access-path-segment selector. If the access descriptor for the destination-access list does not bear write rights, an access-list-rights fault occurs. Fetch the associated access descriptor. If the access descriptor fetched is a null-access descriptor, an invalid-access-path fault occurs. Check that the destination-access-list entry bears delete rights, and if not, an access-descriptor-deletion fault occurs. Use the access information in this access descriptor to complete the path-level descriptor by filling in its next level information. Fetch the boolean third reference. If the third reference is true, set the path-level descriptor to be opaque. Create an access descriptor using the indices from the access descriptor for the path-level descriptor and the rights-and-descriptor-control information from the access descriptor for the access path. Replace the access descriptor for the access path with the created access descriptor. Perform path-count incrementation and reclamation marking on the associated path-level descriptor. Perform a selective-cache flush using the destination segment selector.

TRAVERSE TRANSPARENT PATH LEVEL
    2 data references

TRAVERSE TRANSPARENT PATH LEVEL allows an operation to traverse one level of an access path if the specified level is transparent. If so, the operation receives an access descriptor for the next-lower level in the path as a result. The first data reference specifies a short-ordinal operand containing a segment selector for an access descriptor specifying the level in the access path which is to be traversed. The second data reference specifies a short-ordinal operand containing a segment selector for the destination-access-list entry. Operator execution proceeds as follows. Fetch the access path segment selector. Fetch the associated access descriptor. If the access descriptor fetched is not a path-level access descriptor, a path-level-type fault occurs. If the path level is opaque, a path-level-state fault occurs. Fetch the destination segment selector. If the access descriptor for the destination-access list does not bear write rights, an access-list-rights fault occurs. Fetch the associated access descriptor. Check that the destination access list entry bears delete rights, and if not, an access-descriptor-deletion fault occurs. Check that the destination-access-list entry contains a null-access descriptor, and if so, continue; otherwise perform path-count decrementation on the associated segment descriptor. Create an access descriptor using the next-level information in the path level and the rights and descriptor control information from the access descriptor for the path level. Store the created access descriptor at the destination-access-descriptor entry. Perform path-count incrementation and reclamation marking on the next level descriptor.

TRAVERSE OPAQUE PATH LEVEL    3 data references

TRAVERSE OPAQUE PATH LEVEL allows an operation to traverse one level of an access path if both the specified level of that pah is opaque and the value of a specified label is equal to that of the label accessible via that level of the access path. If so, the operation receives an access descriptor for the next-lower level in the path as a result. The first data reference specifies a short-ordinal operand containing a segment selector for an access descriptor specifying the level in the access path which is to be traversed. The second data reference specifies a short-ordinal operand containing a segment selector for an access descriptor for the label to be compared. The third data reference specifies a short-ordinal operand containing a segment selector for the destination-access-list entry. Operator execution proceeds as follows. Fetch the access-path segment selector. Fetch the associated access descriptor. If the access descriptor fetched is not a path-level access descriptor, a path-level-type fault occurs. If the path level is transparent, a path-level-state fault occurs. Fetch the label segment selector. Fetch the associated access descriptor. If the access descriptor fetched is not a label-access descriptor, a label-type fault occurs. If the value of the specified label is not equal to that of the label accessible via the specified level of the access path, a label-mismatch fault occurs. Fetch the destination-segment selector. If the access descriptor for the destination-access list does not bear write rights, an access-list-rights fault occurs. Fetch the associated access descriptor. Check that the destination-access-list entry bears delete rights, and if not, an access-descriptor-deletion fault occurs. Check that the destination-access-list entry contains a null-access descriptor, and if so, continue; otherwise perform path-count decrementation on the associated segment descriptor.

8.9.4 Segment Creation Operators

CREATE DATA SEGMENT    3 data references

CREATE DATA SEGMENT allows an operation to create a data segment and an access descriptor for it. The first data reference specifies a short-ordinal operand containing the length of the segment to be created. The second data reference specifies a short-ordinal operand containing a segment selector for a storage-resource access descriptor. The third data reference specifies a short-ordinal containing a segment selector for the destination-access-descriptor entry. Operator execution proceeds as follows. Fetch the destination segment selector. If the access descriptor for the destination-access list does not bear write rights, an access-list-rights fault occurs. Check that the destination-access-list entry bears delete rights, and if not, an access-descriptor-deletion fault occurs. Fetch the storage-resource segment selector. Fetch the associated access descriptor. If this descriptor is not a storage-resource access descriptor, a storage-resource-type fault occurs. Fetch the segment-table access descriptor from the storage-resource object. If the access descriptor fetched is not a segment-table access descriptor, a segment-table-type fault occurs. If the segment-table access descriptor does not bear allocation rights, a segment-table-rights fault occurs. Fetch the segment length. Perform a segment-descriptor-allocation cycle. Perform a storage-allocation cycle. Mark the allocated segment descriptor with base-type-data segment and generic-system type. Mark the created data-segment access descriptor for the created segment with no restrictions on rights or descriptor control. Check that the destination access-list entry contains a null-access descriptor, and if so, continue; otherwise, perform path-count decrementation on the associated segment descriptor. Store the created access descriptor at the specified destination entry. Perform a selective-cache flush using the destination segment selector.

CREATE ACCESS LIST    3 data references

CREATE ACCESS LIST allows an operation to create an access list and an access descriptor for it. Operator execution proceeds as with CREATA DATA SEGMENT except that the allocated segment descriptor is marked with base-type-access list and generic-system type.

CREATE PATH LEVEL    3 data references

CREATE PATH LEVEL allows an operation to create a path level and an access descriptor for it. The first data reference specifies a short-ordinal operand containing a segment selector for the destination-access-descriptor entry. The second data reference specifies a short-ordinal operand containing a segment selector for a path-level-table access descriptor. The third data reference specifies a short-ordinal operand containing a segment selector for a label-object access descriptor. Operator execution proceeds as follows. Fetch the segment selectors. If the access descriptor for the destination-access list does not bear writes, an access-list-rights fault occurs. Check that the destination-access list entry bears delete rights, and if not, an access descriptor deletion fault occurs. Fetch the access descriptor for the path-level table. If it is not a path-level-table access descriptor, a path-level-table-type fault occurs. If the path-level-table access descriptor does not bear allocation rights, a path-level-table-rights fault occurs. Perform a path-level descriptor allocation cycle. Mark the allocated path-level descriptor as having a label associated. Mark the created path-level access descriptor for the created path level with no restriction in rights or descriptor control. Check that the destination-access-list entry contains a null-access descriptor, and if so, continue; otherwise, perform path-count decrementation on the assocated segment-descriptor. Store the created access-descriptor at the specified destination entry. Perform a selective-cache flush using the destination-segment selector.

CREATE ACCESS-DESCRIPTOR     3 data references

CREATE ACCESS-DESCRIPTOR allows an operation to create an access-descriptor for an object under controlled circumstances. The first data reference specifies a short-ordinal operand containing a segment selector for a segment-table access descriptor. The required directory index is taken from this access descriptor. The second data reference specifies a short-ordinal operand containing the segment index. The third data reference specifies a short-ordinal operand containing a segment selector for the destination-access-list entry. Operator execution proceeds as follows. Fetch the segment-table segment selector. Fetch the associated access descriptor. If the access-descriptor fetched is not a segment-table access descriptor, a segment-table-type fault occurs. If the access-descriptor fetched does not bear write rights, a segment-table-rights fault occurs. Fetch the segment index. Fetch the destination segment selector. If the access-descriptor for the destination access-list does not bear write rights, an access-list-rights fault occurs. Fetch the associated access descriptor. Check that the destination-access-list entry bears delete rights, and if not, an access-descriptor-deletion fault occurs. Create an access descriptor using the fetched indices. Mark the created access descriptor with no restrictions on rights or descriptor control. Perform access-count incrementation and reclamation marking on the associated segment descriptor. Check that the destination-access-list entry contains a null-access descriptor, and if so, continue; otherwise, perform path-count decrementation on the associated segment descriptor. Store the created access descriptor at the specified destination entry. Perform a selective-cache flush using the destination segment selector.

8.9.5 Access Path Inspection Operators

READ ACCESS DESCRIPTOR     2 data references

READ ACCESS DESCRIPTOR allows an operation to read an access-descriptor from any directly-accessible list and store it as an ordinal in any directly-accessible data segment. The first data reference specifies a short-ordinal operand containing a segment selector for the access descriptor to be read. The second data reference specifies an ordinal operand into which the access-descriptor is to be stored. Operator execution proceeds as follows. Fetch the source segment selector. Fetch the source access descriptor. Store the access descriptor in the destination operand.

READ LABEL     2 data references

READ LABEL allows an operation to read the label information via any directly-accessible path level and store it in any directly-accessible data segment. The first data reference specifies a short-ordinal operand containing a segment selector for an access descriptor for the path level via which the label information is to be read. The second data reference specifies a double-word operand into which the label information is to be stored. Operator execution proceeds as follows. Fetch the source segment selector. Fetch the associated access descriptor. If the access descriptor fetched is not a path-levl access descriptor, a path-level-type fault occurs. Fetch the associated label information. Store the label information in the destination operand.

READ SEGMENT DESCRIPTOR     2 data references

READ SEGMENT DESCRIPTOR allows an operation to read the segment-descriptor information for any directly-accessible segment and store it in any directly-accessible data segment. The first data reference specifies a short-ordinal operand containing a segment selector for an access descriptor for the segment descriptor from which the information is to be read. The second data reference specifies a double-word operand into which the segment descriptor information is to be stored. Operator execution proceeds as follows. Fetch the source segment selector. Fetch the associated access descriptor. If the access descriptor fetched does not reference a segment, an access-descriptor-type fault occurs. Fetch the associated segment-descriptor information in the destination operand.

8.9.6 Object Interlocking

LOCK OBJECT     2 data references

LOCK OBJECT allows a process to interlock a lockable system object with respect to processors or any other process until a corresponding UNLOCK OBJECT operator is executed. The first data reference specifies a short-ordinal operand containing a segment selector for an access descriptor for a lockable system object. The second data reference specifies a boolean operand which is set to true if the object becomes locked. Operator execution proceeds as follows. Fetch the lockable-object segment selector. Fetch the associated access descriptor. If the access descriptor fetched is not a lockable-object access descriptor, a lockable-object-type fault occurs. Fetch the process identification number from the process object. If the software lock is set, store false in the boolean operand. Continue execution; otherwise, if the hardware lock of the accessed segment is set, the processor executing the instruction reattempts the instruction three times, each time after idling for 100 machine cycles. If the hardware lock is still set after four attempts, store false in the boolean operand. Continue execution; otherwise, when the hardware lock is clear, set the software lock. Store the proces identification number in the locker identification field. Store true in the boolean operand.

UNLOCK OBJECT     2 data references

UNLOCK OBJECT allows a process to unlock a lockable system object with respect to processors or any other process after a corresponding LOCK OBJECT operator has been executed. The first data reference specifies a short-ordinal operand containing a segment selector for an access descriptor for a lockable system object. The second data reference specifies a boolean operand which is set to true if the object becomes unlocked. Operator execution proceeds as follows. Fetch the lockable-object segment selector. Fetch the associated access descriptor. If the access descriptor fetched is not a lockable-object access descriptor, a lockable-object-type fault occurs. Indivisibly fetch the object-lock field and, if it is locked, unlock it and clear the locker-identification field. If the lock was not already locked, store false in the boolean operand. If the lock was already locked, store true in the boolean operand.

INDIVISIBLY ADD SHORT-ORDINAL     2 data references

The short-ordinal source operand is indivisibly added to the destination operand and the result is placed in the destination address. A short-ordinal overflow fault can occur.

INDIVISIBLY SUBTRACT SHORT ORDINAL     2 data references

The short-ordinal source operand is indivisibly subtracted from the destination operand and the result is placed in the destination address. A short-ordinal overflow fault can occur.

INDIVISIBLY INSERT ORDINAL   3 data references

The second-source operand is an ordinal that contains a right-justified bit field to be inserted into another ordinal. The first data reference locates a pair of adjacent character operands aligned on a double-byte boundary that forms the descriptor that specifies the field in the target operand to be replaced by the inserted field. The destination address specifies the ordinal into which the bit field is individisbly inserted.

8.10 BRANCH OPERATORS

The branch operators provide a means for altering the normal sequential order of instruction execution within the instruction stream. Unconditional and conditional branch operators are provided to branch to any instruction in the current instruction segment.

Branch references in the instruction indicate the location of the target instruction. Relative branch references provide the signed displacement in bits from the beginning of the instruction containing the branch operator to the first bit of the target instruction. Absolute branch references provide the displacement in bits from the base of the current instruction segment to the first bit of the target instruction.

The conditional branch operators require a data reference for a character operand whose value is used as a boolean value to determine whether the branch is made or not. The test of a boolean value involves testing only the least significant bit. If the bit is a 1, the result is true; otherwise the result is false.

The indirect branch operator provides the ability to determine the target of the branch dynamically during execution by allowing the next value of the instruction pointer to be specified by the value of a short-ordinal operand.

The intersegment branch operators provide the ability to branch to a different instruction segment in the current domain.

If a branch reference in an instruction containing any branch operator specifies a displacement, either relative or absolute, to a point that is outside the boundary of the segment containing the target instruction, an instruction-segment-displacement fault occurs.

8.10.1 Intrasegment Branch Operators.

BRANCH   1 branch reference

A branch is made within the current instruction segment to the target instruction specified by the branch reference. An instruction-segment-displacement fault can occur.

BRANCH TRUE   1 data reference; 1 branch reference

A branch is made in the instruction stream if the boolean value specified by the source operand has the value true. An instruction-segment-displacement fault can occur.

BRANCH FALSE   1 data reference; 1 branch reference

A branch is made in the instruction stream if the boolean value specified by the source operand has the value false. An instruction-segment-displacement fault can occur.

BRANCH INDIRECT   1 data reference

The short-ordinal value specified by the source operand is used as the new value for the instruction pointer. The net result is a branch within the current instruction segment to the instruction whose bit displacement from the base of the segment is given by the short-ordinal operand. An instruction-segment-displacement fault can occur.

8.10.2 Intersegment Branch Operators

BRANCH INTERSEGMENT   2 data references

BRANCH INTERSEGMENT allows a context to use several instruction segments by providing a means for changing not only the current instruction pointer, but also the curren instruction segment. The first data reference specifies a short-ordinal operand containing a segment selector for the new instruction segment. It may only select an entry in either the public or private-access lists of the context. The second data reference specifies a short-ordinal operand containing the bit displacement from the base of the new instruction segment to the first bit of the instruction where execution is to continue. Operator execution proceeds as follows. Fetch the new instruction segment selector. If the entry it selects is not in either the public or private access list of the context, an access-list-type fault occurs; otherwise, fetch the associated access descriptor. If the access descriptor fetched is not an instruction-segment access descriptor, an instruction-segment-type fault occurs. Fetch the branch-displacement operand. If the value is greater than the length of the new instruction segment, an instruction-segment-displacement fault occurs. Replace the current instruction segment selector in the current context control segment with the new instruction segment selector. Replace the current instruction pointer with the branch displacement value. Continue execution.

BRANCH INTERSEGMENT AND LINK   3 data references

BRANCH INTERSEGMENT AND LINK allows a context to change its current instruction segment and store the necessary linkage information to allow later return. The first data reference specifies a short-ordinal operand containing a segment selector for the new instruction segment. It may only select an entry in either the public or private access lists for the context. The second data reference specifies a short-ordinal operand for the instruction-segment selector link. The third data reference specifies a short-ordinal operand for the instruction-pointer link. Operator execution proceeds as follows. Fetch the new instruction segment selector. If the entry it selects is not in either the public or private access list of the context, an access-list-type fault occurs; otherwise, fetch the associated access descriptor. If the access descriptor fetch is not an instruction-segment access descriptor, an instruction-segment-type fault occurs. Store the current instruction segment selector in the specified instruction segment selector link. Replace the current instruction segment selector in the current context control segment with the new instruction segment selector. Replace the current instruction pointer with zero. Continue execution.

8.11 COMMUNICATION OPERATORS

The operators used for communication between contexts, coroutines, processes, and processors are described below.

In order not to complicate the descriptions of those operators that make use of common, but somewhwat involved suboperations, the descriptions simply refer to these suboperations by name. Similarly, for those operators that implicitly invoke other defined operators, the latter are also referred to by name. In both cases, the name of the suboperation or operator will be preceded by the word "perform" to indicate its use or invocation.

8.11.1 Context Communication Operators

ENTER ACCESS LIST    1 data reference

ENTER ACCESS LIST allows an operation to gain direct access to the access descriptors in an access list to which it has base read rights. The data reference specifies a short-ordinal containing the segment selector for an access descriptor for the access list to be entered. Operator execution proceeds as follows. Fetch the access list segment selector. Fetch the associated access descriptor. If the access descriptor fetched is not an access-list access descriptor, an access-list-type fault occurs. If the access descriptor fetched does not bear base read rights, an access-list-rights fault occurs. Check that the entry-access-list entry contains a null descriptor, and if so, continue; otherwise, perform path-count decrementation on the associated segment-descriptor. Alter the entry access list of the current context to be the access list entered on the processor. Store a copy of the new entry-access-list access descriptor, without duplicate or delte rights, in the entry-access-list entry of the current context object. Perform path-count incrementation and reclamation marking on the associated segment descriptor. Perform a selective-cache flush on all entries associated with the entry access list. Continue execution.

CREATE CONTEXT    2 data references

CREATE CONTEXT allows an operation to create a context for an operation to which it has direct access. The first data reference specifies a short-ordinal operand containing a segment selector for an instruction segment in the current domain or an entered domain. The second data reference specifies a short-ordinal operand containing the segment selector for the destination-access-lst entry. Access to the process-storage resource object is implied. Operator execution proceeds as follows. Fetch the destination segment selector. If the access descriptor for the destination access lisst does not bear write rights, an access-list-rights fault occurs. Check that the destination-access-list entry bears delete rights, and if not, an access-descriptor-deletion fault occurs. Fetch the instruction segment selector. If the entry it selects is not in either the public or private access list of the context or the public access list of an entered domain, an access-list-type fault occurs. Fetch the associated access descriptor. If the access descriptor fetched is not an instruction-segment access descriptor, an instruction-segment-type fault occurs. If the access descriptor does not bear create rights, an instruction-segment-rights fault occurs. Fetch the desired contact-access-list length from the instruction segment. Add the desired length to the required minimum. Perform a segment descriptor allocation cycle. Perform a storage allocation cycle. Fetch the desired context-control-segment length from the instruction segment. Add the desired length to the required minimum. Perform a segment descriptor allocation cycle. Perform a storage allocation cycle. Mark the created data-segment access descriptor for the context control segment without duplicate or delete rights. Store the created access descriptor at the context-control-segment entry of the new contact access list. Fetch the desired operand-stack length from the instruction segment. Check that the desired length is greater than zero, and if not, store a null access descriptor at the operand-stack entry of the new context access list; otherwise, perform a segment descriptor allocation cycle. Perform a storage allocation cycle. Mark the created data-segment access descriptor for the operand-stack without duplicate or delete rights. Store the created access descriptor at the operand-stack entry of the new contact access list. Set the instruction pointer in the new context control segment to 48. Set the operand-stack pointer in the new context control segment to zero. Store the instruction segment selector in the new context control segment. Set the context status in the new context control segment to zero. Set the fault-handler segment selector in the new context control segment to zero. Store a copy of the public-access-list access descriptor for the domain of definition of the instruction segment, without delete rights, in the new context object. Perform path-count incrementation and reclamation marking on the associated segment descriptor. Fetch the private-access-list access descriptor from the zero entry of the public access list of the new context object. If this descriptor is not a private-access-list access descriptor, a private-access-list-type fault occurs. Store a copy of this descriptor without delete rights and with base read rights, in the new context object. Perform path-count incrementation and reclamation marking on the associated segment descriptor. Check that the destination-access-list entry contains a null access descriptor, and if so, continue; otherwise, perform path-count decrementation on the associated segment descriptor. Store the created access descriptor for the new context, with base and uninterpreted rights equal to those available via the original private-access-list access descriptor for the domain of definition of the new context, at the specified destination entry. Perform a selective-cache flush using the destination segment selector.

SET CONTEXT MODE    1 data reference

SET CONTEXT MODE allows an operation to change the mode settings for the current context, both on the processor and in the context status field of the current context control segment. The first data reference specified a short-ordinal operand containing a set of new context mode flags. Operator execution proceeds as follows. Fetch the mode flags. Mask out the context state so that it will not be changed, either on the processor or in the context control segment. Store the resultant flags, both in the context status field of the context control segment and on the processor.

CALL CONTEXT WITH MESSAGE    2 data references

CALL CONTEXT WITH MESSAGE allows an operation to call any directly-accessible context and pass a message to that context. The first data reference specifies a short-ordinal operand containing a segment selector for an access descriptor for the message to be passed. The second data reference specifies a short-ordinal operand containing a segment selector for an access descriptor for the context to be called. Operator execution proceeds as follows. Fetch the message segment selector. Fetch the associated access descriptor. If the access descriptor does not bear delete rights, an access-descriptor-deletion fault occurs. Fetch the context segment selector. Fetch the associated access descriptor. If the access descriptor fetched is not a contact access descriptor, a context-type fault occurs. Fetch the new context control segment access descriptor from the new context object. Fetch the context status information from the new context control segment. If the context is not in a suspended for call state, a context state fault occurs. Store the operand-stack pointer, the instruction pointer, and the instruction segment selector in the current context control segment. Set the state of the current context to suspended for return. Store the context state and the other fields of the context status information in the current context control segment. Fetch the new domain access descriptor from the new context object. If the access descriptor fetched is not a domain access descriptor, a domain-type fault occurs. Fetch the new private-access list access descriptor from the new context object. If the access descriptor fetched is not a private-access-list access descriptor, a private-access-list-type fault occurs. Fetch the new instruction segment selector from the new context control segment. Fetch the new instruction-segment access descriptor from the new context. If the access descriptor fetched is not an instruction-segment access descriptor, an instruction-segment-type fault occurs. Fetch the new operand-stack access descriptor from the new context object. If the access descriptor fetched is not an operand-stack access descriptor or null, an operand-stack-type fault occurs. Check that the message entry of the new context object contains a null access descriptor, and if so, continue; otherwise, perform path-count decrementation on the associated segment descriptor. Replace the source-message access descriptor with a null access descriptor and perform reclamation marking on the associated segment descriptor. Store the passed-message access descriptor in the message entry of the new context object. Perform path-count decrementation on the segment descriptor associated with the current context entry in the current process object. Fetch the current contact access descriptor from the current context entry in the current context object, replace it with a null access descriptor. Store the current contact access descriptor in the caller's contact access descriptor (with base read-and-write rights, both uninterpreted rights, and duplicate rights, but without delete rights) in the current contact access descriptor entry in the current process object and in the current context entry of the new context object and perform double path-count incrementation and reclamation marking on the associated segment descriptor. Fetch the new instruction pointer and the new operand-stack pointer from the new context control segment. Set the context state in the new context control segment to active. Continue execution.

CALL CONTEXT  1 data reference

CALL CONTEXT allows an operation to call any directly-accessible context. The data reference specifies a short-ordinal operand containing a segment selector for an access descriptor for the initial instruction segment of the operation to be called. Operator execution proceeds as with CALL CONTEXT WITH MESSAGE except that no message is passed.

RETURN MESSAGE  1 data reference

RETURN MESSAGE allows an operation to return to the context from which it was called and return a message to that context. The data reference specifies a short-ordinal operand containing a segment selector for the message to be returned. The context-to-be-returned-to is implicitly specified via the link-access-descriptor entry of the current context. Operator execution proceeds as follows. Fetch the message segment selector. Fetch the associated access descriptor. If the access descriptor does not bear delete rights, an access-descriptor-deletion fault occurs. Fetch the access descriptor from the link entry of the current context object. If the access descriptor fetched is not a contact access descriptor, a context-type-fault occurs. Fetch the new context control-segment access descriptor from the new context object. Fetch the context state information from the new context control segment. If the context is not in a suspended-for-return state, a context-state fault occurs. Once it has been established that the context-to-be-returned-to can in fact be returned to, store a null access descriptor in the link entry of the current context object to indicate its further usability. Store the operand-stack pointer, the instruction pointer, and the instruction segment selector in the current context control segment. Set the state of the current context to suspended-for-call. Store the context state and the other fields of the context status information in the current context control segment. Fetch the new domain access descriptor from the new context object. If the access descriptor fetched is not a domain access descriptor, a domain-type fault occurs. Fetch the new private-access-list access descriptor from the new domain object. If the access descriptor fetched is not a private-access-list access descriptor, a private-access-list-type fault occurs. Fetch the new instruction segment selector from the new context control segment. Fetch the new instruction-segment access descriptor from the new context. If the access descriptor fetched is not an instruction-segment access descriptor, an instruction-segment-type fault occurs. Fetch the new operand-stack access descriptor from the new context object. If the access descriptor fetched is not an operand-stack access descriptor or null, an operand-stack-type fault occurs. Check that the message entry of the new context object contains a null access descriptor, and if so, continue; otherwise, perform path-count decrementation on the associated segment descriptor. Replace the source-message access descriptor with a null access descriptor and perform reclamation marking on the associated segment descriptor. Store the passed-message access descriptor in the message entry of the new context object. Perform path-count decrementation on the segment descriptor associated with the current context entry in the current process object. Replace the current contact access descriptor in the current context entry in the current context object with a null access descriptor, and perform path-count decrementation and reclamation marking on the associated segment descriptor. Store a copy of the new contact access descriptor (with base read-and-write rights, both uninterpreted rights, and duplicate rights, but without delete rights) in the current contact access-descriptor entry in the current process object and in the current context entry of the new context object and perform double path-count incrementation and reclamation marking on the associated segment descriptor. Fetch the new instruction pointer and the new operand stack pointer from the new context control segment. Set the context state in the new context control segment to active. Continue execution.

RETURN

RETURN allows an operation to return to the context from which it was called. Operator execution proceeds as with RETURN MESSAGE except that no message is returned.

RETURN MESSAGE AND FAULT  2 data references

RETURN MESSAGE AND FAULT allows an operation to return to the context from which it was called, return a message to that context, and cause a context-level fault in that context. The second data reference specifies an ordinal operand containing fault-type information. Operator execution proceeds as with RETURN MESSAGE except that a context-level fault is forced prior to executing any instruction in the context to which control is returned.

8.11.2 Coroutine Communication Operators

RESUME COROUTINE   3 data references

RESUME COROUTINE allows a coroutine to resume any directly-accessible coroutine, pass a message to the resumed coroutine, and suspend itself at any directly-accessible-and-available nonbuffered port. The first data reference specifies a short-ordinal operand containing a segment selector for an access descriptor for the message to be passed. The second data reference specifies a short-ordinal operand containing a segment selector for an access descriptor for the nonbuffered port at which the coroutine-to-be-resumed should be suspended. The third data reference specifies a short-ordinal operand containing a segment selector for an access descriptor for the nonbuffered port at which the current coroutine is to be suspended. Operator execution proceeds as follows. Fetch the message segment selector. Fetch the associated access descriptor. If the access descriptor does not bear delete rights, an access-descriptor-deletion fault occurs. Fetch the resumption-port segment selector. Fetch the associated access descriptor. If the access descriptor fetched is not a nonbuffered-port access descriptor, a nonbuffered-port-type fault occurs. Fetch the access descriptor contained in the nonbuffered port. If the access descriptor fetched is not a context access descriptor, a nonbuffered-port-state fault occurs. Fetch the new context-control-segment access descriptor from the new context object. Fetch the context-state information from the new context-control segment. If the context is not in a suspended-for-resume state, a context-state fault occurs. Once it has been established that the context to be resumed can in fact be resumed, store a null-access descriptor in the nonbuffered port to indicate its further usability. Fetch the suspension-port segment selector. Fetch the associated access descriptor. If the access descriptor fetched is not a nonbuffered-port access descriptor, a domain-type fault occurs. Fetch the new private-access-list access descriptor from the new domain object. If the access descriptor fetched is not a private-access-list access descriptor, a private-access-list-type fault occurs. Fetch the new instruction segment selector from the new context-control segment. Fetch the new instruction-segment access descriptor from the new context. If the access descriptor fetched is not an instruction-segment access descriptor, an instruction-segment-type fault occurs. Fetch the new operand-stack access descriptor from the new context object. If the access descriptor fetched is not an operand-stack access descriptor, an operand-stack-type fault occurs. Check that the message entry of the new context object contains a null access descriptor, and if so, continue; otherwise, perform path-count decrementation on the associated segment descriptor. Replace the source-message access descriptor with a null access descriptor and perform reclamation marking on the associated segment descriptor. Store the passed-message access descriptor in the message entry of the new context object. Perform path-count decrementation on the segment descriptor associated with the current context entry in the current process object. Store a copy of the new contact access descriptor (with base read-and-write rights, both uninterpreted rights, and duplicate rights, but without delete rights) in the current contact access-descriptor entry in the current process object and in the current context entry of the new context object and perform double-path-count incrementation and reclamation marking on the associated segment descriptor. Fetch the new instruction pointer and the new operand-stack pointer from the new context control segment. Set the context state in the new context control segment to active. Continue execution.

8.11.3 Process Communication Operators

SEND   2 data references

SEND allows a process to send a message via a target port. The first data reference specifies a short-ordinal operand containing the segment selector for the message to be sent. The second data reference specifies a short-ordinal operand containing the segment selector for an access descriptor for the port through which the message is to be sent. Operator execution proceeds as follows. Fetch the message segment selector. Fetch the associated access descriptor. If the access descriptor does not bear delete rights, an access-descriptor-deletion fault occurs. Fetch the target-port segment selector. Fetch the associated access descriptor. If the access descriptor fetched is not either a dispatching-port or a buffered-port access descriptor, a port-type fault occurs. If the access descriptor fetched does not bear send rights, a port-rights fault occurs. Replace the source-message access descriptor with a null access descriptor and perform reclamation marking on the associated segment descriptor. Perform message insertion at the target port and continue execution.

WAIT-TO-RECEIVE   1 data reference

WAIT-TO-RECEIVE allows a process to wait at a buffered port for a message from some process. The data reference specifies a short-ordinal operand containing the segment selector for an access descriptor for the buffered port at which the process desires to wait-to-receive a message. Operator execution proceeds as follows. Fetch the buffered-port segment selector. Fetch the associated access descriptor. If the access descriptor fetched is not a buffered-port access descriptor, a port-type fault occurs. If the access descriptor fetched does not bear receive rights, a port-rights fault occurs. If a message is not available at the buffered port, perform process suspension at the buffered port and perform dispatching; otherwise, perform message acceptance from the buffered port. Check that the message entry of the current context of the current process contains a null access descriptor, and if so, continue; otherwise, perform path-count decrementation on the associated segment descriptor. Store the received-message in the message entry of the current context of the current process. Perform a selective-cache flush using the destination segment selector. Continue execution.

CONDITIONAL SEND   3 data references

CONDITIONAL SEND allows a process to check for the availability of message-queuing space at a target port and to indivisibly send a message to that port if queuing space is available. The first data reference specifies a short-ordinal operand containing the segment selector for the message to be sent. The second data reference specifies a short-ordinal operand containing the segment selector for an access descriptor for the port through which the message is to be sent. The third data reference specifies a boolean operand which is set to true if the message was sent. Operator execution proceeds as follows. Fetch the message segment selector. Fetch the associated access descriptor. If the access descriptor does not bear delete rights, an access-descriptor-deletion fault occurs. Fetch the target-port segment selector. Fetch the associated access descriptor. If the access descriptor fetched is not either a buffered-port or a dispatching-port access descriptor, a port-type fault occurs. If the access descriptor fetched does not bear send rights, a port-rights fault occurs. If message-queue space is available, replace the source-message access descriptor with a null access descriptor, perform reclamation marking on the associated segment descriptor, perform message insertion at the target port, and store true in the boolean operand; otherwise, store false in the boolean operand. Continue execution.

CONDITIONAL RECEIVE     2 data references

CONDITIONAL RECEIVE allows a process to check for the availability of a message at a buffered port and to indivisibly accept it if one is available. The first data reference specifies a short-ordinal operand containing the segment selector for an access descriptor for the buffered port which the process desired to check for a message. The second data reference specifies a boolean operand which is set to true if a message is received. Operator execution proceeds as follows. Fetch the buffered-port segment selector. Fetch the associated access descriptor. If the access descriptor fetched is not a buffered-port access descriptor, a port-type fault occurs. If the access descriptor fetched does not bear receive rights, a port-rights fault occurs. If a message is not available at the buffered port, store false in the boolean operand; otherwise, perform message acceptance from the buffered port. Check that the message entry of the current context of the current process contains a null access descriptor, and if so, continue; otherwise, perform path-count decrementation on the associated segment descriptor. Store the received message in the message entry of the current context of the current process. Perform a selective-cache flush using the destination segment selector. Store true in the boolean operand. Continue execution.

WAIT n TIME QUANTA     1 data reference

WAIT n TIME QUANTA allows a process to send itself to a dispatching port and be guaranteed that a dispatching delay of n time quanta will pass prior to it being redispatched. The first data reference specifies a short-ordinal operand containing the dispatching delay value. The dispatching port used is the current service port of the process. Operator execution proceeds as follows. Fetch the current service-port access descriptor from the current process object. If the access descriptor fetched is not a dispatching-port access descriptor, a port-type fault occurs. If the access descriptor fetched does not bear send rights, a port-rights fault occurs. Fetch the dispatching delay value. Perform process suspension at the dispatching port using the dispatching delay value in deadline computation. Perform dispatching.

WAIT-TO-RECEIVE OR n TIME QUANTA     2 data references

WAIT-TO-RECEIVE OR n TIME QUANTA allows a process to send itself to a dispatching port so that it can be guaranteed that, if it has not received a message via a specified buffered port before a dispatching delay of n time quanta passes, it will become dispatchable again. The first data reference specifies a short-ordinal operand containing the dispatching delay value. The dispatching port used is the current service port of the process. The second data reference specifies a short-ordinal operand containing the segment selector for an access descriptor for the buffered port at which the process desires to wait to receive a message. Operator execution proceeds as follows. Fetch the buffered port segment selector. Fetch the associated access descriptor. If the access descriptor fetched is not a buffered-port access descriptor, a port-type fault occurs. If the access descriptor fetched does not bear receive rights, a port-rights fault occurs. If a message is not available at the buffered port, perform process suspension at the buffered port and also send the process to the specified dispatching port as described below; otherwise, perform message acceptance from the buffered port. Check that the message entry of the current context of the current process contains a null access descriptor, and if so, continue; otherwise, perform path-count decrementation on the associated segment descriptor. Store the received message in the message entry of the current context of the current process. Perform a selective-cache flush using the destination segment selector. Continue execution; otherwise fetch the current service-port access descriptor from the current process object. If the access descriptor fetched is not a dispatching-port access descriptor, a port-type fault occurs. If the access descriptor fetched does not bear send rights, a port-rights fault occurs. Fetch the dispatching delay value. Perform process suspension at the dispatching port using the dispatching delay value in deadline computation. Perform dispatching.

READ-PROCESS IDENTIFICATION     1 data reference

The 16-bit-process-identification number of the current process is read from the process object and stored in the short-ordinal operand specified by the destination reference.

READ-PRINCIPAL IDENTIFICATION     1 data reference

The 16-bit-principal-identification number of the current principal is read from the process object and stored in the short-ordinal operand specified by the destination reference.

READ PROCESS CLOCK     1 data reference

The 32-bit process clock of the current process is read from the process object, updated to include time consumed during the current service period, and stored in the ordinal operand specified by the destination reference.

8.11.4 Processor Communication Operators

SEND TO PROCESSOR     3 data references

SEND TO PROCESSOR allows a process to send an interprocessor message to one specific processor, including the processor it is executing on, via the interprocessor communication mechanism. The first data reference specifies a short-ordinal operand containing the interprocessor message. The second data reference specifies a short-ordinal operand containing a segment selector for an access descriptor for the desired processor object. The third data reference specifies a boolean operand which is set to true if the control flags are deposited. Operator execution proceeds as follows. Fetch the interprocessor message. Fetch the processor-object segment selector. Fetch the associated access descriptor. If the access descriptor fetched is not a processor-object access descriptor, a processor-object-type fault occurs. If the access descriptor fetched does not bear send rights, a processor-object-rights fault occurs. Fetch the access descriptor for the processor control segment from the processor object. If the software-request lock is set, store false in the boolean operand. Continue execution; otherwise, if either the hardware-request lock or the response lock of the accessed communication segment is set, the processor executing the instruction reattempts the instruction three times, each time after idling for 100 machine cycles. If either lock is still set after four attempts, store false in the boolean operand. Continue execution; otherwise, when both locks are clear, lock them both. Store the interprocessor message in the communication field of the communication segment. Clear the hardware-request lock. Store true in the boolean operand.

BROADCAST TO PROCESSORS   3 data references

BROADCAST TO PROCESSORS allows a process to broadcast an interprocessor message to all the processors in the system, including the processor it is executing on, via the interprocessor communication mechanism. The first data reference specifies a short-ordinal operand containing the interprocessor message. The second data reference specifies a short-ordinal operand containing a segment selector for an access descriptor for the desired processor object. The third data reference specifies a boolean operand which is set to true if the control flags are deposited. Operator execution proceeds as follows. Fetch the interprocessor message. Fetch the processor object segment selector. Fetch the associated access descriptor. If the access descriptor fetched is not a processor-object access descriptor, a processor-object-type fault occurs. If the access descriptor fetched does not bear broadcast rights, a processor-object-rights fault occurs. Fetch the access descriptor for the global-processor communication segment from the processor object. If the software-request lock is set, store false in the boolean operand. Continue execution; otherwise, if either the hardware-request lock or the response lock of the accessed communication segment is set, the processor executing the instruction reattempts the instruction three times, each time after idling for 100 machine cycles. If either lock is still set after four attempts, store false in the boolean operand. Continue execution; otherwise, when both locks are clear, lock them both. Store the interprocessor message in the communication field of the communication segment. Clear the hardware-request lock. Store true in the boolean operand.

READ PROCESSOR STATUS   1 data reference

The 16-bit-processor-status field of the current processor is read from the processor object and stored in the short-ordinal operand specified by the destination reference. The processor-status field includes both processor unit number and processor status information.

PART 2. GENERALIZED DATA PROCESSOR & SYSTEM INTERCONNECTIONS

9.0 INSTRUCTION UNIT

Figure 5:
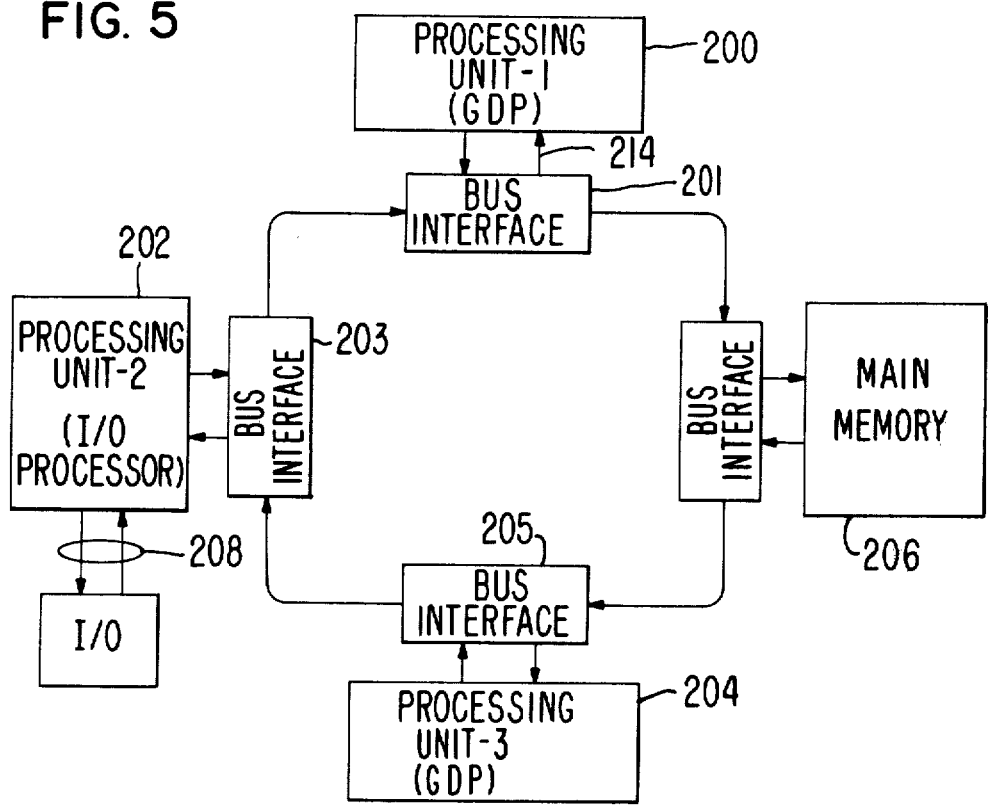
FIG. 5 is a block schematic diagram of a computer system of a type in which the invention may be embodied.
Figure 6:
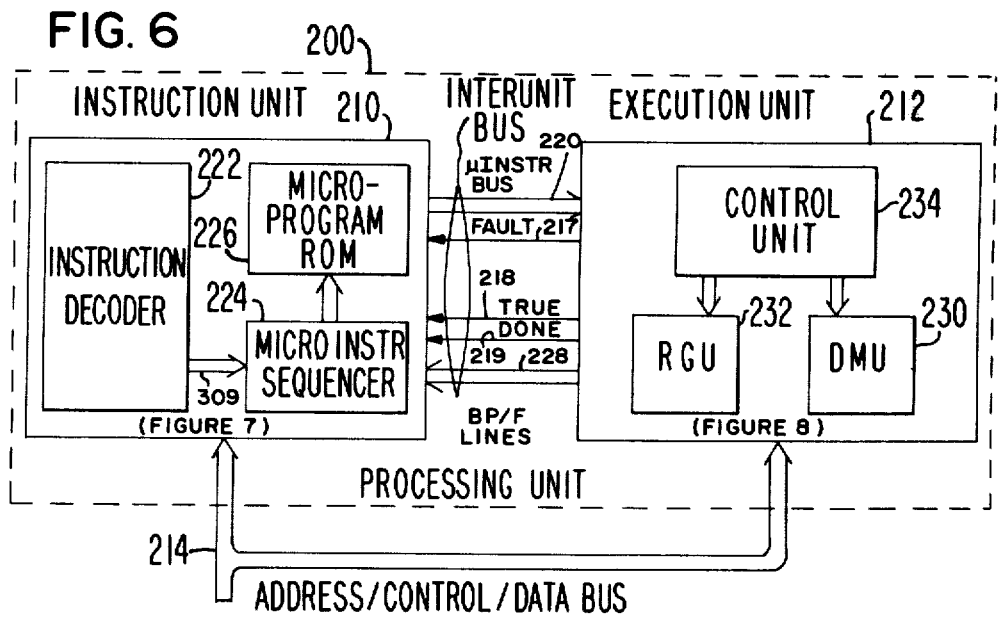
FIG. 6 is a block schematic diagram of one of the processing units shown in FIG. 5.

Referring now to FIG. 5, several processing units (200, 202, 204) share a common memory (206). The processing units may be of two different types. The first type, general purpose processors (GDP), described in Part 1 of this specification, provide for a variety of programming situations of a general nature. The second type, input/output (I/O) processors, described in Part 3 of this specification, provide for the direct, programmed control of microcomputer peripheral interfaces (208) and for the direct transfer of data between main memory (206) and those interfaces. FIG. 6 shows a GDP 200 in more detail. The GDP is made up of two main units, an instruction unit (210) and an execution unit (212). The instruction unit is shown in detail in FIG. 7, and the execution unit is shown in detail in FIG. 8.

9.1 INSTRUCTION UNIT

The instruction unit (210) for a Generalized Data Processor (GDP) has the responsibility for decoding the instruction stream and transferring microinstructions to the execution unit (212) which decodes and executes them. In addition, the instruction unit also transfers logical address information to holding registers on the execution unit. The following is a list and brief description of the input/output lines of the instruction unit. For simplicity of illustration, not all lines are shown in the drawings.

DESCRIPTION

Line Name   I/O
ACD15-ACD0   I

ACAD15-ACDO constitute the time-multiplexed address/control/data (ACD) bus lines (214) between the processor (200) and its associated bus interface (201). The instruction unit receives the double bytes of the instruction stream from memory on these ACD lines. At various times during a memory cycle, the ACD lines carry address information, control information and read/write data. The ACD lines carry true data and are sampled at the falling edge of CLKA.

ALARM'   I

The ALARM input signals the occurrence of an unusual system-wide condition (such as power fail). The instruction unit does not respond to ALARM until it has completed execution of the current instruction, if any, being executed. The signal is active low and is sampled on the rising edge of CLKA.

BF/F3-BP/F0   I

Figure 9:
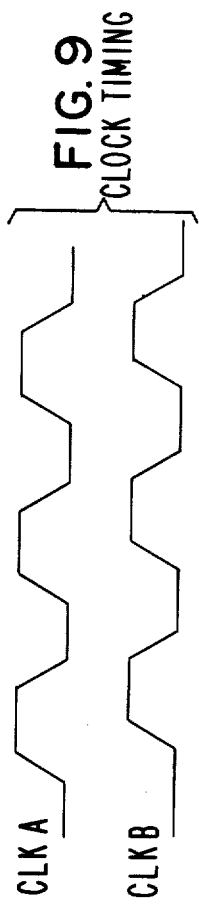
FIG. 9 is a clock timing diagram.

The BP/F lines (228) are generated by the execution unit and received by the instruction unit. Whenever the execution unit is in a faulted state, the BP/F lines carry an ecoding of the fault type. The BP/F lines are used at other times to carry new bit-pointer information to the instruction unit. The BP/F lines are active high and are sampled on the rising edge of CLKA cycle (see FIG. 9).

DESCRIPTION

Pin Name   I/O
DONE'   I

DONE is generated by the execution unit and monitored by the instruction unit. DONE is used to notify the instruction unit that the execution unit is about to complete a multiple-cycle microinstruction. When the instruction unit issues a multiple-cycle microinstruction to the execution unit, it loops on that microinstruction until DONE is asserted low by the execution unit at the point the instruction unit resumes normal operation. DONE is an active low signal and is sampled on the rising edge of CLKA (see FIG. 12).

FAULT'   I

FAULT is a signal generated by the execution unit to inform its associated instruction unit that it has detected a fault. When FAULT is asserted low, the BP/F lines contain a code specifying the type of fault that occurred. FAULT is an active low signal and is sampled on the rising edge of CLKA (see FIG. 12).

INCR uA'   I

Figures 13, 14:
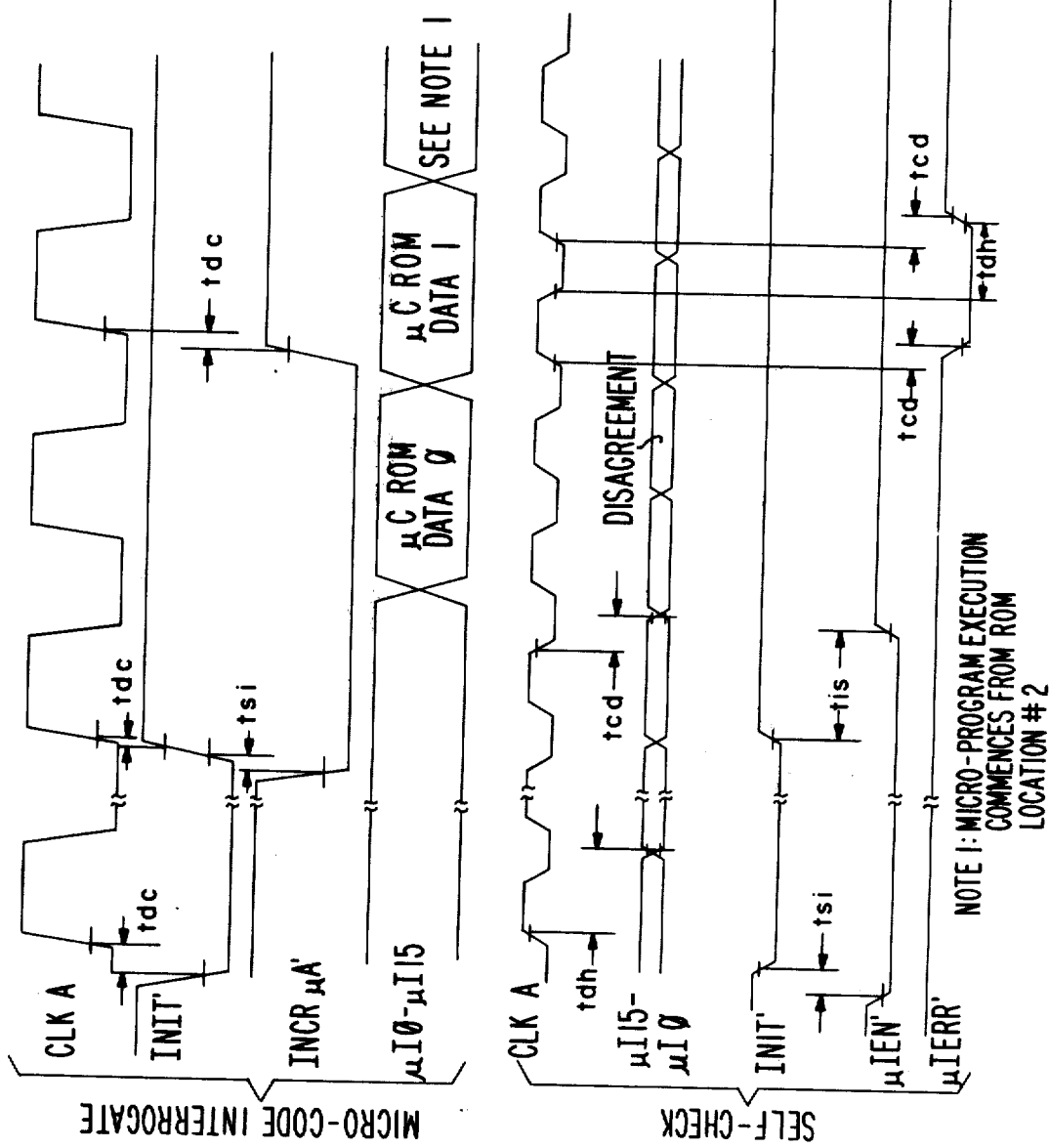
FIG. 13 is a timing diagram of microcode interrogate.
FIG. 14 is a timing diagram of self-check.
Figure 15:
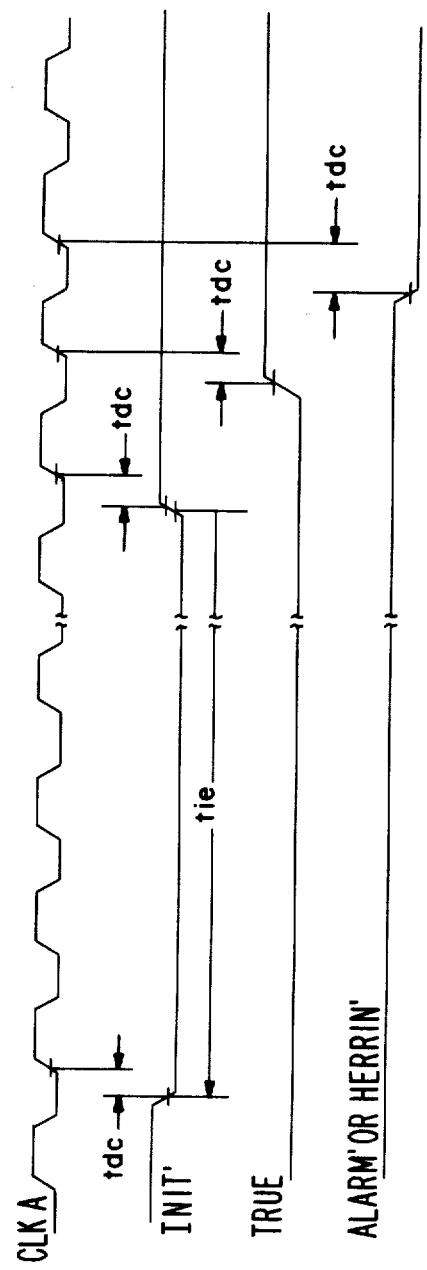
FIG. 15 is a timing diagram of true, alarm, and HERRIN lines.
Figure 16A:
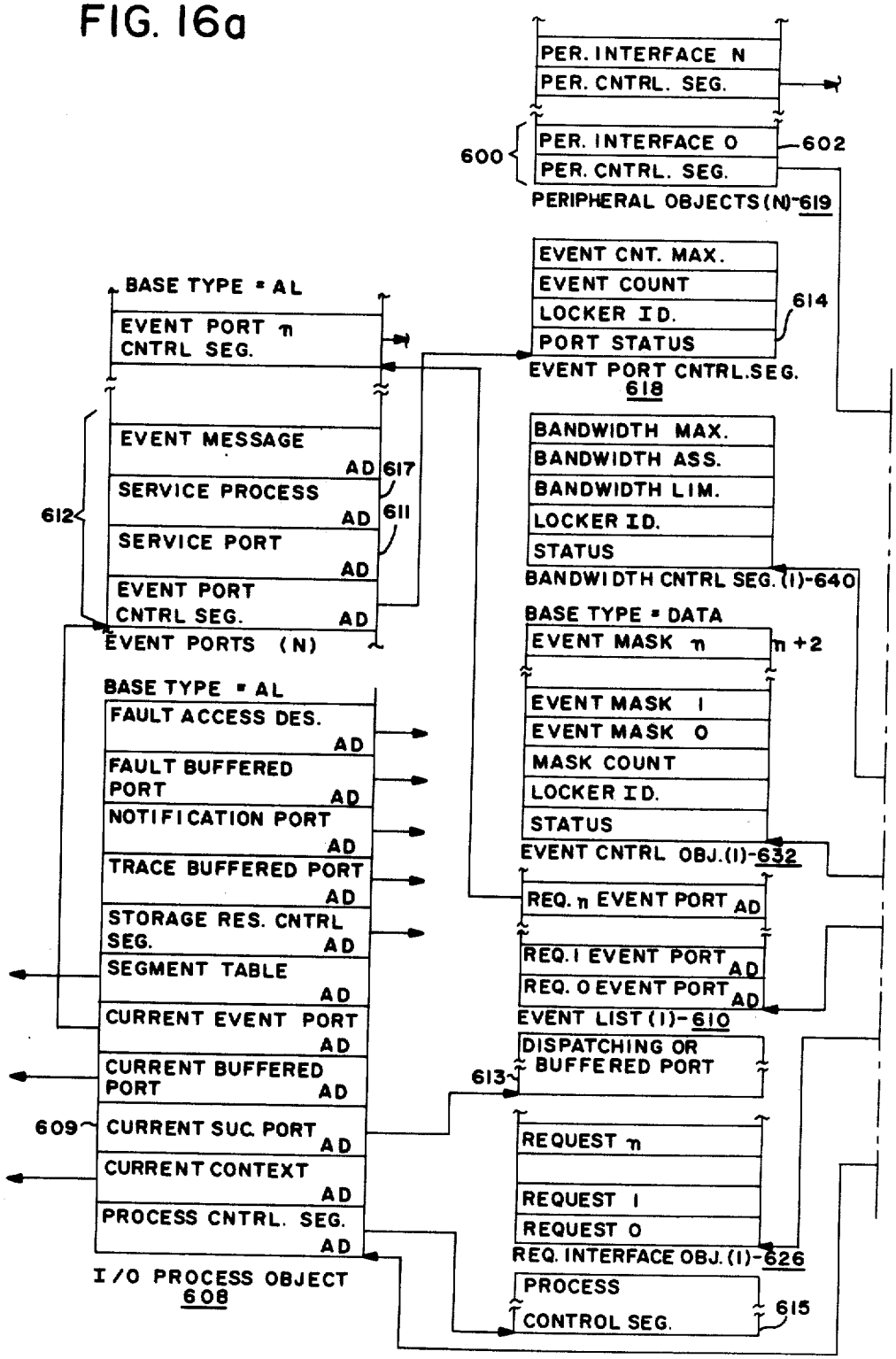
FIGS. 16A and 16B, taken together, are a block diagram of system objects supporting input/output operations.
Figure 16B:
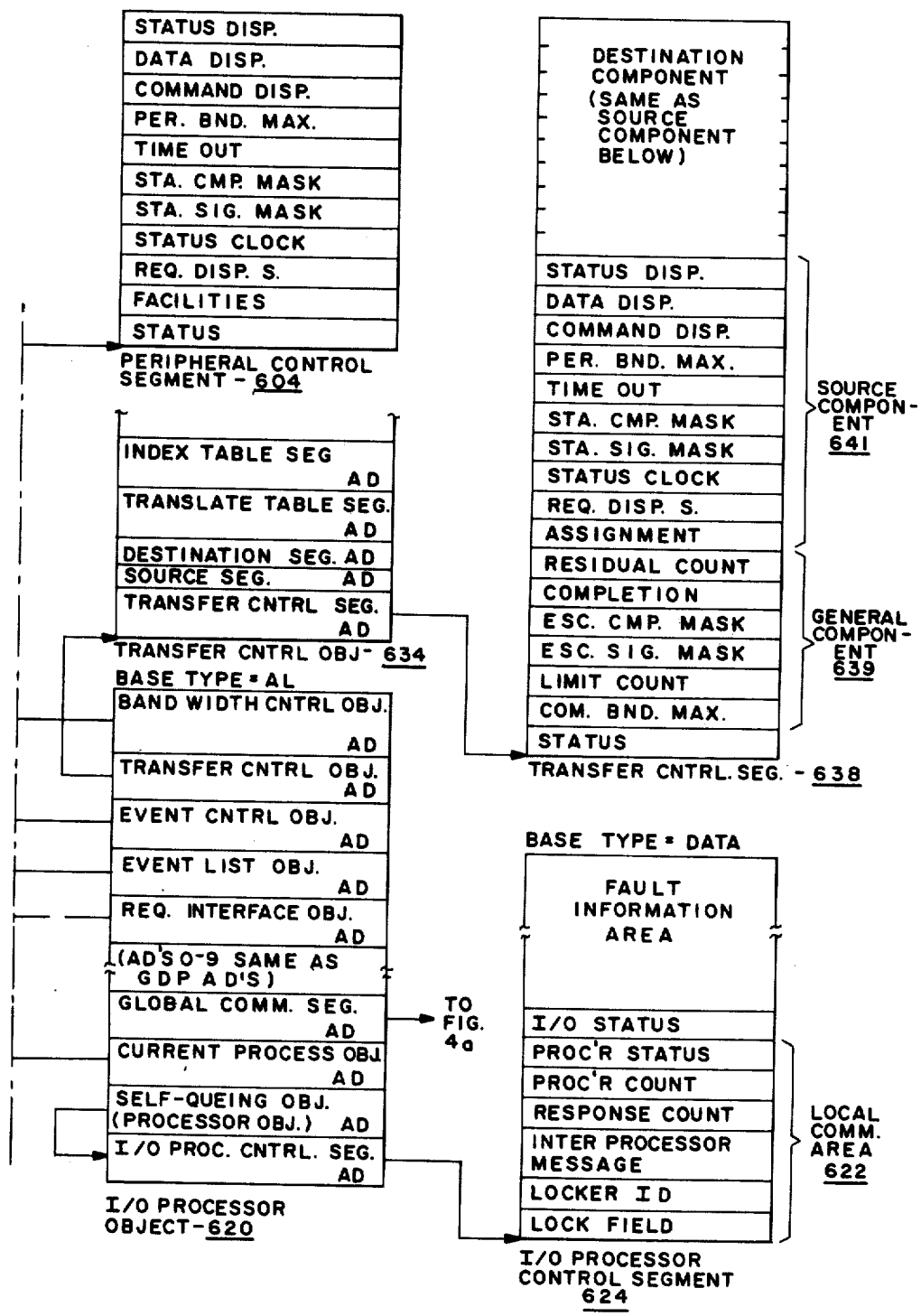

Refer to FIG. 13. When the INCR uA line is asserted low at the end of initialization (INIT asserted), the instruction unit goes into a special diagnostic mode. In this mode, the instruction unit microinstruction sequencer (224) steps through the instruction unit microprogram ROM (226) sequentially displaying the instruction unit microprogram on the microinstruction bus (uI15-uI0) (220). The sequencer continues to cycle through the ROM until INCR uA is unasserted. At this point the instruction unit resumes normal execution of the microinstructions from whatever point the MIS was at the time INCR uA was unasserted. The INCR uA feature is useful for testing but should not be used during normal operation since it could lead to unpredictable results. INCR uA is pulled up internally and should only be asserted low for testing.

INIT'  I

INIT causes the processor to immediately set itself to an initial state. After the instruction unit has achieved this initial state it begins execution of a microcode sequence which initializes all of the instruction unit and execution unit internal registers. Once this initialization sequence has been completed, normal operation begins. INIT must be asserted low for at least 8 cycles (see FIGS. 13 & 14).

HERRIN'  I

HERRIN is used to implement functional redundancy checking (FRC). A low on HERRIN results in an FRC trap which causes the processor to terminate any bus transaction in execution and execute an FRC microprogram. HERRIN is active low and is sampled at the rising edge of CLKA.

ISA'  I

ISA is a communication signal between a GDP and its bus interface. ISA is normally held low by the execution unit whenever there is no transaction taking place between the processor and the bus interface and is high whenever a bus transaction is underway. ISA is also low for the first cycle of a bus transaction (at which time the execution unit is emitting the control information and low-order bits of the address). During the second cycle of a bus transaction, a high on ISA indicates that the bus transaction is valid and the ACD lines contain the high-order bits of the address. A low on ISA during the second cycle of the transaction indicates to the bus interface that the GDP wishes to cancel the bus request. The GDP will cancel a request if it has detected a bounds or access rights violation for the reference. ISA is input only to the instruction unit and is sampled on the rising edge of CLKA.

ISB'  I

ISB is generated by the bus interface and monitored by its associated instruction unit and execution unit. A low on ISB when no but transaction is in progress (ISA low) indicates to the processor that there is an interprocessor communication (IPC) waiting for it. In addition, ISB also has IPC significance during the first cycle of a bus transaction during which ISA is high. For the remainder of the bus transaction, ISB has stretch significance; except during the last cycle of a read transaction or the first cycle after a write transaction. At those times, a low on SB indicates a bus error. During times that ISB has stretch significance, a low on ISB during a read operation means that there is no valid data on the ACD lines; a low on ISB during a write operation indicates to the processor that it should not remove the write data that it is presetting on the ACD lines. ISB is an input only to the instruction unit and is sampled on the rising edge of CLKA.

uI15-uI0  0
3-state uI15-uI0 are generated by the instruction unit and received by the execution unit. The lines are used to pass microinstructions, logical address information, and branch address information from the instruction unit to the execution unit. uI15-uI0 carry true data and are 3-state outputs.

uIEN'  I

Refer to FIG. 14. The uIEN line is used to disable the instruction unit microinstruction bus output buffers (uI15-uI0). uIEN is sampled during initialization time (INIT asserted). If uIEN is low throughout initialization, uI15-uI0 go to their high impedance state. An instruction unit with uIEN asserted does not drive the microinstruction bus; rather, it just monitors the bus and compares the data on the bus to its internally-generated result, signaling disagreement on the uIERR line.

uIERR  0 uIERR is a signal produced by the instruction unit to indicate disagreement between the data appearing on the microinstruction bus (uI15-uI0) and the instruction unit's internally-generated result. uIERR is asserted high when disagreement occurs and is valid during CLKA.

TRUE  I

TRUE (218) is generated by the execution unit and monitored by the instruction Unit. TRUE is used to carry condition flags from the execution unit to the microinstruction sequencer on the instruction unit. The microinstruction sequencer controls the sequencing of the instruction unit microcode and uses TRUE to determine that sequencing. TRUE is asserted high when the condition flag is true.

Referring now to FIG. 6, the internal functions of the instruction unit are partitioned logically into two processing units, the instruction decoder (ID), 222, and the microinstruction sequencer (MIS), 224. These two processing units interact directly, but perform most functions as separate units.

Each is responsible for performing part of the actions required to execute an instruction. An instruction unit is responsible for decoding the instruction and transferring to the execution unit the sequence of microinstructions necessary to execute the instruction. The execution unit is responsible for executing the microinstruction it receives from the instruction unit and also for communicating with the system bus interface.

The two units communicate via the microinstruction bus (220) (uI15-uI0), the BP/F bus (BP/F3-BP/FO [228], FAULT [217]), and the status lines (DONE [219] and T/F [218]). These lines are used only for interunit communication and do not affect the system interface at all.

Both units receive the bus interface lines (214) (ACD15-ACD0, ISA and ISB) but the execution unit is the only one that drives the lines. The instruction unit monitors bus action and receives the bytes of the instruction stream, but it doesn't initiate bus transactions. The instruction unit also receives the system timing lines (CLKA, CLKB, INIT and ALARM) and does use them.

In addition, the instruction unit has several lines to facilitate debug and testing. These lines are INCR uA, uIEN, and uIERR. As with the interchip lines, these debug and test lines do not affect the system bus interface at all. The ID (222) has the responsibility for processing the serially-encoded macroinstructions. The ID monitors the address/control/data bus (214) and receives the double-bytes of the instruction stream from memory. It then interprets the fields of the instruction and generates the microinstructions (or starting addresses for the longer microinstruction routines) which are necessary to execute the macroinstruction. In addition, the ID formats logical address information and transfers it to holding registers on the execution unit. The microinstruction sequencer (224) contains the control circuitry for sequencing through the various microinstruction flows necessary to execute macroinstructions. The MIS receives starting addresses for microinstruction routines from the ID, decodes the microinstructions from the microprogram ROM (226) to control the microprogram sequencing, and transfers the microinstructions to the execution unit where they are executed. In addition, the MIS also processes faults and handles the alarm conditions. The MIS carries a 12-bit microcode ROM address internally.

The instruction unit/execution unit makes use of a single bus (214) which may carry address, control, or data during different times in the bus transaction. This bus does not go directly to main memory; rather, it goes to a local bus interface (201, FIG. 5). The bus interface contains logic to communicate with both the GDP and the rest of the system.

Although the ACD lines carry different types of information during a bus transaction, the instruction unit may determine the status of the bus lines by monitoring ISA and ISB. ISA is produced by the execution unit and is low whenever there is not a bus transaction in progress, and during the first cycle of the transaction. The execution unit may cancel a bus request by holding ISA low during the second cycle of the transaction. If the request isn't canceled, ISA is asserted high during that second cycle and remains high throughout the transaction.

ISB is produced by the bus interface and monitored by both units. ISB has interprocessor communication (IPC) significance whenever ISA is low, and during the first cycle that ISA is high; except when it has error significance. During times that ISB has IPC significance, a low on ISB indicates to the processor that there is an IPC waiting for it.

Figure 10:
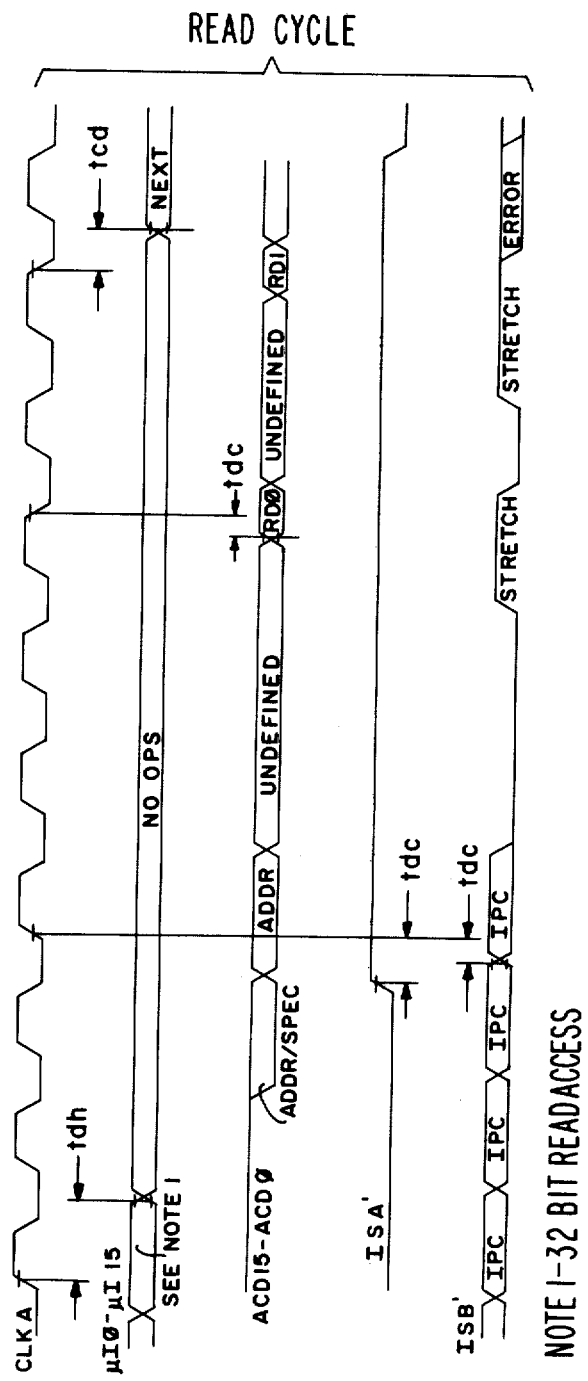
FIG. 10 is a timing diagram of a typical read cycle.

ISB is also used by the bus interface to indicate bus errors to the GDP (200). ISB has error significance during the last cycle of a read transaction (FIG. 10), or during the first cycle following a write transaction (FIG. 11). A low on ISB when it has error significance indicates to the processor that a bus error was detected during the transaction. If possible, the GDP automatically reissues the request.

During a bus transaction (ISA asserted), ISB has "stretch" significance whenever it doesn't have IPC or error significance. A low on ISB when it has "stretch" significance indicates to the processor that there is no valid data on the ACD lines (in the case of a read, FIG. 10) or that the bus interface hasn't accepted the data from the processor yet (in the case of a write, FIG. 11). If the bus interface hasn't accepted the write data, the processor keeps the data on the ACD lines until it is accepted.

The execution unit drives a null specification onto the ACD bus whenever there is no transaction in progress. Once the execution unit receives an access-memory type of microinstruction from the instruction unit, it generates the physical address of the reference and issues the least significant byte of the address along with some control information specifying the type of reference and number of bytes to be transferred. During the second cycle of the transaction, ISA is asserted high by the execution unit unless the request is to be canceled.

In the case of a cancel, ISA remains low. At the same time, the execution unit issues the most significant bits of the address. Throughout the remainder of the transaction, ISB has stretch significance, except, as stated before, during the last cycle of a read, when it has error significance. If a read transaction is an instruction fetch, the data is latched into the instruction unit. If the read is a data fetch, the data is latched into the execution unit.

The GDP may issue requests for 1, 2, 4, 6, 8 or 10 bytes of data to be transferred. This information is part of the control field emitted during the first cycle or a transaction. As the data is returned from memory, it is buffered and aligned by the bus interface (201) and transferred to the GDP in the correct order.

Detailed timing diagrams for ACD bus transaction are included in FIGS. 11 through 16.

9.2 THE INTERCHIP BUS

The interchip bus (also referred to as the interunit bus) is the communication link between the instruction unit and the execution unit. The interchip bus carries microinstructions and logical address information from the instruction unit to the execution unit. In addition, the interchip bus also carries status and fault information for the MIS, and bit-pointer information for the ID, from the execution unit to the instruction unit. The interchip bus has two components (FIG. 6): the microinstruction bus (220) and the BP/F Bus (218). In addition, there is also a TRUE line (218) which returns condition-code bits to the instruction unit from the execution unit and a FAULT line (217) which signals that an instruction-unit fault has been detected by the execution unit.

9.3 THE MICROINSTRUCTION BUS

The microinstruction bus (220) is a unidirectional bus from the instruction unit to the execution unit. The bus is used to transfer microinstructions and logical address data to the execution unit. Internally, the microinstruction bus can be sourced from several locations. Under normal operation, microinstructions are read from the microprogram ROM under control of the MIS and transferred to the execution Unit on the microinstruction bus. The ID, however, may also "steal" a cycle from the microprogram ROM and force a microinstruction across the microinstruction bus. The GDP has a very powerful microinstruction set in which a single microinstruction issued by the instruction unit may cause a sequence of activities to occur on the execution unit. For example, a single microinstruction called ACCESS MEMORY causes the execution unit to generate a physical address, check access rights, issue a bus request, and carry out the transaction. In the case of these multiple-cycle microinstructions, the execution unit returns a DONE signal to the instruction unit (on the DONE line, 219) when the microinstruction completes. Since the GDP supports such powerful microinstructions, there are many macroinstructions which may be entirely executed as they are beind decoded by the ID. In these cases, the ID does not have to access the microprogram ROM at all; instead, the ID can force the microinstructions needed to execute the macroinstruction directly onto the microinstruction bus. The microinstruction bus is also used to transfer segment selector, displacement, and branch address information from the ID on the instruction unit to holding registers on the execution unit. The information to be transferred to the execution unit is stored in a two-deep FIFO (called EXBUF) on the instruction unit. This FIFO may be loaded with data of several different lengths. The data to be transferred is always right-justified and padded with leading zeros to 16 bits so that the execution unit gets 16 bits of valid data. In addition, relative branch references have their sign automatically extended to 16 bits before being transferred to the execution unit. Microinstructions which involve transfer of this EXBUF data are multiple-cycle instructions. The microinstruction is transferred during the first cycle and the contents of the FIFO are transferred on subsequent cycles.

9.4 BP/F LINES

The BP/F lines (228) are unidirectional from the execution unit to the instruction unit. These lines are used to carry an encoding of a fault condition to the instruction unit should a fault occur. The lines are also used to carry bit-pointer information to the ID in the case of a macroinstruction branch. The execution unit detects many faults which cause special action on the instruction unit. In the case of a fault, the FAULT line (217) from the execution unit is asserted and a fault encoding is transferred to the instruction unit on the BP/F lines. This fault encoding is used by the instruction unit to select the starting address of the correct-fault microinstruction flow from the fault ROM on the instruction unit. When a fault occurs, the microinstruction flow being executed is interrupted and the fault flow begins execution. When the fault flow finishes, execution of the interrupted flow may be resumed if possible. The BP/F lines are also used for the execution of macroinstruction branches. The program counter for the GDP is stored as two pieces; the double-byte pointer is stored on the execution unit and the bit pointer is stored on the instruction unit. In the case of a branch, the execution unit may have to do some calculations on the entire program counter. A mechanism has been provided for transferring bit pointer information between the instruction unit and execution unit to allow this. The bit pointer may be transferred to the execution unit via the EXBUF FIFO and new bit-pointer information may be returned to the instruction unit on the BP/F lines. The instruction unit always assumes that the BP/F lines carry bit-pointer information unless the FAULT line is asserted. If FAULT is asserted, the information on the BP/F lines is interpreted as a fault encoding. BP/F is also used to transfer the four-least-significant bits of the top of the operand stack (maintained on the execution unit) to the bit pointer if the branch is through the top of stack.

9.5 TRUE AND DONE LINES

The remaining lines in the interunit bus are the TRUE line (218) and the DONE line (219). The lines are unidirectional from the execution unit to the instruction unit and are used primarily to return status information to the instruction unit. The TRUE line is used whenever a conditional branch in the microcode is performed. The microprogram performs the operation that it wishes to branch on and then requests that the proper condition flag be transferred to the instruction unit (on the TRUE line) where it is latched. The instruction unit then does the branch based on that condition. The DONE line is used to return a DONE signal to the instruction unit during multiple-cycle microinstructions. The DONE signal informs the instruction unit that a multiple-cycle microinstruction is about to complete. The instruction unit detects that a multiple-cycle microinstruction is being transferred to the execution unit and loops on that microinstruction until the DONE line indicates that the execution unit is about to complete the microinstruction. While the execution unit is looping on the multiple-cycle microinstruction, it is transferring NOPs to the execution unit. When DONE indicates that the microinstruction is about to complete, the instruction unit continues. The "done" signal is actually sent out by the execution unit one half cycle before it will complete the microinstruction. This is to allow the MIS pipeline to fill early so that there is no lost cycle before resumption.

9.6 INTERPROCESSOR COMMUNICATION

The system is designed to make implementation of a multiple-processor configuration straightforward. In any multiple-processor system capable of executing tightly-coupled parallel processors, some provision must be made to allow for communication between the processors in the system. The instruction unit contains this interprocessor communication logic. The interprocessor communication (IPC) mechanism operates as follows. A processor places a message in the control-flag field of the appropriate communication segment. The processor sending the message then issues either a BROADCAST-TO-PROCESSOR instruction (for a global message) or a SEND-TO-PROCESSOR instruction (for a processor specific message).

This instruction causes an IPC-type of transaction to travel through the system. When the IPC transaction reaches the proper bus interface (or bus interfaces) the interface notifies its associated processor-of-message through the use of ISB.

ISB has IPC significance whenever ISA is low, except during the first cycle after a write transaction, when it has error significance. ISB also has IPC significance during the first cycle of a bus transaction when ISA is high. A low on ISB when it has IPC significance indicates to the processor that there is an IPC waiting. This IPC indication is latched into the instruction unit fault mechanism. The IPC flag is sampled on instruction boundaries. If the IPC flag indicates the presence of a message, the instruction unit executes a microprogram sequence to process the message.

9.7 INSTRUCTION UNIT DIAGNOSTIC FEATURES

The instruction unit has several features built into the hardware to facilitate debug and component testing. These features are controlled by several pins on the instruction unit; INCR uA is used to display the contents of the microprogram ROM, uIEN is used with uIERR to perform functional checking of an instruction unit by comparing its output to the output of a known-good instruction unit.

INCR uA may be used to display any portion of the microprogram ROM. If INCR uA is asserted low at the end of initialization (INIT also asserted low), the MIS begins incrementing the microprogram address register (uAR) every cycle, thus sequentially displaying the microinstructions on the microinstruction bus (uI15-uI0). The uAR continues to increment, returning to zero when it overflows, until the INCR uA pin returns high. Once the INCR uA line returns high, the MIS begins to execute the microinstructions, starting wherever the uAR left off. Since this could result in unpredictable results, the INCR uA line should remain high for normal operation. uIEN serves to disable the outputs on the microinstruction bus. The uIEN line should be asserted low throughout initialization (INIT asserted) to force uI15-uI0 to their high impedance state. Once the bus is disabled, uIEN is ignored. As a result, the instruction unit must be reinitialized with uIEN unasserted before it will drive the bus again. uIEN is used in conjunction with uIERR to facilitate component testing. The instruction unit has provisions for comparing its internal results with the information appearing on the microinstruction bus. If the results disagree, uIERR is asserted by the instruction unit. If the results agree, uIERR remains low. This feature may be used to perform a functionalty check on an instruction unit. In such a check, the microinstruction bus lines of a known good instruction unit are connected in parallel to the same lines of the instruction unit to be tested. At initialization time, the uIEN line of the good instruction unit is pulled low (thus making it a checker) and the uIEN line of the instruction unit being tested remains high (making it a master). As a result, the instruction unit being tested actually drives the microinstruction bus while the good instruction unit monitors the lines and compares them to its internally-generated results. A program is then run by both processors and any disagreement is signaled on the uIERR pin of the good instruction unit.

9.8 INITIALIZATION AND ERROR CONDITIONS

There are two lines on the instruction unit which force microprogram action. These lines are INIT and ALARM. When INIT is asserted low, the processor immediately sets itself to its initial state. The instruction unit microprogram sequence initializes all of the instruction unit and execution unit internal registers. Once these registers have been initialized, normal operation begins, unless one of the diagnostic pins (INCR uA or uIEN) was asserted. If one of those lines was assertad, the instruction unit begins execution under the selected diagnostic mode. INIT must be asserted for at least 8 cycles to ensure proper initialization. When ALARM is asserted, the processor finishes the macroinstruction, if any, it was executing and then begins execution of the alarm-handling microprogram stored in the microprogram ROM.

10.0 EXECUTION UNIT

10.1 GENERAL OPERATION

The execution unit (212, FIG. 8) responds to microinstructions issued by the instruction units. The execution unit functions as an arithmetic/logic unit for data manipulation and also builds physical addresses for data storage and retrieval. Incorporated within the execution unit are functional blocks allowing run-time fault checking, redundancy checking and system communication. Caches are maintained to facilitate high-speed addressing linkage. The execution unit also provides firmware to assist the instruction unit in performing such GDP operations as multiply/divide and floating-point arithmetic. The next two sections describe the input/output lines associated with the execution unit.

10.2 CLOCK AND SPECIAL LINES (Interunit Bus)

CLKA, CLKB (Inputs)

Clock A provides the basic timing reference for the execution unit. CLKA-high corresponds to internal Phase 1; CLKA-low corresponds to internal Phase 2. Clock B (CLKB) lags CLKA for nominally ¼ cycle (90 degrees). CLKB is used primarily to assist internal timing (four-phase timing is used where necessary). Some external signals are generated with timings referenced to CLKB; BIN' and BOUT are two examples.

INIT' (Input, Low Asserted)

Assertion of initialize (INIT') causes reset/clearing operations to be performed. These functions will be continued as long as INIT' is asserted. The execution unit's stacks, FIFOs, DEQs and storage will be cycled towards a defined state. INIT' must be asserted for at least eight cycles of CLKA. This is more than sufficient to reach a defined state for the storage elements in the execution unit. Upon subsequent unassertion of INIT', the execution unit will be in the faulted state, waiting for the INSTRUCTION UNIT to issue a Reset-EXECUTION-UNIT-Fault-State microinstruction. This should be the first instruction of a microcode-initialization sequence.

MASTER (Input, Hi Asserted)

Master/Checker (MASTER) (440, FIG. 8) indicates to the execution unit its function in a system employing FRC (functional redundancy checking). An internal pull-up on the MASTER pin is incorporated to allow the MASTER pin's use as no-connect in nonFRC systems. An IPC (interprocessor communication) will instruct the execution unit when to sample the state of the MASTER pin. A checker operates with its output buffers disabled; the pins associated with FRC are used as inputs instead. Comparisons are made between the data at the pins and the expected (would have been driven) data. Discrepancy causes assertions of hardware error (HERR').

HERR' (Output, Low Asserted, External Pullup)

Assertion of hardware error (HERR'), line 440, indicates that the execution unit serving as checker disagrees with the signals present on the FRC-tested output lines. If the execution unit has been designated as a checker, the FRC logic will assert this line upon detecting an error. Once asserted, the HERR' line will remain asserted low until an initialization sequence is performed as response to INIT' or software reset.

BIN', BOUT (Outputs, BIN' Low Asserted, BOUT Hi Asserted)

Buffer In (BIN') and BUFFER Out (BOUT) lines (401) are used to control bus transceivers to buffer/isolate the GDP from other procescessors. Though not required, the use of buffers may be desired in systems with heavy pin loading. The BIN' and BOUT signals will facilitate common enabling schemes found in TTL bus transceivers. BIN' is asserted when information is to enter the execution unit (or instruction unit) on the address/control/data (ACDx) lines. BOUT is asserted when information is to leave the execution unit on the ACDX lines.

ISA (Input/Tristate Output, Low Asserted, External Pull-up)

Normal operation uses interface signal 0 (ISO') as a low-asserted error indicator from the bus interface to the execution unit/instruction unit pair. The signal is also used to indicate null transactions from the processor to the interface bus. During address generation/issue, ISA may be used to cancel the request for bus access (execution unit drives the ISA pin at this time). During activity of the bus interface, the interface logic uses ISA as an indication of an error in the bus transaction (execution unit tristates, and receives on the ISA pin). An execution unit serving as a checker (MASTER was unasserted as last sample time) will check that the ISA line has the proper logical level on it during address generation and issue time.

ISB (Input, Low Asserted)

Interface signal 1 (ISB, 401) is an indication to the execution unit, from the bus interface circuitry (403) concerning the status of any bus transaction. The pin's assertion indicates any of: (1) IPC message waiting, (2) input data invalid, (3) output data not taken, (4) incomplete bus transaction. The interpretation of the pin's state is dependent upon the present cycle of a bus transaction. During idle periods (the GDP not using the bus), the bus interface may signal the GDP on ISB that it has received an interprocessor communication message. During a bus transaction, the bus interface will use ISB to handle bus protocol: data not taken, or (for a read into the GDP) data invalid.

uIx (Inputs, Hi Asserted uIx signals on the microinstruction bus (220) are received by the execution unit and generated by the instruction unit. They are used to pass microinstructions, logical addresses, and branch address information to the execution unit during microprogram execution.

TRUE (Output, Hi Asserted, Hi when TRUE)

Condition true (TRUE, 218) is generated by the execution unit and monitored by the instruction unit. The pin is used to return condition flags to the microprogram running in the instruction unit. Branching in microcode (internal to the instruction unit) is possible with use of this pin.

FAULT' (Output, Low Asserted)

Errors in hardware/software interaction on the execution unit are indicated to the instruction unit by the FAULT' (pin 217) as well as simple hardware functional errors. The execution unit asserts this pin when it detects an error in data manipulation, address generation, bus protocol, or access privilege. At detection of a fault, the execution unit stops, waiting for the instruction unit to enter a fault-handling routine subsequently issuing a Reset-EXECUTION-UNIT-Fault-State microinstruction. Only a subset of the faults are checked by hardware; some faults are detected through microcode tests. The assertion of the FAULT' pin implies presence of a fault encoding on the BP/Fx pins.

BP/Fx (Outputs, Hi Asserted)

The bit-pointer/fault x (BP/Fx, pins 228) are dual purpose. While the execution unit is not faulted, bit pointers from physical address generation for instruction fetch may be sent to the INSTRUCTION UNIT (specifically, on branches or subroutine calls in microcode). If the execution unit is faulted, the BP/Fx pins present an encoding of the generic type of the fault that has occurred. A microprocedure may then be invoked to save all information pertaining to that type of fault.

DONE' (Output, Low Asserted)

Certain multiple-cycle microinstructions require a variable number of CLKA cycles to run to completion. The microinstruction done (DONE', pin 219) is asserted one cycle prior to completion of any multiple-cycle microinstruction. This simplifies decoding of multiple-cycle microinstructions on the instruction unit, as well as indicating completion of execution unit operation.

STAT?x (Outputs, undefined)

Status information concerning the GDP (instruction unit/execution unit pair) is presented on these pins (405).

10.3 ADDRESS/CONTROL/DATA LINES

ACDx (Inputs/Tristate Outputs, Hi Asserted)

The address/control/data x (ACDx, pins 214) are basic information paths between the execution unit and main storage. As such, the pins are used three ways. First, they may indicate control information for bus transactions. Second, they may issue physical addresses generated within the execution unit for instruction or data access. Lastly, they may convey data (either direction). Typical operation involves time-multiplexing the above functions in the order given. Provisions are made to assert high levels to the ACDx lines during null times. The interpretation of these pins at specific times during a bus transaction is augmented by the state of the ISA and ISB pins. In idle time, or during the first cycle of a bus request, the pins are defined as follows: ACD-15ACD8 Bus CTL Bits 70, ACD7ACD0 Phys Add Bits 70. The second cycle of a request, this definition applies: ACDi15ACD0 Phys Add Bits 238. One or more cycles of data follow, having ACD15ACD0 Data 150 (either in- or outbound). The end of a bus transaction is accepted as the completion of the request, looking for any error indication of ISA at that time. (Refer to definition of ISA and ISB.)

10.4 FUNCTIONAL DESCRIPTION

The execution unit (212, FIG. 6) consists primarily of two functional blocks and a control-logic block. The data manipulation unit (DMU, 230) performs arithmetic, logical, and extraction operations on data brought in during the course of program execution. The reference generation unit (RGU, 232) builds 24-bit physical addresses from logical addresses in instructions, and issues addresses. Both the DMU and the RGU do extensive run-time checking for data-type and validity while operating.

The control unit (CU, 234) receives microinstructions from the instruction unit, retains them, exercises the DMU and the RGU, and may handle multiple-cycle execution-unit-only firmware sequence. Several other smaller structures are provided to meet the requirements of the system (service-period timers, status registers, clock generators, and the like). Each of these three logic blocks are shown in more detail in FIG. 8. The DMU is shown within dotted lines labeled 230, and the RGU is shown within dotted lines 232. The remaining logic comprises the control unit.

10.4.1 Data Manipulation Unit (DMU)

The data manipulation unit (DMU, 230, FIG. 8) contains structures to perform the system macroinstruction set. The DMU itself is a stack-oriented arithmetic engine, performing mostly diadic operations. Basic operations are done in one GDP microcycle and include logical operations, add/subtract, partial multiply, partial divide, partial floating-point operations, shifting, field extraction, data movement, and flag setting.

The DMU incorporates several unique circuit structures for data storage. Memory structures physically correspond to the logical function required. Included are a FIFO (408, first-in, first-out memory), several STACKs (last-in, first-out storage), two double-ended queues (DEQs, 400, 402, combination FIFO/STACKs) and a shifter matrix (field extractor, 434). The two DEQs are used for ALU operand and result storage, as well as acting as a receiver for data from memory. The field extractor facilitates arithmetic and logical shifting, 16-bit field extraction, mask generation, and finding most-significant bit. One of the STACKs performs as an extension of the operand stack in memory. Two other STACKs serve as areas to build segment selectors (SS) and displacements (DX) to be used in physical-address generation. The last two STACKs retain present and past instruction pointers (IP) and stack pointers (SP). For simplicity, the IP, SP, DX, and SS stacks are shown as one logic block (404). Older pointers, segment selectors, and displacements are retained for program backtrack upon faulting. The FIFO is used as a buffer between the hardware-operand stack and its in-memory part. The FIFO retains data pushed out the bottom of the hardware stack until it may conveniently be written to memory. The FIFO is also used as a temporary data-storage location primarily for multiple-cycle microinstructions.

10.4.2 Control Unit (CU)

The control unit (CU, 234) retains microinstructions issued by the instruction unit, decodes and controls actions requested in the microinstructions and may serve, when required, as a sequencer for multiple-cycle microinstructions execution. Data for effective fault handling is retained in the CU circuitry.

The CU operates in a pipeland, overlapped, four-phase timing scheme, each phase being ½ cycle of CLKA in duration. Significant amounts of dynamic latching are required to allow this. The four CU phases are: [1] microinstruction read, [2] microinstruction decode, [3] execution start, [4] execution completion. Concurrency of microinstruction execution cycles is provided. ([1] of a microinstruction occurs at the same time as [3] of the previous microinstruction. [2] and [4] are similarly overlapping.) The presence of a multiple-cycle microinstruction will cause deviation from the above scheme. In such cases, the microinstruction bus read-phase [1] is skipped until the multiple-cycle microinstruction is completed. Internal logic of the execution unit will sequence through the multiple-cycle microinstruction. The CU provides control signals for the operation of the DMU and the RGU. Major operations to be performed by the DMU and the RGU are indicated by the CU's logic. Some local decoding of the CU signals is done to relieve the CU of minor decoding. (For example, the stacks will cycle themselves after being given a PUSH command.) As microinstructions are received, they are recoded, when necessary, to a form more appropriate to the PLAs in the CU. The recoding is input to either or both of the major PLAs. The PLAs produce raw control signals, which are captured in a dynamic latch. Some control signals are generated at this time (particularly signals gating data into arithmetic units), as in [3] above. In the following cycle, the latched raw control is combined with the CLK to finish the operation of the microinstruction, as in [4] above. This last phase accomplishes result-generation and storage.

10.4.3 Reference Generation Unit (RGU)

The reference generation unit (RGU, 232) contains structures used in generation of 24-bit physical addresses. The RGU is primarily a data-store maintaining base-and-length information for segments used by a running GDP process. Also included are an adder (433) for summing base and displacement and a subtractor/comparator (431) for length checking. Some control circuitry is present to drive the control bits of the ACDx group.

Information for both system and data segments is maintained within the RGU, with the data segment information accessed associatively. Segment selectors (from logical addresses) or microinstruction encodings address the storage within the RGU. The base information is combined with a displacement from the DMU to form a physical address. The segment-length information is compared with the displacement to assure an inbound reference. Various faults may occur during address generation.

10.4.4 Minor Circuit Blocks

The execution unit also contains several smaller functional blocks, including a clock generator, functional redundancy checking logic, two VBB (back bias) generators, and numerous buffers.

The Clock Generator uses CLKA and CLKB as inputs, and generates a set of well-buffered timing signals. These include Phase 1 (corresponds to CLKA high), Phase 2 (corresponding to CLKA low), Phase 1d and Phase 2d (corresponding to CLKB high and low, respectively), and other, shorter duration timing signals created by logically combining CLKA and CLKB.

The functional redundancy checking (FRC) logic, when enabled, compares the state of the data at certain pins of the execution unit and the data to be driven. Two or more execution units are OR-tied for performing FRC functions, with one execution unit designated master and the other(s) designated checker(s). When the FRC logic is enabled (by MASTER unasserted when sampled), the drivers for these certain pins are disabled. Disagreement between the pin data (driven by another execution unit) and the data that would have been driven causes assertion of HERR'. The pins that incorporate this function include: (1) ACDx, when acting as output; and (2) BIN', BOUT, ISA. Some exceptions to the above pins at various states are present.

This FRC logic is more fully-described in copending patent application Ser. No. 901,527 entitled "Method and Circuit for Checking Integrated Circuit Chips," Daniel K. Jackson, filed on May 1, 1978, now U.S. Pat. No. 4,176,258.

A set of timers (412, 414) are included in the execution unit to count system time, service-period time, and to limit process run time. They operate at a rate 1000 times slower than the system-timing-reference CLKA. The service-period timer is capable of faulting the GDP for service-period timeout. The system time in initialized at INIT' time, or when otherwise instructed. The service period is initialized at process run time slot start.

11.0 INSTRUCTION UNIT/EXECUTION UNIT MICROINSTRUCTION SET

The following is a summary of the hardware functions of the instruction unit and of the execution unit that are required to support the operation of the microinstruction set.

The instruction unit consists of three main blocks: the instruction decoder (222), the microprogram ROM (226), and the microinstruction sequencer (224), as described previously with reference to FIG. 7.

The instruction decoder (ID) contains a composer (300) that extracts fields up to 16-bits long from the instruction stream and a PLA state machine (305), which sequentially decodes these extracted bit fields.

The composer has two 16-bit registers (301) for holding the current 32 bits of the instruction stream that is being decoded. There is also one additional 16-bit buffer register that holds the next double-byte of the instruction stream. Each time the least-significant-16 bits in the composer have been passed over, the contents of the composer registers are updated. If the buffer register currently contains valid data, the composer most-significant-double-byte register is transferred to the least-significant register and the buffer register is transferred to the most-significant register. The buffer register is then set invalid. Otherwise, if the buffer register does not contain valid data, the composer most-significant-double byte is transferred to the least-significant register and a composer-empty fault is generated. This fault causes a microcode flow to load the next 32 bits of the instruction stream into the most-significant, composer-double-byte register and the buffer register. The buffer register is then set valid again and decoding continues.

The composer maintains a five-bit microinstruction bit pointer (302, BIP) that indicates the position of the LSB of the next field to be extracted from the composer registers. In addition, the composer has a five-bit wide by two-deep stack (304) that contains the bit pointer at the start of the current instruction (and the previous instruction if in look-ahead mode). There is also a five-bit temporary-bit pointer (306, TBIP) that holds the bit pointer for a branch destination whenever a relative or absolute branch reference is decoded. Microcode controls all transfers between the bit-pointer stack or the TBIP and the BIP.

The ID interprets the class, format, and reference fields of an instruction, loads any source operands into the execution unit, and then decodes the opcode field. If the operator can be executed as a single microinstruction, the ID forces the microinstruction that executes the operation to the execution unit and then stores the result and continues on to the next microinstruction. Otherwise, if the operator requires a microcode flow, the ID issues the starting address for the appropriate flow and then begins decoding the next instruction in a look-ahead mode. The ID interprets the next instruction until an operation is required of the execution unit to continue decoding, at which time the ID waits until the previous instruction completes.

Two FIFOs are required in the ID for transferring information to the execution unit. The first FIFO (XBUF, 308) holds segment selector, displacement, and branch data, as it is decoded from the instruction stream. Then, under microcode control, the FIFO data can be transferred to the execution unit. The second FIFO (PIR, 310) holds forced microinstructions issued by the ID for controlling the operation of the execution unit. Both FIFOs are 16-bits wide by two-entries deep. The microprogram ROM (226) contains the flows for executing the longer generalized-data-processor operators—and for machine initialization, dispatch, suspend, idle, IPC, faults of all kinds, and alarm. This ROM is 16-bits wide by approximately 3584 locations.

The instruction unit also maintains a 12-bit microinstruction pointer (312) for addressing the microprogram ROM. This instruction pointer is incremented via adder (314) after each microinstruction fetch or reloaded on a branch-or-call subroutine microinstruction. Note that the next sequential microinstruction after a branch or call is executed before the instruction pointer is reloaded. A subroutine-call stack (316) is maintained by the instruction unit and is 12-bits wide by 8-entries deep.

The microinstruction sequencer (224) controls the order and timing of microinstructions passed to the execution unit and decodes instructions that affect the operation of the instruction unit.

The sequencer may receive microinstructions from three sources. When a fault must be handled, the fault logic forces a subroutine branch to the specific microcode routine for that fault. This microinstruction source is given the highest priority by the sequencer. Next in priority are forced microinstructions from the instruction decoder (during look-ahead mode, forced microinstructions are held off until the end of the current macroinstruction). Last in priority are microinstruction from the microcode ROM from any currently running flow. Based on this priority, the sequencer accepts these microinstructions, interprets them, and passes them on to the execution unit over the interchip bus. Note that in the case of a cache fault, the sequencer must be capable of holding and reissuing a memory-reference microinstruction (under microcode control).

The sequencer controls the operation of all faults, whether generated by the instruction unit or execution unit. These faults cause a forced microcode subroutine call to a routine for that fault. Thus on nonfatal faults, the fault subroutine can return to the interrupted microcode flow to continue normal operation. Faults are handled in two ways: immediate faults force a subroutine call at the completion of the current microinstruction, and condition faults force a subroutine call at the end of execution of the current macroinstruction. The fault types recognized by the sequencer are summarized as follows:

| Instruction Unit Fault Type | Response |
| --- | --- |
| Composer Empty | Immediate |
| Bus Error | Immediate |
| Herr | Immediate |
| Trace | End of Macroinstruction |
| IPC | End of Macroinstruction |
| Alarm | End of Macroinstruction |
| Invalid Class | End of Macroinstruction (if in look-ahead) Immediate (otherwise) |

| Execution Unit Fault Type | Response |
| --- | --- |
| Data Cache Fault | Immediate |
| Segment Table Cache | Immediate |
| Address Development | Immediate |
| Computational | Immediate |
| Segment Altered | Immediate |
| Process Timeout | End of Macro Instruction |
| Instruction Fetch | End of Macro Instruction (if in look-ahead) Immediate (otherwise) |

Note that the invalid-class and instruction-fetch faults are ignored if detected while the ID is in the look-ahead mode and the current operator performs a branch or some form of wait. For these operators a special end is indicated to the sequencer so that is will ignore these faults.

The execution unit, described previously with respect to FIG. 8, contains all the hardware for performing the generalized-data-processor operators and for accessing memory and the operand stack. The following describes the operation of the various registers and the ALU on the execution unit.

Two double-ended queues (DEQ A, 400, and DEQ B, 402) are used for holding the source operands and the result of an operation. Also all transfers between memory or the operand stack and the execution unit are done through the DEQs.

The DEQ operates as a combination first-in, first-out register and stack. As a FIFO, data can be dropped into one end of the DEQ and then popped from the other end. As a stack, data can be both pushed and popped from the same end of the DEQ. Data can also be read (contents of the DEQ remain unchanged) from one end of the DEQ.

Note that if the DEQ is full and data is pushed into the DEQ, the data is pushed out of the other end and lost. If the DEQ is full and data is dropped into the DEQ, the contents of the DEQ remains unchanged and the dropped data is lost. When data is dropped into the DEQ, all the invalid registers take on the same value as the dropped data (and one DEQ element becomes valid). When data is popped from the DEQ, a zero is read into the vacated invalid register at the opposite end of the DEQ. In this way it is possible to anticipate what value will be read (or popped) from the DEQ when the DEQ is empty.

DEQ A contains six double-bytes of storage and DEQ B contains four double-bytes of storage. A microinstruction that obtains a double-byte from or stores a double-byte into a DEQ may either read or pop the double-byte from the DEQ or either drop or push the double-byte into the DEQ. The two 2-bit fields that define the operation of the DEQ are defined as follows:

| SS | Source Operation |
|----|------------------|
| 00 | Read DEQ A, Read DEZ B |
| 01 | Read DEQ A, Pop DEQ B |
| 10 | Pop DEQ A, Read DEQ B |
| 11 | Pop DEQ A, Pop DEQ B |

| DD | Destination Operation |
|----|----------------------|
| 00 | Push DEQ A |
| 01 | Drop DEQ A |
| 10 | Push DEQ B |
| 11 | Drop DEQ B |

A set of data registers and stacks are provided on the execution unit for holding information about the processor and the currently-running process. The microinstructions reference a register or a top-of-stack element using a four-bit field encoded as follows:

| RRRR | Register or Stack | | |
|------|-------------------|---|---|
| 0000 | Segment selector stack | | |
| 0001 | Displacement stack | | |
| 0010 | Instruction pointer stack | | 404 |
| 0011 | Stack pointer stack | | |
| 0100 | Exponent stack | - | 406 |
| 0101 | FIFO | - | 408 |
| 0110 | Fault encoding | - | 410 |
| 0111 | | | |
| 1000 | Process-timeout timer | - | 412 |
| 1001 | System timer | - | 414 |
| 1010 | Temporary B | - | 416 |
| 1011 | On-Chip stack count | - | 418 |
| 1100 | Context status | - | 420 |
| 1101 | Processor status | - | 422 |
| 1110 | Process status | - | 424 |
| 1111 | Instruction segment selector | - | 426 |

The segment selector stack is 16-bits wide by 4-deep and holds the segment selector for the current data or segment-table cache-memory access. The displacement stack is 16-bits wide by 3-deep and contains the segment displacement for the current memory access. The instruction-pointer stack is 12-bits wide by 3-deep. The top element maintains the current double-byte displacement into the instruction segment for the next word of the instruction stream to be fetched. The next element contains the start of the current instruction, and the last element contains the start of the previous instruction. The stack-pointer stack is 15-bits wide by 2-deep and contains the current stack pointer and the stack pointer at the start of the current instruction. The exponent stack is 15-bits wide by 2-deep and holds the exponent bits of an 80-bit temporary real value loaded from memory or the operand stack. Whenever microcode reads or writes a stack, the stack is popped or pushed by one element.

The system timer is a 16-bit up-count register that is zeroed at initialization time and is incremented once every 100 microseconds. The process timeout register is a 16-bit count-down register that can be loaded, started, and stopped under microcode control. The register is decremented once every 100 microseconds while running and returns a fault if it counts down to zero. The FIFO is 16-bits wide by 5 entries deep and is used to hold temporary results during floating-point computations. Writing to the FIFO drops the double-byte value into the FIFO and reading the FIFO pops the top element of the FIFO.

The execution unit also has a set of 16-bit ROM constants (428) that can be loaded into the DEQs for various masking and testing operations.

The execution unit contains 26 base-and-length registers that are used for referencing the segments to which the processor currently has access. Each base-and-length register (430) contains the 22-bit physical base address of a segment, the segment's length (−1), the base rights (for the data segment cache registers only), and the altered bit.

Fourteen of the base-and-length registers contain information on various system object segments, eight registers form a data-segment cache (435), and four registers form a segment-table cache (433). The data-segment cache registers point to the eight most-recently-used data segments in the current context, and are associatively searched using the 16-bit segment selector on the top of the segment-selector stack (404). The segment-table cache registers (433) point to the four most-recently-used segment tables, and are associatively searched using the eight-bit segment-table segment selector on the top of the segment-selector stack. If a reference is made to either cache and a match is not found, a cache fault (217) is returned to the instruction unit to force reloading the least-recently-used cache register with the desired value.

The data-segment and segment-table caches (433, 435) maintain validity bits for each register to indicate which registers contain valid information. Microcode control is provided for clearing either cache. In addition the data-segment cache can be selectively cleared. A single register can be cleared when it matches the current segment selector (this is done when the corresponding access descriptor in an access list has been overwritten). And a set of registers can be cleared when the two least-significant bits of their caches match the current segment selector (this is done when a new access list is entered).

The microinstructions that reference the base-and-length registers (430) specify a four-bit field to select a register. Only one address is provided for each of the two caches. The current segment selector is used to select a specific register when a cache has been specified. The base and length register address is encoded as follows:

| BBBB | Register |
|------|----------|
| 0000 | Entry access list |
| 0001 | Public access list |
| 0010 | Context object |
| 0011 | Private access list |
| 0100 | Segment table directory |
| 0101 | Processor object |

-continued

| BBBB | Register |
| --- | --- |
| 0110 | Dispatching port |
| 0111 | Process object |
| 1000 | Process control segment |
| 1001 | Context control segment |
| 1010 | Instruction segment |
| 1011 | Operand stack |
| 1100 | Work register-A |
| 1101 | Work register-B |
| 1110 | Data segment cache |
| 1111 | Segment table cache |

The ALU (432) on the execution unit provides a range of logical operations and add and subtract on characters, short ordinals, short integers, ordinals, and integers. These operations take their input values from the DEQs (400, 402) and store-and-result back into one of the DEQs. The logical operations are specified in microinstructions by a four-bit field defined as follows:

| LLLL | Logical Operation |
| --- | --- |
| 0000 | ZERO |
| 0001 | NOT A AND NOT B |
| 0010 | NOT A AND B |
| 0011 | NOT A |
| 0100 | A AND NOT B |
| 0101 | NOT B |
| 0110 | A XOR B |
| 0111 | NOT A OR NOT B |
| 1000 | A AND B |
| 1001 | A XNOR B |
| 1010 | B |
| 1011 | NOT A OR B |
| 1100 | A |
| 1101 | A OR NOT B |
| 1110 | A OR B |
| 1111 | ONES |

The length and type of a logical or arithmetic operation is specified in a microinstruction with a three-bit field encoded as follows:

| TTT | Data Type |
| --- | --- |
| 000 | Character |
| 001 | Short ordinal |
| 010 | Ordinal |
| 011 | 16-bit nonfaulting operation |
| 100 | 16-bit operation (ALU flags unchanged) |
| 101 | Short integer |
| 110 | Integer |
| 111 | 16-bit nonfaulting operation with carry |

The extractor (434) takes two 16-bit inputs from the A and B bus and extracts a 16-bit field from the combined 32-bit value. The A input is the most-significant half of the 32-bit value and the B input is the least-significant half. The least-significant-bit position (0–15) of the extracted value is specified by the current value contained in the extractor shift-count register (right shift) or by the 2s complement of the value contained in the extractor shift-count register (left shift).

The ALU also contains logic for encoding the bit position of the most-significant 1 in a double-byte value. If the value in nonzero, the function returns the position of the most-significant 1 as a number from 0 to 15. If the value is zero, the function returns either 0 or 16, depending on setting of two controlling flags. This allows easy computation of the significant-bit function for multiple double-byte values.

Very-high level memory and operand-stack-access microinstructions are provided. These microinstructions only specify the data length (8, 16, 32, 48, 64, or 80 bits), the source or destination DEQ, and the base-and-length register, and logic on the execution unit handles the complete access. The length of the access is specified with a three-bit field encoded as follows:

| VVV | Data Length |
| --- | --- |
| 000 | 8 bits |
| 001 | 16 bits |
| 010 | 32 bits |
| 011 | 48 bits |
| 100 | 64 bits |
| 101 | 80 bits |
| 110 | 32-bit instruction fetch |
| 111 | 16 bits (special case) |

The special-case 16-bit access is only used with read-memory and pop-operand stack. This special-case mode forces the result of the read or pop to go to the segment-selector stack instead of a DEQ. This is necessary to support fetching indirect segment selectors while interpreting the instruction stream.

A two-bit field in the microinstruction defines how a value is to be read from or written to a DEQ. The interpretation of the field depends upon whether the operation is a read or write and is encoded as follows:

| JJ | Write or Push Operation |
| --- | --- |
| 00 | Read DEQ A |
| 01 | Pop DEQ A |
| 10 | Read DEQ B |
| 11 | Pop DEQ B |

| JJ | Read or Pop Operation |
| --- | --- |
| 00 | Drop DEQ A |
| 01 | Push DEQ A |
| 10 | Drop DEQ A and drop DEQ B |
| 11 | Drop DEQ B |

A one-bit field specifies the type of operation (read or write), and two 1-bit fields in the microinstruction specify if the segment-selector stack or displacement stack should be popped after the access instruction has successfully completed. The encoding of these fields is defined as follows:

| W | Operation |
| --- | --- |
| 0 | Read memory or pop operand stack |
| 1 | Write memory or push operand stack |

| Q | Operation |
| --- | --- |
| 0 | Read segment selector stack |
| 1 | Pop segment selector stack |

| P | Operation |
| --- | --- |
| 0 | Read displacement stack |

-continued

| P | Operation |
|---|---|
| 1 | Pop displacement stack |

The execution unit maintains eight 16-bit registers for holding top-of-the-operand-stack information. The execution-unit hardware automatically handles the operation of these registers, including stack-bounds checking as a sum of the in-memory-stack size plus the stack size. A special-operand-stack-push operation is provided for flushing the stack registers when suspending the current context.

The execution unit supports the detection of both address development and computational faults. In general, when a fault condition occurs on the execution unit, the execution unit loads a unique value into the fault register (410) and returns the fault type to the instruction unit via line 217. If the fault type requires immediate handling, the execution unit ignores all further microinstructions until a reset-execution-unit fault-state microinstruction is received. This prevents the current microcode flow from performing any invalid operations before the instruction unit can respond to the fault and start the fault microsubroutine.

Address-development faults are all faults that relate to accessing a value in memory or on the operand stack. These include access-rights faults, invalid-segment faults, segment-bounds faults, bus error, cache faults, and invalid-instruction-class faults. Computational faults are all faults that can occur while performing a specific generalized-data-processor operator. These include overflow and underflow faults, divide-by-zero fault, and invalid floating-point-source-operand fault.

A large number of flags are maintained on the execution unit in register 436 to to indicate specific information (such as zero, positive, etc.) about data transferred over certain internal data paths. These flags can be split into two categories: source-operand flags and ALU flags.

The source-operand flags indicate certain conditions about data values that have been read from memory or from the operand stack and dropped into DEQ A or DEQ B. A duplicate set of flags is maintained for DEQ A and DEQ B. A duplicate set of flags is maintained for DEQ A and DEQ B, and the flags are only set when a memory or stack value is dropped (not pushed) into that specific DEQ. The flags are set in a manner consistent with the data length (8-, 16-, 32-, 64-, or 80-bits) being loaded from memory (e.g., the zero flag indicates that the entire value is zero). The source operand flags are summarized as follows:

| Mnemonic | | |
|---|---|---|
| DEQ A | DEQ B | Definition |
| OPAZ | OPBZ | Value is all zero |
| SA | SB | Sign bit of value (equal of MSB of value) |
| TA | TB | Least significant bit of MS double-byte of value |
| INVA | INVB | Invalid floating-point value (for 32-, 64-, 80-bits) (Note that unnormalized 32- and 64-bit values are included in invalid floating point.) |
| UNNA | UNNB | Unnormalized temporary real (only for 80-bits) |

Five of the ALU flags indicate conditions about the result of the last ALU operation. These five flags are Zero, Sign, Overflow, LSB, and All 1s. Again these flags are set in a manner consistent with the length (8-, 16-, or 32-bits) of the ALU operation. In addition, there is a significant-bit flag that is used when calculating the significant-bit position of a multiple double-byte value.

The microinstructions are split into six classifications: memory-and-operand-stack access, address development, data manipulation, floating point, communication, and control. The following sections describe the microinstructions in each of these classifications along with their encodings and execution-cycle times. An 'X' in a microinstruction's encoding indicates that this bit is a don't-care bit in the encoding and will always be zero.

11.1 MEMORY AND OPERAND STACK ACCESS MICROINSTRUCTIONS

Access Memory
Cycles: Variable
Encoding: 000MPJJQWVVVBBB
Fault Encoding:

A value is transferred between a DEQ (or the segment-selector stack) and the physical-memory location specified by the sum of the top-displacement-stack value and the physical-base address in the specified base-and-length register. If a cache is specified, the current segment selector identifies the specific base-and-length register to use for the access. If the M field is 1, then a read-modify-write read or write operation is performed. Several faults can be detected during the execution of this microinstruction. They are: data-segment-cache fault, segment-table-cache fault, access-rights fault, segment-altered fault, nonexistent-memory fault, and segment-bounds fault. All of these faults are checked before the memory access is started. If a fault is found, the access is terminated and a fault code is returned to the instruction unit.

Local Access
Cycles: Variable
Encoding: 00100010W001XXXX

A value is transferred between DEQ A and a local register. The first value popped from DEQ A is used as the address of the access. Local access is used to read the processor's ID and for externally indicating the current state of the processor.

Access-List Access
Cycles: Variable
Encoding: 00101JJQWVVVMXXX
Fault encoding:

A value is transferred between a DEQ and an entry in one of the current context's four access lists. The least-significant-two bits of the current segment selector specify one of the four access lists (BBBB=0 to 3). The upper-14 bits of the segment selector are used as a word displacement into the access list to the specific entry to be accessed. The faults that can occur are: segment-bounds fault, segment-altered fault, nonexistent-memory fault, and access-rights fault.

Instruction Segment Read
Cycles: Variable
Encoding: 00110XX001101010
Fault encoding:

A 32-bit value is read from the instruction segment and loaded into the composer registers on the instruction unit. The top of the IP stack specifies the displacement into the instruction segment to the next word of the instruction stream to be read. After the operation successfully completes, the IP is incremented by 4. The faults that can occur are: access-rights fault, nonexistent-memory fault, and segment-bounds fault.

Operand Stack Access
Cycles: Variable

Encoding: 00111JJ0WVVV1011
Fault encoding:

A value is transferred between a DEQ and the top of the operand stack. After completion of the stack access, the stack pointer and the top-of-stack register validity pointers are updated. The faults that can occur are: operand-stack overflow, operand-stack underflow, segment-altered fault, nonexistent-memory fault, and access-rights fault.

Access Destination
Cycles: 1
Encoding: 11110JJ01011WVVV

This microinstruction is used to load or store the destination operand of an instruction. The instruction unit translates this microinstruction into either an access-memory microinstruction or an operand-stack-access microinstruction and then sends this translated microinstruction to the execution unit. The instruction decoder sets the destination flag (0=memory, 1=stack) while decoding an instruction and this flag is used by the instruction unit to determine which microinstruction to translate the access destination into.

11.2 ADDRESS DEVELOPMENT MICROINSTRUCTIONS

Transfer Data to Register
Cycles: 2
Encoding: 11111SS00010RRR

A double-byte value is transferred from XBUF on the instruction unit to the specified register on the execution unit. The value is transferred over the interchip bus during the second cycle of the execution of this microinstruction. (This microinstruction is currently only used to access the segment selector and displacement stacks on the execution unit).

;.bb Transfer Logical Address
Cycles: 3
Encoding: 11111SS000010000

Two double-byte values are transferred from XBUF on the instruction unit to the segment selector stack and the displacement stack on the execution unit. The segment selector and displacement values are passed over the interchip bus during the second and third cycles, respectively, of the execution of this microinstruction.

Scale Displacement
Cycles: 2
Encoding: 01111SSDDVVV0100
Fault encoding:

The double-byte value read from DEQ A is shifted left 0, 1, 2, 3, or 4 places and stored into the destination DEQ. The number of places shifted is encoded in the VVV field. For this microinstruction the VVV field is interpreted as follows:

| VVV | Shift Count |
| --- | --- |
| 000 | 0 |
| 001 | 1 |
| 010 | 2 |
| 011 | not used |
| 100 | 3 |
| 101 | 4 |
| 110 | not used |
| 111 | not used |

An overflow fault is generated if the result of the shift is greater than 65535.

Add to Displacement Stack
Cycles: 2
Encoding: 01011SSXX0010110

Fault encoding:

The double-byte value read out of DEQ A is added to the value on the top of the displacement stack and written back to the displacement stack. An overflow fault is generated if the result is greater than 65535.

DEQ OP DEQ to Register
Cycles: 1
Encoding: 10000SS0RRRRLLLL

The double-byte value from the source DEQ is transferred to the destination register. If the destination register is a stack, the value is pushed onto the stack. Note that a logical operation may be performed on the value when it is transferred.

Register OP DEQ to DEQ
Cycles: 1
Encoding: 10000DD1RRRRLLLL

The double-byte value is transferred from the source register to the destination DEQ. If the source register is a stack, the value is popped from the top of the stack. Note that a logical operation may be performed on the value read from the register and the value read from DEQ A while transferring the result to the destination DEQ.

11.3 DATA MANIPULATION MICROINSTRUCTIONS

Logical Operation
Cycles: 1 or 2
Encoding: 01101SSDDTTTLLLL

The specified logical operation is performed on the values read from source DEQs and the result is stored in the destination DEQ. The operation may be 1, 2, or 4 bytes long.

Add
Cycles: 2 or 3
Encoding: 01000SSDDTTT0110
Fault encoding:

The sum of the values read from the source DEQs is stored in the destination DEQ. The operation is supported for characters, short ordinals, short integers, ordinals, and integers, for which an overflow fault may be generated. Two 16-bit-nonfaulting adds are also supported for implementing floating-point operations. These operations are add (carry zero) and add-with-carry (carry equal to the result of the last add).

Subtract
Cycles: 2 or 3
Encoding: 01000SSDDTTT1001
Fault encoding:

The value read from DEQ A is subtracted from the value read from DEQ B and the result is stored in the destination DEQ. The operation is supported for characters, short ordinals, short integers, ordinals and integers, for which an overflow fault may be generated. Two 16-bit-nonfaulting subtracts are also supported for implementing floating-point operations. These operations are subtract (borrow zero) and subtract-with-borrow (borrow equal to the result of the last subtract).

Increment
Cycles: 2 or 3
Encoding: 01001SSDDTTT1001
Fault encoding:

The value read from DEQ B is incremented by one and the result is stored into the destination DEQ. The operation is supported for characters, short ordinals, short integers, ordinals, and integers. An overflow fault may be generated.

Decrement
Cycles: 2 or 3

Encoding: 01001SSDDTTT0110
Fault encoding:

The value read from DEQ B is decremented by one and the result is stored into the destination DEQ. The operation is supported for characters, short ordinals, short integers, ordinals, and integers. An overflow fault may be generated.

Negate
Cycles: 2 or 3
Encoding: 01010SSDDTTT1001
Fault encoding:

The value read from DEQ A is subtracted from zero (negated) and the result is stored in the destination DEQ. The operation is supported for short integers and integers. An overflow fault may be generated.

Perform Operation
Cycles: Variable
Encoding: 10101XXXXXXXCCCC

This microinstruction initializes and starts the PLA state machine on the execution unit that handles the functions of multiply, divide, remainder, MOD, and square root. The CCCC field specifies the type of operation to be performed by the loop microinstruction and is encoded as follows:

| CCCC | Operation |
|---|---|
| 0000 | short ordinal multiply |
| 0001 | Short integer multiply |
| 0010 | Ordinal multiply |
| 0011 | Integer multiply |
| 0100 | Short ordinal divide |
| 0101 | Short ordinal remainder |
| 0110 | Short integer divide |
| 0111 | Short integer remainder |
| 1000 | Ordinal divide |
| 1001 | Ordinal remainder |
| 1010 | Integer divide |
| 1011 | Integer remainder |
| 1100 | 64-bit ordinal divide |
| 1101 | 64-bit MOD |
| 1110 | 64-bit ordinal multiply |
| 1111 | 64-bit square root |

Clear Operand Sign Bits
Cycles: 1
Encoding: 10100SS01000XXXX

The source operand flags SA and SB are cleared.

Invert SA
Cycles: 1
Encoding: 10100SS01010XXXX

The value in source operand flag SA is inverted. This function is used in the floating-point-subtract routines.

Exchange Flags
Cycles: 1
Encoding: 10100SS01001XXXX

The values in the source-operand flags SA and SB, and OPAZ and OPBZ are exchanged. This function is used in the floating point add-and-subtract routines.

Move to Extractor Shift Count
Cycles: 1
Encoding: 10100SS1111ULLLL

A four-bit value from the source DEQ is moved into the extractor shift-count register. The U field allows this count to move from either byte of the 16-bit source value to support the packed field operand of the generalized-data-processor insert and extract operators. This field is defined as follows:

| U | Count Field Source |
|---|---|
| 0 | Bits 0–3 |
| 1 | Bits 8–11 |

The shift-count register controls the operation of both the extract-and-create-mask microinstructions.

Move Constant to Extractor Shift Count
Cycles: 1
Encoding: 10100SS0001KKKK

The five-bit constant in the microinstruction is loaded into the extractor shift-count register.

Extract
Cycles: 1
Encoding: 01100SSDDRJTAABB

A 16-bit value is extracted from the combined 32-bit value on the extractor A bus (EA BUS) (MSB) and the EB BUS (LSB) and the result is stored in the destination DEQ. The bit position of the least-significant bit to be extracted is specified by the 4-bit value in the shift-count register (shift right) or the 2s complement of the value in the shift-count register (shift left). For the extract microinstruction, DEQ A, DEQ B, the extractor B register, or zero can be read onto the EA BUS and DEQ A, DEQ B, the extractor B register, or zero can be read onto the EB BUS. At the same time, the value read from either DEQ A or DEQ B can be read into the extractor B register (a master-slave register). The AA and BB fields control the value read onto the EA and EB buses, the T field controls the value loaded into the extractor register, and the J field controls the direction of the shift. These fields are encoded as follows:

| AA | EA BUS Value |
|---|---|
| 00 | Zero |
| 01 | DEQ A |
| 10 | DEQ B |
| 11 | Extractor register |
| BB | EB BUS value |
| 00 | Zero |
| 01 | DEQ A |
| 10 | DEQ B |
| 11 | Extractor Register |
| T | Extractor Register Load |
| 0 | DEQ A |
| 1 | DEQ B |
| J | Shift |
| 0 | Right |
| 1 | Left |

The different modes of the extract microinstruction allow arbitrary length shifts of up to 15 bits to proceed at one cycle for each 16 bits (e.g., a 15-bit shift of a 64-bit number can be done in 4 cycles). The R field is used to control loading the floating-point rounding flags from the extractor output. When the R bit is set in the extract microinstruction the rounding flags are loaded in one of three modes. If the shift count is zero, the flags are left unchanged; if the shift count is one, the sticky is loaded with the OR of the sticky-and-rounding flags, the rounding flag is loaded with the guard flag, and the guard is loaded with bit 15 of the extractor output; otherwise, the sticky is loaded with the OR of the sticky, guard, round, and bits 0–13 of the extractor output, and the guard and round flags are loaded with bits 15 and 14 of the extractor output, respectively. This has the effect of shifting from 0 to 15 bits into the rounding-control flags.

Significant Bit
Cycles: 2
Encoding 01110SSDDXXXXXXX

The bit position of the most-significant 1 in the value read from DEQ A is encoded and stored into the destination DEQ. If the source value is zero, a 0 or 16 is returned depending on the state of the OPAZ and significant-bit flag.
ROM OP DEQ to DEQ
Cycles: 1
Encoding: 10001DDAAAAALLLL

The specified logical operation is performed on the selected ROM value and the value read from DEQ A, and the result is stored in the destination DEQ. The ROM constants are defined as follows:

| AAAAA | Hexidecimal Constant |
|-------|----------------------|
| 00000 | 0001 |
| 00001 | 000B |
| 00010 | 000F |
| 00011 | 0020 |
| 00100 | 0028 |
| 00101 | 003F |
| 00110 | 0040 |
| 00111 | 0042 |
| 01000 | 007F |
| 01001 | 00FF |
| 01010 | 07FF |
| 01011 | 8000 |
| 01100 | 1F1F |
| 01101 | F800 |
| 01110 | FF00 |
| 01111 | CVTexp32 |
| 10000 | MAXEXPO |
| 10001 | SRTREXP |
| 10010 | RTREXP |
| 10011 | mulbias |
| 10100 | divbias |
| 10101 | sqrtbias |

Convert Flag to Boolean
Cycles: 2
Encoding: 10011DDFFFFI0101

The specified flag is converted to a 16-bit boolean value and the result is stored in the destination DEQ. If the I bit is one, then the inverse of the flag is converted to a boolean value. The flag to be converted is encoded into a four-bit field defined as follows:

| FFFF | Flag |
|------|------|
| 0000 | ZERO |
| 0001 | SIGN |
| 0010 | CARRY |
| 0011 | OPAZ |
| 0100 | SA |
| 0101 | NSIGN AND NZERO |
| 0110 | SIGN AND NZERO |
| 0111 | ROUND |
| 1000 | GUARD |
| 1001 | GREATER THAN ORDINAL |
| 1010 | GREATER THAN INTEGER |
| 1011 | GREATER THAN OR EQUAL INTEGER |
| 1100 | EQUAL REAL |
| 1101 | GREATER THAN REAL |
| 1110 | GREATER THAN OR EQUAL REAL |
| 1111 | |

11.4 FLOATING-POINT MICROINSTRUCTIONS

Absolute Value
Cycles: 2 or 3
Encoding: 01010SSDDTTTXXX0

The value read from DEQ A is either subtracted from zero (if negative) or added to zero (if positive) and the result is stored in the destination DEQ. The operation is supported for short integers and integers. This operation is used for the convert-short-integer-and-integer to temporary-real operators.
Add to Exponent Stack
Cycles: 2
Encoding: 01011SSXX1000110
Fault encoding:

The value readout of DEQ A is added to the value on top of the exponent stack and written back to the exponent stack.
;.bb Conditionally Shift by Sixteen
Cycles: 1
Encoding: 10100001110CLLLL

If bits 4–6 of the shift-count register are nonzero, then pop the source DEQ and load the popped value into the rounding-control flags (bits 15 and 14 into the guard and round, bits 13–0 and the old guard, round, and sticky into the sticky), drop a zero double-byte onto the DEQ, and decrement the count in bits 4–6 by one. If bits 4–6 are zero, then perform a no-operation. The C field specifies which DEQ to use in the operation (O=DEQ A, 1=DEQ B). This microinstruction is used to implement an arbitrary length shift of a 64-bit value and to unnormalize a floating-point value for add-and-subtract floating point.

11.5 COMMUNICATION MICROINSTRUCTIONS 11.5.1 IP Manipulation Microinstructions
Add to IP Stack
Cycles: 2
Encoding: 01011SSXX0100110
Fault encoding:

The value readout of DEQ A is added to the value on the top of the IP stack and the sum is written back to the IP stack. An IP-overflow fault can occur.
Transfer DEQ to BIP
Cycles: 1
Encoding: 11111SS01010LLLL

The least-significant-4-bits of the source DEQ are transferred over the fault bus to the BIP on the instruction unit.

11.5.2 Segment Manipulation Microinstructions
Move Constant to Displacement Stack
Cycles: 1
Encoding: 10100SS0000KKKK

The 5-bit KKKKK constant (with zeros in the upper 11 bits) is pushed onto the displacement stack.
Test Segment Type
Cycles: 2
Encoding: 10110SSZKKKKKKKK
Fault encoding:

The least-significant 3-or-8 bits of the value read from DEQ A is compared to 3-or-8 bits of the K field in the microinstruction, and if the two fields are not equal, an invalid-segment-type fault is generated. If the Z field is zero, 3 bits are compared; otherwise all 8 bits of the two fields are compared. This is used to test the segment-descriptor-type and segment-type fields in a segment descriptor.
Test Write Rights
Cycles: 1
Encoding: 10100SS00111XXXX
Fault encoding:

The base-and-length register for the access list selected by the current value on the top of the segment-selector stack is tested for write rights and a fault is generated if the write right is false. Note that the fault is not generated until the actual access list access microinstruction is executed.

Load Rights
Cycles: 1
Encoding: 10100SS11000BBBB

The access rights from the value read from the source DEQ (the least-significant half of an access descriptor) are loaded into the specified base-and-length register.

Load Physical Address Lower
Cycles: 1
Encoding: 10100SS11001BBBB

The least-significant-8 bits of the physical address are loaded from bits 8-15 of the value read from the source DEQ into the specified base-and-length register.

Load Physical Address Upper
Cycles: 1
Encoding: 10100SS11010BBBB

The most-significant-14 bits of the physical address and the altered-and-valid bits are loaded from the value read from the source DEQ into the specified base-and-length register.

Load Segment Length
Cycles: 1
Encoding: 10100SS11011BBBB

The segment-length field is loaded from the value read from the source DEQ into the specified base-and-length register.

11.5.3 Timer Control Microinstructions

Start Process Timer
Cycles: 1
Encoding: 10100SS1011XXXXX
Fault encoding:

The process timeout-countdown register is started counting down once every 1000 clock cycles. If the register counts down to zero, a process-timeout fault is generated.

Stop Process Timer
Cycles: 1
Encoding: 10100SS1010XXXXX

The process-timeout register is stopped from counting down and no timeout fault can then be generated.

11.5.4 Cache Managament Microinstructions

Invalidate Data Segment Cache
Cycles: 1
Encoding: 10100SS10010XXXX

The eight base-and-length registers contained in the data-segment cache are invalidated.

Invalidate Data Segment Cache Register
Cycles: 1
Encoding: 10100SS10000XXXX

If the segment selector on the top of the segment-selector stack matches a base-and-length register contained in the data-segment cache, then invalidate that base-and-length register.

Invalidate Data Segment Cache Register Set
Cycles: 1
Encoding: 10100SS10001XXXX

If the least-significant-2 bits in the segment selector on top of the segment-selector stack match any base-and-length registers contained in the data-segment cache, then invalidate those matching base-and-length registers.

Invalidate Segment Table Cache
Cycles: 1
Encoding: 10100SS10011XXXX

The four base-and-length registers contained in the segment-table cache are invalidated.

11.6 CONTROL MICROINSTRUCTIONS

11.6.1 Instruction Unit Control Microinstructions

This section describes the microinstructions used to control the operation of the instruction unit. All microinstructions in this section are treated by the execution unit as no-operations.

Stop Instruction Decoder and Flush Composer
Cycles: 1
Encoding: 11110XX00000XXXX

The instruction unit instruction decoder is stopped, the instruction decoder's state is set to zero, and the instruction unit composer registers and the composer buffer register are invalidated. Also the XBUF and PIR FIFOs are cleared.

Start Instruction Decoder
Cycles: 1
Encoding: 11110XX00001XXXX

The instruction unit instruction decoder is started in state zero which starts it decoding the class field of an instruction.

Pop Bit Pointer Stack
Cycles: 1
Encoding: 11110XX00010XXXX

The instruction unit bit-pointer stack is popped up by one and the top value on the stack is lost.

Move TBIP to BIP
Cycles: 1
Encoding: 11110XX00011XXXX

The current contents of the instruction unit TBIP are moved to the BIP.

Move Bit Pointer Stack to XBUF
Cycles: 1
Encoding: 11110XX00100XXXX

The current contents of the 5-bit top element in the instruction unit bit-pointer stack (with the upper 11 bits zero) is moved to the instruction unit XBUF FIFO.

Set Invalid Class Fault
Cycles: 1
Encoding: 11110XX00101XXXX

The invalid-class fault is set in the instruction unit fault handler.

Set Trace Fault
Cycles: 1
Encoding: 11110XX01011XXXX

This microinstruction sets a trace fault to occur on the instruction unit after the current macroinstruction completes execution.

Issue IPC Function
Cycles: 1
Encoding: 11110XX00110XXXX

The IPC bus function protocol is asserted on the instruction unit.

Set Processor Fatal Condition Pin
Cycles: 1
Encoding: 11110XX00111XXXX

The processor is inconsistency-fatal-condition-signal pin is asserted on the instruction unit. This signal is reset only by processor initialization.

Restart Current Access Microinstruction
Cycles: 1
Encoding: 11110XX01000XXXX

The instruction unit retransmits the last memory or operand-stack access microinstruction over the interchip bus to the execution unit.

Move Condition to Branch Flag
Cycles: 1

Encoding: 11110XX01001XXCC

The instruction unit internal flag specified by the CC field is transferred to the instruction unit branch condition flag. The CC field is encoded as follows:

| CC | Instruction Unit Flag |
|----|----|
| 00 | Destination Stack Flag |
| 01 | Lookahead Mode Flag |
| 10 | IPC |
| 11 | |

Branch
Cycles: 1
Encoding: 1100AAAAAAAAAAAA

The microinstruction pointer on the instruction unit is loaded with the absolute-branch address specified in the A field. The next microinstruction after the branch microinstruction is executed, then execution continues at the specified absolute-branch address.
Conditional Branch
Cycles: 1
Encoding: 1101AAAAAAAAAAAA

If the instruction unit branch-condition flag is true, then the microinstruction pointer on the instruction unit is loaded with the absolute-branch address specified in the A field. On a successful branch, the next microinstruction after the conditional branch is executed, then execution continues at the specified absolute branch address.
Call Microsubroutine
Cycles: 1
Encoding: 1110AAAAAAAAAAAA

The microinstruction pointer on the instruction unit is loaded with the absolute-branch address specified in the A field. The next microinstruction after the call microinstruction is executed then execution continues at the specified absolute-branch address. The address of the second microinstruction after the call microinstruction is pushed onto the microinstruction-subroutine stack.
Return From Microsubroutine
Cycles: 1
Encoding: 11110XX01010XXXX

The microinstruction pointer on the instruction unit is loaded with the value on the top of the microinstruction-subroutine stack. The next microinstruction after the return microinstruction is executed, the execution continues at the absolute address specified by the top of the subroutine-stack value. The microinstruction-subroutine stack is popped by one value.

11.6.2 Instruction Unit/Execution Unit Control Microinstructions

Reset Processor
Cycles: 1
Encoding: 11111SS00100XXXX

This microinstruction resets the internal state of the instruction unit and of the execution unit. The instruction unit responds to this microinstruction by:
1. Clear all faults
2. Stop the instruction decoder
3. Reset the instruction-decoder state to zero
4. Flush the composer registers and the composer buffer register
5. Start a microinstruction flow at the absolute address zero
6. Clear the XBUF and PIR FIFOs
7. Clear lookahead mode The execution unit responds to this microinstruction by:
1. Clear the DEQs
2. Clear all faults
3. Reset any internal operations
4. Clear the data segment and segment-table caches
5. Clear lookahead mode The instruction unit and the execution unit must respond to this microinstruction independent of their current internal state.
;.bb Transfer Operator Fault Encoding
Cycles: 3
Encoding: 11111SS00000XXXX

The 8-bit-fault encoding saved on the instruction unit when the current instruction's opcode was decoded is transferred over the interchip bus to the execution unit and stored on the displacement stack. The fault value is transferred over the bus during the third cycle of the execution of this microinstruction.
Return Flag to Instruction Unit Branch Condition
Cycles: 2
Encoding: 10010SSFFFFIXXXX

The specified flag on the execution unit is passed over the T/F signal pin to the instruction unit and loaded into the branch-condition flag on the instruction unit (if the I bit is 1, the complement of the flag is returned to the instruction unit). The flag on the execution unit to be returned is encoded in the microinstruction as follows:

| FFFF | Execution Unit Flag |
|------|---------------------|
| 0000 | ZERO |
| 0001 | SIGN |
| 0010 | CARRY |
| 0011 | OPAZ |
| 0100 | SA |
| 0101 | SA XNOR SB |
| 0110 | OPBZ |
| 0111 | OPAZ OR OPBZ |
| 1000 | PRECISION CONTROL 24 OR 53 BITS |
| 1001 | PRECISION CONTROL 24 BITS |
| 1010 | SUBTRACT MAGNITUDE ZERO RESULT |
| 1011 | LSB |
| 1100 | UNNB OR SIGN |
| 1101 | TRACE |
| 1110 | |
| 1111 | |

Reset IP and Stack to Instruction Start
Cycles: 1
Encoding: 11111SS01001XXXX

The instruction unit responds to this microinstruction popping the microinstruction-bit pointer by one element. The execution unit responds to this microinstruction by popping the IP and stack-pointer stacks by one element and by resetting the validity pointers for the on-chip top of operand-stack registers.
End of Macro Instruction
Cycles: 1
Encoding: 11111SS00111XXXX

The instruction unit responds to this microinstruction by starting any end-of-macroinstruction-subroutine-call faults and if not in lookahead mode, by pushing the microinstruction-bit-pointer stack by one element (leaving the top element unchanged). The execution unit responds to this microinstruction by pushing the IP (if not in lookahead mode) and stack-pointer stacks by one element (leaving the top element of the stack unchanged), by saving the current state of the on-chip-topof-operand-stack-register validity pointer, and by clearing the DEQs. Also, both the instruction unit and execution unit clear their lookahead mode flags, and the instruction unit clears the destination flag.

End of Branch Macro Instruction

Cycles: 1

Encoding: 11111SS00110XXXX

The instruction unit and execution unit respond to this microinstruction the same way as the end-of-macroinstruction microinstruction except that the instruction unit ignores any currently-saved instruction-segment fetch or invalid class faults.

Set Lookahead mode

Cycles: 1

Encoding: 11111SS00011XXXX

The instruction unit responds to this microinstruction by setting the lookahead mode flag and by pushing the bit pointer stack by one element (leaving the top element unchanged). The execution unit responds to this microinstruction by pushing the IP stack by one element (leaving the top element of the stack unchanged). Also, both the instruction unit and execution unit set their lookahead-mode flags.

11.6.3 Execution Unit Control Microinstructions

Reset execution unit Fault State

Cycles: 1

Encoding: 10100SS00110XXXX

The execution unit resets its current fault state and begins decoding all new microinstructions.

No-operation

Cycles: 1

Encoding: 10100SS01100XXXX

The instruction unit and execution unit idle for one cycle.

12.0 SUMMARY OF INSTRUCTION UNIT/EXECUTION UNIT OPERATION 12.1 THREE-STAGE PIPELINE

The GDP (shown in FIGS. 6, 7 and 8) has a three-stage, pipelined microarchitecture. The first stage of the pipeline is the instruction decoder (ID, 222) which takes in the macroinstruction-bit stream over bus 214 and emits the data fields and microinstructions (or microinstruction flows) necessary to emulate the function encoded in the macroinstruction. The data fields and microinstructions issued by the ID are buffered in two FIFOs where they wait to be passed on by the microinstruction sequencer (224).

The second stage of the pipeline, the microinstruction sequencer (MIS, 224) controls the flow of microinstructions and data to the microinstruction execution unit (MEU, 212). In the simplest case, the MIS just passes on the microinstructions and data from the ID at the rate that the MEU can execute them. But the MIS must also be able to interrupt this flow if any faults are returned from the MEU or if any external conditions (such as INIT or ALARM) must be recognized.

The last stage of the pipeline is the MEU (212) which actually executes the sequence of microinstructions necessary to advance the state of the computation. The MEU can handle a large number of data-handling and memory and operand-stack access microinstructions dealing with 8-, 16-, 32-, 64-, and 80-bis-data types. The microinstruction set has been highly optimized around the requirements of the architecture and is described in detail under the preceding heading "INSTRUCTION UNIT/EXECUTION UNIT MICROINSTRUCTION SET."

The operation of each of the three stages of the pipeline will now be described in detail.

12.2 STAGE ONE: INSTRUCTION DECODER (ID)

Figure 7:
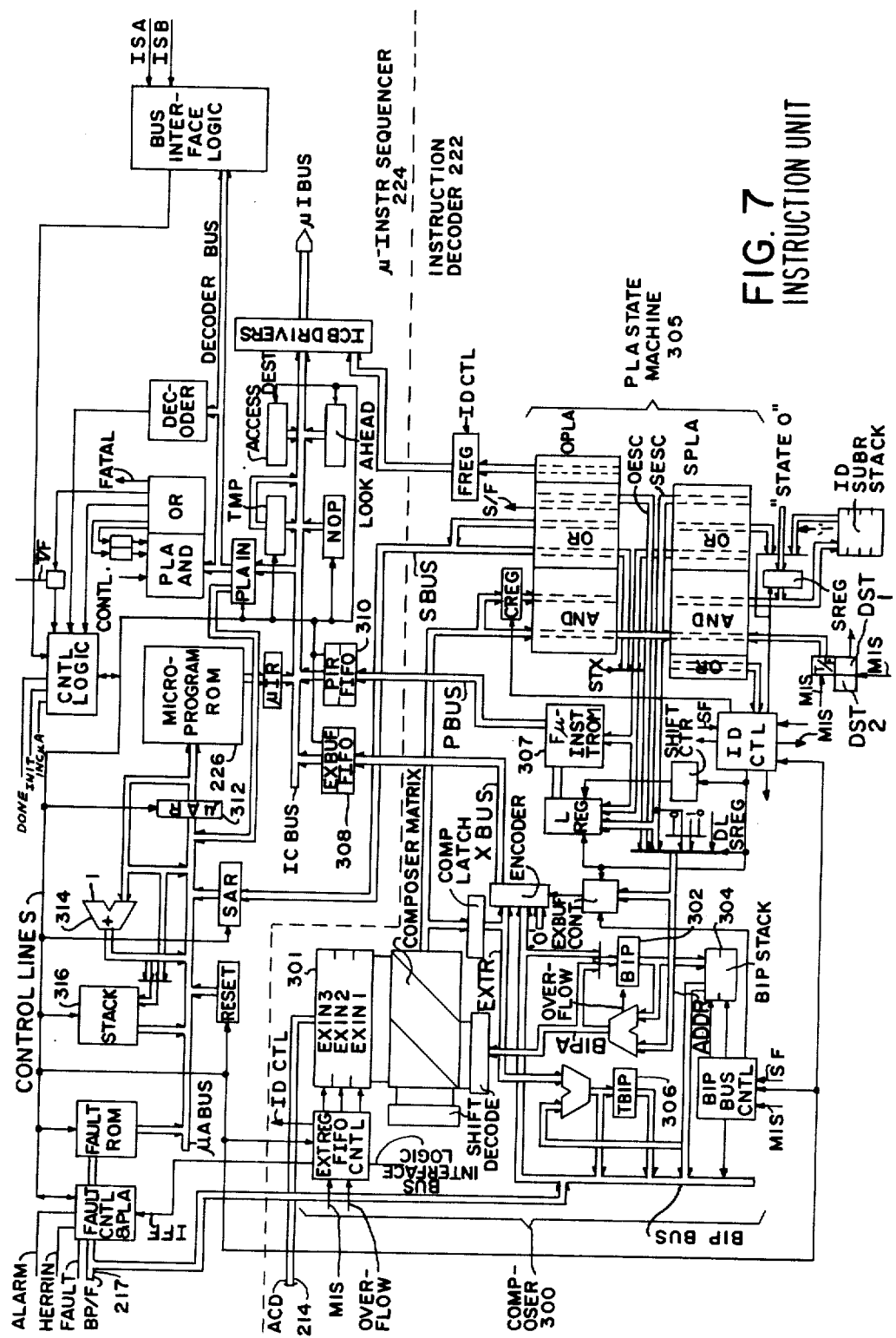
FIG. 7 is a block schematic diagram of the instruction unit of FIG. 6.

The instruction decoder (ID) is the first stage of the pipelined microarchitecture. The ID sequentially decodes the fields of a GDP macroinstruction and passes the necessary control and data information to execute the instruction on to the next stage of the pipeline. The block diagram of the ID is shown in FIG. 7.

The instruction buffer (301) holds macroinstruction data that it has received from memory through the memory interface (214). The bit pointer (302) indicates the bit position in the instruction buffer of the least-significant bit of the next field to be decoded by the ID. Using the bit pointer, the extractor (300) presents the next n bits of instruction data to be decoded to the state machine (305). The state machine decodes the instruction field, passes on any data or microinstructions to the FIFOs (308, 310) and then updates the pointer by the bit length of the field just decoded.

For instance, when decoding a simple scalar reference, the state machine first picks up the segment selector and then the displacement field of the instruction and loads them into the data FIFO (308). Then the state machine forces a microinstruction to the instruction FIFO (310) that will cause the segment selector from the TROM (307) and displacement to be transferred across to the MEU.

The ID continues decoding fields until the data in the instruction buffer is exhausted. The ID then goes idle and requests the MIS to fetch more instruction data from memory. Once the memory access is complete and the instruction buffer (301) is loaded, the ID continues decoding more of the instruction. Ideally, the ID will decode every possible bit of the data in the buffer before requesting more data from memory. This minimizes any excess fetched data after the end-of-a-branch macroinstruction. Otherwise, extra data bits may be fetched from memory which will never be used. This will hurt both processor and bus performance. Note that there is no advantage to fetching more instruction data before the buffer becomes empty since the ID, MIS, and MEU are all involved in the memory access (and hence not idle waiting for the ID to start running again).

The amount of instruction data fetched from memory (which also controls the size of the instruction buffer) is another parameter not easily defined. If the amount fetched is too short, the ID will be constantly going not ready waiting for more data from memory. If the amount fetched is too long, considerably fetched data will be wasted after each branch macroinstruction, decreasing the overall performance. The average instruction field size, the average instruction size, and the average number of instructions between branches all control this parameter. 32-bit instruction fetches are utilized in the present embodiment of the invention. When the state machine (305) decodes the op-code field of a macroinstruction, one of two cases can occur. Either the macroinstruction function can be executed by the MEU with a single microinstruction, in which case the ID puts that microinstruction in the instruction FIFO (310) or the macroinstruction requires a sequence of microinstructions to be executed, in which case the ID issues a starting address for the microcode ROM (226) for the flow. The MIS will then independently execute the specified microcode flow from the ROM while the ID continues decoding the next GDP macroinstruction.

FIFOs (308, 310) between the ID and the MIS are necessary for the following reasons. The ID will not issue new microinstructions to the MIS at the same rate that the MIS can execute them. Without the FIFOs, the ID would be stopped occasionally, in the process of giving the MIS a new microinstruction, while the MIS is completing the previous one. In some other cases the MIS would be stopped waiting for the ID to issue a new microinstruction. The FIFOs smooth out this difference in execution rate. The ability of the ID to keep work for the MIS and MEU to do in the FIFOs is essential to the overall performance of the processor. The FIFOs should be deep enough to ensure that the ID can always be far enough ahead to keep the MIS and MEU from going idle (in all cases). There is a second feature of the FIFOs. The ID is allowed to get considerably ahead of the MIS and MEU in execution. Should the ID decode a successful branch macroinstruction, considerable time could be wasted by the ID if it begins fetching and decoding the next macroinstruction after the branch (since this macroinstruction will not be executed). The ID must be able to handle this case by stopping itself after decoding the branch instruction. The microinstruction flow for executing the branch will then do the necessary work for reloading the macroinstruction memory pointer and restarting the ID at the target macroinstruction. Similarly, the instruction decoder should be able to stop after decoding those communication macroinstructions that are very likely to stop the instruction flow and suspend the process (i.e. Wait for Message, Wait for N Time Quanta, etc.). It should be recognized that these macroinstructions are far less common than the branch macroinstructions and so, less important if the ID cannot handle this optimization in all cases. One additional difficulty that must be handled is generating the proper information when a fault occurs. This fault data includes the bit address of the start- and end-of the macroinstruction that caused the fault. This required the ID to save the bit pointer on a stack (304) each time a new macroinstruction is encountered. The fault handler microcode may then retrieve this data from the stack if a fault occurs. Note that the stack must be deep enough to handle the worst-case number of macroinstructions that the ID can get ahead of the MIS and MEU.

12.3 STAGE TWO: MICROINSTRUCTION SEQUENCER (MIS)

The second stage of the pipeline is the microinstruction sequencer (224, FIG. 7). The MIS has the complex task of resolving a large number of inputs and determining what the correct data is to put onto the microinstruction bus during the next clock cycle. The MIS receives inputs from several sources. The ID provides data and microinstructions to be executed and requests to fetch more macroinstruction data. External requests for service can be received from INIT, interprocessor communication (IPC), and ALARM (IPC lines are not shown in FIG. 7). The MEU returns status information to the MIS which may include faults that have to be prioritized and serviced by the MIS. Faults received by the MIS over BP/F bus 217 indicate that some exceptional condition exists that has to be serviced. The MIS does this by interrupting the normal flow of microinstructions to the MEU and forcing a subroutine call to a special handler in the microcode ROM (226). When the fault subroutine completes its operation, it returns from the subroutine and the normal flow of microinstructions starts again. Each fault type has its own service subroutine in the ROM. The faults that the MIS has to handle fall into two categories: immediate faults and end-of-macroinstruction faults. Within each category the faults are prioritized (since more than one fault can be pending at a time) and serviced in priority order. Immediate faults indicate that the fault condition must be serviced as soon as the currently-executing microinstruction completes. The immediate fault types and their priorities are as follows:

1. Hardware error
2. Bus error
3. Computational fault (overflow, etc.)
4. Instruction fetch fault
5. Invalid class field fault End-of-macro faults are of a less serious nature and are not serviced until the current macroinstruction has completed execution (which is indicated by an end-of-macroinstruction microinstruction). The end-of-macro faults and their priorities are given in the following table.

1. ALARM
2. Interprocessor communication
3. Trace fault
4. Process timeout

One difficulty arises from the fact that the ID can be decoding ahead on the next microinstruction(s) while the current macroinstruction is still executing. Two faults, invalid class fault and instruction fetch fault, can result from this lookahead operation of the ID. If either of these faults does occur, they must be held off until all macroinstructions previous to the one causing the fault have completed execution. Otherwise, the wrong macroinstruction will be stopped and flagged for the fault. The appropriate mechanism must be provided in the MIS to ensure that these two faults and the macroinstructions that they were caused by remain synchronized. The algorithm used by the MIS to determine its operation is based on a priority structure. The set of conditions tested by the MIS and their priorities are as follows:

1. INIT
2. MEU not ready
3. Immediate fault
4. Instruction fetch request
5. Macroinstruction boundary and end-of-macro fault
6. Flow microinstruction waiting
7. Forced microinstruction waiting
8. Flow starting address waiting
9. Idle The MIS scans down this list of conditions each cycle and stops at the first one that is true. The true condition controls what is sent out over the microinstruction bus (MIB) (220) to the MEU. The following outlines the response of the MIS to each condition if it is the highest priority true condition.

1. Reset all fault and internal conditions, stop the ID, and send a reset-processor microinstruction over the MIB.
2. Continue sending the current microinstruction on the MIB. (Different microinstructions vary in execution time from 1 cycle to over 300 cycles.)
3. Force a microcode-subroutine call to the highest-priority-pending immediate fault.
4. Send an instruction fetch microinstruction on the MIB to cause another 32-bits of instruction data to be loaded into the ID's instruction buffer.
5. Force a microcode-subroutine call to the highest-priority-pending end-of-macroinstruction fault.

6. Issue the next microinstruction from the ROM onto the MIB and increment the microinstruction pointer.
7. Pop the next microinstruction from the ID's microinstruction FIFO and put it on the MIB.
8. Load the microinstruction pointer with the new starting address from the ID and start executing the flow at that address.
9. If none of the above conditions are true, then the MIS has no work to do and a no-op microinstruction is sent out over the MIB. Each of these no-op cycles is a wasted cycle and hopefully the pipeline will keep them to a minimum.

The MIS also has to interpret and execute a few microinstructions that control the operation of the MIS and ID. These microinstructions perform such operations as starting and stopping the ID, loading the ID's bit pointer, etc. The MIS microinstructions are described in detail under the preceding heading "INSTRUCTION UNIT/EXECUTION UNIT MICROINSTRUCTION SET."

12.4 STAGE THREE: MICROINSTRUCTION EXECUTION UNIT (MEU)

Figure 8:
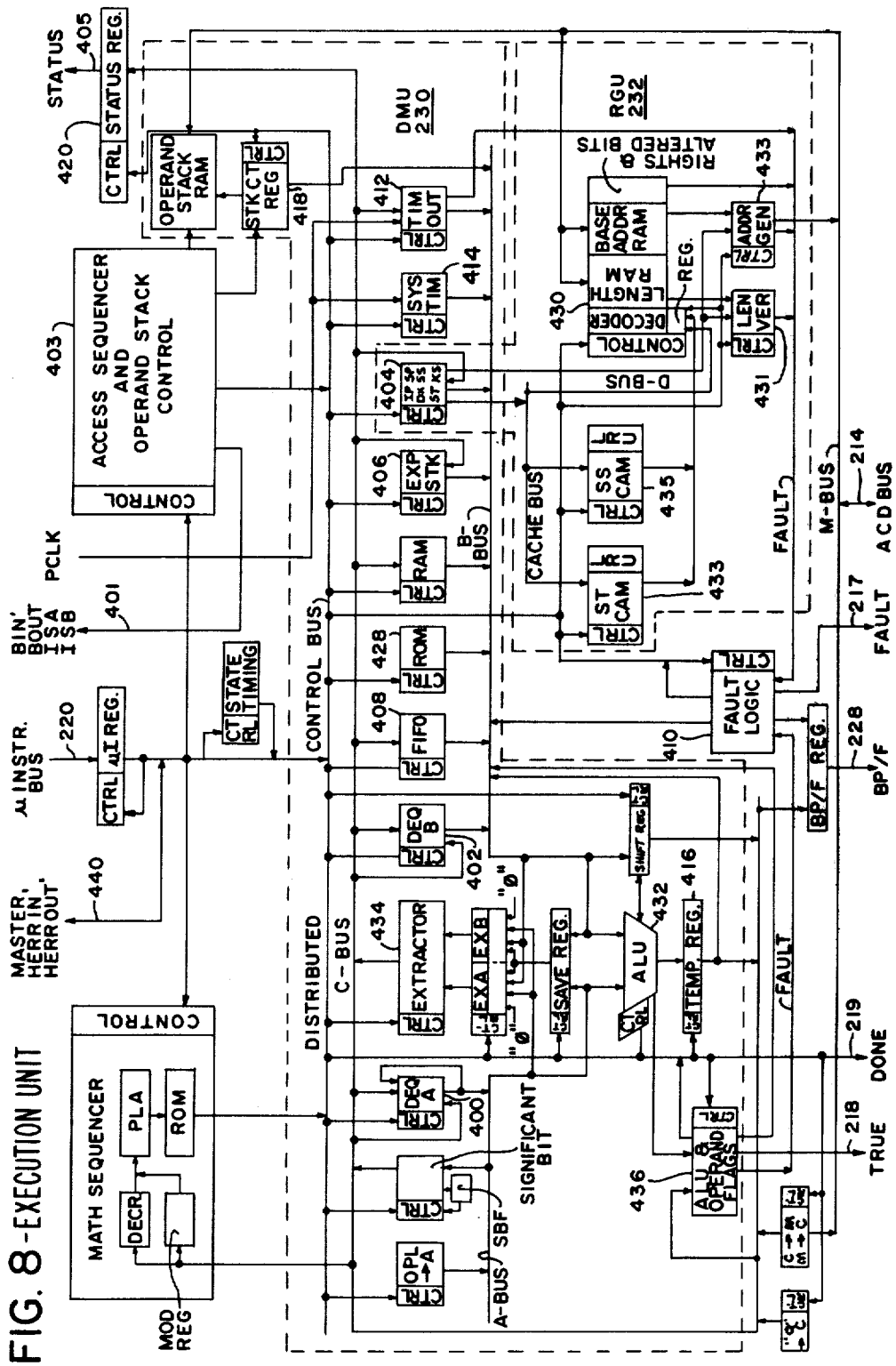
FIG. 8 is a block schematic diagram of the execution unit of FIG. 6.

The third and final stage of the GDP pipeline is the microinstruction execution unit (212) shown in detail in FIG. 8. The MEU accepts, decodes, and executes the continuous stream of microinstructions received from the MIS. The MEU can handle more than 63 distinct microinstructions. The MEU has two main parts shown within dotted lines in FIG. 8: the data-manipulation unit (DMU, 230) and the reference-generation unit (RGU, 232). The DMU contains the registers and arithmetic capabilities to perform the functions of the GDP macroinstructions. The RGU contains the base-and-length registers (430) and the arithmetic to generate and check addresses in the GDP segmented-address space. The sequence of execution of a typical GDP macroinstruction, such as add short ordinal, will be used to illustrate the operation of the DMU. The ID begins decoding the instruction and sends (through the MIS) the logical address (segment selector and displacement) of the first source operand across the microinstruction bus (220) to the registers in the DMU. The ID then sends a microinstruction to load the source value from memory (or the operand stack) to the DEQA register (400). The RGU handles the translation of the logical address into a physical address to send to memory. The second source operand is loaded in a like manner from memory into the DEQB register (402). Next the logical address of the result is passed to the DMU and the ID decodes the opcode field of the macroinstruction. In the case of an add, an add microinstruction is sent by the ID to the DMU. The DMU responds by passing the values in DEQA and DEQB through the adder in the ALU (432) and putting the sum back into the DEQB register. To complete the instruction, the ID sends a microinstruction to store the result from DEQB into the destination location in memory. The ID then continues on with the next GDP macroinstruction. The sequence for generating a physical address from a logical address in the RGU (232) proceeds in several steps. First the segment selector in SSCAM (435) is compared against the values in the base-and-length-register cache (430). If there is no match, a fault is generated to fault logic (410) and the memory access is stopped. (The fault handler will load the correct base-and- length information into the registers and then restart the memory access.) Otherwise, the base-address-and-length of the segment to be accessed is read from the registers. Next the displacement is compared (431) to the length of the segment to check that the access is within bounds. If the access is out of the segment or if the access rights (read or write) do not allow the operation, a fault is generated and the access is terminated. Otherwise, all checks are now complete and the base address is added to the displacement in address generator (433) to give the physical-memory address of the desired value. A complete description of the registers in the MEU and the microinstructions used to manipulate them is given under the heading "INSTRUCTION UNIT/EXECUTION UNIT MICROINSTRUCTION SET."

12.5 TYPICAL PROCESSOR OPERATION

The following description follows the processor's operations from the time it is initialized to executing its first flow of macroinstructions. At time t=0 the INIT pin is asserted, and the three stages of the pipeline respond as follows. The ID empties the instruction buffer and the FIFOs, resets the state machine, and puts itself in a stopped state (there are no instructions to decode yet). The MIS resets all faults and other saved conditions, starts a microinstruction flow from location zero in the microcode ROM, and sends a reset-processor microinstruction out on the microinstruction bus. The MEU resets any internal fault conditions, stops any multiple-cycle microinstructions that may be in progress, and awaits new microinstructions from the MIS. The microinstruction flow sent out by the MIS performs the necessary operations to initialize the processor. These operations include reading the processor's identification number and qualifying the segment-directory table, the segment table and the processor object. Once the processor initialization is complete, the initialization microcode branches to the dispatch microcode. The dispatch microcode searches the processor's current dispatching port for a process to run. If there are no waiting processes, the processor goes into an idle state and waits for an IPC signal to tell it to try to dispatch again. If there is a waiting process, the dispatch routine removes the process from the dispatching port and loads the processor's internal registers with all the necessary addressing information about the process' current environment. When the registers are loaded and the bit pointer and instruction pointer are intialized, the ID is started and the dispatch microcode is ended. The ID starts by requesting instruction data to be fetched from memory, and then the state machine begins decoding and sending information to the MIS. Macroinstruction decoding and execution continues in this way until a macroinstruction is executed that suspends the process, a fault occurs, or the process times out. When one of these occurs, the MIS forces a microcode subroutine call to a microcode flow to handle the condition. This handler will eventually branch to the suspend flow, which will stop the ID and store away the necessary information from the on-chip registers into the process. The suspend flow will then put the process at the appropriate communication or dispatching port. After the suspend is complete, the suspend flow branches back to the dispatch flow described above, and the loop is complete. It is this dispatch-execute-suspend sequence (with possibly idle waits in between) that defines the basic operation of the GDP.

PART 3. INPUT/OUTPUT ARCHITECTURE

13.0 OVERALL I/O SYSTEM

Generalized data processors (GDPs), as previously defined, function within a GDP-system address space and can only reference objects within that space. Input/output processors (IOPs) function at the boundary between two address spaces and can reference objects in both spaces. The first is the GDP-system address space and the second is called an input/out (I/O) address space. The main purpose of input/output processors is to support data transfer between these two address spaces (i.e., transfer data from input devices to main memory and/or transfer data from main memory to output devices). The following is a description of the logical mechanisms used to support input/output on the system. First a set of basic facilities provided by input/output processors are discussed. Next, a picture of the software viewpoint provided by input/output processors is presented. Then the methods supplied for initiating, performing, and terminating data transfer cycles are discussed. Facilities provided, beyond those required for input/output alone, are discussed in the next section. Following that, a structural overview is presented of the relationships between input/output processors, input/output processes, and the objects they use. Lastly, a comment on the interfaces supported is made.

13.1 BASIC STRUCTURES AND FACILITIES

A basic set of structures and facilities are provided by input/output processors which are similar to the architectural structures and facilities provided in the generalized data processor. In order to establish a framework, those areas in which the same structures and facilities apply are described first. In later sections, those areas are described where the structures and facilities provided either differ from those provided by generalized data processors or are totally unique to input/output processors. Input/output processors use the same descriptor-controlled, segment-based, address-development mechanism as that used by other processors. Input/output operations execute in four-component, context-based environments similar to those provided on other processors. Character, short-ordinal, and short-integer data types are supported. Operand stacks are employed for expression evaluation. The same environment manipulation and control flow facilities are available as on GDP processors. Interprocess communication is supported via the same message-based mechanism used by GDP processors. Input/output processes are selected for service via the same dispatching mechanism used by GDP processors. Interprocessor communication mechanisms are similar. Storage allocation, base/system type management, extended-type management, exception handling, and debugging employ the same mechanisms.

13.2 SOFTWARE VIEWPOINT

The viewpoint of the input/output function provided by IOPs and the environment in which it is performed is consistent with the high-level viewpoint provided throughout the overall system architecture. Any privilege necessary to allow access to an input/output interface is granted via an access path to that interface. Thus, no circumvention of protection is possible via the input/output system is is possible in many prior systems. No master/slave modes or protected instructions are necessary or provided. The inherent concurrency of the input/output system is exploited by modular programming. In the present system, concurrency occurs only between processes. Therefore each peripheral capable of independent, asynchronous activity should be managead by a separate process in order to allow this independent, asynchronous activity to be fully realized. A programmer sees each peripheral as being completely independent and asynchronous with respect to all other peripherals. The programmer controls the peripheral in what appears to be a completely-dedicated and synchronous manner. Some peripheral components are implemented with multiple peripherals per component. This generally requires time-multiplexed access to the interface of such a component. Each of the processes managing such a set of peripherals must be able to gain exclusive access to the interface before referencing that interface. Any exclusion between input/output processes required over a segment containing such peripheral-interface registers can be achieved via normal software-exclusion mechanisms (i.e., via the use of buffered-communication ports). Peripheral-request handling (e.g., interrupt handling) is moved out of the software and into the hardware. To do this, the multiplexing of an IOP over several input/output processes over time must be, for the most part, removed from the view and concern of the programmer. The general problem is to be able to properly bind processes to processors to peripherals in a multiprocessor environment. The problem of binding processes to processors is handled by a slightly modified version of the dispatching mechanism used by GDPs. The problem of binding processes to peripherals is handled by entirely new mechanisms based upon system objects called event-control objects, event lists and event ports and hardware agents called event controllers.

13.3 DATA TRANSFER

The data transfer function can be thought of as a three-phase, potentially-cyclic, operation. These phases are setup, transfer, and cleanup.

13.3.1 Setup

Where the IOP portion of the setup phase begins is very dependent upon the partitioning of a particular algorithm between GDP and IOP. This is, to some extent, determined by the presence or absence of support for the necessary data types and associated operators by input/output processors. Given the availability of the character, short-ordinal, and shot-integer data types and the complete set of operators over them, there is far less chance of having to partition an algorithm and, thus, suffer the interprocess communication latencies which would result than would be the case if some of that support were absent. Certain portions of any such algorithm must be performed by an IOP process. Certainly any portions of a given algorithm which must be able to react in real-time-to-external events or requests must be performed by an IOP process. Beyond this, any portions of a given algorithm which cannot stand the interprocess communication and dispatching latencies incurred whenever communication between GDP and IOP processes occurs must be performed by an IOP process. Thus, it is expected that at least some parameter interpretation and actual device setup and initiation will be performed by an IOP process. Due to the design of some peripheral interfaces there is a potential boundary-condition problem between the setup and transfer phases of a data transfer operation. With some peripheral interfaces, the issuance of the last setup command implies that the peripheral may immediately begin to issue requests to the IOP process for service. If such a peripheral cannot withstand the transfer-instruction-fetch-and-setup-latency before suffering lost data or some other error, then that peripheral is not supportable.

13.3.2 Transfer

The transfer phase of any input/output operation consists of copying data from/to the GDP system address space to/from an input/output address space. There are two kinds of transfer operators provided: single-operand-transfer operators and operators which transfer blocks of operands. The single-operand-transfer operators are used primarily in peripheral setup/cleanup. They consist of the basic MOVE operators for the supported data types. To be able to perform block-operand transfer operations, an IOP employs what are called macro operators. These macro operators specify, via a transfer control object, all the information required for special IOP hardware, called a transfer controller, to perform a complete transfer operation under normal conditions. A transfer control object contains such information as a count of the items to be transferred and initial source and destination references. In the case of status-driven data transfer, a transfer control object also contains a status reference and a mask to be matched with the status interface. The use of such macro operators obviates the need to fetch instructions during transfer operations (allowing maintenance of higher data transfer rates).

13.3.2.1 Synchronization

There are extra requirements imposed on an IOP when making references into an input/output address space over those involved when making references into the GDP-system address space. The design of the GDP-system-address-space interface makes the response time of the various components of that space invisible. Thus, when referencing the GDP system address space, a processor is willing to wait for the response and expects that response within a reasonable time. Components of an input/output address space generally have a wider spectrum of possible-response times and typically-worse-response times than the components of the GDP system address space. Given the greater maximum and typical response delays of input/output address-space components, an IOP is, in many cases, not willing to wait for a response. Given this unwillingness, some synchronization mechanism is required to allow an IOP to deal with such components. Two synchronization mechanisms are provided: signal-drive synchronization and status-driven synchronization. Some peripherals require an IOP to be able to perform the data-transfer portion of the traditional direct-memory access (DMA). The synchronization of such transfers uses a form of signal-drive synchronization (i.e., request/acknowledge). For such DMA-oriented peripherals, the basic operation performed by an IOP is to generate memory references in synchronization with a particular peripheral (via request/acknowledge) until either transfer completion (signaled via run-out of a software-provided transfer-limit count) or peripheral completion (signaled via a termination request) occurs. Note that while peripherals requiring request/acknowledge synchronization are supported, real DMA transfers, when the source and destination are in different address spaces, are not supported. With real DMA transfers, the source-and-destination variables must be in the same address space. This allows the acknowledge signal to serve as an implicit reference and thus avoid one reference cycle. In the present system, the GDP-system address space does not intersect any input/output address space, and, thus, real, interaddress-space DMA transfers are not possible. Instead, both source-and-destination references are explicitly generated with the data being captured in the IOP in between the two references. Some peripherals require that data transfer be done in status-driven or sampling mode. The only difference between the mode described above and the status-driven mode is that an IOP performs synchronization with the peripheral via sampling a status interface until its contents meet some condition. The impetus for sampling the status interface can either be peripheral-generated (i.e., a request) or clock-generated (i.e., sample every n time quanta). Except for interfaces which behave like memory components, the common peripheral interfaces encountered use a status-synchronized transmission mechanism for command-loading/status-storing. Thus an added facility, provided by the status-driven-transfer mechanism described above, is that an IOP can perform not only the data transfer portion of the input/output function but also the peripheral command-loading/status-storing portions. By having an IOP perform the whole input/output function, awkward synchronization problems between the IOP and the peripheral can be avoided and some interprocess communication overhead removed.

13.3.2.2 Termination

As mentioned above, there are, for any data transfer, some termination criteria. One criteria is always present: a transfer limit count. Used either alone or in conjunction with other termination criteria (such as peripheral-termination requests), the transfer limit count is the primary termination facility provided. Together with such other information as the maximum-allowable-intertransfer latency, it helps guarantee the deterministic behavior of data-transfer operators. Other termination criteria, such as peripheral-termination requests and error status, can signal either satisfactory or early termination (if some error has occurred). Certain other termination criteria, discussed below, cause potentially-early termination based upon context sensitive criteria applied to the data being transferred.

13.3.3 Cleanup

One potentially major facet of the cleanup portion of any input/output operation is error recovery. The intention is that most error recovery will be done under control of input/output processes. Error signaling can occur in different ways depending upon which party recognizes the condition. When a device recognizable condition occurs (i.e., data overrun, parity error, etc.), it can signal an IOP via a request-and-post status. For IOP-recognized errors or termination conditions, an IOP can either ignore continued transfer requests on the part of the peripheral, reset the peripheral, or inform some other agent in the system address (i.e., post some information where it will gain the attention of other software). Another portion of normal cleanup work is the assembly and transmittal of result messages to other processes within the system.

13.4 BEYOND DATA TRANSFER

Below are discussed two classes of facilities, beyond those required for data transfer, which are provided by input/output processors. First, there are those which are performable along with data transfer. Second, there are those which are separable from data transfer. Beyond simply being able to transfer data, it is useful to be able to manipulate the data being transferred. Two kinds of manipulations are available: scanning the data to see if it contains certain specified constants and altering the data as defined via a table lookup. Scanning the data for the occurrence of a constant or element of a constant set can be useful when the data contains control information (e.g., carriage return, rubout, backspace, DLE, ETX, ETB, STX, ACK). The occurrence of a constant or element of a constant set can be used as an escape termination criteria. Altering the data as defined via a table lookup can be useful when it is necessary to provide character-set translation. Thus, this level of function is merely an extension of the basic transfer functions to include context-sensitive processing. Such operations do consume extra bus bandwidth compared to simple data transfer. Since they would be performed by the processor in any case, no bus bandwidth is really lost, and processor-context switching on a character at a time basis is saved. One might expect to be able to use certain of the block-operand-data-transfer operators to perform certain string manipulation functions more efficiently than could be done by programmed loops within generalized data processors. One could do this by writing a special IOP operation to perform the desired function and then invoking it by an interprocess message. The performance implications of such algorithm partitioning are not readily analyzed. Unless parallelism is really achievable, a strong caveat is in order. IOP facilities, beyond those provided specifically for data transfer, bear a basic penalty if invoked as a separate function rather than being used in-line in some input/output algorithm. This penalty is the response latency involved in the required-interprocess-request-and-response cycles. For example, only when the IOP function time plus the interprocess latency is less than the time required to perform the same function via some programmed loop on another processor may it make sense to invoke such an IOP function. Given that caveat, there are several potential noninput/output uses of the block transfer capability which probably make sense if parallelism can be achieved. Two simple examples of these uses occur in association with the reclamation phase of storage deallocation. One function to be performed in this application is the clearing (via overwriting with zeros) of discarded data segments. Another function to be performed in this application is called compaction. It consists of moving, in response to memory-manager requests, all the nondiscarded segments in memory, one at a time, to one end of physical memory. This can result in larger unallocated blocks of memory. With larger blocks of unallocated memory, fewer allocation requests will fail due to fragmentation. Besides being able to transfer blocks of data, an IOP can transfer blocks of access descriptors. Such a facility can be useful in the reclamation phase of storage deallocation. The main function to be performed in this application is the clearing (via overwriting each entry with a null-access descriptor) of discarded access lists. This is not quite as simple as it souunds. As with all access descriptor entries, overwriting these access descriptors involves careful processing of the access descriptor occupying the entry to be overwritten prior to actually doing so. For example, if the destination entry does not already contain a null-access descriptor, the path count in the associated path level or segment descriptor must be decremented and, if necessary, path-count notification performed.

Another facility provided on input/output processors which helps avoid interprocess-communication latency in input/output algorithms is the ability, using the same mechanisms as other processors, to allocate physical memory. Without this facility, input/output processes would have to invoke GDP processes to provide this service. Such a requirement and the associated overhead could make it difficult for an input/output process to serve high-speed, continuously-running, data-stream peripherals such as high-bandwidth-communication-line controllers or high-speed data acquisition controllers.

At system initialization, the temporary-segment-table directory and associated data structures must be initialized prior to any processor beginning the initialization sequence. This information cannot preexist in the required locations (i.e., be encoded there in a ROM) because it is subject to later change. Thus, the required information is moved into the required locations from an image encoded in ROM or PROM elsewhere in the system. Since none of the processors in the system have yet qualified any of their address-development information, the processor performing this low-level initialization must work at the physical-address level. This movement is performed by a designated IOP.

13.5 STRUCTURAL OVERVIEW

Many of the facilities provided by input/output processors employ mechanisms based upon the use of objects. To help relate the objects used to the agents using them, the following section outlines those relationships. Composite FIG. 21 is a block diagram of the major IOP system-object structures. The numbers in parentheses next to the name of the object indicate the number of such objects in a configuration for one input/output address space. There can be as many as 32 input/output address spaces per system. The numbers in brackets relate the size of that type of object to the numbers of some of the other types of objects in the figures.

The active agents, I/O processors, and I/O processes use the facilities in FIGS. 21A, 21B. There are L processors sharing one input/output address space. Of course, they also share the GDP system-address space along with all of the other processors in the system. Multiplexed for service over these L processors over time are M processes. At least some of these processes are related to particular peripherals or sets of peripherals from the total of N that are accessible. For each of the N peripherals accessible via the given input/output address space, there is a peripheral object (619, and its associated peripheral control segment, 604), which is used to describe the facilities available on that peripheral. As described above, the request interface is shared by the processors. It is the source of requests for both the event controllers and transfer controllers of the processors. The event control object (632) is used by the event controllers to specify which of the requests presented via the request interface should be turned into events and posted at event ports (612). A transfer-control object (634) holds, among other things, like information specifying which of the requests presented via the request interface should be used by a particular transfer controller in synchronizing or terminating a block-transfer operation. The main purpose of a transfer control object is to hold all the information necessary for a transfer controller to perform a block-transfer operation. The bandwidth-control object (640) is used by the processors to maintain a running accumulation of the currently-assigned, maximum potential bandwidth consumption by all the processors in the input/output address space. By making sure that this maximum bandwidth does not exceed a software-specified limit, data-overrun and lost-data conditions can be avoided. The event list (610) is used by event controllers to translate request indexes presented via the request interface into access to the appropriate event port for posting that event. Event ports (612) are the objects used to support asynchronous communication between peripherals and processes. The dispatching port (613) is used by processors as a source of executable processes. It is used by processes as a scheduling facility for gaining service by one of the processors.

13.6 SUPPORTED INTERFACES

The input/output processor supports a wide variety of peripheral interface types. Any peripheral which meets the synchronization, termination, and interface protocol requirements of the input/output processor can be interfaced to it.

14.0 INFORMATION STRUCTURE

The memory component of a system is made up of one GDP-system-address space and one or more input/output address spaces, each containing some amount of read/write and read-only memory. All processors (of any type) in a system can access the contents of all of the GDP system address space. Only input/output processors can access input/output address spaces. The following describes how information is represented and accessed in these address spaces.

14.1 MEMORY

The present system implements a two-level memory structure. The software system exists in a segmented environment in which a logical address specifies the location of an operand. The processor automatically translates this logical address into a physical address for accessing the value in physical memory.

14.1.1 Logical Addressing

The software system is partitioned into many segments. A segment is a group of contiguously-addressed memory bytes, where a byte contains eight binary bits of information. A segment may be of any length from 1 to 54,536 bytes.

The instructions of an operation have access to the information contained within the segments that make up its current context. Instructions may contain one or more data references or access descriptor references that specify the location of an operand in memory with a logical address. Logical addresses for data operands have two components: a segment selector and an operand displacement. The segment selector specifies an index to an entry in one of the current context's primary access lists. That entry indirectly specifies the memory segment that contains the operand. The operand displacement is the offset to the beginning byte of the desired operand from the base of the chosen segment. Logical addresses for access-descriptor operands have either one or two components. In some cases, only a segment selector is required. In other cases, both a segment selector and an operand displacement are required.

The maximum logical address space of a software system is limited to 2,097,152 segments of 65,536 bytes each for a total of 137,438,953,472 bytes.

14.1.2 Physical Addressing

Logical addresses are translated by the processor into physical addresses as explained previously under the heading "GENERALIZED DATA PROCESSOR INSTRUCTIONS." Physical addresses are transmitted to memory by a processor to select the beginning byte of a memory value to be referenced. A primary address within the GDP system address space is 24 binary bits in length. This results in a physical memory size limit for the GDP address space of 16,777,216 bytes. A physical address within an input/output address space is 17 binary bits in length. This results in a physical memory size limit for an input/output address space of 131,072 bytes.

14.2 OPERAND FORMATS

When a processor executes the instructions of an operation within a context, it manipulates operands found in the segments of the context. An individual data operand may occupy one or two bytes of memory or a byte or double byte respectively. An individual access-descriptor operand always occupies four bytes of memory or a word. All operands are referenced by a logical address as described above. The displacement in such an address is the displacement in bytes from the base address of the data segment to the first byte of the operand. For operands consisting of multiple bytes the address locates the low-order byte, and the higher-order bytes are found at the next higher consecutive addresses.

14.3 OPERAND REPRESENTATION

The following convention has been adopted for representing data and access-descriptor structures that are stored in memory. The bits in a field are numbered by increasing numeric significance, with the least-significant bit shown on the right. Increasing byte addresses are shown from right to left. Examples of the presentation of the three basic data lengths in the system are shown below.

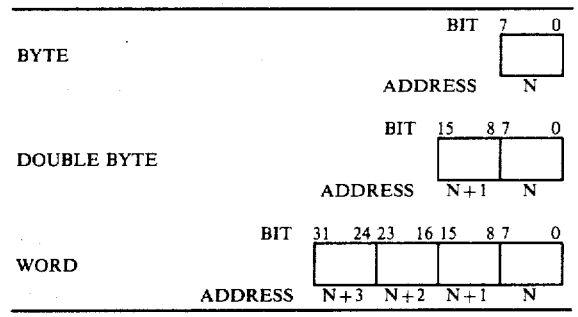

14.4 OPERAND POSITIONING

The data structures discussed above may be aligned on an arbitrary byte boundary within a data segment. Note that more efficient system operation may be obtained when multiple-byte-data structures are aligned on double-byte boundaries if the memory system is organized in units of double bytes. The access-descriptor structures discussed above may be aligned only on a word boundary within an access-list segment.

14.5 OPERAND INTEGRITY

The multiprocessor architecture of the present system places certain requirements on the operation of the memory system to insure the integrity of operands that can potentially be accessed simultaneously. Indivisible read-modify-write (RMW) operations to both double-byte and word operands in memory are necessary for manipulating system objects. From the time a RMW-read is processed for a location in memory, any other RMW-reads to that location must be held off by the memory system until a RMW-write to that location is received (or until a RMW timeout occurs). Also, for ordinary reads and writes of double-byte or longer operands, the memory system must insure that the entire operand has been either read or written before beginning to process another access to the same location. Otherwise, for instance, as a result of two simultaneous writes to the same location (by two processors), the set of locations used to store the operand could contain some interleaved combination of the two written values.

14.6 OPERAND STACKS

Each context contains a distinguished data segment called an operand stack. Any data operand of an instruction may be specified to reference the value at the top of the operand stack.

The stack pointer (SP), managed by the hardware, contains the displacement in bytes from the base of the segment to the next free stack element. When an operand is pushed onto the stack, the value is stored in the location specified by the SP and the SP is then incremented by the length of the operand. Similarly, when an operand is popped from the stack, the SP is first decremented by the length of the operand and then the value is loaded from the location specified by the SP (operand stack, 106, FIG. 3B).

An instruction referencing the top element in the stack need not specify either the segment selector or the displacement, since the processor is aware of which segment contains the current stack for the executing process, and the stack pointer specifies the current top-of-stack displacement. Temporary results generated by an executing operation are most efficiently stored on the operand stack, since very little information is required in an instruction to make a stack reference.

The exact manner in which operands are stored in an operand stack depends on the length of the operand. A byte operand stored in the stack is right justified in a 16-bit stack element with an all-zero high-order byte. A double-byte operand simply occupies one element in the stack.

14.7 INSTRUCTION SEGMENTS

Every software operation has its instructions contained in an instruction segment. Unlike data items, however, instructions are not contrained to fit within the fixed length formats described above. Instead a processor views an instruction segment as a contiguous string of bytes called an instruction stream. Individual processor instructions, which contain a variable number of bytes, may begin at any byte within the string. The location of an input/output processor instruction is specified by a logical address whose displacement is a byte displacement from the beginning of the instruction segment containing the instruction stream to the first byte of the instruction. This displacement is limited by IOPs to 13 bits and, thus, an instruction segment is limited to 8,192 bytes.

In the present system, the processor reads the instruction segment from memory in units of 32 bits. For this reason an instruction segment must end on a word boundary. Otherwise, a boundary error will occur when the processor attempts to read the bytes of the last instruction of the instruction segment.

14.8 PERIPHERAL INTERFACE ADDRESSING

The command, status, and data registers of peripheral interfaces are selected by a 17-bit physical memory address within an input/output address space. The contents and sizes of these registers is interface-dependent. To access an individual register in the interface, the reference specifies a segment selector for the segment in which the interface registers are found and a register-selecting displacement into that segment. Thus, references to interface registers use the same logical addresses as described above. Since access to interface segments can be limited to specified controlling input/output processes, no privileged input/output instructions are required.

Three methods are available for synchronizing processors with peripherals and their interfaces. Polling or status-driven synchronization can be performed by an input/output processor. This requires that a peripheral status register be provided in which the peripheral stores encoded information indicating its desire either to have data stored into or to have data removed from a particular associated register. The act of storing data into or removing data from the status register informs the peripheral that it may proceed. Interrupt-driven synchronization is available with input/output processors for those peripherals that use an interrupt to indicate their desire either to have data stored into or to have data removed from a particular associated register. The act of storing data into or removing data from the register informs the peripheral that it may proceed. Request/acknowledge synchronization can be supported via an input/output processor if the peripheral uses a tranfer request signal to indicate its desire either to have data stored into or to have data removed from a particular associated register. The input/output processor will respond by generating the appropriate physical memory address and generating a request acknowledge. The peripheral then uses that signal to gate the associated data on-to or off-of the input/output bus.

15.0 INPUT/OUTPUT PROCESSING

15.1 COMPUTATIONAL DATA TYPES

An input/output processor provides a comprehensive set of operators for manipulating several different hardware-recognized computational data types. Each type is characterized by the amount of storage required and the operators available for operands of that type. These types, each of which is discussed below, are the primitive types with which more complex data structures can be built in a system. The operators for each type are considered to be complete in the sense that all meaningful operators for data of that type are available. If the result of any operator violates the bunds of its data type, this condition is recognized by the hardware, and special action, as defined in subsequent sections, is taken.

15.1.1 Character

Character operands require one byte of memory and can be used to represent boolean, character, or unsigned integer values. The latter are limited to the range 0 to 255. The operations provided for character operands include logical operations (e.g., AND, OR, XOR, etc.), simple unsigned arithmetic operations (e.g., add, subtract, increment, decrement, etc.), relational operations (e.g., equal, greater than, greater than or equal, etc.), and single-operand and block-operand transfer operations.

15.1.2 Short Ordinal

Short-ordinal operands are most commonly used as selectors that designate the position of an element in an ordered list. For example, such operands would be useful as indexes for vectors or arrays. Since these operands occupy a double byte of memory, their values are limited to the range 0 to 65,535. Additionally, short-ordinal operands can be used to represent bit fields of 16 bits or less. The short-ordinal operations include logical operations, bit-manipulation operations, complete unsigned arithmetic and relational operations, and single-operand and block-operand transfer operations.

15.1.3 Short Integer

Short-integer operands also occupy a double byte of memory but represent signed integers in the range −32,768 to 32,767 in 2s complement form. A complete set of signed arithmetic and relational operators is provided to manipulate short-integer operands.

15.2 ENVIRONMENT MANIPULATION

An input/output processor provides a comprehensive set of operators for access-environment manipulation. The operands used in such manipulations are access descriptors that always appear in access lists.

15.3 INSTRUCTION COMPOSITION

The actions of an input/output processor are determined by the instructions obtained from the current instruction segment of the process being executed. Every instruction specifies an operator and several references. The operator specifies to the processor what hardware operation is to be performed, and the references select the operands to be used or manipulated. For each instruction this operator and reference information is encoded in several variable length fields. The ordering of these fields within an instruction is shown in the diagram below.

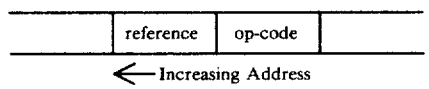

The general form and function of each field is described in the following sections.

15.3.1 Types of References

Three types of references may appear in the reference field of an instruction. A data reference is the encoded form of a data operand's logical address in a data segment. An access-descriptor reference is the encoded form of an access-descriptor operand's logical address in an access list. A branch reference, used only with a branch operator, is simply the encoded form of an instruction's logical address in an instruction segment. For a given instruction, the type and number of required references is uniquely determined by the operator. For example, whenever the ADD SHORT INTEGER operator occurs in an instruction, three data references are required. Two of them specify the operands to be added together, and the third gives the logical address of where the result is to be stored. Similarly, the SEND operator requires two access-descriptor references. The unconditional branch operator, on the other hand, requires a single branch reference that gives the logical address of the next instruction to be executed.

15.3.2 Operators

The operator specified in an instruction is encoded in a field called the operator code or op-code field. The op-code field selects the hardware operation to be performed from within a given operator class.

An operator's class is determined by the order of the operator (i.e., the number of required references) and the length of the associated operands. The order-zero operators, such as the BRANCH operator, require no data or access-descriptor references. The order-one operators require a single operand reference that may specify an operand whose length ranges from a byte to a word. The reference may specify either a source operand or a destination address. For example, the conditional-branch operators require a single data reference that specifies a byte operand that supplies a condition to be tested. Alternatively, the ZERO SHORT ORDINAL operator requires a single data reference that specifies the address of a double byte that is set to zero by the action of the operator. The order-two operators require two operand references that may independently specify operands whose lengths range from a byte to a word. In most cases one reference specifies a source operand to be manipulated, and the other specifies a destination address for the result. For example, the EQUAL ZERO SHORT INTEGER operator compares a double-byte-source operand and zero for equality and produces a boolean result, which is a byte. The order-three operators require three operand references that may specify several combinations of operand lengths. In most cases the three references specify two source operands to be manipulated by the operator and a destination address for the result of the operation. The NOT EQUAL SHORT INTEGER operator compares two double-byte source operands for inequality and produces a bookean result, which is a byte. The order-four operators require four operand references that may specify several combinations of operand lengths. The MOVE SHORT ORDINAL FROM INDIRECT VARIABLE operator uses three references to indirectly specify a source operand and one reference to specify a destination address.

15.3.3 Data References

The data operands required by a operator may be supplied in various ways to provide an increase in flexibility and a more efficient use of memory. An encoded form of a data operand's logical address may appear directly in the reference field of an instruction. Such an explicit data reference provides random access to the operands within any currently accessible data segment. If, however, an operand is to be read from or a result is to be written to the top of the current operand stack, an explicit data reference is not required. Instead, a stack reference is used. In other cases, the operand itself may be encoded directly in a reference as a constant. Such constants are called literals and immediates.

15.3.3.1 Explicit Data References

An encoded explicit data reference must contain sufficient information for a processor to determine both components of the full logical address of the desired operand. Both the segment selector and the displacement components of a logical address are specified directly in an explicit data reference.

15.3.3.2 Stack References

It is possible for a reference field to indicate that an instruction contains fewer explicit data references than are indicated by the instruction's class. In such a case the corresponding source or result operands are obtained from or returned to the top of the operand stack.

The use of stack references is illustrated in the following example that considers the high-level language statement:

$$A = A + B - C$$

The instruction stream fragment for this statement consists of two instructions and has the following form:

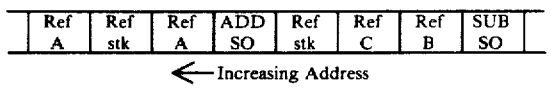

Assume that A, B, and C are short-ordinal operands. The first op-code field (the right-most field in the picture above) specifies that the operator is of order three and that all three references reference double-byte operands. There are two explicit data references that supply the two source operands. The destination is specified to be the operand stack so the result of the subtraction is to be pushed onto the operand stack. The second operator is of order three and all three references reference double-byte operands. There are two explicit data references. The first explicit reference is used for the destination. The source for the second source operand is specified to be the operand stack and, thus, it is to be popped from the operand stack when the instruction is executed.

15.3.4 Access Descriptor References

The access-descriptor operands required by an operator are provided via access-descriptor references. An encoded form of an access descriptor operand's logical address appears directly in the reference field of an instruction. Such an explicit access-descriptor reference provides random access to the operands within any currently accessible access list.

An encoded explicit access-descriptor reference must contain sufficient information for a processor to determine both components of the full logical address of the desired operand. Both the segment-selector component and the displacement component (when needed) of a logical address are specified directly or indirectly in an access-descriptor reference.

15.4 OPERAND STACK BEHAVIOR

The operand stack is handled in a uniform manner whenever stack references are used in an instruction. Unless the operator is one of the save operators, using the operand stack to obtain a source operand causes the value to be popped from the stack when it is fetched. The save operators provide the ability to read the value at the top of the operand stack without popping it. Whenever the operand stack is specified as the destination, the result of the operation is pushed onto the stack. If the operand stack is used as the source for both operands of an order-three operator, the op-code field in the instruction specifies the order in which the two operands appear on the stack. As an example of the behavior of the operand stack during instruction execution, consider the stack in the following configuration:

|                          | | Byte Displacement |
|---|---|---|
| Top of Operand Stack ⟶ | xx | n + 6 |
|                          | 5  | n + 4 |
|                          | 3  | n + 2 |
|                          | xx | n |

Assume that the instruction being executed is:

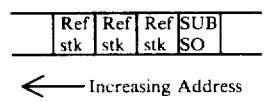

⟵ Increasing Address

The operation to be performed is SUBTRACT SHORT ORDINAL. The op-code field indicates that the operator is of order three and that all three references specify double-byte operands. The stack references specify that both source operands must be obtained from the operand stack, and the result must be stored back on the operand stack. Assume that the top element of the stack is the first source operand and that the second element in the stack is the second source operand. After this instruction has been executed, the configuration of the operand stack is:

|                          | | Byte Displacement |
|---|---|---|
| Top of Operand Stack ⟶ | xx | n + 4 |
|                          | 2  | n + 2 |
|                          | xx | n |

15.5 SEQUENTIAL INSTRUCTION EXECUTION

Normally, an input/output processor is controlled by instructions that are taken in sequence from the current instruction segment of the context currently being executed. An instruction is fetched from the current instruction segment using a byte displacement obtained from the instruction pointer (IP) that is maintained within the processor. After that instruction has been executed, the instruction pointer is incremented by the number of bytes in that instruction so that it points to the next sequential instruction.

15.6 BRANCHING

This sequential control flow can be changed by the use of branch operators. There are four types of branch operators: unconditional, conditional, indirect, and intersegment. These operators require information to locate the instruction that is the target of the branch. This is provided by a branch reference for the unconditional and conditional branch operators, by a data reference to a short-ordinal value for the indirect branch operator, and by an access-descriptor reference and a data reference to a short-ordinal value for the intersegment branch operator.

Executing an instruction containing the unconditional branch operator causes the next instruction to be the one specified by the branch reference. The conditional branch operators behave similarly except that the branch may or may not be taken depending on the value of a condition generated by a previously executed instruction or the result of a test and the sense of the branch instruction. Conditional branch operators are of order one, two, or three. With the order-one operators, called boolean conditional branch operators, the one required data reference specifies the location of the boolean to be tested. There are two boolean conditional branch operators. One causes the branch to take place if the condition is true, while the other causes the branch if the condition is false. With the order-two operators, called the indexed-escape operators, the first data reference specifies an operand to be tested, and the second data reference specifies a table against which the first operand is used as a bit displacement to locate a testable condition bit. There are two character and two short-ordinal indexed escape conditioned branch operators. One operator in each pair causes the branch to take place if the test condition holds, while the other causes the branch if the test condition does not hold. With the order-three operators, called the masked-escape operators, the first data reference specifies an operand to be tested, the second data reference specifies an operand whose value is used as a mask against the operand being tested, and the third data reference specifies an operand whose value is used as the test condition. There are two character and two short-ordinal masked-escape conditional branch operators. One operator in each pair causes the branch to take place if the test condition holds, while the other causes the branch if the test condition does not hold.

Two types of branch references are used with conditional and unconditional branch operators. Since these operators only allow branches to be taken within the current instruction segment, these references need not specify the segment-selector component of the logical address. The first type, the relative branch reference, is a 7-bit signed integer value that provides the byte displacement to the target instruction relative to the beginning of the instruction containing the branch operator. The second type, the absolute branch reference, is a 13-bit unsigned integer that provides the byte displacement to the target instruction relative to the base of the current instruction segment. This value is simply used as the new value for the instruction pointer in order to execute the branch.

The BRANCH INDIRECT operator provides a mechanism for placing an arbitrary 16-bit value from an arbitrary segment into the instruction pointer. The operator is of order one, and the one required data reference specifies the short-ordinal value to be used as the new instruction pointer. Viewed another way, the short-ordinal value gives the displacement in bytes from the base of the current instruction segment to the target instruction.

The BRANCH INTERSEGMENT operator provides the ability to change the current instruction segment and to branch to a target instruction within that segment. The operator is of order two. The access descriptor referenced by the access-descriptor reference specifies the new instruction segment, and the short ordinal referenced by the data reference provides the byte displacement from the beginning of that segment to the target instruction.

16.0 INPUT/OUTPUT OBJECT STRUCTURES

All processors make extensive use of nonprimitive, hardware-recognized structures to represent the various system objects described previously with respect to GDP processors. For convenience, efficiency, and logical consistency, the structures for these system objects are built from information of the primitive types described under the heading "GENERALIZED DATA PROCESSING." In this section, the only structures described are those which are either unique to input/output processors, different but logically similar to those employed by GDP processors, or, while available on other processors, are unavailable on input/output processors. Thus, unless specified, all those structures described with respect to generalized data processors are available on input/output processors.

16.1 SEGMENTS

The use of the segment as the logical basis for every type of system object is fundamental as segments form the foundation for all address development and access control. Segments also serve as the building blocks for all larger and more specialized computational objects and are the basis for realizing a multilevel or virtual memory capability. Normally, a single segment is sufficient to contain the data structure defined for a system object. In those cases, however, where a system object is a composite of primitive data and other system objects, a number of segments may be used.

16.1.1 Input/Output Segments and Segment Descriptors

When referencing the GDP-system-address space, input/output processors use the same access-descriptor controlled, segment-based address-development mechanism which is logically similar to the mechanism used for the GDP-system address space. There are, however, slight mechanistic differences. The differences are primarily involved with matching the mechanism to the environment to be described. For example, input/output address spaces are of smaller maximum size than GDP-system-address spaces. Input/output segments are described in input/output segment descriptors which appear in segment tables, are 8-bytes long, describe one segment, and have the following organization:

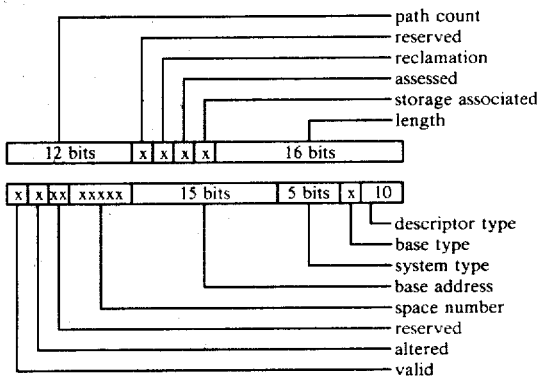

All those fields whose names and sizes are the same as in GDP-segment descriptors serve the same purposes and are treated the same way as the corresponding fields in GDP segment descriptors.

The 15-bit base-address field of such input/output segment descriptor specifies a 17-bit, word-aligned (i.e., the two-least-significant bits are implied to be zero), physical-base address of a segment. This would normally result in a physical-memory size limit of 131,072 bytes for an input/output address space. However, due to a hardware partitioning of the address space into two 65,536-byte components in some configurations, a segment will not be allowed to span the boundary between those 65,536-byte components in such a configuration.

The 5-bit, input/output-address-space number specifies which of the 32 possible input/output address spaces contains the given segment. When using an input/output segment descriptor, if the address space number in the segment descriptor does not match the address space number associated with the given input/output processor, an invalid address space number fault occurs.

Strictly in terms of encoding, input/output segment descriptors can support any system/base-type combination. It is unreasonable, however, to expect some types of objects to ever appear in an input/output address space. For example, any object which must be referenced by software or hardware not having access to a given input/output address space must not appear in that address space. Rather, such objects will probably appear in the GDP address space.

16.1.2 Peripheral Objects

Refer now to the composite drawing, FIG. 21A, 21B. There is one peripheral object (600) per peripheral. Besides providing access to the given peripheral (via an access descriptor [602] for the peripheral interface), a peripheral object provides all the other static information necessary to characterize the functioning of the given interface.

A peripheral object is represented by an access list (619) whose organization is shown in FIG. 21A. Peripheral objects are accessed via peripheral-object access descriptors. The base-rights field for a peripheral-object access descriptor is interpreted in the same manner as for all objects of base-type access list. The low-order bit of system-rights field for a peripheral-object access descriptor is interpreted as follows:

0—this peripheral object may be assigned/deassigned to/from a transfer control object 1—this peripheral object may not be assigned/deassigned to/from a transfer control object.

The high-order bit of the system-rights field for a peripheral-object access descriptor is not interpreted.

16.1.2.1 Peripheral Control Segments

Other than the access information provided in the peripheral object, the rest of the parametric information necessary to characterize the functioning of a given peripheral is found in the associated peripheral control segment (604).

The first double-byte of a peripheral-control segment contains a status field. The information in this field describes the status of the peripheral object, i.e., object assigned or not assigned.

The second double-byte of a peripheral control segment describes some of the facilities provided by the peripheral. It is encoded as shown below.

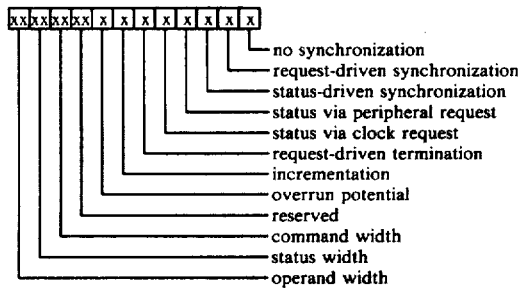
- no synchronization
- request-driven synchronization
- status-driven synchronization
- status via peripheral request
- status via clock request
- request-driven termination
- incrementation
- overrun potential
- reserved
- command width
- status width
- operand width The command, operand and status width subfields specify the widths, per access, of those fields in the peripheral interface. They are encoded as follows:

00—byte-length operands
01—double-byte-length operands
10—word-length operands
11—reserved The overrun potential subfield contains a zero or a one to specify respectively whether or not the given peripheral can ever suffer from data overrun.

The rest of the subfields of the status field specify whether or not the given peripheral can be operated in a particular manner. For example, the request-driven synchronization subfield specifies whether or not the periperal can provide request-driven synchronization. For each of these subfields, a value of zero indicates the absence of the facility and a value of one indicates the presence of the facility.

The no-status subfield specifies whether or not the peripheral requires any synchronization. The status-driven synchronization subfield specifies whether or not the peripheral can provide status-driven synchronization. Given that the status-driven synchronization subfield contains a 1, the status-via-request subfield specifies whether or not the peripheral can provide a request to indicate that synchronization status is available and should be sampled. Given that the status-driven synchronization subfield contains a 1, the status-via-clock-request subfield specifies whether or not the impetus for peripheral-synchronization-status sampling must be a clock-request internal to the processor. The request-driven-termination subfield specifies whether or not the peripheral can provide request-driven termination. The incrementation subfield specifies whether or not incrementation should be done between operand transfers for the peripheral interface.

The request-displacements field consists of two bytes which specify the displacements into the request interface to be used with request-driven synchronization and request-driven termination. The status-clock field specifies the minimum clock interval between status checks when doing clocked status-driven synchronization. The status-significance mask specifies the mask to be used to clear insignificant bits with status-driven synchronization. The status-comparison mask specifies the mask to be used as the success condition with status-driven synchronization. The timeout field specifies the maximum intertransfer-latency value used to prevent nonterminated transfers. The peripheral-bandwidth maximum field specifies the maximum potential-bandwidth consumption of the given peripheral. The command, data and status-displacement fields specify the byte displacements in the peripheral interface of the beginning of the associated fields from the base of the peripheral interface.

The base-rights field of a peripheral control-segment access descriptor is interpreted in the same manner as for all segments of base-type data segment. The system-rights field of a peripheral control segment is uninterpreted.

16.2 OPERATIONS AND CONTEXTS

A process may change its access environment as a result of calling or returning from an instance of an operation. This change to the current access environment of a process, which normally occurs in a nested manner, is recorded in the form of a linked set of access lists called context objects. In this way, the current context object of a process provides the means for a processor to re-establish the previous access environment as each invoked operation is exited.

The only significant difference between input/output contexts and generalized data contexts is that instructions in input/output instruction segments begin on byte rather than bit boundaries. Thus, at context creation the IP field is initialized to the value 6 rather than 48 as with generalized-data contexts. This leaves it pointing to the starting byte of the first instruction in the instruction segment.

16.3 COROUTINES

Coroutines are supported by the same mechanisms and data structures as used by GDP processors.

16.4 PROCESSES

Only two significant differences exist between input/output process objects and generalized-data process objects. The first is the addition of a current event-port entry. The complete structure of an I/O process object (608) is shown in FIG. 21A.

The second difference is the alteration of the name of one process state (running on an instruction-set processor) and the addition of one process state (running on a transfer controller) which takes up the 001 state encoding.

16.4.1 Current-Event Ports

In certain situations, it is essential for hardware to record, for later use by both hardware and software, the identity of the last event port used for process service. This information is found in the fourth entry of its process object and is updated each time an access descriptor for the process is sent to an event port. The current event port is simply the event port last used to pair the process with an event.

16.4.2 Event Ports

When an I/O process is being executed on an I/O processor, it can receive event signals from the peripheral or peripherals it manages directly. However, when an I/O process not running on an I/O processor (i.e., the processor it normally runs on is executing some other process managing some other peripheral), the process has no way of receiving event signals from a peripheral it manages. Thus, it cannot know that its peripheral needs service or has completed a requested function. A hardware agent, called an event controller, is used to accept event signals from peripherals for inactive processes. It uses two data structures in finding the process, if any, associated with a given event signal.

The first of these data structures, called an event list (610) is logically a vector with an element for every possible event signal that may be received by the given event controller. This vector is represented by a processor-associated access list. Given the way that event signals are encoded, an event controller can compute an access descriptor index which is used as a displacement into the event list of the given I/O processor.

The access descriptor found at that displacement provides access to the second data structure employed by the event controller, called an event port (612). This event port is a peripheral-to-process communication mechanism logically associated with the given event signal. Conceptually, an event port contains two queues. The first queue is called the request queue and consists of a flag (in the port-status field, 614) which, when set, indicates that an event or events have occurred but have not yet been received, and a count of these as-yet-unreceived events. The second queue contains, at most, a single entry (617). It is called the server queue and holds the process-object access descriptor for any process which has been suspended pending the arrival of an event. Status information found in the port status (614) indicates whether the server queue is empty or not.

Event ports are accessed via event-port access descriptors. The base-rights field for an event-port access descriptor is interpreted in the same manner as for all objects of base-type access lists. The system-rights field for an even-port access descriptor is interpreted as follows:

00—events may be sent or received via this port
01—events may be sent via this port
10—events may be received via this port
11—events may neither be sent nor received via this port The following subsections describe the other components of an event port in detail.

16.4.2.1 Event Port Control Segments

The logical state of an event port is defined by a hardware-recognized data structure called its port control segment (618). The first four double-bytes of the segment contain status and control information. The overall structure of this segment is shown below.

The first double-byte (614) of an event port control segment contains the port-status field. The information in this field, as shown below, indicates the presence or absence of either events or a process, thus establishing either one or the other logical queues (request queue or server queue) described previously.

The port locks are used to give one processor or one process exclusive access to the port during insertion or removal operations. When the port is locked by a processor, the second double-byte contains the locking processor's identification value. When the port is locked by a process, the second double-byte contains the locking process' identification value.

The use of the service-mode flag is described below. The queue state flags indicate whether the associated queues are empty or occupied.

The third double-byte contains the count of events which have occurred but have not yet been received.

To assist software in the management of the port, a maximum event-count value can be maintained by the hardware when events are recorded. The count control flag indicates whether or not event-count monitoring is to be done. A value of zero indicates that event-count monitoring is to be done. A value of one indicates that event-count monitoring is not to be done. The count control flag can be used to allow performance improvements in systems where event-count monitoring is not desired or necessary. If the count control flag is not set, the maximum event count field is checked and updated if necessary.

The base-rights field of an event port control segment access descriptor is interpreted in the same manner as for all segments of base-type data segment. The system-rights field of an event-port control segment is uninterpreted.

16.4.2.2 Service Ports

When a waiting process is paried with an arriving event, the process access descriptor for that process is removed from the server queue and sent, as a message, to the port specified by the second entry (611) in the event port object (612). This specified port may be a buffered port or a dispatching port. In the latter case the process will soon be accepted for execution.

Should a process not have to wait to receive an event at an event port (i.e., an event was already queued there), it continues to execute unless its current service-port access descriptor (609) is different from the service-port access descriptor (611) in the port event. If it is different, the process is suspended and its process-object access descriptor is sent to the service port specified by access descriptor 611, as described above.

In certain event-port applications, it is often desirable to send a process to its current service port, as specified by access descriptor 609 in its process object, instead of sending it to the port specified by access descriptor 611 in the event-port object. This mode of operation is obtained when the service-mode flag in the port-status field (614) is set to one.

16.5 PROCESSORS

An input/output processor consists of three cooperating processing elements: an instruction-set processor, a transfer controller, and an event controller. The instruction-set processor executes the operator set described under the heading: "GENERALIZED DATA PROCESSOR INSTRUCTIONS." It can run in parallel with its event controller but not its transfer controller. The transfer controller performs block operand transfer operations as described by transfer-control objects. It can run in parallel with its event controller but not its instruction-set processor. The event controller accepts event requests from peripherals, via the request interface and the event-control object, for processes which are not currently in service on an instruction-set processor or a transfer controller. It then routes notice of the occurrence of the events to the appropriate processes via the event list and event ports.

16.5.1 Processor Objects

As with generalized data processors, input/output processors use a hardware-recognized data structure called an I/O processor object (620, FIG. 21B) to contain processor-specific state-and-access information. This object is represented by an access list.

Within input/output processor objects, most of the access descriptors serve the same purpose and are treated the same way as those within processor objects for other types of processors. Those entries unique to input/output processors (ten and above) reference objects whose form as well as function are described in the following subsections. While serving a similar purpose to processor-control segments for other processor types, input/output processor-control segments differ in some respects and are discussed below.

16.5.1.1 Interprocessor Messages

A processor is able to receive information directed to it from other processors by inspecting, when requested, the contents of an area called the local communication area (622) in its processor control segment (624). This segment, which is unique to each processor, is accessed via the second access descriptor in its processor object. In addition to interprocessor communication, the segment is also used to record fault and diagnostic scan information.

In order to interlock the transmission of multiple, simultaneous interprocess messages, each processor control segment contains a set of lock bits in its first double byte. The format of this lock field is shown below.

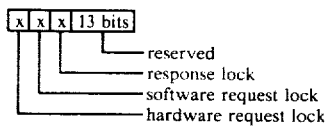

The request locks and the response lock must be clear before transmission begins. At the onset of communication, one of the request locks and the response lock are set. Following the communication, the request lock is cleared, with the response lock left set until the processor carries out the functions requested by the message.

When locked by a processor, the second double byte contains the locking processor's identification value. When locked by a process, the second double byte contains the locking process' identification value. An interprocessor message takes the form of a word-length, bit field containing a set of processor control flags. Interprocessor messages have two components: a general component and a processor class specific component. The general component is stored in the third double byte of the segment (624) by the sending processor. It has the following organization.

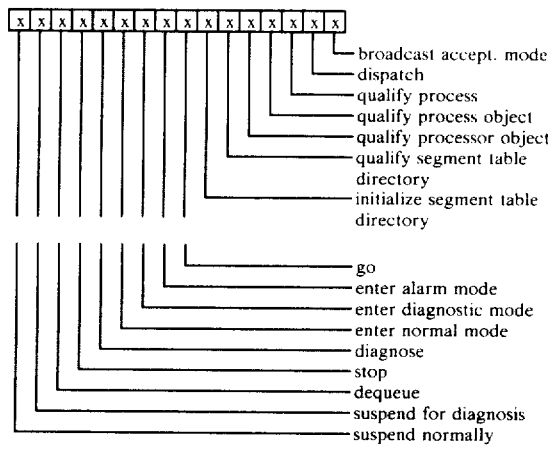

The processor class specifier (input/output) component is stored in the fourth double byte of the segment by the sending processor. It has the following organization.

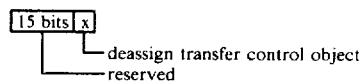

The processor count and response-count fields also participate in the message interlock function. At the time a message is sent, the sending processor initializes the response count to the processor-count value. When the processor completes the requested function, it decrements the response count and tests the new value for zero. If the decremented value is zero, the processor clears the response lock. Normally, the processor-count value in a processor control segment will be initialized to one.

Another double-byte bit field is present in each processor control segment. This field contains status information about the associated processor. Included in the processor-status field, as shown below, are subfields describing the processor state, dispatching state and type.

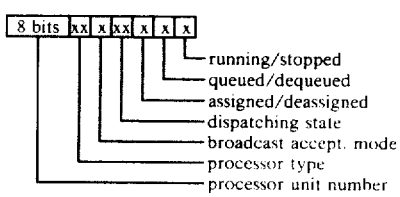

The processor unit number is the value loaded into the processor at initialization or reset.

The running/stopped bit is interpreted as follows:
0—running
1—stopped

The queued/dequeued bit is interpreted as follows:
0—not queued at a dispatching port
1—queued at a dispatching port The assigned/deassigned bit is interpreted as follows:
0—assigned to a process
1—not assigned to a process The dispatching state subfield is interpreted as follows:
00—using normal dispatching port
01—using alarm dispatching port
10—using diagnostic dispatching port
11—reserved The meaning of these states is explained in later sections of this chapter and previously under the heading "ACCESS ENVIRONMENT MANIPULATION AND COMMUNICATION."

The broadcast-acceptance-mode bit is interpreted as follows:
0—broadcast interprocessor messages are being accepted and acknowledged
1—broadcast interprocessor messages are not being accepted or acknowledged The processor-type subfield is interpreted in the following manner:
00—generalized data processor
01—input/output processor
10—reserved
11—reserved All of the subfields in the processor-status field are initialized and maintained by the processors themselves.

The input/output status field contains three subfields as shown below.

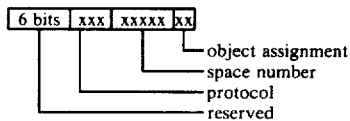

The transfer-control-object-assignment subfield is interpreted as follows:
00—assigned
01—unassigned
10—forced unassigned
11—reserved The input/output address-space-number subfield specifies which one of the 32 possible input/output address spaces is served by the processor.

The interface-protocol subfield specifies which one of eight available static interface protocols to use when referencing the input/output address space. The interface-protocol subfield is encoded as follows:
000—a 300-ns. input/output bus cycle provided to meet the needs of some unspecified, high-speed interface
001—a 400-ns. input/output bus cycle provided to meet the requirements of the "Processor Independent Bus Specification"
010—a 500-ns. input/output bus cycle provided to meet the requirements of the "−2 Bus Specification"
011—a 600-ns. input/output bus cycle provided to meet the requirements of early 825x class components and the "multibus"
100 to 111—reserved All of the above protocols are "stretchable" via use of "ready" signaling.

The base-rights field of a processor-control segment-access descriptor is interpreted in the same manner as for all segments of base-type-data segment. The system-rights field of a processor-control segment-access descriptor is uninterpreted.

16.5.1.2 Request Interfaces

A request interface (626, FIG. 21A) is a variable length segment in an input/output address space. At any instant, it logically contains a bit vector of captured but not yet accepted requests from the various peripherals in the associated input/output address space. There is one such segment (626) per input/output address space. The differept processing elements of an IOP use the request interface associated with the input/output address space they werve to receive requests from the various peripherals they serve. The criteria used to specify whi,h requests the event controllers or transfer controllers should accept control object (632) and the transfer control object (634), respectively.

Several kinds of requests can be received. There are two kinds of synchronization requests. First, there are simple requests to transfer data. Second, there are requests to perform status sampling. These may be used to minimize the bus loading caused by such sampling. An additional kind of request, called a termination request, may be used to terminate a transfer operation.

16.5.1.3 Event Lists

As described above, an event list (610) is used by the event controller element of an I/O processor as an indexable vector of event ports to support translation of peripheral request indexes into event destinations. There is one event list per input/output address space that is shared by the event-controller elements of all of the I/O processors serving that address space.

Event lists are accessed via event-list access descriptors. The base-rights field for an event-list access descriptor is interpreted in the same manner as for all objects of base-type access list. The system-rights field for an event-list access descriptor is uninterpreted.

16.5.1.4 Event-Control Objects

An event-control object (632, FIG. 21A) is used by an event controller to specify which, is any, of the requests available via the request interface should be accepted for processing during one scan cycle. There is one event-control object per input/output address space that is shared by the event-controller elements of all of the processors serving that address space. The logical state-of-an-event control object is defined by a hardware-recognized data structure called an event-control segment. The first three double bytes of the segment contain status and control information.

The first double byte of an event-control segment contains a status field. The information in this field, as shown below, controls access to the segment.

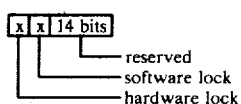

The control-object locks are used to give one processor or one process exclusive access to the control object during masking or mask alteration operations. When the control object is locked by a processor, the second double byte contains the locking processor's identification value. When the control object is locked by a process, the second double byte contains the locking process' identification value.

The mask count specifies the number of double-byte request selections masks in the event control segment and also the number of double bytes in the associated request interface. Each request selection-event mask contains ones and zeros to specify respectively which peripheral requests are and are not currently being served by the associated event controller(s). Each bit in the set of event masks corresponds to a bit in the associated-request interface.

The base-rights field of an event-control segment-access descriptor is interpreted in the same manner as for all segments of base-type data segment. The system-rights field of an event-control segment-access descriptor is uninterpreted.

16.5.1.5 Transfer-Control Objects

Transfer-control objects (634, FIG. 21B) are used by transfer controllers to control block-transfer operations. They are prepared by operations executed on the associated-instructions set processor. Much of the information in a transfer-control object comes from the peripheral object(s) assigned for a particular transfer. They contain sufficient parametric information to fully characterize any of the kinds of transfer operations that a transfer controller can perform. A transfer-control object is represented by an access list.

Transfer-control objects are accessed via transfer-control object-access descriptors. The base-rights field for a transfer-control object-access descriptor is interpreted in the same manner as for all objects of base-type access list. The low-order bit of the system-rights field for a transfer-control object-access descriptor is interpreted as follows:

0—this transfer-control object may have source/destination/translate table/index table objects assigned/deassigned to/from it 1—this transfer-control object may not have source/destination/translate table/index table objects assigned/deassigned to/from it The high-order bit of the system-rights field for a transfer-control object-access descriptor is interpreted as follows:

0—this transfer-control object may be assigned/deassigned to/from a transfer controller 1—this transfer-control object may not be assigned/deassigned to/from a transfer controller The objects referenced by a transfer-control object are functionally described in the following subsections. In those cases where the referenced object is uniquely associated with transfer-control objects (i.e., actually part of their basic structure), the structure of the object as well as its function is described.

16.5.1.5.1 Transfer-Control Segments

Other than the access information provided in the transfer-control object (634), the rest of the parametric information necessary to perform a block-transfer operation is found in the associated transfer-control segment (638).

The first double byte of a transfer-control segment contains status information specifying the state of the object (634). The status field is organized as follows.

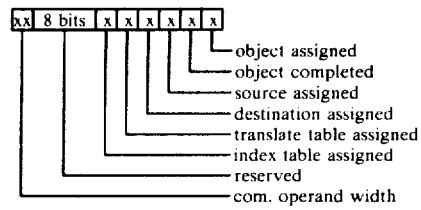

The object-assigned subfield indicates whether or not the transfer-control object is assigned to a transfer controller. A value of zero indicates that no assignment is in effect. A value of one indicates that an assignment is in effect. The object-completed subfield indicates whether or not the transfer-control object is completed for assignment to a transfer controller. A value of zero indicates that the object has not been completed. A value of one indicates that the object has been completed. The source, destination, translate table, and index-table-assigned subfields indicate whether or not the associated object is currently assigned to the given transfer-control object. A value of zero indicates that no assignment is in effect. A value of one indicates that an assignment is in effect.

The combined-operand-width subfield specifies the width of the operands to be transferred. It is encoded as follows:

00—byte-length operands
01—double-byte-length operands
10—word-length operands
11—access-descriptor operands The rest of the transfer-control segment consists of three components: the general component, the source component, and the destination component. The general component contains several values that apply to the transfer in general rather than the source or the destination. For example, the combined bandwidth maximum field specifies the maximum cumulative bandwidth requirement for the given transfer. The transfer-limit count is used to prevent nonterminated transfers. The escape masks are used with escape-driven termination. The completion information describes how a transfer was terminated. The completion field is organized as follows:

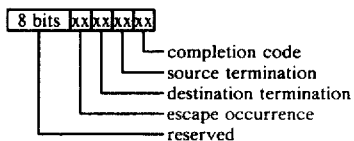

The completion-code subfield is basically used to tell whether the transfer was successful or not. If it was not completely successful, the other completion information can be used in recovery. The completion-code subfield in encoded is follows:

00—normal completion
01—early termination forced by source
10—early termination forced by destination
11—early termination forced by escape occurrence The source and destination termination subfields are encoded as follows:

00—termination request
01—invalid status
10—intertransfer latency

11—reserved

The escape-occurrence termination subfield is encoded as follows:

00—masked-escape occurrence
01—indexed-escape occurrence
10 to 11—reserved

Upon transfer termination, the residual-count field contains the original limit count minus the number of operands transferred.

The source-and-destination components are of the same format. Except for the assignment field, the fields are the same in form and function as the corresponding fields in peripheral-control segments. The assignment field contains both option selections made when the source/destination was assigned and nonoptional constant facilities information copied from the associated peripheral-control segment. The subfields are the same in form as the corresponding subfields in a peripheral-control segment-facility field. However, rather than having the available options indicated as in a facility field, in an assignment field only the selected options are indicated. It is encoded as follows:

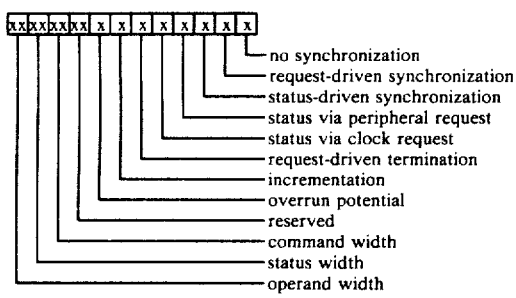
- no synchronization
- request-driven synchronization
- status-driven synchronization
- status via peripheral request
- status via clock request
- request-driven termination
- incrementation
- overrun potential
- reserved
- command width
- status width
- operand width The base-rights field of a transfer-control segment-assess descriptor is interpreted in the same manner as for all segments of base-type-data segment. The system-rights field of a transfer-control segment-access descriptor is uninterpreted.

16.5.1.5.2 Source-and-Destination Segments

The source-and-destination segments for any transfer must have the same in-base type.

16.5.1.5.3 Translate-Table Segments

Translate-table segments are used with the block-transfer operator when translating byte-operand blocks. These segments are at least 256 bytes long.

16.5.1.5.4 Index-Table Segments

Index tables are used with indexed escape-occurrence termination testing by the block-transfer operator. These segments come in two sizes, depending upon whether a byte or a double-byte index is to be used. With byte indexes, the index table is 16 bytes long. With double-byte indexes, the index table is 8192 bytes long.

16.5.1.6 Bandwidth-Control Objects

A bandwidth-control object is used, along with the associated bandwidth maximum information from a given transfer-control object, by the instruction set-processor element of a processor when preparing for a block transfer. If the sum of the maximum potential bandwidth consumption of the proposed transfer plus the currently assigned bandwidth is not less than the maximum bandwidth consumption allowed by the bandwidth control object, the transfer is disallowed. There is one bandwidth control object per input/output address space that is shared by the instruction-set-processor elements of all of the processors serving that address space. The logical state of a bandwidth-control object is defined by a hardware-recognized data structure called a bandwidth-control segment (640, FIG. 21A). The first double byte of the segment contains status and control information.

The first double byte of a bandwidth-control segment (640) contains a status field. The information in this field, as shown below, controls access to the segment.

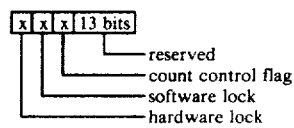
- reserved
- count control flag
- software lock
- hardware lock

The control objects locks are used to give one processor or one process exclusive access to the control object during bandwidth computation operations. When the control object is locked by a processor, the second double byte contains the locking processor's identification value. When the control object is locked by a process, the second double byte contains the locking process' identification value.

The bandwidth limit field specifies the software-provided, bandwidth consumption limit for the given input/output address space. The bandwidth-assigned field specifies the sum of the maximum potential bandwidth consumption figures for each of the transfers currently under way on the set of transfer controllers serving the given input/output address space. To assist software in the management of the input/output address space, a maximum count value can be maintained by the hardware during bandwidth assignment operations. The count-control flag indicates whether or not maximum bandwidth monitoring is to be done. A value of zero indicates that maximum bandwidth monitoring is to be done. A value of one indicates that maximum bandwidth monitoring is not to be done. The count-control flag can be used to allow performance improvements in systems where maximum bandwidth monitoring is not desired or necessary. If the count-control flag is not set, the maximum bandwidth field is checked and updated if necessary.

The base-rights field of a bandwidth-control segment-access descriptor is interpreted in the same manner as for all segments of base-type-data segment. The system-rights field of a bandwidth-control segment-access descriptor is uninterpreted.

16.6 STORAGE RESOURCES, TRANSFORMERS, AND LABELS

Storage resources, transformers, and/or labels are supported by the same mechanisms and data structures as used by other processors.

16.7 PROCESSOR REGISTERS

To efficiently access the system objects previously described, each I/O processor possesses an extensive set of internal, segment-descriptor registers. These registers are used to buffer segment address and length information obtained from segment descriptors.

The first set of registers, which are referenced directly by the microcode, is shown below:

| 15 | 0 23 16 2 | |
|---|---|---|
| length \| base | | 0 segment table directory |
| length \| base | | 1 process object |
| length \| base | | 2 dispatching port |
| length \| base | | 3 process control segment |
| length \| base | | 4 process object |
| length \| base | | 5 context control segment |
| length \| base | | 6 context object |
| length \| base | | 7 public access list |
| length \| base | | 8 private access list |
| length \| base | | 9 entry access list |
| length \| base | | 10 operand stack |
| length \| base | | 11 instruction segment |
| length \| base | | 12 segment work register - A |
| length \| base | | 13 segment work register - B |

A second set of registers, which can be used for either data segments or access lists, are provided. They are referenced associatively by the microcode based upon segment selector, as shown below.

| 15 | 0 23 16 2 | |
|---|---|---|
| length \| base | | 0 segment - A (assoc.) |
| length \| base | | 1 segment - B (assoc.) |
| length \| base | | 2 segment - C (assoc.) |
| length \| base | | 3 segment - D (assoc.) |
| length \| base | | 4 segment - E (assoc.) |
| length \| base | | 5 segment - F (assoc.) |
| length \| base | | 6 segment - G (assoc.) |
| length \| base | | 7 segment - H (assoc.) |

The third set of registers, which are referenced associatively by the microcode based upon segment-table directory index, is shown below.

| length \| base | 0 segment table - A (assoc.) |
|---|---|
| length \| base | 1 segment table - B (assoc.) |
| length \| base | 2 segment table - C (assoc.) |
| length \| base | 3 segment table - D (assoc.) |

Since the segment-descriptor registers can only contain segment information that is identical to that found in memory, it is never necessary to save or store their contents. Further, they are only reloaded when conditions demand it for proper and efficient operation. These conditions are described in the following table:

| REGISTER | LOAD TIME |
|---|---|
| 0 - segment table dir. | initialization; reset |
| 1 - processor object | initialization; reset |
| 2 - dispatching port | initialization; reset |
| 3 - process control seg. | process switch |
| 4 - process object | process switch |
| 5 - context control seg. | context switch |
| 6 - context object | context call/switch |
| 7 - public access list | domain switch |
| 8 - private access list | domain switch |
| 9 - entry access list | access list entry/domain switch |
| 10 - operand stack | context call/switch/switch |
| 11 - instruction segment | context call/switch; seg-seg branch |
| 12 - segment work reg. - A | when needed |
| 13 - segment work reg. - B | when needed |
| 0 - data seqment A | first reference to segment |
| 1 - data segment B | first reference to segment |
| 2 - data segment C | first reference to segment |
| 3 - data segment D | first reference to segment |
| 4 - data segment E | first reference to segment |
| 5 - data segment F | first reference to segment |

| REGISTER | LOAD TIME |
|---|---|
| 6 - data segment G | first reference to segment |
| 7 - data segment H | first reference to segment |
| 0 - segment table A | first reference to segment table |
| 1 - segment table B | first reference to segment table |
| 2 - segment table C | first reference to segment table |
| 3 - segment table D | first reference to segment table |

The segment table, segment-descriptor registers are loaded automatically whenever a new segment is first referenced. Once loaded, they are selected through an associative search on their segment-selector fields (not shown). If more than eight segments are being referenced simultaneously, the registers are reloaded on a least-recently-used basis.

The segment table, segment-descriptor registers are loaded automatically whenever a new segment is first referenced. Once loaded, they are selected through an associative search on their segment table directory-index fields (not shown). If more than four segments are being referenced simultaneously, the registers are reloaded on a least-recently-used basis.

Input/output processors also possess an additional set of registers for buffering frequently used pointers. The instruction segment selector (ISS), the instruction pointer (IP), and the operand stack pointer (SP) are kept in this manner. The processors also possess a set of registers for maintaining the status of the currently executing process and context, as well as the status of the processor itself.

| 15 | 0 | |
|---|---|---|
| ISS | | 0 instruction segment selector |
| IP | | 1 instruction pointer |
| SP | | 2 operand stack pointer |
| context status | | 3 context status registers |
| process status | | 4 process status register |
| processor status | | 5 processor status registers |

17.0 INPUT/OUTPUT FACILITIES

All GDP processors provide a set of nonprimitive, object-based facilities. The IOP not only provides those basic facilities, but also provides other facilities specific to its specialized function of supporting input/output. The basic access environment manipulation and communication facilities available on input/output processors was described previously under the heading "ACCESS ENVIRONMENT MANIPULATION AND COMMUNICATION." Discussions of exception handling, debugging, system initialization and reset, and alarm handling are also found in sections at the end of that heading. Under the present heading, the only facilities described are those which are either unique to input/output processors, different but logically similar to those employed by other processors, or, while available on other processors, are unavailable on input/output processors. Thus, unless specified, all those facilities described with respect to Generalized Data Processor are available on input/output processors.

17.1 ADDRESS SPACE MANIPULATION

Input/output processors deal with the GDP system address space as do GDP processors. They must also deal with an input/output address space. Additional facilities, beyond those required for dealing with the GDP system address space, are needed. This requires being able to deal with various bus protocols. Thus an input/output processor supports one of a fixed set of protocols as specified in its processor object.

17.2 PERIPHERAL TO PROCESS COMMUNICATION

Processes and peripherals are capable of running and normally do run asynchronously with respect to each other. Therefore, communication between peripherals and processes tends to occur asynchronously. In such cases, the process being communicated with may be either active (i.e., running) or inactive (i.e., waiting for some event). One of the mechanisms required to support this kind of communication can be viewed as a queuing mechanism interposed between the communicating parties to resolve the possible speed differentials. With GDP input/output processors, event ports provide this queuing mechanism. Details of their use are described below.

There are other cases where closer peripheral/process synchronization is required (i.e., during block transfer operations). Special mechanisms are provided to support such synchronization (i.e., request driven synchronization).

Both kinds of communication mentioned above involve acceptance of requests from peripherals. On an input/output processor, requests are accepted by the event controller or the transfer controller.

17.2.1 Request Acceptance by a Transfer Controller

There are three kinds of synchronization requests accepted by transfer controllers. The most simple are peripheral-generated, data transfer requests presented via the request interface. With such requests, a peripheral explicitly requests a data transfer. There is no ambiguity and the transfer controller can respond without further communication. Acknowledgments, where required, are generated via external hardware triggered as a side effect of the reference mechanism.

The second kind are also peripheral-generated requests presented via the request interface. They are called peripheral status requests. With such requests, a peripheral notifies a process that a peripheral state change has occurred, but requires that the process sample the peripheral status interface in order to ascertain the specific service being requested. For economy, simple interfaces are designed in this fashion rather than providing several unique requests per peripheral. Such interfaces halve their potential bandwidth by requiring a status cycle for every transfer cycle and, in doing so, interfere with other peripherals in the same input/output address space by consuming extra bandwidth. They do, however, provide some signal of peripheral state change.

The third kind of synchronization request accepted by transfer controllers is generated internally via processor clock. They are called clocked status requests. Peripherals for which this form of synchronization is employed simply do not provide any signal of peripheral state change. A tight status sampling loop would waste considerable bandwidth, especially when dealing with very slow peripherals. The facility of internally-generated, clocked requests to drive status sampling is provided to help avoid that excessive bandwidth consumption.

When a process is active on a transfer controller, it can directly accept synchronization requests of the kinds described above from the peripherals with which it is running in close synchronization. The set of potential request sources is quite restricted by comparison to the set served by an event controller, as described below. The appropriate set of requests is specified by a set of displacements into the request interface loaded from the assigned transfer control object prior to initiation of the transfer. This set is limited to synchronization and termination requests for, at most, the source and the destination of the given transfer operation. The accepted requests are responded to directly by either fetching or storing a requested operand (data or status) or terminating the given transfer operation. As alluded to above, besides communicating asynchronous scheduling requests and synchronous transfer or status requests to processes, peripherals sometimes also need to communicate termination requests to processes. Such requests are peripheral-generated and presented via the request interface like those described above. In the case of satisfactory transfer completion, a termination request may only signify that the peripheral concurs with the process that the transfer has been completed successfully. In other cases, however, a termination request may well indicate that the peripheral has detected what it considers to be an error and that it has forced an early termination to the transfer so that it can report the error. In either case, the occurrence of a termination request is a signal that a tightly synchronized transfer phase has concluded. In many cases, the termination request can also be viewed as a request to interrogate the peripheral status interface (i.e, to find the cause of an early termination). However, the impetus to respond to this kind of status request is not as strong as status requests associated with synchronization.

17.2.2 Request Acceptance by an Event Controller

When a process is inactive, it cannot accept requests directly as can a process which is active on a transfer controller. Thus, any request for an inactive process, besides being a request for service, is also, in effect, a scheduling request. To support such scheduling requests, a hardware agent called an event controller is provided. An event controller can accept a request for an inactive process and cause that process to be made schedulable for execution. An event controller uses the information provided by several different kinds of objects in passing the request to the intended process. The event control object is used to select among those requests presented via the request interface only those which the event controllers should accept. When it accepts a request from the request interface, it converts the bit displacement of the request in the interface into the corresponding access descriptor index in a structure called an event list (610, FIG. 21A) described previously. There is one event list per input/output address space. An event list contains one entry for each peripheral in the input/output address space which can generate scheduling requests. The event controller uses the access descriptor index to select the entry in the event list logically associated with the peripheral making the request being served. The access descriptor at that entry is used to reference another object called an event port, also described previously. Thus, the event list serves as an indexable vector for translating between request displacements and ports at which events can be posted.

17.3 DATA TRANSFER

Given the ability to reference the input/output address space and communicate with the peripherals in that address space, specialized facilities for transferring data are called for.

As shown above, processes depend to some extent upon signals from peripherals about peripheral state changes. However, the case of peripherals which do not inform the associated process of state change shows that in some cases extra facilities (i.e., such as clocked synchronization requests) must be provided to make up for inadequacies in the peripherals being supported. Other facilities are provided, not so much to make up for peripheral inadequacies, but to make the operations controlling the peripherals more reliable and easier to program.

For reliability, determinacy, and buffering considerations, all block transfer operations employ a pair of related termination facilities, beyond those provided by the peripherals.

With no control over the length of a given operand transfer, a peripheral failure could lock up a processor. The use of maximum intertransfer latency values associated with every operand transfer helps solve this determinacy problem. Such an intertransfer latency value is associated with each peripheral via the peripheral object and specifies the worst-case, maximum time period which should elapse between transfers of any pair of operands to or from that peripheral during a block transfer operation. This timing period is started at the beginning of each synchronization phase with that peripheral. If the period elapses prior to completion of the associated operand transfer, the whole block transfer operation is terminated with the appropriate completion information.

With no control over the number of operands transferred during a block transfer, a runaway peripheral could overrun buffers and/or never terminate. The use of a transfer limit count with all block transfer operations helps solve these determinacy problems. This limit count is initialized at the beginning of each block transfer, decremented once for each operand transfer cycle, and upon reaching zero causes termination of the block transfer and posting of the appropriate completion information.

Note that the produce of the maximum intertransfer latency and the transfer limit count is the total time allowed for the block transfer.

For ease of programming, two other termination related facilities are provided. Most of the transfer facilities described here tend to treat the operands being transferred with insensitivity (i.e., the operands are just transferred with no attention being paid to their values). Both of the following facilities add some sensitivity to the transfer operations. Each causes block transfer termination whenever one of a given set of values is transferred. The operands are examined, one at a time, after having been deposited at the destination. The methods of examination for determining terminations differ.

The first method, called termination upon masked escape occurrence, consists of first "ANDing" the operand with an escape significance mask to clear insignificant bits and then comparing the result of the AND operation for equality with an escape comparison mask. Equality indicates escape occurrence.

The second method, called termination upon indexed escape occurrence, consists of using the operand as a bit displacement into an indexed escape table. If the bit at the indexed displacement is set, escape occurrence is indicated.

The masked escape mechanism is economical of space and requires only two masks. It is best at inspecting the values of a subset of the operand such as a single bit, a single field, or several fields rather than part or parts of the value range of the operand.

The indexed escape mechanism is more costly in space requiring indexed escape tables of either 16 bytes or 8192 bytes for byte or shortordinal operands respectively. It is best at inspecting the operand with respect to value range. In the degenerate case, any random set of values from the value range of the operand can be treated as escapes. A far more powerful use is to be able to detect a value subrange (i.e., that the values read, say representing temperatures, are between n and m) or a set of value subranges (i.e., that characters read are alphabetic, say in a character set encoding such as EBCDIC where the alphabetics are encoded as several discontiguous value subranges). Another facility providing limited sensitivity with respect to the operands being transferred and alteration of those operands as they are transferred is translation by table lookup. This facility is only available over blocks of bytes. This is due to segment size limitations. One use of this facility is in translating between character set encodings.

Given the above synchronization and termination facilities, there are two kinds of transfer operators: the single operand transfer operators and the block operand transfer operator. The single operand transfer operators (really the MOVE operators) are only capable of being used in programmed status driven synchronization with a peripheral or by treating the peripheral interface as a simple data segment. Thus, programmed operand transfer loops using single operand transfer operators can only except to deal with quite slow and simple peripheral interfaces. Since the major use of single operand transfer operators is in setup/cleanup for block transfer operations and the peripheral interfaces to be dealt with generally provide for status driven or simple, memory-mapped setup/cleanup, the facilities provided should be sufficient. For any peripheral which may require other synchronization modes for setup/cleanup, the block transfer operator can be used.

For the transfer of blocks of operands, the block transfer operator is available. These transfers are carried out on a transfer controller. In response to a TRANSFER operator, a transfer controller performs one or more transfer cycles under control of information previously loaded by an ASSIGN TRANSFER CONTROL OBJECT operator. A transfer cycle consists of fetching an operand from the source under the specified synchronization control and depositing the operand at the destination under the specified synchronization control. A transfer cycle may complete normally just as some termination condition is satisfied. In such cases, the block transfer completes normally. A transfer cycle may also be forced to complete abnormally due to some termination condition becoming satisfied at some point other than at the end of a transfer cycle. In such cases, the block transfer completes abnormally.

Transfer controller invocations are synchronous with respect to the process being run on the associated instruction set processor. As such, they can be considered to be just the execution of a long instruction. In other architectures, long instructions have a history of being a source of problems. Most of those problems relate to keeping the processor from responding to requests for service quickly enough. Obviously, a transfer controller will not have this particular problem since it is especially good at responding to requests.

Prior to initiating any block transfer operation, the combined maximum bandwidth information in the assigned transfer control object and the information in the bandwidth control object are used to make sure that the bandwidth required for the intended block transfer is available. One reason for doing bandwidth computation is in order to know how much more bandwidth resource is left so more transfer activity can be committed if available. Looking at the question another way, one reason for doing bandwidth computation is in order to not overcommit the bandwidth available so as to avoid data overrun conditions and the associated recovery difficulties. If the sum of the maximum bandwidth required for the intended transfer plus the currently assigned bandwidth is not less than the maximum assignable bandwidth, the transfer is disallowed.

17.3.1 Block Transfer Operators

This section describes the possible combinations of uses of the facilities described above. In each of the following descriptions, the defaults are underlined.

17.3.1.1 Block Data Transfer

The basic block data transfer operator syntax is:

```
data transfer: =    transfer data ( width option,
                                    reference option,
                                    reference option,
                                    termination option
                                  )
width option: =  { bytes
                 | double bytes
                 }
reference option: =  ( maximum intertransfer latency,
                       incrementation option,
                       synchronization option
                     )
incrementation option: =   { increment
                           | don't increment
                           }
synchronization option: =  { don't synchronize
                           | synchronize via request
                           | status option
                           }
status option: =  { sample status upon peripheral request
                  | sample status upon clock request
                  {
termination option: =  count runout or
                       terminate upon peripheral request or
                       terminate upon
                         occurrence of masked escape operand or
                       terminate upon
                         occurrence of indexed escape operand
```

17.3.2 Block Data Translation

Block data translation is only available over blocks of bytes. The basic block data translation operator syntax is:

```
data translation: =  translate bytes ( table reference,
                                       reference option,
                                       reference option,
                                       termination option
                                     )
reference option: =  ( maximum intertransfer latency,
                       incrementation option,
                       [synchronization option]
                     )
incrementation option: =  { increment
                          | don't increment
                          }
synchronization option: =  don't synchronize
                           synchronize via request
                           status option
status option: =  sample status upon peripheral request
```

-continued
```
                     sample status upon clock request
termination option: =  count runout or
                       terminate upon peripheral request or
                       terminate upon
                         occurrence of masked escape operand or
                       terminate upon
                         occurrence of indexed escape operand
```

17.3.3 Access Descriptor Transfer

Access descriptor transfers are somewhat more complicated than data transfers in that descriptor control constraints can exist upon fetching certain source entries, descriptor control constraints can exist upon overwriting certain destination entries, and path count incrementation and decrementation and reclamation marking must be done. Again, in the following descriptions, the defaults are underlined.

17.3.3.1 Block Access Descriptor Transfer

The basic block access descriptor transfer operator syntax is:

```
access descriptor transfer: =  transfer
                               access descriptors  ( reference
                                                     option,
                                                     reference
                                                     option,
                                                     termination
                                                     option
                                                   )
reference option: =  ( incrementation option
                     )
incrementation option: =  { increment
                          | don't increment
                          }
termination option: = count runout
```

17.3.4 Transfer Algorithms

Given the facilities described above, this section describes the various block transfer algorithms employed by a transfer controller. The first algorithm exhibited below provides the semantics for supporting the block data transfer operator syntax above. The second algorithm exhibited below provides the semantics for supporting the block data translation operator syntax above. The third algorithm exhibited below provides the semantics for supporting the block access descriptor transfer operator syntax above. They are written in slightly extended PSIL. The first extension if the parallel do construct which calls for the parallel evaluation of the statements within it. The second extension is the using construct which calls for the application of a given bus protocol to the associated reference. The third extension is the before construct which calls for forced statement termination if the associated becomes true. A few intrinsic hardware functions which return either a boolean or a short-ordinal operand are employed to deal with synchronization details.

proc transfer-data (const bus-protocol: 3 bits,
    const no-source-synch: 1 bit,
    const no-destination-synch: 1 bit,
    const source-request-driven-synch: 1 bit,
    const destination-request-driven-synch: 1 bit,
    const    source-status-driven-synch-via-peripheral-request: 1 bit,
    const destination-status-driven-synch-via-peripheral-request: 1 bit,
    const source-status-driven-synch-via-clock-request: 1 bit,

```
const    destination-status-driven-syncb-via-clock-
    request: 1 bit,
const terminate-upon-request: 1 bit,
const source-status-disp: short-ordinal,
const destination-status-disp: short-ordinal,
const source-synch-req-disp: 8 bits,
const destination-syncb-req-disp: 8 bits,
const source-termination-req-disp: 8 bits,
const destination-termination-req-disp: 8 bits,
const source-status-sig-mask: short-ordinal,
const source-status-cmp-mask: short-ordinal,
const destination-status-sig-mask: short-ordinal,
const destination-status-cmp-mask: short-ordinal,
const escape-sig-mask: short-ordinal,
const escape-cmp-mask: short-ordinal,
const source-latency: short-ordinal,
const destination-latency: short-ordinal,
const operand-width: short-ordinal,
const increment-source: 1 bit,
const increment-destination: 1 bit,
const increment-value: short-ordinal,
var limit-count: short-ordinal,
var source-index: short-ordinal,
var destination-index: short-ordinal,
name source: bits array {0 to limit-count},
name destination: bits array {0 to limit-count},
name index-table: bits array {0 to 8192}) is
let holding-reg: ordinal;
repeat
parallel do
    if terminate-upon-request and terminate-request-
        (source-terminate-request-disp) then terminate;
    end if;
    if no-source-synch then accept-from-source;
    end if:
    if source-request-driven-synch and peripheral-synch-
        request(source-synch-request-disp) before time-
        out(source-latency) then accept-from-source; else
        terminate;
    end if;
    if source-status-driven-synch-via-peripheral-request
        and    peripheral-synch-request(source-synch-
        request-disp) before time-out(source-latency) then
        let status = peripheral-status(source-status-disp)
        if (status or source-status-sig-mask) = source-status-
            cmp-mask then accept-from-source; else termi-
            nate;
        end if;
        else terminate;
    end if;
    if source-status-driven-synch-via-clock-request then
        parallel do
        if time-out(source-latency) then terminate; end if;
        repeat
        if clock-synch-request then let status = peripheral-
            status(source-status-disp)
            if (status or source-status-sig-mask) = source-
                status-cmp-mask then accept-from-source;
            end if;
        end if;
        end repeat;
        end do;
    end if;
    when accept-from-source do
    holding-reg    subseqn    (O,operand-width): = source
        [source-index] using bus-protocol;
    end;
    end do;
    parallel do
    if terminate-upon-request and terminate-request(des-
        tination-terminate-request-disp) then terminate;
    end if:
    if no-destination-synch then accept-from-destination;
    end if;
    if destination-request-driven-synch and peripheral-
        synch-request(destination-synch-request-disp) be-
        fore time-out(destination-latency) then accept-
        from-destination; else; terminate;
    end if;
    if    destination-status-driven-synch-via-peripheral-
        request and peripheral-synch-request(destination-
        synch-request-disp) before time-out (destination-
        latency) then let status = peripheral-status(destina-
        tion-status-disp)
        if (status or destination-status-sig-mask) = destina-
            tion-status-cmp-mask then accept-from-destina-
            tion; else terminate;
        end if;
        else terminate;
    end if;
    if destination-status-driven-synch-via-clock-request
        then parallel do
        if time-out(destination-latency) then terminate; end
            if; repeat
        if clock-synch-request then let status = peripheral-
            status(destination-status-disp)
            if (status or destination-status-sig-mask) = desti-
                nation-status-cmp-mask then accept-from-des-
                tination;
            end if;
        end if;
        end repeat
        end do;
    when deposit-in-destination do
    destination destination-index
    using bus-protocol: = holding-reg subseqn (O,ope-
        rand-width);
    end;
    end do;
    if terminate-upon-masked-escape-occurrence and
        [holding-reg subseqn (O,operand-width) or escape-
        sig-mask] = escape-cmp-mask then terminate;
    end if;
    if terminate-upon-indexed-escape-occurrence and
        index-table holding-reg subseqn (O,operand-width)
        then terminate;
    end if;
    limit-count: = limit-count − 1;
    if limit-count = O then terminate;
    end if;
    if increment-source then
    source-index: = source-index + increment-value;
    end if;
    if increment-destination then
    destination-index: = destination-index + increment-
        value;
    end if;
    end repeat;
    when terminate(const reason: short-ordinal) do
    residual-count: = limit-count;
    completion: = reason;
    end;
    end transfer-data;
```

The block byte translation algorithm is very similar to the block data transfer algorithm.

proc translate-bytes(const bus-protocol: 3 bits,

```
const no-source-synch: 1 bit,
const no-destination-synch: 1 bit,
const source-request-driven-synch: 1 bit,
const destination-request-driven-synch: 1 bit,
const    source-status-driven-synch-via-peripheral-
   request: 1 bit,
const destination-status-driven-synch-via-peripheral-
   request: 1 bit,
const source-status-driven-synch-via-clock-request: 1
   bit,
const    destination-status-driven-synch-via-clock-
   request: 1 bit,
const terminate-upon-request: 1 bit,
const source-status-disp: short-ordinal,
cost destination-status-disp: short-ordinal,
const source-synch-req-disp: 8 bits,
const destination-synch-req-disp: 8 bits,
const source-termination-req-disp: 8 bits,
const destination-termination-req-disp: 8 bits,
const source-status-sig-mask: short-ordinal,
const source-status-cmp-mask: short-ordinal,
const destination-status-sig-mask: short-ordinal,
const destination-status-cmp-mask: short-ordinal,
const escape-sig-mask: tiny-ordinal,
const escape-cmp-mask: tiny-ordinal,
const source-latency: short-ordinal,
const destination-latency: short-ordinal,
const operand-width: short-ordinal,
const increment-source: 1 bit,
const increment-destination: 1 bit,
const increment-value: short-ordinal,
var limit-count: short-ordinal,
var source-index: short-ordinal,
var destination-index: short-ordinal,
name source: bits array {0 to limit-count},
name destination: bits array 0 to limit-count,
name translate-table: char array {0 to 256},
name index-table: bits array {0 to 8192}) is
let holding-reg: ordinal;
repeat
parallel do
if terminate-upon-request and terminate-request-
   (source-terminate-request-disp) then terminate;
end if;
if no-source-synch then accept-from-source;
end if;
if source-request-driven-synch and peripheral-synch-
   request(source-synch-request-disp) before time-
   out(source-latency) then accept-from-source; else
   terminate;
end if;
if source-status-driven-synch-via-peripheral-request
   and     peripheral-synch-request(source-synch-
   request-disp) before time-out(source-latency) then
   let status = peripheral-status(source-status-disp)
   if (status or source-status-sig-mask) = source-status-
      cmp-mask then accept-from-source; else termi-
      nate;
   end if;
   else terminate;
end if;
if source-status-driven-synch-via-clock-request then
   parallel do
   if time-out(source-latency) then terminate; end if;
   repeat
   if clock-synch-request then let status = peripheral-
      status(source-status-disp)
      if (status or source-status-sig-mask) = source-
         status-cmp-mask then accept-from-source;
      end if;
   end if;
   end repeat;
   end do;
end if;
when accept-from-source do
holding-reg subseqn (O,operand-width): = source
   [source-index] using bus-protocol;
end
end do;
if translate then dummy: = translate-table [dummy]
   where dummy = holding-reg subseqn (0,8);
end if;
parallel do
if terminate-upon-request and terminate-request(des-
   tination-terminate-request-disp) then terminate;
end if;
if no destination-synch then accept-from-destination;
end if;
if destination-request-driven-synch and peripheral-
   synch-request(destination-synch-request-disp) be-
   fore time-out(destination-latency) then accept-
   from-destination; else terminate;
end if;
if    destination-status-driven-synch-via-peripheral-
   request and peripheral-synch-request(destination-
   synch-request-disp) before time-out(destination-
   latency) then let status = peripheral-status(destina-
   tion-status-disp)
   if (status or destination-status-sig-mask) = destina-
      tion-status-cmp-mask then accept-from-destina-
      tion; else terminate;
   end if;
   else terminate;
end if;
if    destination-status-driven-synch-via-clock-request
   then parallel do
   if time-out(destination-latency) then terminate; end
      if; repeat
   if clock-synch-request then let status = peripheral-
      status(destination-status-disp)
      if (status or destination-status-sig-mask) = desti-
         nation-status-cmp-mask then accept-from-des-
         tination;
      end if;
   end if;
   end repeat;
   end do;
when deposit-in-destination do
destination [destination-index]
using bus-protocol: = holding-reg subseqn (O,ope-
   rand-width);
end;
end do;
if terminate-upon-masked-escape-occurrence and
   (holding-reg subseqn (O,operand-width) or escape-
   sig-mask) = escape-cmp-mask then terminate;
end if;
if terminate-upon-indexed-escape-occurrence and
   index-table [holding-reg subseqn (O,operand-
   width)] then terminate;
end if;
limit-count: = limit-count-1;
if limit-count-O then terminate;
end if;
if increment-source then
```

```
source-index:-source-index + increment-value;
end if;
if increment-destination then
  destination-index: = destination-index + increment-
    value;
end if;
end repeat;
when terminate(const reason: short-ordinal) do
  residual-count: = limit-count;
  completion: = reason;
end;
end translate-bytes;
```

The access descriptor transfer algorithm only describes the actual transfer portion of that algorithm. Considerable additional function is required to provide the descriptor control checking and the path count and reclamation manipulation which is also required.

```
proc transfer-access-descriptors(const bus-protocol: 3
    bits,
  const increment-source: 1 bit,
  const increment-destination: 1 bit,
  const increment-value: short-ordinal,
  var limit-count: short-ordinal,
  var source-index: short-ordinal,
  var destination-index: short-ordinal,
  name source: ordinal array {0 to limit-count},
  name destination: ordinal array {0 to limit-count},
  let holding-reg: ordinal;
repeat
  holding-reg  subseqn  (O,operand-width): = source
    [source-index] using bus-protocol;
  destination [destination-index]
  using  bus-protocol: = holding-reg  subseqn  (O,ope-
    rand-width);
  limit-count: = limit-count-1;
  if limit-count = O then terminate;
  end if;
  if increment-source then
    source-index: = source-index + increment-value;
  end if;
  if increment-destination then
    destination-index: = destination-index + increment-
      value;
  end if;
end repeat;
when terminate(const reason: short-ordinal) do
  residual-count: = limit-count;
  completion: = reason;
end;
end transfer-access-descriptors;
```

17.4 PROCESS-TO-PROCESS COMMUNICATION

The only major difference between GDP and IOP operation at the process level is the addition of the IDLE n TIME QUANTA operator. In many cases the WAIT n TIME QUANTA and/or the WAIT TO RECEIVE OR n TIME QUANTA operators will be used in situations where there is a known expected delay period which must elapse before the process can profitably continue execution. For example, with some very slow speed peripherals using status-driven synchronization, it is known that if the peripheral status is sampled every n milliseconds (i.e., usually something like twice the maximum potential data rate of the peripheral) no data will be lost. With such long periods of inactivity, it makes sense to issue a wait and make the processor available to serve other processes. The dispatching latency required to get the service process running again after such a delay period is insignificant by comparison to the length of the delay period. However, for slightly higher speed peripherals there are cases where the delay period is significantly shorter. In such cases, the dispatching latency associated with waiting becomes significant. The tendency of programmers then might be to not issue a wait, but rather to hold onto the processor by programming a tight idle loop. Such idle loops, even when of short duration, consume considerable wasted brandwidth in just fetching instructions. The IDLE n TIME QUANTA operator supports just such short idle periods without wasted bandwidth consumption. The n time quanta specified in the idle operator must be less than the remaining m time quanta in the current service period of the process or an invalid idle request fault occurs.

17.5 PROCESSOR-TO-PROCESSOR COMMUNICATION

The only major difference between GDP and IOP operation at the processor level is the addition of the processor class specific communication facility. This is an extension of the general interprocessor communication facility already specified. It supports functions specific to a processor class. The interprocessor message is extended by a double byte to a 32-bit length. The second double byte is used for class specific messages. General messages alone, class specific messages alone, or both general and class specific messages can be sent. There is one input/output control function that will be specified in an interprocessor communication segment.

DEASSIGN TRANSFER CONTROL OBJECT

The reaction to the DEASSIGN TRANSFER CONTROL OBJECT flag by a processor currently assigned to a transfer control object is to terminate the transfer in progress (if any) and store residual count and completion information, simulate the execution of the DEASSIGN TRANSFER CONTROL OBJECT operator, flush the information associated with the transfer control object, and enter the forced deassigned state. For a processor which is not currently assigned to a transfer control object, no response is required.

17.6 LOW-LEVEL INITIALIZATION

At system initialization, the temporary segment table directory and associated data structures must be initialized prior to any processor beginning the initialization sequence. This information cannot preexist in the required locations (i.e., be encoded there in a ROM) because it is subject to later change. Thus, the required information is moved into the required locations from an image encoded in ROM or PROM elsewhere in the system. Since none of the processors in the system have yet qualified any of their address development information, the processor performing this low-level initialization must work at the processor address level. This movement is performed by a designated IOP.

18.0 INPUT/OUTPUT PROCESSOR INSTRUCTIONS

The instructions of an input/output processor are encoded into a common format that allows the interpretation of each instruction to proceed in a single, logical sequence. An instruction consists of a series of fields that are organized to present information to the processor as it is needed. Decoding of these fields proceeds as follows: decode the operator and the number, type, and length of the operands; decode the operand addresses and fetch the source operands; finally, perform the operator-specified operation and store any result.

The general instruction format for the IOP contains two fields: the op-code and reference fields. These fields are stored in memory in the following format.

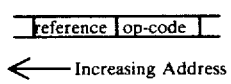

← Increasing Address

The following two sections in this chapter explain the encoding of these fields. The third and final section provides a detailed description of the actions of a processor as it interprets instructions from its current instruction segment.

18.1 OP-CODE FIELD

The first field of the instruction is the op-code field. This field selects which of the operators is to be performed. It also specifies the number, type, and length of the operands to be used.

18.2 REFERENCE FIELD

The reference field of an instruction provides the data and access-descriptor references indicated by the op-code field. For branch operators, the branch reference for the target instruction is also provided. A branch reference in the reference field follows any other references that are in the same field.

References are composed of one, two, or three components. The reference header component comes first and describes the reference. The other two succeeding components, if present, provide either reference components or data values. The next several sections describe how these components are combined to build each of the types of references.

Note again that after decoding a given op-code, the type and length of operands to be provided by the following references are known. Thus, a reference need not provide that basic information.

18.2.1 Data References

In many cases, a data reference is simply an explicit encoding of a logical address. As such, it must provide the segment selector component and the operand displacement component of the logical address. In other cases, a reference indicates that the desired operand can be found at the top of the operand stack. In still other cases, the desired operand is encoded directly in a reference as a constant literal or immediate value.

18.2.1.1 Explicit Data References

There are four encodings of explicit data references from the reference-length point of view. In general, greater length for a given reference component implies either that more of a given segment is accessible or that a segment of greater total length is totally accessible.

Note that these explicit data references, described below, provide for only a static encoding of data reference component information directly in the instruction stream. That is, no provision is made in these references for the selection of dynamically created reference component information from outside the instruction stream (i.e., indirection or indexing). For those situations when the use of such dynamic reference-component information is necessary, special operators, described under the heading: "INPUT/OUTPUT PROCESSOR OPERATOR SET," are provided to support the movement of operands from/to such dynamically referenceable variables to/from known, statically referenceable variables.

The encodings for explicit data references are as follows:

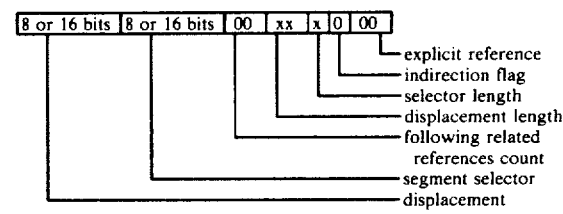

When the reference encoding field specifies that the operand is found via an explicit reference, as shown above, the rest of the reference header component specifies the structure of that reference. The indirection flag subfield, used only with indirect-access descriptor references, must contain a zero. The first length field specifies the length of the segment selector component of the reference as follows:

0—a byte length component
1—a double-byte length component

Segment selectors are encoded as described under the heading: "GENERALIZED DATA PROCESSOR INSTRUCTIONS." The second length field specifies the length of the displacement component of the reference as follows:

00—a zero length component
01—a byte length component
10—a double-byte length component
11—reserved Note that a zero-length displacement field is invalid with explicit data references. The following related references count subfield, used only with indirect-access descriptor references, must contain zeros.

18.2.1.2 Stack References

All data references except stack references must appear in the instruction stream in order (i.e., reference one procedes reference two). Stack references are not required to follow such ordering constraints. This allows a reordering of references to operands on the stack. Stack references are encoded as follows:

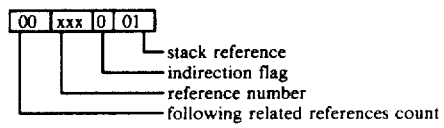

The reference number field specifies which of the references required by the operator is represented by this reference. If that reference has already been specified by another reference, an invalid stack reference fault occurs. As with explicit data references, data references to the stack must be encoded with the indirection flag and following related references count equal to zero.

18.2.1.3 Literals

There is only one encoding for literals, as shown below:

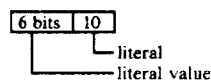

When the reference-encoding field specifies that the operand is a literal, the rest of the reference header component is interpreted as a 6-bit literal value. Depending upon the type of operand required, the literal is interpreted as a character value with two high-order zero bits, a short-ordinal value with ten high-order zero bits, or a short-integer value with ten high-order sign-extended bits.

18.2.1.4 Immediates

There are two encodings of immediate operands from the reference length point of view. Immediates are encoded as follows:

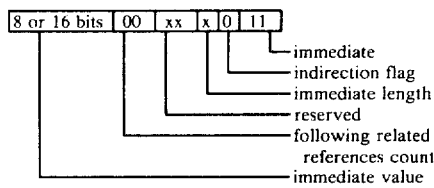

When the reference encoding field specifies that the operand is an immediate value, the immediate length field specifies the length of the immediate value as follows:

0—a byte immediate value
1—a double-byte immediate value

As with explicit data references, immediate references must be encoded with the indirection flag and following related references count equal to zero.

18.2.2 Access-Descriptor References

There are four kinds of access-descriptor references: direct primary, indirect primary, direct secondary, and indirect secondary. As noted above with explicit data references, there are situations when it is necessary to employ reference-component information generated dynamically during operation execution. The solution adopted with data operands (i.e., moving the operands to known, statically referenceable variables) will not always work with access-descriptor operands due to potential restrictions caused by descriptor control settings. Indirect access-descriptor references provide the ability to employ dynamically created access-descriptor reference components in accessing such access-descriptors in situ via indirection through short-ordinal operands.

Primary access-descriptor references support specification of access descriptors within one of the four primary access lists of a context. Secondary access-descriptor references support specification of access descriptors within any access list for which there is an access descriptor in one of the four primary access lists of a context. There are two encodings of direct primary access-descriptor references from the reference length point of view. Direct primary access descriptor references are encoded as follows:

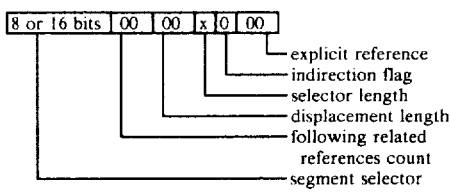

There are four encodings of direct secondary-access descriptor references from the reference length point of view. Direct secondary access-descriptor references are encoded as follows:

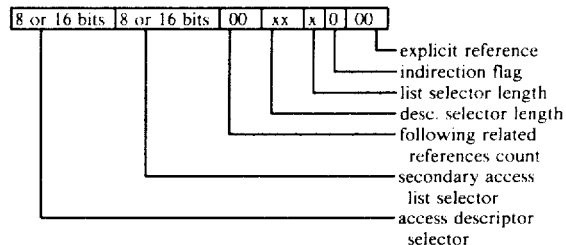

The encodings of the fields of the reference header component are the same for access-descriptor references as for explicit data references. Note that only the high-order 14 bits of the 16-bit access-descriptor selector field is used.

Indirect access-descriptor references, both primary and secondary, only consist of one or two data references, respectively. These data references are used to specify short-ordinal operands that are then used to reference an access descriptor. The short ordinals are used as segment selectors. In such references, the indirection flag subfield is set to indicate that the value fetched is to be used as a reference component. Such references employ the following related references count subfield to distinguish between primary and secondary access descriptor references. If no further references are indicated in the first data reference of an indirect access-descriptor reference, then an indirect primary-access-descriptor reference is performed. If further references are indicated in the first data reference of an indirect access-descriptor reference, then an indirect secondary access-descriptor reference is performed. Indirect primary-access-descriptor references are encoded as follows:

```
... | 00 | xx | x | 1 | xx |
```

Indirect secondary access-descriptor references are encoded as follows:

```
... | 00 | xx | x | 1 | xx | ... | 01 | xx | xx | 1 | xx |
```

The . . . is used to indicate the rest of the given-data reference, if any. In the cases of both indirect primary and secondary access-descriptor references, note that if stack references are employed the . . . becomes zero length. Note also that indirect access-descriptor reference components cannot be represented via literal references. The following related-references-count subfield is encoded as follows:

00—no related references follow
01—one related reference follows
10 to 11—reserved

18.2.3 Branch References

A branch reference provides the logical address of an instruction that is the target of a branch operator. Two types of branch references are provided: relative branch references and absolute branch references. The relative branch reference provides a 7-bit signed integer value that is used as the byte displacement to the target instruction relative to the beginning of the instruction containing the branch operator. The absolute branch reference provides a 13-bit unsigned integer value that is the byte displacement from the base of the current instruction segment to the target instruction. Absolute branch references are encoded right-justified in 15-bit fields. The format for a branch reference is shown below. The length bit specifies by implication whether the reference is relative or absolute.

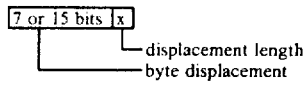
- displacement length
- byte displacement

18.3 INSTRUCTION INTERPRETATION

Before the individual instructions of an operation can be interpreted by a processor, appropriate process, domain, and operation information must be loaded into the processor's registers. This forms an access environment in which logical addresses from the instruction stream can be translated to the physical addresses that reference memory. Whenever a new instruction- segment descriptor is loaded, the length of the segment is checked to insure that it does not exceed the maximum length of 8192 bytes allowed for instruction segments. If the new instruction segment length exceeds this limit, an instruction segment-length fault occurs.

Once a proper access environment has been established, the processor begins to interpret the instruction referenced by the current value of the instruction pointer. If any attempt is made to access instruction information lying outside of the boundaries of the current instruction segment, an instruction segment-displacement fault occurs. As an instruction is fetched from memory, each of its several fields is decoded, the logical addresses for the required operands are converted to physical addresses, the required source operands are read from memory, the hardware operation specified by the operator is executed, and any result that is generated is written back into memory in the destination address specified by the instruction.

18.4 PHYSICAL ADDRESS GENERATION

As the reference field of an instruction is decoded by a processor, each reference in converted to a logical address as described above. Since the conversion process for some types of access-descriptor references requires data values from memory, this conversion may generate additional logical addresses. Each of these logical addresses must in turn be coverted to physical addresses.

The sequence of steps that must be carried out in order to generate a physical address are described under the heading: "GENERALIZED DATA PROCESSOR INSTRUCTIONS."

18.4.1 EXECUTION

If all operand addresses are formed and all values fetched without any faults occurring, the hardware operation specified by the operator in the instruction is executed. Faults that are closely related to the actual manipulation of data may occur during this stage of instruction execution. Descriptions of these faults are contained with the detailed operator descriptions under the heading "GENERALIZED DATA PROCESSOR OPERATOR SET."

19.0 INPUT/OUTPUT PROCESSOR OPERATOR SET

The IOP operator set contains operators to manipulate operands of each data type (character operators, short-ordinal operators, and short-integer operators), operators to manipulate the access environment (access environment manipulation operators), operators to alter the sequential flow of control within the instruction stream (branch operators), and operators to allow interaction between contexts, coroutines, processes, and processors (communication operators). The operators in each of these classes are described below. Each description includes the number and type of required references, a commentary on the operation performed, and a list of the type-related faults that can occur when an instruction containing the operator is executed.

Several operator classes contain relational operators that are used to compare operands of a given type to determine if a particular relation (e.g., equal) holds between the operands. When an instruction containing such a relational operator is executed a true/false, or boolean result is generated. This is a value of type character that has the binary value XXXXXXX1 if the relation holds (i.e., the relation is true) and the binary value XXXXXXX0 otherwise (i.e., the relation is false). Here X is used for a bit whose value can be either 0 or 1.

Although a complete set of relational operators for each type is not explicitly provided, a full set for each type is available. This completeness is achieved through the ordering of explicit operand references within the instruction reference field.

19.0 INPUT/OUTPUT PROCESSOR OPERATOR SET

19.1 CHARACTER OPERATORS

The character operators perform logical, arithmetic, and relational operations on character operands. These 8-bit operands are used to represent booleans, characters, or unsigned integer values in the range 0 to 255. If an arithmetic operation produces a result that cannot be represented in 8 bits, then the operation is terminated without storing a result, and a character overflow fault occurs.

19.1.1 Character Movement Operators

MOVE CHARACTER    2 data references

The character at the source address is moved to the destination address. Using the operand stack as the source address results in the classical stack operation POP, and using the operand stack as the destination address results in the classical stack operation PUSH. Using the operand stack as both addresses results in no change.

ZERO CHARACTER    1 data reference

A character value of zero is moved to the destination address.

ONE CHARACTER    1 data reference

A character value of 1 is moved to the destination address.

SAVE CHARACTER    1 data reference

The character o top of the operand stack is read, without adjusting the stack, and move to the destination address specified by the data reference. Using a stack reference results in an operand stack configuration in which the top two locations contain the same character value.

MOVE CHARACTER FROM INDIRECT VARIABLE    4 data references

The character at the combined indirect source address is moved to the destination address. Using the operand stack as the destination address results in the classical stack operation PUSH. The first reference specifies a short-ordinal operand which is used as the segment selector component of the combined indirect source reference. The second reference specifies a short-ordinal operand which is used as the index component of the combined indirect source reference. The third reference specifies a short-ordinal operand which is used as the base component of the combined indirect source reference. The fourth reference specifies a character destination operand.

MOVE CHARACTER     4 data references
TO INDIRECT VARIABLE

The character at the source address is moved to the combined indirect destination address. Using the operand stack as the source address results in the classical stack operation POP. The first reference specifies a character source operand. The second reference specifies a short-ordinal operand which is used as the segment selector component of the combined indirect destination reference. The third reference specifies a short-ordinal operand which is used as the index component of the combined indirect destination reference. The fourth reference specifies a short-ordinal operand which is used as the base component of the combined indirect destination reference.

19.1.2 Character Logical Operators

AND CHARACTER     3 data references

The logical AND of the two character source operands is placed in the destination address.

OR CHARACTER     3 data references

The logical OR of the two character source operands is placed in the destination address.

XOR CHARACTER     3 data references

The logical XOR (EXCLUSIVE OR) of the two character source operands is placed in the destination address. Note that applying this operator to two boolean operands produces a boolean result whose value is equivalent of the result of comparing the two boolean operands for inequality.

XNOR     3 data references

The logical XNOR (EXCLUSIVE NOR) of the two character source operands is placed in the destination address. Note that applying this operator to two boolean operands produces a boolean result whose value is equivalent to the result of comparing the two boolean operands for equality.

COMPLEMENT CHARACTER     2 data references

The logical complement (1's complement) of the character source operand is placed in the destination address.

19.1.3 Character Arithmetic Operators

ADD CHARACTER     3 data references

Unsigned 8-bit addition is performed on the two character source operands, and the result is placed in the destination address. A character overflow fault can occur.

SUBTRACT CHARACTER     3 data references

Unsigned 8-bit subtraction is used to subtract the first character source operand from the second, and the result is placed in the destination address. A character overflow fault can occur.

INCREMENT CHARACTER     2 data references

The character source operand is incremented using unsigned 8-bit addition, and the result is placed in the destination address. A character overflow fault can occur.

DECREMENT CHARACTER     2 data references

The character source operand is decremented using unsigned 8-bit subtraction, and the result is placed in the destination address. A character overflow fault can occur.

19.1.4 Character Relational Operators

EQUAL CHARACTER     3 data references

The two character source operands are compared for equality, and the boolean result is placed in the destination address.

NOT EQUAL CHARACTER     3 data references

The two character source operands are compared for inequality, and the boolean result is placed in the destination address.

EQUAL ZERO CHARACTER     2 data references

The character source operand is compared to zero for equality, and the boolean result is placed in the destination address.

NOT EQUAL ZERO CHARACTER     2 data references

The character source operand is compared to zero for inequality, and the boolean result is placed in the destination address.

GREATER THAN CHARACTER     3 data references

An unsigned 8-bit comparison is made between the two character source operands. If the second is greater than the first, the boolean result is true. Otherwise, the result is false. The boolean result is placed in the destination address.

GREATER THAN OR EQUAL CHARACTER     3 data references

An unsigned 8-bit comparison is made between the two character source operands. If the second is greater than or equal to the first, the boolean result is true. Otherwise, the result is false. The boolean result is placed in the destination address.

19.1.5 Character Conversion Operators

CONVERT CHARACTER TO SHORT ORDINAL     2 data references

The character-source operand is converted to a short-ordinal value by moving the source operand to the low-order byte of the short-ordinal result and setting the high-order byte to zero. The result is placed in the destination address.

19.2 SHORT-ORDINAL OPERATORS

The short-ordinal operators are used to perform logical, arithmetic, and relational operations on short-ordinal operands. These 16-bit operands are used to represent unsigned integer values in the range 0 to 65,535 and bit strings of 16 bits or less. If any arithmetic operation, except divide, produces a result that cannot be represented in 16 bits, the operation is terminated without storing a result, and a short-ordinal overflow fault occurs. If any division operation, including division by zero, would produce a result that cannot be represented in 16 bits, the operation is suppressed, and a short-ordinal divide fault occurs.

The set of short-ordinal operators contains two operators, EXTRACT and INSERT, that manipulate fields of bits. These operators require a descriptor to specify the field being manipulated. This descriptor consists of two adjacent character operands that form a double byte. The first specifies the beginning bit of the field. The bits of a short-ordinal operand are numbered with bit 0 the least-significant bit and bit 15 the most-significant bit. The beginning bit of a field is the smallest numbered bit in the field. The second character operand, which is located at the next higher address, specifies one less than the number of bits in the field. Only the low-order four bits of these character operands are interpreted by the hardware during execution. A field of any length up to 16 bits can be specified by a descriptor regardless of the beginning bit position. If a field is specified that extends beyond bit 15, bit 0 is considered to follow bit 15 in a circular fashion. Note that the sum modulo 16 of the two character operands gives the bit number of the highest numbered bit in the field. For example, a descriptor whose first character operand has the value 14 and whose second character operand has the value 3 describes a bit field consisting of 4 bits starting with bit number 14. Thus, the field consists of bit 14, bit 15, bit 0, and bit 1, with bit 14 the least-significant bit of the extracted field and bit 1 the most-significant bit.

Also in the set of short-ordinal operators is an operator that aids in the manipulation of individual bits. The SIGNIFICANT BIT operator produces a result that specifies a bit position. Again bit 0 is the least-significant bit and bit 15 the most-significant bit of a short-ordinal operand.

19.2.1 Short-Ordinal Movement Operators

MOVE SHORT ORDINAL    2 data references

The short ordinal at the source address is moved to the destination address. Using the operand stack as the source address results in the classical stack operation POP, and using the operand stack as the destination address results in the classical stack operation PUSH. Using the operand stack as both addresses results in no change. Note that this operator is identical to the MOVE SHORT INTEGER operator and is specified by the same operator code.

ZERO SHORT ORDINAL    1 data reference

A short-ordinal value of zero is moved to the destination address. Note that this operator is identical to the ZERO SHORT INTEGER operator and is specified by the same operator code.

ONE SHORT ORDINAL    1 data reference

A short-ordinal value of 1 is moved to the destination address. Note that this operator is identical to the ONE SHORT INTEGER operator and is specified by the same operator code.

SAVE SHORT ORDINAL    1 data reference

The short ordinal on top of the operand stack is read, without adjusting the stack, and moved to the destination address specified by the data reference. Using a stack reference results in an operand stack configuration in which the top two locations contain the same short-ordinal value. Note that this operator is identical to the SAVE SHORT INTEGER operator and is specified by the same operator code.

MOVE SHORT ORDINAL FROM INDIRECT VARIABLE    4 data references

The short ordinal at the combined indirect source address is moved to the destination address. Using the operand stack as the destination address results in the classical stack operation PUSH. The first reference specifies a short-ordinal operand which is used as the segment selector component of the combined indirect source reference. The second reference specifies a short-ordinal operand which is used as the index component of the combined indirect source reference. The third reference specifies a short-ordinal operand which is used as the base component of the combined indirect source reference. The fourth reference specifies a short-ordinal destination operand. Note that this operator is identical to the MOVE SHORT INTEGER FROM INDIRECT VARIABLE operator and is specified by the same operator code.

MOVE SHORT ORDINAL TO INDIRECT VARIABLE    4 data references

The short ordinal at the source address is moved to the combined indirect destination address. Using the operand stack as the source address results in the classical stack operation POP. The first reference specifies a short-ordinal source operand. The second reference specifies a short-ordinal operand which is used as the segment selector component of the combined indirect destination reference. The third reference specifies a short-ordinal operand which is used as the index component of the combined indirect destination reference. The fourth reference specifies a short-ordinal operand which is used as the base component of the combined indirect destination reference. Note that this operator is identical to the MOVE SHORT INTEGER TO INDIRECT VARIABLE operator and is specified by the same operator code.

19.2.2 Short-Ordinal Logical Operators

AND SHORT ORDINAL    3 data references

The logical AND of the short-ordinal source operands is placed in the destination address.

OR SHORT ORDINAL    3 data references

The logical OR of the short-ordinal source operands is placed in the destination address.

XOR SHORT ORDINAL    3 data references

The logical XOR of the short-ordinal source operands is placed in the destination address.

COMPLEMENT SHORT ORDINAL    2 data references

The logical complement (1's complement) of the short-ordinal source operand is placed in the destination address.

EXTRACT SHORT ORDINAL    3 data references

The second source operand is a short ordinal from which a bit field is to be extracted. The first source operand is a short ordinal that is the descriptor used to identify the field to be extracted. The extracted bit field is right justified with high order zeros in the short-ordinal operand specified by the destination address.

INSERT SHORT ORDINAL    3 data references

The second source operand is a short ordinal that contains a right justified bit field to be inserted into another short ordinal. The first source operand is a short ordinal that is the descriptor used to specify the field in the target operand to be replaced by the inserted field. The destination address specifies the short ordinal into which the bit field is to be inserted.

SIGNIFICANT BIT SHORT ORDINAL    2 data references

The position of the most significant set bit in the short-ordinal source operand is determined. The result is placed in the double byte reference by the destination address. If the source operand has the value zero, the result of the operand is 16.

19.2.3 Short-Ordinal Arithmetic Operators

ADD SHORT ORDINAL    3 data references

Unsigned 16-bit addition is performed on the short-ordinal source operands, and the result is placed in the destination address. A short-ordinal overflow fault can occur.

SUBTRACT SHORT ORDINAL    3 data references

Unsigned 16-bit subtraction is used to subtract the first short-ordinal source operand from the second, and the result is placed in the destination address. A short-ordinal overflow fault can occur.

INCREMENT SHORT ORDINAL    2 data references

The short-ordinal source operand is incremented using unsigned 16-bit addition, and the result is placed in the destination address. A short-ordinal overflow fault can occur.

DECREMENT SHORT ORDINAL  2 data references

The short-ordinal source operand is decremented using unsigned 16-bit subtraction, and the result is placed in the destination address. A short-ordinal overflow fault can occur.

MULTIPLY SHORT ORDINAL  3 data references

Unsigned 16-bit multiplication is performed on the short-ordinal source operands, and the least 16 bits of the result are placed in the destination address. A short-ordinal overflow fault can occur.

DIVIDE SHORT ORDINAL  3 data references

Unsigned 16-bit division is used to divide the second short-ordinal source operand by the first, and the 16-bit quotient is placed in the destination address. Note that when the dividend is not an exact ordinal multiple of the divisor, the quotient is truncated toward zero (i.e., 5 divided by 2 is 2). A short-ordinal divide fault can occur.

REMAINDER SHORT ORDINAL  3 data references

Unsigned 16-bit division is used to divide the second short-ordinal source operand by the first, and the 16-bit remainder is placed in the destination address. A short-ordinal divide fault can occur.

19.2.4 Short-Ordinal Relational Operators

EQUAL SHORT ORDINAL  3 data references

The short-ordinal source operands are compared for equality, and the boolean result is placed in the destination address. Note that this operator is identical to the EQUAL SHORT INTEGER operator and is specified by the same operator code.

NOT EQUAL SHORT ORDINAL  3 data references

The short-ordinal source operands are compared for inequality, and the boolean result is placed in the destination address. Note that this operator is identical to the NOT EQUAL SHORT INTEGER operator and is specified by the same operator code.

EQUAL ZERO SHORT ORDINAL  2 data references

The short-ordinal source operand is compared to zero for equality, and the boolean result is placed in the destination address. Note that this operator is identical to the EQUAL ZERO SHORT INTEGER operator and is specified by the same operator code.

NOT EQUAL ZERO SHORT ORDINAL  2 data references

The short-ordinal source operand is compared to zero for inequality, and the boolean result is placed in the destination address. Note that this operator is identical to the NOT EQUAL ZERO SHORT INTEGER operator and is specified by the same operator code.

GREATER THAN SHORT ORDINAL  3 data references

An unsigned 16-bit comparison is made between the short-ordinal source operands. If the second is greater than the first, the boolean result is true; otherwise, the result is false. The boolean result is placed in the destination address.

GREATER THAN OR EQUAL SHORT ORDINAL  3 data references

An unsigned 16-bit comparison is made between the short-ordinal source operands. If the second is greater than or equal to the first, the boolean result is true, otherwise the result is false. The boolean result is placed in the destination address.

19.2.5 Short-Ordinal Conversion Operators

CONVERT SHORT ORDINAL TO CHARACTER  2 data references

The short-ordinal source operand is converted to a character value by moving the low-order eight bits of the source operand to the destination address. If any of the high-order bits of the short-ordinal source operand has the value 1, the operation is suppressed, and a character overflow fault occurs.

19.3 SHORT-INTEGER OPERATORS

The short-integer operators perform arithmetic and relational operations on short-integer operands. These 16-bit operands represent signed integer values in the range $-32,768$ to $32,767$ in 2s complement form. If any arithmetic operation, except division, produces a result that cannot be represented as a 16-bit 2s complement value, the operation is terminated without storing a result, and a short-integer overflow fault occurs. If any division operation, including division by zero, would produce a result that cannot be represented as a 16-bit 2s complement value, the operation is suppressed, and a short-integer divide fault occurs.

19.3.1 Short-Integer Movement Operators

MOVE SHORT INTEGER  2 data references

The short integer at the source address is moved to the destination address. Using the operand stack as the source address results in the classical stack operation POP, and using the operand stack as the destination address results in the classical stack operation PUSH. Using the operand stack as both addresses results in no change. Note that this operator is identical to the MOVE SHORT ORDINAL operator and is specified by the same operator code.

ZERO SHORT INTEGER  1 data reference

A short-integer value of zero is moved to the destination address. Note that this operator is identical to the ZERO SHORT ORDINAL operator and is specified by the same operator code.

ONE SHORT INTEGER  1 data reference

A short-integer value of 1 is moved to the destination address. Note that this operator is identical to the ONE SHORT ORDINAL operator and is specified by the same operator code.

SAVE SHORT INTEGER  1 data reference

The short integer on top of the operand stack is read, without adjusting the stack, and moved to the destination address specified by the data reference. Using a stack reference results in an operand stack configuration in which the top two locations contain the same short-integer value. Note that this operator is identical to the SAVE SHORT ORDINAL operator and is specified by the same operator code.

MOVE SHORT INTEGER FROM INDIRECT VARIABLE  4 data references

The short integer at the combined indirect source address is moved to the destination address. Using the operand stack as the destination address results in the classical stack operation PUSH. The first reference specifies a short-ordinal operand which is used as the segment selector component of the combined indirect source reference. The second reference specifies a short-ordinal operand which is used as the index component of the combined indirect source reference. The third reference specifies a short-ordinal operand which is used as the base component of the combined indirect source reference. The fourth reference specifies a short-integer destination operand. Note that this operator is identical to the MOVE SHORT ORDINAL FROM INDIRECT VARIABLE operator and is specified by the same operator code.

MOVE SHORT INTEGER TO INDIRECT VARIABLE    4 data references

The short integer at the source address is moved to the combined indirect destination address. Using the operand stack as the source address results in the classical stack operation POP. The first reference specifies a short-integer source operand. The second reference specifies a short-ordinal operand that is used as the segment selector component of the combined indirect destination reference. The third reference specifies a short-ordinal operand that is used as the index component of the combined indirect destination reference. The fourth reference specifies a short-ordinal operand that is used as the base component of the combined indirect destination reference. Note that this operator is identical to the MOVE SHORT ORDINAL TO INDIRECT VARIABLE operator and is specified by the same operator code.

19.3.2 Short-Integer Arithmetic Operators

ADD SHORT INTEGER    3 data references

Signed 16-bit addition is performed on the short-integer source operands, and the result is placed in the destination address. A short-integer overflow fault can occur.

SUBTRACT SHORT INTEGER    3 data references

Signed 16-bit subtraction is used to subtract the first short-integer source operand from the second, and the result is placed in the destination address. A short-integer overflow fault can occur.

INCREMENT SHORT INTEGER    2 data references

The short-integer source operand is incremented using signed 16-bit addition, and the result is placed in the destination address. A short-integer overflow fault can occur.

DECREMENT SHORT INTEGER    2 data references

The short-integer source operand is decremented using signed 16-bit subtraction, and the result is placed in the destination address. A short-integer overflow fault can occur.

NEGATE SHORT INTEGER    2 data references

The short-integer source operand is negated, and the result is placed in the destination address. A short-integer overflow fault can occur.

MULTIPLY SHORT INTEGER    3 data references

Signed 16-bit multiplication is performed on the short-integer source operands, and the least-significant-16 bits of the result are placed in the destination address. A short-integer overflow fault can occur.

DIVIDE SHORT INTEGER    3 data references

Signed 16-bit division is used to divide the second short-integer source operand by the first, and the signed 16-bit quotient is placed in the destination address. Note that when the dividend is not an exact integer multiple of the divisor, the quotient is truncated toward zero (i.e., 5 divided by 2 is 2, and $-5$ divided by 2 is $-2$). A short-integer divide fault can occur.

REMAINDER SHORT INTEGER    3 data references

Signed 16-bit division is used to divide the second short-integer source operand by the first, and the signed 16-bit remainder is placed in the destination address. The sign of the remainder is the same as the sign of the dividend. A short-integer divide fault can occur.

19.3.3 Short-Integer Relational Operators

EQUAL SHORT INTEGER    3 data references

The short-integer source operands are compared for equality, and the boolean result is placed in the destination address. Note that this operand is identical to the EQUAL SHORT ORDINAL operator and is specified by the same operator code.

NOT EQUAL SHORT INTEGER    3 data references

The short-integer source operands are compared for inequality, and the boolean result is placed in the destination address. Note that this operator is identical to the NOT EQUAL SHORT ORDINAL operator and is specified by the same operator code.

EQUAL ZERO SHORT INTEGER    2 data references

The short-integer source operand is compared to zero for equality, and the boolean result is placed in the destination address. Note that this operator is identical to the EQUAL ZERO SHORT ORDINAL operator and is specified by the same operator code.

NOT EQUAL ZERO SHORT INTEGER    2 data references

The short-integer source operand is compared to zero for inequality, and the boolean result is placed in the destination address. Note that this operator is identical to the NOT EQUAL ZERO SHORT ORDINAL operator and is specified by the same operator code.

GREATER THAN SHORT INTEGER    3 data references

A signed 16-bit comparison is made between the short-integer source operands. If the second is greater than the first, the boolean result is true; otherwise, the result is false. The boolean result is placed in the destination address.

GREATER THAN OR EQUAL SHORT INTEGER    3 data references

A signed 16-bit comparison is made between the short-integer source operands. If the second is greater than or equal to the first, the boolean result is true; otherwise, the result is false. The boolean result is placed in the destination address.

POSITIVE SHORT INTEGER    2 data references

If the short-integer source operand is positive (greater than zero), the boolean result is true; otherwise, the result is false. The boolean result is placed in the destination address.

NEGATIVE SHORT INTEGER    2 data references

If the short-integer source operand is negative (less than zero), the boolean result is true; otherwise, the result is false. The boolean result is placed in the destination address.

19.4 ACCESS ENVIRONMENT MANIPULATION OPERATORS

The operators used for access-environment manipulation are described below.

Except where explicitly specified, the operators described in this section are the same in structure and facility as the corresponding operators under the heading: "GENERALIZED DATA PROCESSOR OPERATOR SET." Thus, their detailed descriptions have been omitted below.

Where detailed descriptions are provided, in order not to complicate the descriptions of those operators that make use of common, but somewhat involved, suboperations, the descriptions simply refer to these suboperations by name. Similarly, for those operators that implicitly invoke other defined operators, the latter are also referred to by name. In both cases, the name of the suboperation or operator will be preceded by the word perform to indicate its use or invocation.

19.4.1 Access Descriptor Movement Operators

MOVE ACCESS DESCRIPTOR    2 access descriptor references

MOVE ACCESS DESCRIPTOR allows an operation to move an access descriptor from a specified entry in any directly accessible access list to a specified entry in any directly accessible access list. The first reference specifies the access descriptor to be moved. The second reference specifies the destination access-list entry.

COPY ACCESS DESCRIPTOR    2 access descriptor references

COPY ACCESS DESCRIPTOR allows an operation to copy an access descriptor from a specified entry in any directly accessible access list to a specified entry in any directly accessible access list. The first reference specifies the access descriptor to be copied. The second reference specifies the destination access list entry.

NULL ACCESS DESCRIPTOR    1 access descriptor reference

NULL ACCESS DESCRIPTOR allows an operation to overwrite and thus logically clear a given access descriptor entry. At the same time, access to any object previously available via that access descriptor entry is given up. The reference specifies the destination access-list entry.

19.4.2 Type and Rights Manipulation Operators

APPLY TYPE    2 access descriptor references

APPLY TYPE allows an operation to apply a system type to an object and a set of rights and control information to an access path. The first reference specifies an access descriptor for the given object. The resultant new access descriptor overwrites the original access descriptor for the given object. The second reference specifies a transformer access descriptor.

RESTRICT RIGHTS    2 access descriptor references

RESTRICT RIGHTS allows an operation to restrict its access to an object by altering, under control of an unprotected transformer, the access descriptor for that object to have either restricted rights or restricted rights and restricted descriptor control. The first reference specifies an access descriptor for the given object. The second reference specifies a data segment access descriptor. The segment will be used as a transformer object. The destination access list entry is the same as the source access list entry.

AMPLIFY RIGHTS    2 access descriptor references

AMPLIFY RIGHTS allows an operation to amplify its access to an object by altering, under control of a protected transformer, the access descriptor for that object to have either amplified rights or amplified rights and amplified descriptor control. The first reference specifies an acess descriptor for the given object. The second reference specifies a transformer access descriptor. The destination access list entry is the same as the source access list entry.

19.4.3 Label Manipulation Operators

MOVE LABEL    2 data references

The label at the source address is moved to the destination address. Using the operand stack as the source address results in the classical stack operation POP, and using the operand stack as the destination address results in the classical stack operation PUSH. Using the operand stack as both addresses results in no change.

SAVE LABEL    1 data reference

The label on top of the operand stack is read, without adjusting the stack, and moved to the destination address specified by the data reference. Using a stack reference results in an operand stack configuration in which the top two double words contain the same label value.

EQUAL LABEL    3 data references

The label source operands are compared for equality, and the boolean result is placed in the destination address.

NOT EQUAL LABEL    3 data references

The label source operands are compared for inequality, and the boolean result is placed in the destination address.

APPLY PATH LEVEL    1 data reference; 2 access descriptor references

APPLY PATH LEVEL allows an operation to apply a path level to an access path at a specified level. The first reference specifies an access descriptor for the path level descriptor to be applied. The second reference specifies an access descriptor for the level in the access path at which the path level is to be applied. The destination access list entry is the same as that specifying the access path. The third reference specifies a boolean operand that determines whether the path becomes opaque or transparent.

TRANSVERSE TRANSPARENT PATH LEVEL    2 access descriptor references

TRANSVERSE TRANSPARENT PATH LEVEL allows an operation to traverse one level of an access path if the specified level is transparent. If so, the operation receives an access descriptor for the next lower level in the path as a result. The first reference specifies an access descriptor specifying the level in the access path that is to be traversed. The second reference specifies the destination access list entry.

TRAVERSE OPAQUE PATH LEVEL    3 access descriptor references

TRAVERSE OPAQUE PATH LEVEL allows an operation to traverse one level of an access path if both the specified level of that path is opaque and the value of a specified label is equal to that of the label accessible via that level of the access path. If so, the operation receives an access descriptor for the next lower level in the path as a result. The first reference specifies an access descriptor specifying the level in the access path that is to be traversed. The second reference specifies an access descriptor for the label to be compared. The third reference specifies the destination access list entry.

19.4.4 Segment Creation Operators

CREATE DATA SEGMENT    1 data reference; 2 access descriptor references

CREATE DATA SEGMENT allows an operation to create a data segment and an access descriptor for it. The first reference specifies a shortordinal operand containing the length of the segment to be created. The second reference specifies a storage resource access descriptor. The third reference specifies the destination access descriptor entry.

CREATE ACCESS LIST    1 data reference; 2 access descriptor references

CREATE ACCESS LIST allows an operation to create an access list and an access descriptor for it.

Operation execution proceeds as with CREATE DATA SEGMENT except that the allocated segment descriptor is marked with base-type access list and generic-system type.

CREATE PATH LEVEL      3 access descriptor references

CREATE PATH LEVEL allows an operation to create a path level and an access descriptor for it. The first reference specifies the destination access descriptor entry. The second reference specifies a path level table access descriptor. The third reference specifies a label object access descriptor.

CREATE ACCESS DESCRIPTOR      1 data reference; 2 access descriptor references

CREATE ACCESS DESCRIPTOR allows an operation to create an access descriptor for an object under controlled circumstances. The first reference specifies a segment table access descriptor. The required directory index is taken from this access descriptor. The second reference specifies a short-ordinal operand containing the segment index. The third reference specifies the destination access list entry.

19.4.5 Access Path Inspection Operators

READ ACCESS DESCRIPTOR      1 data reference; 1 access descriptor reference

READ ACCESS DESCRIPTOR allows an operation to read an access descriptor from any directly accessible access list and store it as an ordinal in any directly accessible data segment. The first reference specifies the access descriptor to be read. The second reference specifies an ordinal operand into which the access descriptor is to be stored.

READ LABEL      1 data reference; 1 access descriptor reference

READ LABEL allows an operation to read the label information via any directly accessible path level and store it in any directly accessible data segment. The first reference specifies an access descriptor for the path level via which the label information is to be read. The second reference specifies a double-word operand into which the label information is to be stored.

READ SEGMENT DESCRIPTOR      1 data reference; 1 access descriptor reference

READ SEGMENT DESCRIPTOR allows an operation to read the segment descriptor information for any directly accessible segment and store it in any directly accessible data segment. The first reference specifies an access descriptor for the segment descriptor from which the information is to be read. The second reference specifies a double-word operand into which the segment descriptor information is to be stored.

19.4.6 Object Interlocking Operators

LOCK OBJECT      1 data reference; 1 access descriptor reference

LOCK OBJECT allows a process to interlock a lockable system object with respect to processors or any other process until a corresponding UNLOCK OBJECT operator is executed. The first reference specifies an access descriptor for a lockable system object. The second reference specifies a boolean operand that is set to true if the object becomes locked.

UNLOCK OBJECT      1 data reference; 1 access descriptor reference

UNLOCK OBJECT allows a process to unlock a lockable system object with respect to processors or any other process after a corresponding LOCK OBJECT operator has been executed. The first reference specifies an access descriptor for a lockable system object. The second reference specifies a boolean operand that is set to true if the object becomes unlocked.

INDIVISIBLY ADD SHORT ORDINAL      2 data references

The short-ordinal source operand is indivisibly added to the destination operand and the result is placed in the destination address. A short-ordinal fault can occur.

INDIVISIBLY SUBTRACT SHORT ORDINAL      2 data references

The short-ordinal source operand is indivisibly subtracted from the destination operand and the result is placed in the destination address. A short-ordinal fault can occur.

INDIVISIBLY INSERT ORDINAL      3 data references

The second source operand is an ordinal that contains a right-justified bit field to be inserted into another ordinal. The first reference locates a pair of adjacent character operands aligned on a double-byte boundary that form the descriptor that specifies the field in the target operand to be replaced by the inserted field. The destination address specifies the ordinal into which the bit field is indivisibly inserted.

19.5 BRANCH OPERATORS

The branch operators provide a means for altering the normal sequential order of instruction execution within the instruction stream. Unconditional and conditional branch operators are provided to branch to any instruction in the current instruction segment. It is intended that one use of the conditional branch operations will be in testing peripheral status interfaces such that, in combination with the single operand transfer operations described below, programmed status-driven or polling-data transfer loops are supported.

Branch references in the instruction indicate the location of the target instruction. Relative branch references provide the signed displacement in bytes from the beginning of the instruction containing the branch operator to the first byte of the target instruction. Absolute branch references provide the displacement in bytes from the base of the current instruction segment to the first byte of the target instruction.

Some conditional branch operators require a data reference for a character operand whose value is used as a boolean value to determine whether the branch is made or not. The test of a boolean value involves testing only the least significant bit. If the bit is a 1, the result is true, otherwise the result if false. A second class of conditional branch operators require two data references as follows: one reference for an operand to be tested and another for a table into which the first operand is used as a bit displacement to select a condition test bit. The result of the test and the sense of the instruction determine whether the branch is made or not. A third class of conditional branch operators require three data references as follows: one reference for an operand to be tested, one reference for an operand whose value is used as a mask against the operand being tested, and one reference for the operand whose value is used as the test condition. First the mask is "ANDed" with the operand being tested to clear insignificant bits. Then the test condition operand is compared for equality to the result of the "AND" operation. The result of the test and the sense of the instruction determine whether the branch is made or not.

The indirect branch operator provides the ability to determine the target of the branch dynamically during execution by allowing the next value of the instruction pointer to be specified by the value of a short-ordinal operand.

The intersegment branch operators provide the ability to branch to a different instruction segment in the current domain.

If a branch reference in an instruction containing any branch operator specifies a displacement, either relative or absolute, to a point that is outside the boundary of the segment containing the target instruction, an instruction segment displacement fault occurs.

19.5.1 Intrasegment Branch Operators

BRANCH    1 branch reference

A branch is made within the current instruction segment to the target instruction specified by the branch reference. An instruction segment displacement fault can occur.

BRANCH TRUE    1 data reference; 1 branch reference

A branch is made in the instruction stream if the boolean value specified by the source operand has the value true. An istruction segment displacement fault can occur.

BRANCH FALSE    1 data reference; 1 branch reference

A branch is made in the instruction stream if the boolean value specified by the source operand has the value false. An instruction segment displacement fault can occur.

BRANCH ON MASKED CHARACTER ESCAPE    3 data references; 1 branch reference

A branch is made in the instruction stream if the character mask escape condition is met. An instruction segment displacement fault can occur.

BRANCH ON NO-MASKED CHARACTER ESCAPE    3 data references; 1 branch reference

A branch is made in the instruction stream if the character mask escape condition is not met. An instruction segment displacement fault can occur.

BRANCH OR MASKED SHORT-ORDINAL ESCAPE    3 data references; 1 branch reference

A branch is made in the instruction stream if the ordinal mask escape condition is met. An instruction segment displacement fault can occur.

BRANCH ON NO-MASKED SHORT-ORDINAL ESCAPE    3 data references; 1 branch reference A branch is made in the instruction stream if the ordinal mask escape condition is not met. An instruction segment displacement fault can occur.

BRANCH ON INDEXED CHARACTER ESCAPE    2 data references; 1 branch reference

A branch is made in the instruction stream if the character index escape condition is not met. An instruction segment displacement fault can occur.

BRANCH ON NO-INDEXED CHARACTER ESCAPE    2 data references; 1 branch reference

A branch is made in the instruction stream if the character index escape condition is not met. An instruction segment displacement fault can occur.

BRANCH ON INDEXED SHORT-ORDINAL ESCAPE    2 data references; 1 branch reference

A branch is made in the instruction stream if the short-ordinal index escape condition is met. An instruction segment displacement fault can occur.

BRANCH ON NO-INDEXED SHORT-ORDINAL ESCAPE    2 data references; 1 branch reference A branch is made in the instruction stream if the short-ordinal index escape condition is not met. An instruction segment displacement fault can occur.

BRANCH INDIRECT    1 data reference

The short-ordinal value specified by the source operand is used as the new value for the instruction pointer. The net result is a branch within the current instruction segment to the instruction whose bit displacement from the base of the segment is given by the short-ordinal operand. An instruction segment displacement fault can occur.

19.5.2 Intersegment Branch Operators

BRANCH INTERSEGMENT    1 data reference; 1 access descriptor reference

BRANCH INTERSEGMENT allows a context to use several instruction segments by providing a means for changing not only the current instruction pointer but also the current instruction segment. The first reference specifies an access descriptor for the new instruction segment. It may only select an entry in either the public or private access lists of the context. The second reference specifies a short-ordinal operand containing the bit displacement from the base of the new instruction segment to the first bit of the instruction where execution is to continue.

BRANCH INTERSEGMENT AND LINK    2 data references; 1 access descriptor references BRANCH INTERSEGMENT AND LINK allows a context to change its current instruction segment and store the necessary linkage information to allow later return. The first reference specifies an access descriptor for the new instruction segment. It may only select an entry in either the public or private access lists of the context. The second reference specifies a short-ordinal operand for the instruction segment selector link. The third reference specifies a short-ordinal operand for the instruction pointer link.

19.6 COMMUNICATON OPERATORS

The operators used for communication between contexts, coroutines, processes, and processors are described below.

Except where explicitly specified, the operators described in this section are the same in structure and facility as the corresponding operators described under the heading "GENERALIZED DATA PROCESSOR OPERATOR SET." Thus, their detailed descriptions have been omitted below.

Where detailed descriptions are provided, in order not to complicate the descriptions of those operators that make use of common, but somewhat involved, suboperations, the descriptions simply refer to these suboperations by name. Similarly, for those operators that implicitly invoke other defined operators, the latter are also referred to by name. In both cases, the name of the suboperation or operator will be preceded by the word "perform" to indicate its use of invocation.

19.6.1 Context Communication Operators

ENTER ACCESS LIST    1 access descriptor references

ENTER ACCESS LIST allows an operation to gain direct access to the access descriptors in an access list to which it has base-read rights. The reference specifies an access descriptor for the access list to be entered.

CREATE CONTEXT    2 access descriptor references

CREATE CONTEXT allows an operation to create a context for any operation to which it has direct access. The first reference specifies an instruction segment in the current domain or an entered domain. The second reference specifies the destination access list entry. Access to the process storage resource object is implied.

SET CONTEXT MODE     1 data reference

SET CONTEXT MODE allows an operation to change the mode settings for the current context, both on the processor and in the context status field of the current context control segment. The first reference specifies a short-ordinal operand containing a set of new context mode flags.

CALL CONTEXT WITH MESSAGE     2 access descriptor references

CALL CONTEXT WITH MESSAGE allows an operation to call any directly accessible context and pass a message to that content. The first reference specifies an access descriptor for the message to be passed. The second reference specifies an access descriptor for the context to be called.

CALL CONTEXT     1 access descriptor reference

CALL CONTEXT allows an operation to call any directly accessible context. The reference specifies an access descriptor for the initial instruction segment of the operation to be called. Operator execution proceeds as with CALL CONTEXT WITH MESSAGE except that no message is passed.

RETURN MESSAGE     1 access descriptor reference

RETURN MESSAGE allows an operation to return to the context from which it was called and return a message to that context. The reference specifies the message to be returned. The context to be returned to is implicitly specified via the link access descriptor entry of the current context.

RETURN

RETURN allows an operation to return to the context from which it was called. Operator execution proceeds as with RETURN MESSAGE except that no message is returned.

RETURN MESSAGE AND FAULT     1 data reference; 1 access descriptor reference

RETURN MESSAGE AND FAULT allows an operation to return to the context from which it was called, return a message to that context, and cause a context-level fault in that context. The second reference specifies an ordinal operand containing fault-type information. Operator execution proceeds as with RETURN MESSAGE except that a context-level fault is forced prior to executing any instructions in the context to which control is returned.

19.6.2 Coroutine Communication Operators

RESUME COROUTINE     3 access descriptor references

RESUME COROUTINE allows a coroutine to resume any directly accessible coroutine, pass a message to the resumed coroutine, and suspend itself at any directly accessible and available nonbuffered port. The first reference specifies an access descriptor for the message to be passed. The second reference specifies an access descriptor for the nonbuffered port at which the coroutine to be resumed should be suspended. The third reference specifies an access descriptor for the nonbuffered port at which the current coroutine is to be suspended.

19.6.3 Process Communication Operators

SEND     2 access descriptor references

SEND allows a process to send a message via a target port. The first reference specifies the message to be sent. The second reference specifies an access descriptor for the port through which the message is to be sent.

WAIT TO RECEIVE     1 access descriptor reference

WAIT TO RECEIVE allows a process to wait at a buffered port for a message from some process. The reference specifies an access descriptor for the buffered port at which the process desires to wait to receive a message.

CONDITIONAL SEND     1 data reference; 2 access descriptor references

CONDITIONAL SEND allows a process to check for the availability of message-queuing space at a target port and to indivisibly send a message to that port if queuing space is available. The first reference specifies the message to be sent. The second reference specifies an access descriptor for the port through which the message is to be sent. The third reference specifies a boolean operand that is set to true if the message was sent.

CONDITIONAL RECEIVE     1 data reference; 1 access descriptor reference

CONDITIONAL RECEIVE allows a process to check for the availability of a message at a buffered port and to indivisibly accept it if one is available. The first reference specifies an access descriptor for the buffered port that the process desires to check for a message. The second reference specifies a boolean operand that is set to true if a message is received.

IDLE n TIME QUANTA     1 data reference

IDLE n TIME QUANTA allows a process to retain control of the associated processor but cease executing instructions for a processing delay of n time quanta. The reference specifies a short-ordinal operand containing the processing delay value. Note that this operator is unique to input/output processors.

WAIT n TIME QUANTA     1 data reference

WAIT n TIME QUANTA allows a process to send itself to a dispatching port and be guaranteed that a dispatching delay of n time quanta will pass prior to it being redispatched. The reference specifies a short-ordinal operand containing the dispatching delay value. The dispatching port used is the current service port of the process.

WAIT TO RECEIVE OR n TIME QUANTA     1 data reference; 1 access descriptor reference WAIT TO RECEIVE OR n TIME QUANTA allows a process to send itself to a dispatching port so that it can be guaranteed that, if it has not received a message via a specified buffered port before a dispatching delay of n time quanta passes, it will become dispatchable again. The first reference specifies a short-ordinal operand containing the dispatching delay value. The dispatching port used is the current service port of the process. The second reference specifies an access descriptor for the buffered port at which the process desires to wait to receive a message.

READ PROCESS IDENTIFICATION     1 data reference

The 16-bit process identification number of the current process is read from the process object and stored in the short-ordinal operand specified by the destination reference.

READ PRINCIPAL IDENTIFICATION     1 data reference

The 16-bit principal identification number of the current principal is read from the process object and stored in the short-ordinal operand specified by the destination reference.

READ PROCESS CLOCK     1 data reference

The 32-bit process clock of the current process is read from the process object, updated to include time consumed during the current service period, and stored in the ordinal operand specified by the destination reference.

19.6.4 Processor Communication Operators
SEND TO PROCESSOR    2 data references; 1 access descriptor reference SEND TO PROCESSOR allows a process to send an interprocessor message to one specific processor, including the processor it is executing on, via the interprocessor communication mechanism. The first reference specifies a short-ordinal operand containing the interprocessor message. The second reference specifies an access descriptor for the desired processor object. The third reference specifies a boolean operand that is set to true if the control flags are deposited.

BROADCAST TO PROCESSORS    2 data references; 1 access descriptor reference

BROADCAST TO PROCESSORS allows a process to broadcast an interprocessor message to all the processors in the system, including the processor it is executing on, via the interprocessor communication mechanism. The first reference specifies a short-ordinal operand containing the interprocessor message. The second reference specifies an access descriptor for the desired processor object. The third reference specifies a boolean operand that is set to true if the control flags are deposited.

READ PROCESSOR STATUS    1 data reference

The 16-bit processor status field of the current processor is read from the processor object and stored in the short-ordinal operand specified by the destination reference. The processor status field includes both processor unit number and processor status information.

19.7 BLOCK TRANSFER OPERATORS

The following set of operators support the block transfer facilities of the input/output processor and are unique to input/output processors. They are used in setup, initiation of transfer, and cleanup phases of a transfer operation.

ASSIGN PERIPHERAL    2 data references; 2 access descriptor references

ASSIGN PERIPHERAL allows a process to assign a peripheral object as either the source or destination for a block transfer. The first reference specifies an access descriptor for a peripheral object. The second reference specifies a boolean operand whose value is used to specify whether the assignment is as the source or as the destination. A value of zero indicates that the assignment is as the source. A value of one indicates that the assignment is as the destination. The third reference specifies a short-ordinal operand that contains the assignment option control flags. These flags, encoded in the same way as described for the peripheral control segment facilities field under the heading "INPUT/OUTPUT OBJECT STRUCTURES" specify the incrementation, synchronization, and termination option selections for the assignment being made. The assignment option flags are encoded as follows:

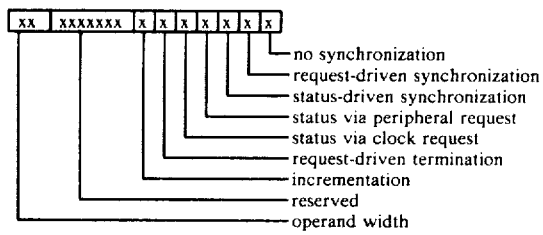

The fourth reference specifies an access descriptor for the transfer control object to which the assignment is to be made. Operator execution proceeds as follows. The peripheral object address development information is fetched. If the object referenced is not a peripheral object, a peripheral object-type fault occurs. If the peripheral object-across descriptor does not bear assign/deassign rights, a peripheral-object rights fault occurs. The associated peripheral control-segment address development information is fetched. If the object referenced is not a peripheral control segment, a peripheral control-segment-type fault occurs. The peripheral interface address development information is fetched. If the object referenced is not a data segment, a data-segment-type fault occurs. The peripheral interface address development information is fetched. If the object referenced is not a data segment, a data-segment type fault occurs. The source/destination selection boolean is fetched. If source is specified and the data segment access descriptor does not bear read rights, a data segment rights fault occurs. If destination is specified and the data segment access descriptor does not bear write rights, a data segment rights fault occurs. The assignment option control flags are fetched. The transfer control object address development information is fetched. If the object referenced is not a transfer control object, a transfer control object type fault occurs. If the transfer control object acess descriptor does not bear assign/deassign rights, a transfer control objects rights fault occurs. The association transfer control segment address development information is fetched. If the object referenced is not a transfer control segment, a transfer control segment-type fault occurs. Based upon the value of the source/destination selection operand, the appropriate source/destination assignment flag in the transfer control segment is inspected to see if the specified source/destination is currently assigned. If the specified source/destination is assigned, an invalid assignment fault occurs. If the source/destination entry in the transfer control object does not contain a null access descriptor, a transfer control object state fault occurs. The assignment option control flags are checked for validity against the corresponding facilities provided flags in the peripheral-control segment, and if invalid, cause an invalid assignment options fault. Otherwise, the peripheral object access descriptor is written into the appropriate source/destination entry in the transfer control object, the assignment option control flags are entered in the appropriate fields of the transfer control segment, the transfer control object completed flag is cleared, the appropriate source/destination assignment flag in the transfer control segment is set, and the object assignment flag in the peripheral control segment is set.

ASSIGN DATA SEGMENT    2 data references; 2 access descriptor references

ASSIGN DATA SEGMENT allows a process to assign a data segment as either the source or destination for a block transfer. The first reference specifies an access descriptor for a data segment. The second reference specifies a boolean operand whose value is used to specify whether the assignment is as the source or as the destination. A value of zero indicates that the assignment is as the source. A value of one indicates that the assignment is as the destination. The third reference specifies a short-ordinal operand that contains the assignment option control flags. These flags, encoded in the same way as described for the peripheral-control segment facilities field under the heading "INPUT/OUTPUT OBJECT STRUCTURES" synchronization, and termination option selections for assignment being made. The assignment option flags are encoded as follows:

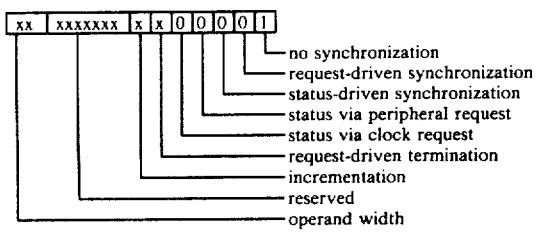

Note that the no-synchronization field is specified to contain a one and that the other synchronization fields are specified to contain zeros. This value is forced no matter what the value in the operand. Also note that the operand width is never allowed to take on the value 11 (i.e., specifying that access descriptors are to be transferred). The fourth reference specifies an access descriptor for the transfer control object to which the assignment is to be made. Operator execution proceeds as follows. The data segment address development information is fetched. If the object referenced is not a data segment, a data segment-type fault occurs. The source/destination selection boolean is fetched. If source is specified and the data segment access descriptor does not bear read rights, a data segment rights fault occurs. If destination is specified and the data segment access descriptor does not bear write rights, a data segment rights fault occurs. The assignment option control flags are fetched. The transfer control object address development information is fetched. If the object referenced is not a transfer control object, a transfer control object-type fault occurs. If the transfer control object access descriptor does not bear assign/deassign rights, a transfer control object rights fault occurs. The associated transfer control segment address development information is fetched. If the object referenced is not a transfer control segment, a transfer control segment-type fault occurs. Based upon the value of the source/destination selection operand, the appropriate source/destination assignment flag in the transfer control segment is inspected to see if the specified source/destination is currently assigned. If the specified source/destination is assigned, an invalid assignment fault occurs. If the source/destination entry in the transfer control object does not contain a null access descriptor, a transfer control object state fault occurs. The assignment option control flags are checked for validity, and if invalid, cause an invalid assignment options fault. Otherwise, the data segment access descriptor is written into the appropriate source/destination entry in the transfer control object, the assignment option control flags are entered in the appropriate fields of the transfer control segment, the transfer control object completed flag is cleared, and the appropriate source/destination assignment flag is set.

ASSIGN ACCESS LIST    2 data references; 2 access descriptor references

ASSIGN ACCESS LIST allows a process to assign an access list as either the source or destination for a block transfer. The first reference specifies an access descriptor for an access list. The second reference specifies a boolean operand whose value is used to specify whether the assignment is as the source or as the destination. A value of zero indicates that the assignment is as the source. A value of one indicates that the assignment is as the destination. The third reference specifies a short-ordinal operand that contains the assignment option control flags. These flags, encoded in the same way as described for the peripheral control segment facilities field under the heading "INPUT/OUTPUT OBJECT STRUCTURES," specify the incrementation, synchronization, and termination option selections for the assignment being made. The assignment option flags are encoded as follows:

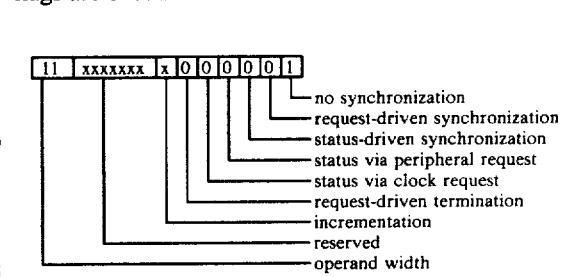

Note that the no-synchronization field is specified to contain a one and that the other synchronization fields and the termination field are specified to contain zeros (i.e., specifying no synchronization and termination upon limit count runout). These values are forced no matter what the values in the operand. Also note that the operand length field is specified to contain ones (i.e., specifying that access descriptors are to be transferred). This value is forced no matter what the value in the operand. The fourth reference specifies an access descriptor for the transfer control object to which the assignment is to be made. Operator execution proceeds as follows. The access list address development information is fetched. If the object referenced is not an access list, an access list type fault occurs. The source/destination selection boolean is fetched. If source is specified and the access list access descriptor does not bear read rights, an access list rights fault occurs. If destination is specified and the access list access descriptor does not bear write rights, a access list rights fault occurs. The assignment option control flags are fetched. The transfer control object address development information is fetched. If the object referenced is not a transfer control object, a transfer control object-type fault occurs. If the transfer control object access descriptor does not bear assign/deassign rights, a transfer control object rights fault occurs. The associated transfer control segment address development information is fetched. If the object referenced is not a transfer control segment, a transfer control segment-type fault occurs. Based upon the value of the source/destination selection operand, the appropriate source/destination assignment flag in the transfer control segment is inspected to see if the specified source/destination is currently assigned. If the specified source/destination is assigned, an invalid assignment fault occurs. If the source/destination entry in the transfer control object does not contain a null access descriptor, a transfer control object state fault occurs. The assignment option control flags are checked for validity, and if invalid, cause an invalid assignment options fault. Otherwise, the data segment access descriptor is written into the appropriate source/destination entry in the transfer control object, the assignment option control flags are entered in the appropriate fields of the transfer control segment, the transfer control object completed flag is cleared, and the appropriate source/destination assignment flag is set.

DEASSIGN SOURCE/DESTINATION    1 data reference; 1 access descriptor reference

DEASSIGN SOURCE/DESTINATION allows a process to deassign either a source or a destination assigned to a given transfer control object. The first reference specifies a boolean operand whose value is used to specify whether the deassignment applies to the source or the destination. A value of zero indicates that the deassignment applies to the source. A value of one indicates that the deassignment applies to the destination. The second reference specifies an access descriptor for the transfer control object in which the deassignment is to be made. Operator execution proceeds as follows. The source/destination selection boolean is fetched. The transfer control object address development information is fetched. If the object referenced is not a transfer control object, a transfer control object type fault occurs. If the transfer control object access descriptor does not bear assign/deassign rights, a transfer control objects rights fault occurs. The associated transfer control segment address development information is fetched. If the object referenced is not a transfer control object, a transfer control segment-type fault occurs. Based upon the value of the source/destination selection operand, the appropriate source/destination assignment flag in the transfer control segment is inspected to see if the specified source/destination is currently assigned. If the specified source/destination is not assigned, an invalid assignment fault occurs. Otherwise, the address development information for the source/destination being deassigned is fetched. If the object referenced is a peripheral object and the associated access descriptor does not bear assign/deassign rights, a peripheral object rights fault occurs. If the source/destination access descriptor does not bear delete rights, an access descriptor deletion fault occurs. Otherwise, path count decrementation is performed on the associated segment descriptor. Then a null access descriptor is written into the appropriate source/destination entry in the transfer control object, the appropriate source/destination assignment flag and the transfer control object completed flag are cleared and, if the object being deassigned is a peripheral object, the object assignment flag in the associated peripheral control segment is cleared.

ASSIGN TABLE SEGMENT    1 data reference; 2 access descriptor references

ASSIGN TABLE SEGMENT allows a process to assign a data segment as either the translation table segment or the indexed escape segment for a block transfer. The first reference specifies an access descriptor for a table segment. The second reference specifies a boolean operand whose value is used to specify whether the assignment is as the translate table or as the index table. A value of zero indicates that the assignment is as the translate table. A value of one indicates that the assignment is as the index table. The third reference specifies an access descriptor for the transfer control object to which the assignment is to be made. Operator execution proceeds as follows. The table segment address development information is fetched. If the object referenced is not a data segment, a data segment-type fault occurs. If the data segment access descriptor does not bear read rights, a data segment rights fault occurs. The table segment selection boolean is fetched. The transfer control object address development information is fetched. If the object referenced is not a transfer control object, a transfer control object-type fault occurs. If the transfer control object access descriptor does not bear assign/deassign rights, a transfer control object rights fault occurs. The associated transfer control segment address development information is fetched. If the object referenced is not a transfer control segment, a transfer control segment-type fault occurs. Based upon the value of the table segment selection operand, the appropriate table segment assignment flag in the transfer control segment is inspected to see if the specified table segment is currently assigned. If the specified table segment is assigned, an invalid assignment fault occurs. If the appropriate table segment entry in the transfer control object does not contain a null access descriptor, a transfer control object states fault occurs. Otherwise, the data segment access descriptor is written into the appropriate table segment entry in the transfer control object, the transfer control object completed flag is cleared, and the appropriate table segment assignment flag is set.

DEASSIGN TABLE SEGMENT    1 data reference; 1 access descriptor references

DEASSIGN TABLE SEGMENT allows a process to deassign either one of the table segments assigned to a given transfer control object. The first reference specifies a boolean operand whose value is used to specify whether the deassignment applies to the translate table or the index table. A value of zero indicates that the deassignment applies to the translate table. A value of one indicates that the deassignment applies to the index table. The second reference specifies an access descriptor for the transfer control object in which the deassignment is to be made. Operator execution proceeds as follows. The table segment selection boolean is fetched. The transfer control object address development information is fetched. If the object referenced is not a transfer control object, a transfer control object-type fault occurs. If the transfer control object access descriptor does not bear assign/deassign rights, a transfer control object rights fault occurs. The associated transfer control segment address development information is fetched. If the object referenced is not a transfer control object, a transfer control object-type fault occurs. Based upon the value of the table segment selection operand, the appropriate table segment assignment flag in the transfer control segment is inspected to see if the specified table segment is currently assigned. If the specified table segment is not assigned, an invalid deassignment fault occurs. Otherwise, the address development information for the table segment being deassigned is fetched. If the object referenced is not a data segment, a data segment-type fault occurs. If the table segment access descriptor does not bear delete rights, an access descriptor deletion fault occurs. Otherwise, path count decrementation is performed on the associated segment descriptor. Then a null access descriptor is written into the appropriate table segment entry in the transfer control object and the appropriate table segment assignment flag and the transfer control object completed flag are cleared.

COMPLETE TRANSFER CONTROL OBJECT
3 data references; 1 access descriptor reference COMPLETE TRANSFER CONTROL OBJECT allows a process to finish the setup of a transfer control object by first adding several final items of information about the transfer to be performed and then by performing compatability checks on the completed object. The first reference specifies a short-ordinal operand containing the transfer limit count. The second reference specifies a short-ordinal operand containing the escape significance mask. The third reference specifies a short-ordinal operand containing the escape comparison mask. The fourth reference specifies an access descriptor for the transfer control object to be completed. Operator execution proceeds as follows. The transfer limit count is fetched. The escape significance mask is fetched. The escape comparison mask is fetched. The transfer control object address development information is fetched. If the object referenced is not a transfer control object, a transfer control object-type fault occurs. If the transfer control object access descriptor does not bear assign/deassign rights, a transfer control objects rights fault occurs. The associated transfer control segment address development information is fetched. If the object referenced is not a transfer control segment, a transfer control segment-type fault occurs. The source and destination assignment flags in the transfer control segment are inspected to see if the source and destination are currently assigned. If the source and destination are not assigned, a transfer control object state fault occurs. The source and destination operand widths are compared for compatability and, if incompatible, cause a transfer control object state fault. If a translate table is assigned and the combined operand width is not bytes, a transfer control object state fault occurs. The combined bandwidth maximum is computed and stored in the appropriate field of the transfer control object. The transfer limit count and the escape masks are stored in the appropriate fields of the transfer control segment. The completion and residual count fields are cleared. Then the transfer control object completed flag is set.

ASSIGN TRANSFER CONTROL OBJECT    1 access descriptor reference

ASSIGN TRANSFER CONTROL OBJECT allows a process to assign a completed transfer control object in preparation for a block transfer. The reference specifies an access descriptor for the transfer control object for which transfer setup is to be done. Operator execution proceeds as follows. The transfer control object address development information is fetched. If the object referenced is not a transfer control object, a transfer control object-type fault occurs. If the transfer control object access descriptor does not bear assign-/deassign rights, a transfer control object rights fault occurs. The associated transfer control segment address development information is fetched. If the object referenced is not a transfer control segment, a transfer control segment type fault occurs. The transfer control object completed flag in the transfer control segment is inspected to use if the transfer control object has been completed. If the transfer control object has not been completed, a transfer control object state fault occurs. Otherwise, the address development information for the bandwidth control object is fetched. If the object referenced is not a bandwidth control object, a bandwidth-control object-type fault occurs. If the sum of the combined bandwidth maximum from the transfer control segment and the bandwidth assigned from the bandwidth control segment is greater than the bandwidth limit from the bandwidth control segment, an invalid bandwidth request fault occurs. Based upon the transfer option information in the transfer control segment, the transfer control information necessary to prepare for the execution of a TRANSFER operator is loaded. The process and processor states are altered.

DEASSIGN TRANSFER CONTROL OBJECT

DEASSIGN TRANSFER CONTROL OBJECT allows a process to break the assignment currently in effect between the transfer controller and a transfer control object. Operator execution proceeds as follows. If no transfer control object is currently assigned, a transfer control object state fault occurs. Otherwise, process and processor state revert to that in effect prior to the execution of the most recent ASSIGN TRANSFER CONTROL OBJECT operator.

TRANSFER

Using the transfer control information loaded previously by an ASSIGN TRANSFER CONTROL OBJECT operator to specify the transfer options, a block of operands of the specified type and width of length limit count or less is transferred from the specified source to be specified destination. Data translation, if specified, is performed, one operand at a time, as the operands are transferred. Source and/or destination reference incrementation is performed as specified. Source and/or destination synchronization is maintained via the specified mechanism. Transfer termination occurs based upon the specified criteria. Upon termination, transfer completion and residual count information is stored in the assigned transfer control object. Process and processor state revert to that in effect prior to the execution of the most recent ASSIGN TRANSFER CONTROL OBJECT operator. Thus, in effect, an implicit and automatic DEASSIGN TRANSFER CONTROL OBJECT operator is performed.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. For use in a data processing system including at least one processor capable of executing an operation by means of an operator specified in an instruction, said operator including a class field specifying the operator class to which said operator belongs, said system having instruction objects defining an operation, and data objects, said objects stored in a memory which can be shared by a number of processors, an object-based access mechanism comprising:

means for decoding said instruction, said decoding means including means for decoding said class field specifying the operator class to which said operator belongs;

first means for registering first access information, said first access information providing information for locating a description (a first segment descriptor) of a first object (a data segment) stored in said memory, said first object being of a first basic type, said first object being a representation of related first information maintained in a contiguously-addressed set of memory locations;

second means for registering second access information, said second access information providing information for locating a description (a second segment descriptor) of a second object (an access list) stored in said memory, said second object being of a second basic type, said second object being a representation of related second information maintained in a contiguously-addressed set of memory locations;

said first type of object (said data segment) containing data scalar values;

said second type of object (said access list) containing access descriptors, at least one of said access descriptors providing information for locating said description of an object (said segment descriptor) and information for defining the extent of access to an object accessible through the use of said access descriptor and said segment descriptor;

each of said segment descriptors including a type field for indicating that the segment of said first or second type of object from which operands are obtainable for execution by said operator correspond to a particular one of said first or second types;

means for registering said segment decriptor type fields; and third means connected to said instruction decoding means, to said first and said second means and to said segment descriptor type field registering means, responsive to said operator specified in said instruction, for accessing said memory, said third means including means for invoking said first means or said second means, to access said memory, upon the condition that said class field in said operator for specifying the operator class to which said operator belongs and said segment descriptor type field each indicate that the content of the segment accessible by said first or second means corresponds to said first type of object or said second type of object, respectively.

2. The combination in accordance with claim 1 wherein:
said third means includes means for developing a physical memory address of an item of information within an object from a logical address for said item of information.

3. The combination in accordance with claim 1 wherein said segment descriptors include a base address indicating the starting address of a segment and a length vector specifying the length of said segment.

4. The combination in accordance with claim 3 wherein:
said third means includes means for developing a physical memory address of an item of information within an object including means for adding the position (displacement) of an item of information within said segment to said base address of said segment.

5. The combination in accordance with claim 4 wherein:
said third means further comprises means for protecting memory areas including means for comparing said displacement and said length vector, and means responsive to said comparing means for indicating a fault if said displacement exceeds said length.

6. The combination in accordance with claim 3 further comprising:
means (a segment table) for storing the base address-and-length parameters (a segment descriptor) of all allocated and unallocated segments; and
fourth means connected to said third means means including means for fetching the parameters for a particular segment from said segment table;
whereby changing the base address of any segment or redefining the size of a segment can be performed by updating a single copy of the parameters describing said segment, as stored in said segment table.

7. The combination in accordance with claim 1, wherein said segment descriptors further include:
means for selectively indicating that the manipulation of data in said first type of object is permitted and for indicating that the manipulation of data in said second type of object is not permitted.

8. The combination in accordance with claim 1 wherein said access list comprises:
means for storing various types of access descriptors, including access-list access-descriptors for other access lists that are part of complex structures;
said access descriptors representing hardware-recognized objects and software-created system objects;
whereby a complex object may be structurally changed by manipulation of said various access descriptors in the access list corresponding to said object.

9. The combination in accordance with claim 8 wherein said access list includes an access descriptor providing access to a data segment containing data associated with said access list.

10. The combination in accordance with claim 8 including:
means in said processor for executing a move access descriptor operator to thereby move an access descriptor from a specified entry in a directly accessible access list to a specified entry in another directly accessible access list.

11. The combination in accordance with claim 8 including:
means in said processor for executing a move access descriptor indirect to thereby move an access descriptor from a specified entry in an indirectly accessible access list to a specified entry in another indirectly accessible access list.

12. The combination in accordance with claim 8 including:
means in said processor for executing a restrict rights operator to thereby restrict access of an operation to an object.

13. The combination in accordance with claim 8 including:
means in said processor for executing an amplify rights operator to thereby amplify access of an operation to an object.

14. For use with a memory shared by a number of processors, said memory having stored therein instruction objects defining an operation, and data objects, at least one of said processors comprising:
first means for registering first access information, said first access information providing access to a first processor-recognizable object (a domain);

second means for registering second access information, said second access information providing access to a second processor-recognizable object (a context);

third means for registering third access information, said third access information providing access to said instruction objects and said data objects;

said first processor-recognizable object (a domain) including said third access information (access descriptors) for providing access information for use by said third means in accessing said instruction objects and said data objects;

said second object (a context) including fourth access information (access descriptors) having encoded fields specifying the type and extent of access to said instruction objects and said data objects, said that for a process executing instructions (from said instruction objects) which reference a set of objects (either access lists or data segments) defined by said fourth access information in said second object, only those objects whose access descriptors appear in said second object are accessible and only in a manner specified by said encoded fields of said access descriptors in said second object;

said fourth access information in said second processor-recognizable object defining said set of objects (either access lists or data segments) accessible to the instructions of a given instance of an operation, said set of objects including said first processor-recognizable object, said fourth access information including therein said first access information to thereby provide information for use by said first accessing means in accessing said first object; and fifth means connected to said first and second means, said fifth means including means for decoding said encoded fields of said access descriptors in said second object and for invoking said first means and said second means, to thereby access said memory and said instruction objects and said data objects stored in said memory in said manner specified by said encoded fields of said access descriptors in said second object.

15. The combination in accordance with claim 14 wherein said second object has associated therewith a message object, said combination further comprising:
means (an access descriptor) for providing access to said message object;
sixth means for registering sixth access information, said sixth access information providing access to a sixth processor-recognizable object (another context), and
means for communicating instances of operations by moving a message in said second object to said sixth object, the message being the access descriptor of the one of said objects that has been referenced with said descriptor.

16. The combination in accordance with claim 14 wherein said second object has associated therewith a nonbuffered port, said combination further comprising:
means (an access descriptor) for providing access to said nonbuffered port; and
means for inserting into said nonbuffered port an access descriptor for said context object.

17. The combination in accordance with claim 14 further comprising:
a create-context operator;
a call-context operator;

means responsive to said create-context operator for preparing and establishing an access environment in which the operation that is called by said call-context operator has access both to data on said first object and to access descriptors on said second object, said create-context operator including means for updating linkage information for operations entered and not yet returned from on said second object; and, means for storing parameters onto a newly-created context, said context being the context for the operation called.

18. The combination in accordance with claim 17 further comprising;
means (return context operator) for reestablishing the environment for dynamic accessibility of the process environment object that existed before execution of said call-context operator.

19. The combination in accordance with claim 18 wherein said return-context operator means further includes means to return information to the reestablished dynamic environment, by means of a link access descriptor entry of the current context object.

20. The combination in accordance with claim 14 wherein said second object further includes means for supporting a program structure (coroutine) for enabling a number of context objects to be associated with each computational object.

21. The combination in accordance with claim 14 wherein said first object includes means for supporting a computationally complete access environment, said access environment including separate primary segments, one for each of a public, a private, and entry access list.

22. The combination in accordance with claim 21 wherein:
said public access list comprises a primary segment containing access descriptors for all objects available to another process environment including an access descriptor of a private access list;
said private access list comprises a primary segment containing the access descriptors for those objects that are only accessible when a process is operating within said process environment as a result of invoking one of the operations within said environment; and
said entry access list comprises the public access list for one of the process environments whose access descriptors are accessible in said first-mentioned process environments.

23. The combination in accordance with claim 21 wherein one of the access descriptors in said public access list is for an instruction segment to hold instructions of programmer-defined operations associated with said process environment.

24. The combination in accordance with claim 21 wherein one of the access descriptors in said public access list is the access descriptor of its private access list, the entry in said list appearing to be a null access descriptor when examined or selected from outside said process environment, whereby only by invoking one of the operations in the public part of said process environment does a process gain access to said public access list entry and thus access to the private access list of said process environment.

25. For use with a memory shared by a number of processors, said memory having allocatable memory locations, a processor comprising:

first means connectable to said memory for registering access information, said access information providing access to a plurality of objects stored in said memory;

second means for developing a physical memory address from a logical address reference to an object, in response to a request from a process running on said processor; and third means connected to said first and second means for registering third access information providing access to a first processor-recognizable object for storing therein access information for describing in said memory a set of objects which an operation being executed can access, said third access information including encoded fields for specifying what kind of access is provided to said objects in said memory, such that said objects are accessible by said first means only in a way specified by said encoded fields.

26. The combination in accordance with claim 25 wherein, said memory has stored therein instruction objects defining an operation, and data objects, said combination further comprising:

means for accessing said instruction objects and data objects, said first object including access information (access descriptors) including encoded fields for specifying the type and extent of access to said objects, such that for a process executing instructions from said instruction objects which reference said set of objects, defined by said first object, only those objects whose access descriptors appear in said first object are accessible and only in a manner specified by said encoded fields.

27. The combination in accordance with claim 26 further comprising:

fourth means, connected to said first and second means, for registering fourth access information providing access to a second processor recognizable object defining said set of objects accessible to the instruction of a given instance of a procedural operation, said set of objects including said first processor-recognizable object, said second object being associated with said process running on said processor.

28. The combination in accordance with claim 27 further comprising:

means for storing the state of a computation associated with one of said instruction objects in said memory, said state representing a virtual processor, a virtual processor being defined for each process; and means for associating one of said number of processors with said virtual processor;

whereby a ready-to-run process is paired with an available one of said processors.

29. The combination in accordance with claim 28 wherein the means for associating a physical processor with said virtual processor comprises;

queuing means (a dispatching port) for effecting the dispatching of processes for execution by one of said number of processors, said dispatching port means including executable process queuing means for queuing processes which have been sent for execution, and processor queuing means for queuing processors that are avaiable to receive a process for execution thereof.

30. The combination in accordance with claim 28 wherein a processor has access via a processor object to two communication segments, one for system wide communication (a global communication segment) and one for processor specific communication (a local communication segment); and, processor control flags in said communiation segments, whereby when set by a sending processor and later inspected by a target processor, specified functions are indicated in accordance with the setting of said control flags.

31. The combination in accordance with claim 28 wherein said means for associating a physical processor with a virtual processor includes:

means in a processor responsive to the detection of an alarm signal for suspending a process that said processor is currently executing; and means for activating the execution of a process waiting at an alarm dispatching port specified by a port access descriptor.

32. The combination in accordance with claim 27 wherein said second object has associated therewith a message segment, said combination further comprising:

means (an access descriptor) for providing access to said message object;

fifth means for registering fifth access information, said fifth access information providing access to a fifth processor-recognizable object (another context), and means for communicating between instances of operations by moving a message in said second object to said fourth object, the message being the access descriptor of said message object represented by said descriptor.

33. The combination in accordance with claim 27 wherein said second object has associated therewith a nonbuffered port, said combination further comprising:

means (an access descriptor) for referencing said nonbuffered port; and means for inserting into said nonbuffered port an access descriptor for said context object.

34. The combination in accordance with claim 27 wherein said first object has associated with it access list means for referencing arbitrarily complex multisegment structures, said access list comprising:

means for storing various types of access descriptors, including access list access descriptors for other access lists that are part of said structures;

said access descriptors representing hardware recognized objects and software-created system objects;

whereby a complex object may be structurally changed by manipulation of said various access descriptors in the access list corresponding to said object.

35. The combination in accordance with claim 34 wherein said access list means includes an access descriptor referencing a data segment associated with said access list.

36. The combination in accordance with claim 34, further comprising:

a first mechanism for controlling the degree of movement of access descriptors; and, a second mechanism for supporting an indirectly accessible list, including means for reading the access descriptor from a specified entry in the indirectly accessible access list, and means for writing said access descriptor onto said second object, whereby the object referenced by said means descriptor may be accessed directly.

37. The combination in accordance with claim 34 further comprising:
   a first mechanism for controlling the degree of movement of access descriptors; and,
   a second mechanism for supporting a directly accessible access list, including means for changing entries in the directly accessible access list, whereby an access descriptor may be removed from said second object, and said access descriptor may be written into a specified entry in said directly accessible access list.

38. The combination in accordance with claim 34 including:
   means in a processor for executing a move access descriptor operator to thereby move an access descriptor from a specified entry in a directly accessible access list to a specified entry in another directly accessible access list.

39. The combination in accordance with claim 34 including:
   means in a processor for executing a move access descriptor indirect to thereby move an access descriptor from a specified entry in an indirectly accessible access list to a specified entry in another indirectly accessible access list.

40. The combination in accordance with claim 34 including:
   means in a processor for executing a restrict rights operator to thereby restrict access of an operation to an object.

41. The combination in accordance with claim 34 including:
   means in a processor for executing an amplify rights operator to thereby amplify access of an operation to an object.

42. The combination in accordance with claim 27 further comprising means for parameter and result transmission, including a message segment associated with said second object; and
   means for establishing an access environment in which an operation to be called has access to data in said message segment;
   whereby any number of scalar parameters can be transmitted via said message segment.

43. The combination in accordance with claim 27 further comprising:
   a create context operator;
   a call-context operator;
   means responsive to said create-context operator for preparing and establishing an access environment in which the operation that is called by said call-context operator has access both to data on said first object and to access descriptors on said second object, said create-context operator including means for updating linkage information for operations entered and not yet returned from on said second object; and,
   means for storing parameters onto a newly-created context, said context being the context for the operation called.

44. The combination in accordance with claim 43 further comprising:
   means (return context operator) for reestablishing the environment for dynamic accessibility of the context object that existed before execution of said call context operator.

45. The combination in accordance with claim 44 wherein said return context operator means further includes means to return information to the re-established dynamic environment, by means of a link access descriptor entry of the current context object.

46. The combination in accordance with claim 27 wherein said context object further includes means for supporting a program structure (coroutine) for enabling a number of context objects to be associated with each instruction object.

47. The combination in accordance with claim 27 wherein said second object includes means for supporting a computationally complete access environment, said access environment including separate primary segments, one for each of a public, a private, and entry access list.

48. The combination in accordance with claim 47 wherein:
   said public access list comprises a primary segment containing access descriptors for all objects available to another process environment having an access descriptor for said other environment, including an access descriptor of a private access list;
   said private access list comprises a primary segment containing the access descriptors for those objects that are only accessible when a process is operating within said environment as a result of invoking one of said operations; and
   said entry access list comprises the public access list for one of the environments whose access descriptors are accessible in said first-mentioned environment.

49. The combination in accordance with claim 47 wherein one of the access descriptors in said public access list is for an instruction segment to hold instructions of programmer-defined operations associated with said environment.

50. The combination in accordance with claim 47 wherein one of the access descriptors in said public-access list is the access descriptor of its private-access list, the entry in said list appearing to be a null access descriptor when examined or selected from outside said environment, whereby only by invoking one of the operations in the public part of said process environment does a process gain access to said public-access-list entry and thus access to the private-access list of said process environment.

51. The combination in accordance with claim 25 wherein:
   said means for maintaining an environment includes means for initating the creation by said object maintaining means of a first type of system object (a data segment) for containing data scal ar values, and a second type of system object (an access list) for containing access descriptors having parameters which define the type and extent of access to an object associated with an access descriptor, said combination further comprising,
   means in said processor for allocating a data segment of said first or second type of system object in response to a request from said process running on said processor.

52. The combination in accordance with claim 51, wherein said processor further comprises:
   means for selectively indicating that the manipulation of data in said first type of system object is permitted and
   for indicating that the manipulation of data in said second type of system object is not permitted.

53. The combination in accordance with claim 51 wherein said parameters in said access descriptors include a base address indicating the starting address of a data segment and a length vector specifying the length of said segment.

54. The combination in accordance with claim 53 wherein said means in said processor for developing a physical memory address includes means for adding the position (displacement) of an item of data within said data segment to said base address of said data segment.

55. The combination in accordance with claim 54 further comprising:

means in said processor for protecting memory areas including means for comparing said displacement and said length vector, including means for indicating a fault if said displacement exceeds said length.

56. The combination in accordance with claim 53 further comprising:

means responsive to said allocating means (a segment table) for storing the base address and length parameters (a segment descriptor) of all allocated and unallocated data segments; and wherein said address development means further includes means for fetching the parameters for a particular segment from said segment table;

whereby changing the base address of any segment or redefining the size of a segment can be performed by updating a single copy of the parameters describing said segment, as stored in said segment table.

* * * * *

UNITED STATES PATENT AND TRADEMARK OFFICE
CERTIFICATE OF CORRECTION

PATENT NO. : 4,325,120
DATED : April 13, 1982
INVENTOR(S) : Stephen R. Colley, et al.

It is certified that error appears in the above-identified patent and that said Letters Patent are hereby corrected as shown below:

Column 269, line 16, the part which reads "objects, said", should read --objects such that--;

Column 270, line 50, the word "environments" should read --environment--;

column 272, line 67, the part which reads "by said means", should read --by said access--;

column 274, line 52, the part which reads "scal ar", should read --scalar--.

Signed and Sealed this

Fourteenth Day of September 1982

[SEAL]

Attest:

Attesting Officer

GERALD J. MOSSINGHOFF
Commissioner of Patents and Trademarks